(12) United States Patent
Allwein et al.

(10) Patent No.: US 12,391,413 B2
(45) Date of Patent: *Aug. 19, 2025

(54) SYSTEMS AND METHODS FOR AIRBORNE RECOVERY AND LAUNCH OF AERIAL VEHICLES

(71) Applicant: General Atomics Aeronautical Systems, Inc., San Diego, CA (US)

(72) Inventors: Michael Joseph Allwein, San Luis Obispo, CA (US); Roy Hultenius, Encinitas, CA (US); James William Groves, La Mesa, CA (US); Arthur Siemens, San Diego, CA (US); Sebastian Kaser, San Diego, CA (US); Elijah Abelovski, Escondido, CA (US); Celestino Morales, San Diego, CA (US)

(73) Assignee: General Atomics Aeronautical Systems, Inc., San Diego, CA (US)

( * ) Notice: Subject to any disclaimer, the term of this patent is extended or adjusted under 35 U.S.C. 154(b) by 125 days.

This patent is subject to a terminal disclaimer.

(21) Appl. No.: 18/350,648

(22) Filed: Jul. 11, 2023

(65) Prior Publication Data

US 2024/0017857 A1 Jan. 18, 2024

Related U.S. Application Data

(60) Provisional application No. 63/388,931, filed on Jul. 13, 2022.

(51) Int. Cl.
*B64U 70/20* (2023.01)
*B64D 3/00* (2006.01)
*B64U 10/25* (2023.01)

(52) U.S. Cl.
CPC ............... *B64U 70/20* (2023.01); *B64D 3/00* (2013.01); *B64U 10/25* (2023.01)

(58) Field of Classification Search
CPC ....... B64F 1/029; B64C 39/024; B64U 70/30; B64U 70/20
See application file for complete search history.

(56) References Cited

U.S. PATENT DOCUMENTS

| 2,365,827 A | 12/1944 | Liebert |
| 2,464,073 A | 3/1949 | Cotton |

(Continued)

FOREIGN PATENT DOCUMENTS

| CN | 103434646 | 12/2013 |
| CN | 104015931 | 9/2014 |

(Continued)

OTHER PUBLICATIONS

U.S. Appl. No. 15/930,281 U.S. Pat. No. 11,724,807, filed Aug. 15, 2023, Systems And Methods For In-Flight Recovery Of A Target Aircraft By A Host Aircraft During Forward Flight.

(Continued)

*Primary Examiner* — Justin M Benedik
(74) *Attorney, Agent, or Firm* — Knobbe, Martens, Olson & Bear, LLP

(57) ABSTRACT

Embodiments of a recovery and deployment pylon for recovering and launching/relaunching a target aircraft that can include a housing configured to be coupled with an aircraft, a motorized winch, a towline coupled with the winch and configured to be paid out and reeled in using the winch, a fitting coupled with the towline, and a first latching mechanism configured to selectively engage with a first lug of the target aircraft when the target aircraft is in a first position relative to the recovery and deployment pylon. The (Continued)

target aircraft can be in the first position when the target aircraft is within a predetermined proximity of the device.

20 Claims, 79 Drawing Sheets

(56) References Cited

U.S. PATENT DOCUMENTS

| | | | |
|---|---|---|---|
| 2,692,121 A | 10/1954 | Brown | |
| 3,013,743 A | 12/1961 | Keeney | |
| 3,049,319 A | 8/1962 | Elder et al. | |
| 3,088,693 A | 5/1963 | Brown | |
| 3,100,093 A | 8/1963 | McQuillen et al. | |
| 3,167,278 A | 1/1965 | Roberge | |
| 3,207,480 A * | 9/1965 | Fulton, Jr. | B64D 1/22 |
| | | | 258/1.2 |
| 4,256,012 A | 3/1981 | Cowart et al. | |
| 5,074,402 A | 12/1991 | Bender-Zanoni et al. | |
| 5,103,712 A | 4/1992 | Minovitch | |
| 5,315,561 A | 5/1994 | Grossi | |
| 5,983,161 A | 11/1999 | Lemelson et al. | |
| 6,056,236 A | 5/2000 | Weimer et al. | |
| 6,079,664 A | 6/2000 | Salzberger | |
| 6,100,842 A | 8/2000 | Dreier et al. | |
| 6,532,192 B1 | 3/2003 | Reid | |
| 6,932,299 B2 | 8/2005 | Beyerle et al. | |
| 7,059,564 B2 * | 6/2006 | Dennis | B64F 1/04 |
| | | | 244/110 G |
| 7,066,430 B2 * | 6/2006 | Dennis | B64F 1/06 |
| | | | 244/110 F |
| 7,097,137 B2 | 8/2006 | McDonnell | |
| 7,900,866 B2 * | 3/2011 | Kutzmann | B64D 5/00 |
| | | | 244/116 |
| 8,038,090 B2 | 10/2011 | Willson et al. | |
| 8,074,931 B2 | 12/2011 | Schroeder | |
| 8,231,083 B2 | 7/2012 | Kutzmann et al. | |
| 8,991,793 B1 * | 3/2015 | Bernhardt | B64D 1/22 |
| | | | 258/1.2 |
| 9,878,777 B2 | 1/2018 | Bernhardt et al. | |
| 10,246,189 B2 | 4/2019 | Paunicka et al. | |
| 10,266,267 B2 | 4/2019 | Paunicka et al. | |
| 10,589,859 B2 | 3/2020 | Foo et al. | |
| 10,618,676 B2 | 4/2020 | Chen et al. | |
| 10,913,534 B1 | 2/2021 | Brum | |
| 11,008,102 B2 | 5/2021 | Ryan et al. | |
| 11,639,223 B1 | 5/2023 | Allwein et al. | |
| 11,724,807 B2 | 8/2023 | Koller et al. | |
| 2003/0071164 A1 | 4/2003 | Carlson et al. | |
| 2004/0089767 A1 | 5/2004 | Harrison | |
| 2005/0110676 A1 | 5/2005 | Heppe et al. | |
| 2005/0133665 A1 | 6/2005 | Dennis et al. | |
| 2006/0000949 A1 | 1/2006 | Schroeder | |
| 2006/0202088 A1 | 9/2006 | Padan | |
| 2007/0108345 A1 | 5/2007 | McDonnell | |
| 2008/0234884 A1 | 9/2008 | Von Thal | |
| 2008/0265097 A1 | 10/2008 | Stecko et al. | |
| 2009/0132165 A1 | 5/2009 | Gabrielsson et al. | |
| 2009/0326736 A1 | 12/2009 | Waid | |
| 2010/0025523 A1 | 2/2010 | Kutzmann et al. | |
| 2010/0038477 A1 | 2/2010 | Kutzmann et al. | |
| 2010/0191450 A1 | 7/2010 | Ravenscroft et al. | |
| 2010/0217526 A1 | 8/2010 | McElveen et al. | |
| 2010/0237183 A1 | 9/2010 | Wilson et al. | |
| 2010/0276537 A1 | 11/2010 | Kutzmann et al. | |
| 2011/0001011 A1 | 1/2011 | Degiorgis et al. | |
| 2011/0006151 A1 | 1/2011 | Beard | |
| 2012/0059536 A1 | 3/2012 | Pepicelli et al. | |
| 2012/0251280 A1 | 10/2012 | Jaurand et al. | |
| 2013/0082137 A1 * | 4/2013 | Gundlach | B64C 25/68 |
| | | | 244/110 G |
| 2013/0103249 A1 | 4/2013 | Pieper et al. | |
| 2013/0320138 A1 | 12/2013 | Dickson et al. | |
| 2013/0334370 A1 | 12/2013 | Herrero et al. | |
| 2014/0129126 A1 | 5/2014 | Richardson et al. | |
| 2015/0293225 A1 | 10/2015 | Riley et al. | |
| 2016/0023761 A1 | 1/2016 | McNally | |
| 2016/0152339 A1 | 6/2016 | von Flotow et al. | |
| 2017/0146659 A1 | 5/2017 | Kovermann et al. | |
| 2017/0349283 A1 * | 12/2017 | Paunicka | B64U 70/20 |
| 2017/0355458 A1 | 12/2017 | Chen et al. | |
| 2018/0265211 A1 | 9/2018 | Burgener et al. | |
| 2018/0281986 A1 | 10/2018 | Chang et al. | |
| 2018/0327093 A1 | 11/2018 | Von Flotow et al. | |
| 2019/0031347 A1 | 1/2019 | Duan et al. | |
| 2019/0063881 A1 | 2/2019 | Abramov et al. | |
| 2019/0068953 A1 | 2/2019 | Choi et al. | |
| 2019/0088156 A1 | 3/2019 | Choi et al. | |
| 2019/0110270 A1 | 4/2019 | Chen | |
| 2019/0112049 A1 | 4/2019 | Phan et al. | |
| 2019/0352015 A1 | 11/2019 | Hall | |
| 2020/0072587 A1 | 3/2020 | Bailey et al. | |
| 2020/0108922 A1 | 4/2020 | Smith et al. | |
| 2020/0108923 A1 | 4/2020 | Smith et al. | |
| 2020/0108924 A1 | 4/2020 | Smith et al. | |
| 2020/0108925 A1 | 4/2020 | Smith et al. | |
| 2020/0108926 A1 | 4/2020 | Smith et al. | |
| 2020/0108927 A1 | 4/2020 | Bosworth et al. | |
| 2020/0148387 A1 | 5/2020 | Johansen et al. | |
| 2020/0156790 A1 * | 5/2020 | von Flotow | B64U 80/70 |
| 2020/0279495 A1 | 9/2020 | von Flotow et al. | |
| 2020/0331630 A1 | 10/2020 | Ricaud | |
| 2020/0346781 A1 | 11/2020 | Bosma | |
| 2021/0039804 A1 | 2/2021 | Ropers | |
| 2021/0122486 A1 | 4/2021 | Sanchez et al. | |
| 2021/0129982 A1 | 5/2021 | Collins et al. | |
| 2021/0237901 A1 | 8/2021 | von Flotow et al. | |
| 2021/0239814 A1 | 8/2021 | Pimentel et al. | |
| 2021/0286379 A1 | 9/2021 | Wittenberg et al. | |
| 2021/0325542 A1 | 10/2021 | Ashjaee | |
| 2021/0354825 A1 * | 11/2021 | Koller | B64U 70/20 |
| 2022/0009628 A1 | 1/2022 | Hamilton | |
| 2022/0009632 A1 | 1/2022 | Gallo | |
| 2022/0066477 A1 | 3/2022 | Shi et al. | |
| 2022/0100207 A1 | 3/2022 | Koyanagi | |
| 2022/0144449 A1 | 5/2022 | Gamble et al. | |
| 2023/0150668 A1 | 5/2023 | Allwein et al. | |
| 2023/0150691 A1 | 5/2023 | Allwein et al. | |

FOREIGN PATENT DOCUMENTS

| | | |
|---|---|---|
| CN | 107933925 | 4/2018 |
| CN | 207578847 U | 7/2018 |
| CN | 109969401 A * | 7/2019 |
| CN | 110239726 | 9/2019 |
| CN | 110371296 | 10/2019 |
| CN | 110588986 | 12/2019 |
| CN | 107697303 | 10/2020 |
| CN | 111776148 | 10/2020 |
| CN | 112731502 | 4/2021 |
| CN | 113168190 | 7/2021 |
| CN | 113264188 | 8/2021 |
| CN | 113386962 | 9/2021 |
| CN | 113589848 | 11/2021 |
| CN | 113885577 | 1/2022 |
| ES | 1258116 U | 12/2020 |
| FR | 2421106 | 10/1979 |
| GB | 523991 | 7/1940 |
| GB | 566201 | 12/1944 |
| GB | 804704 | 11/1958 |
| GB | 2373488 | 9/2002 |
| KR | 10-2263294 | 6/2021 |
| KR | 10-2263704 | 6/2021 |
| RU | 2111154 C1 | 5/1998 |
| RU | 2712403 C1 | 1/2020 |
| TW | M608094 U | 2/2021 |
| WO | WO 2015/195175 | 12/2015 |
| WO | WO 2016/167849 | 10/2016 |
| WO | WO 2019/113971 | 6/2019 |
| WO | WO 2022/003343 | 1/2022 |
| WO | WO 2023/091132 | 5/2023 |

(56) References Cited

FOREIGN PATENT DOCUMENTS

| WO | WO 2023/091133 | 5/2023 |
|----|----------------|--------|
| WO | WO 2024/010655 | 3/2024 |

OTHER PUBLICATIONS

U.S. Appl. No. 17/455,383 U.S. Pat. No. 11,639,223, filed Nov. 17, 2021, Airborne Recovery Of Unmanned Aerial Vehicles.
U.S. Appl. No. 17/455,376, filed Nov. 17, 2021, Airborne Recovery Of Unmanned Aerial Vehicles.
U.S. Appl. No. 18/066,935, filed Dec. 15, 2022, Relative Navigation For Aerial Recovery Of Aircraft.
U.S. Appl. No. 18/066,935, filed Dec. 15, 2022, Allwein et al.
Cole, Major Michael W., "Inflight Rearming", Air Command and Staff College, Air University, Maxwell AFB, AL, Student Report No. 88-570, in 37 pages (1988).
Genuth, "ABRAcadabra—Airborne ReArming", The Future of Things, https://thefutureofthings.com/3023-abracadabra-airborne-rearming/, accessed on May 22, 22, in 5 pages.
Rescue Hoist Model 44301, A Rugged, Reliable Rescue Hoist, collinaerospace.com/hoistandwinch, printed 2019 in 2 pages.
Rescue Hoist Model 42305 A Rugged, Reliable Rescue Hoist, collinaerospace.com/hoistandwinch, printed 2019 in 2 pages.
Rescue Hoist Model 42325/44314, A Rugged, Reliable Rescue Hoist, collinaerospace.com/hoistandwinch, printed 2019 in 2 pages.
TE Connectivity Ltd., Rochester Cables, Engineered Cable Solutions for Harsh Environments, (2016)16 pages.
Caizzone et al., "Compact 6+1 antenna array for robust GNSS applications", IEEE, Aug. 31, 2016, retrieved on Dec. 30, 2023, available at https://ieeexplore.ieee.org/stamp/stamp.jsp?tp=&arnumber=7533853.
Parlin et al., "Jamming of UAV remote control systems using software defined radio", IEEE, Jun. 20, 2018, retrieved on Dec. 30, 2023, available at https://ieeexplore.ieee.org/stamp/stamp.jsp?tp=&arnumber=8398711.

\* cited by examiner

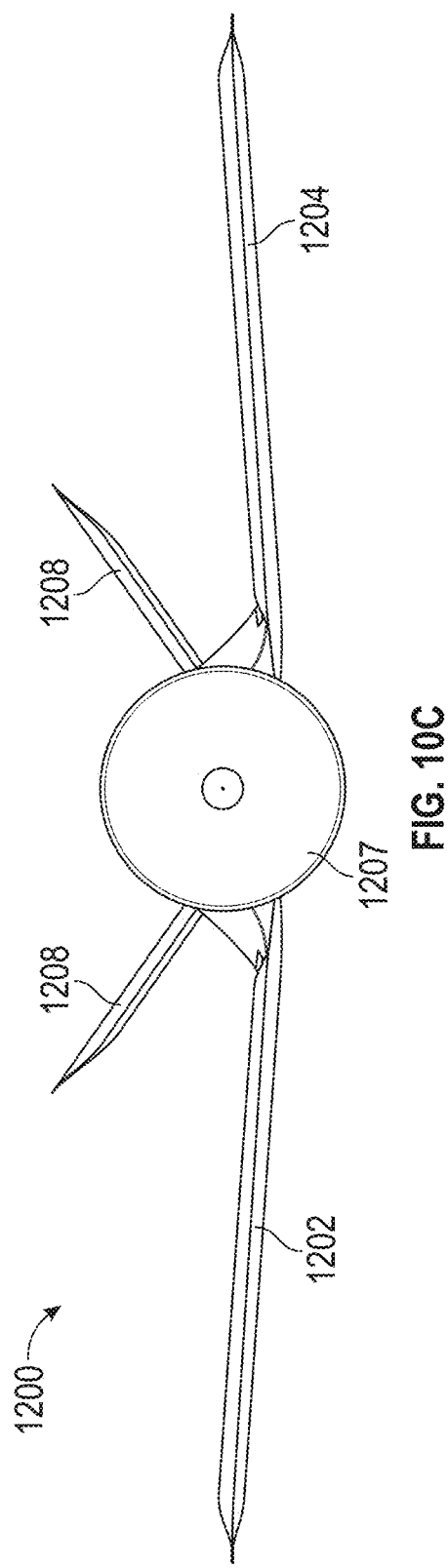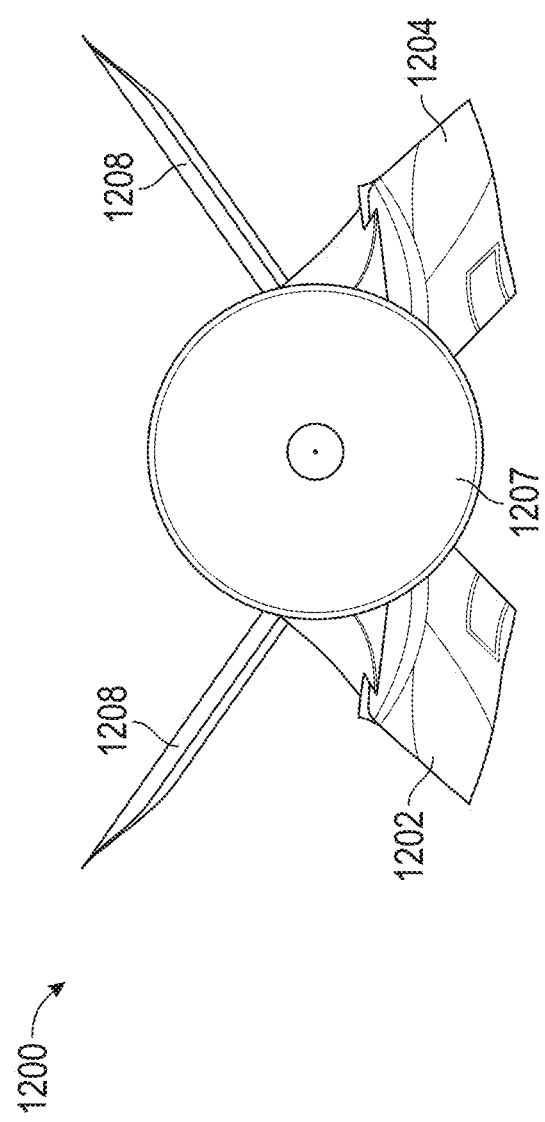

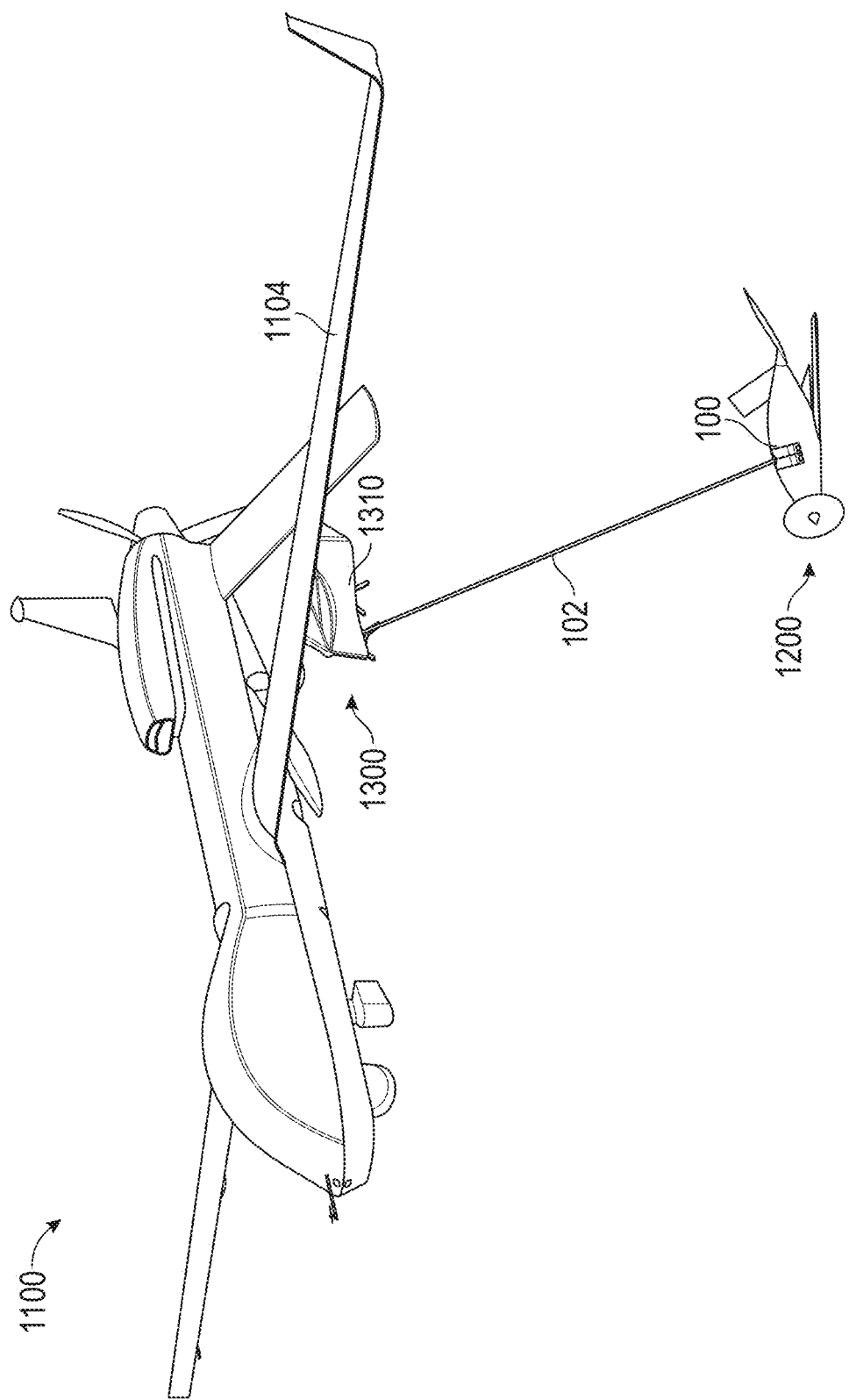

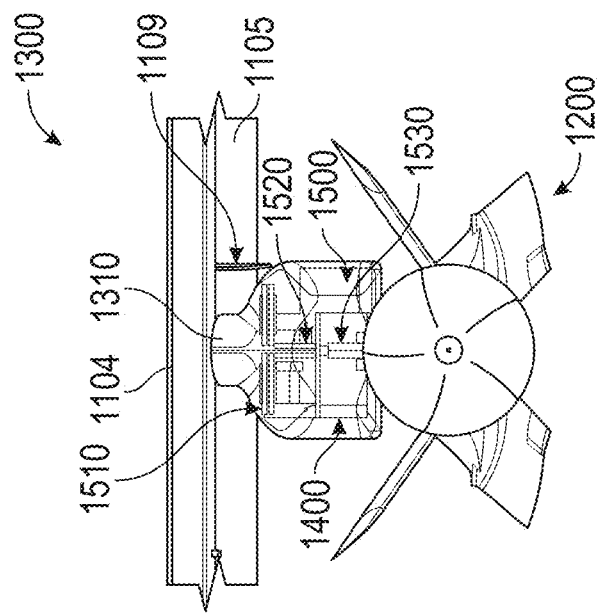
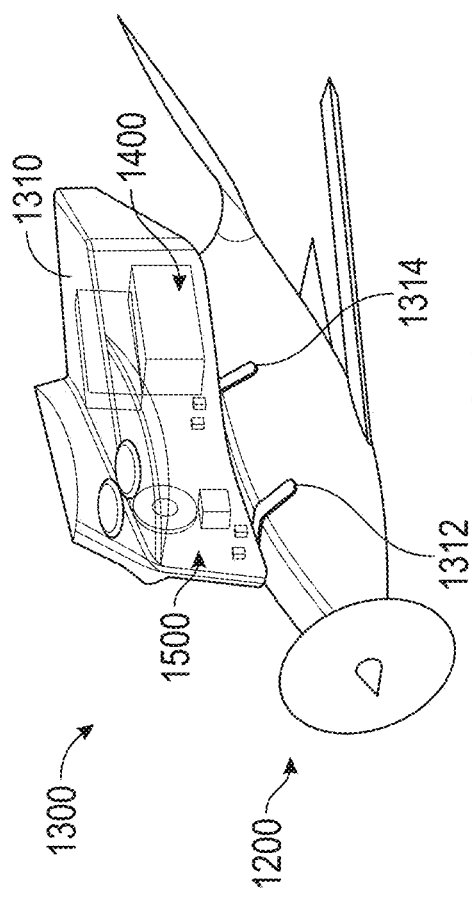
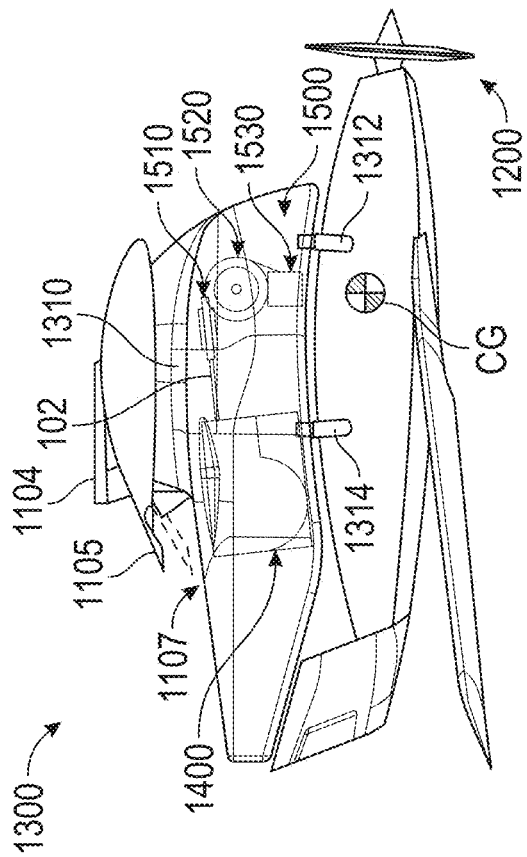
FIG. 12A
FIG. 12B
FIG. 12C

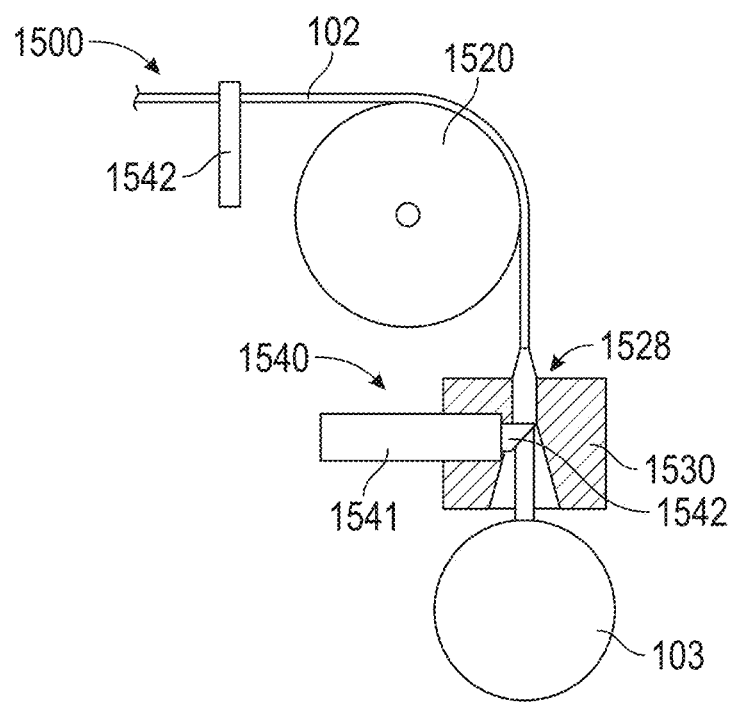
FIG. 15A
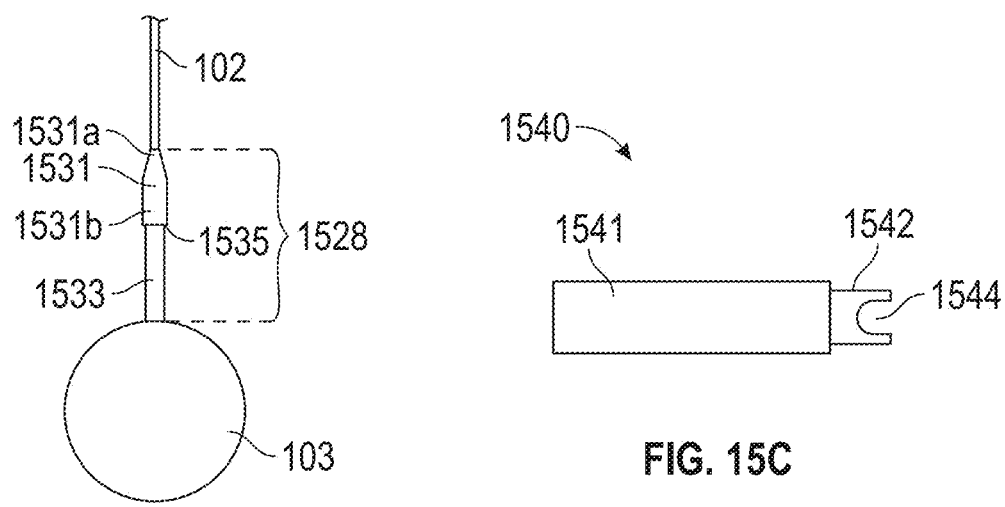
FIG. 15B
FIG. 15C

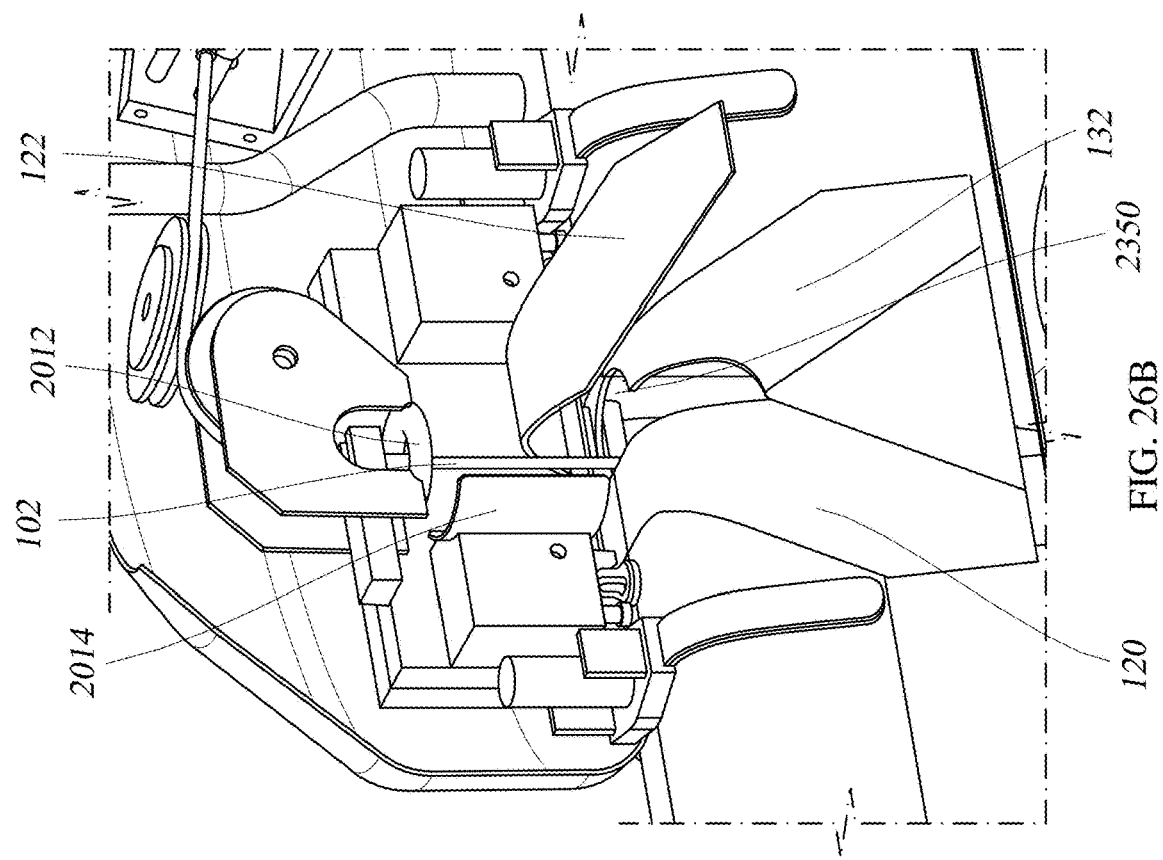
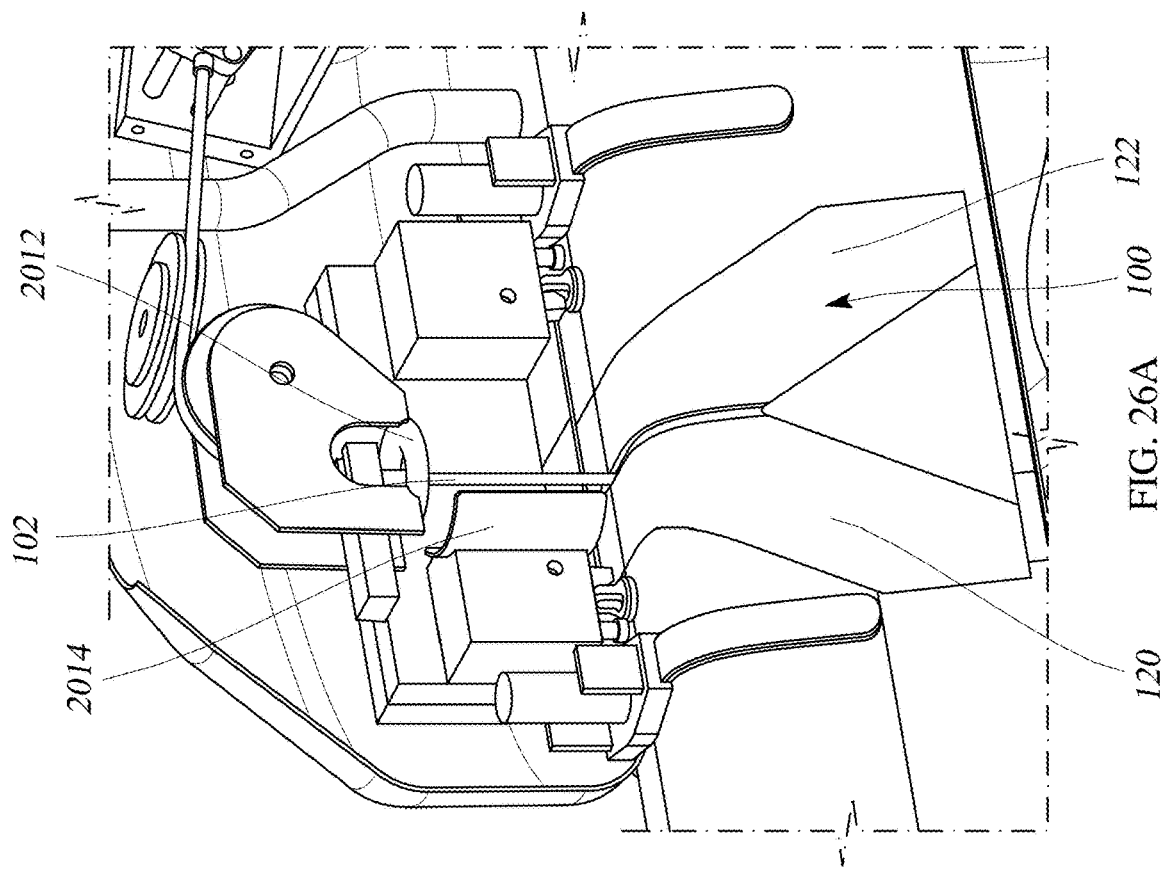

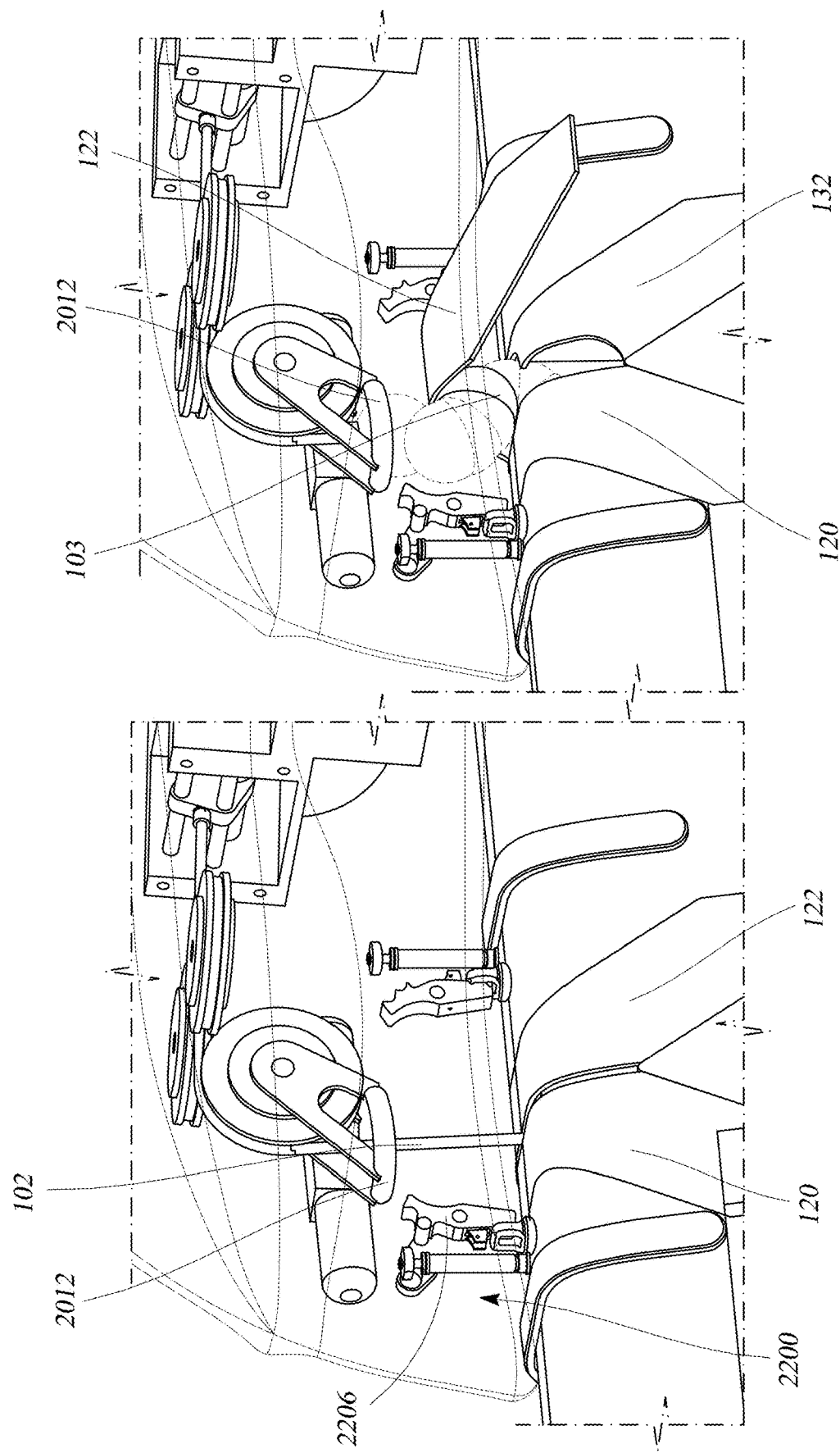

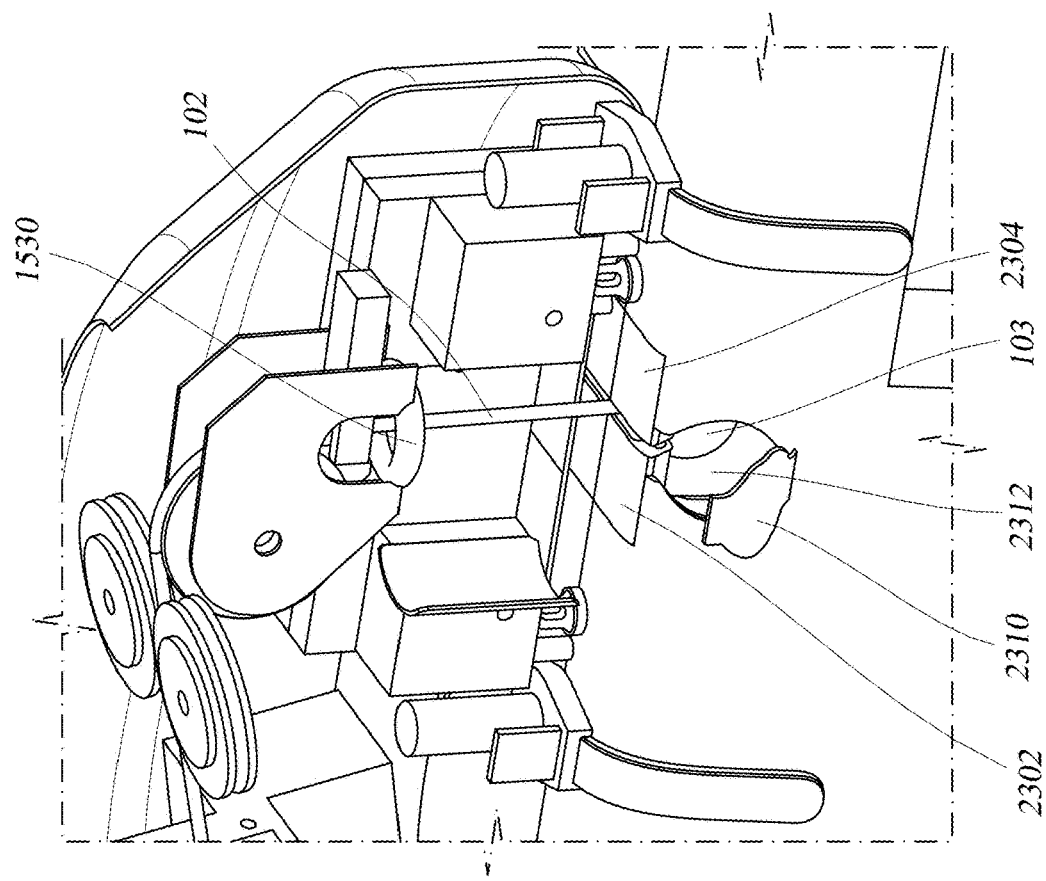
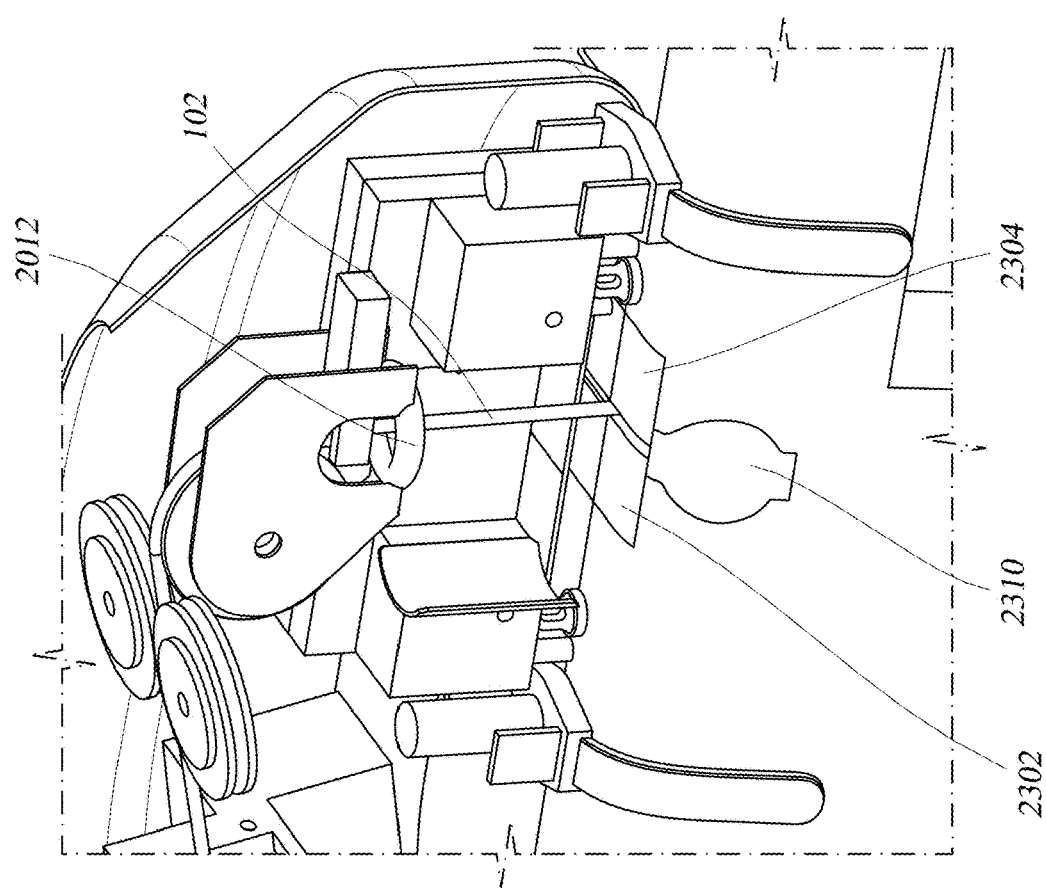

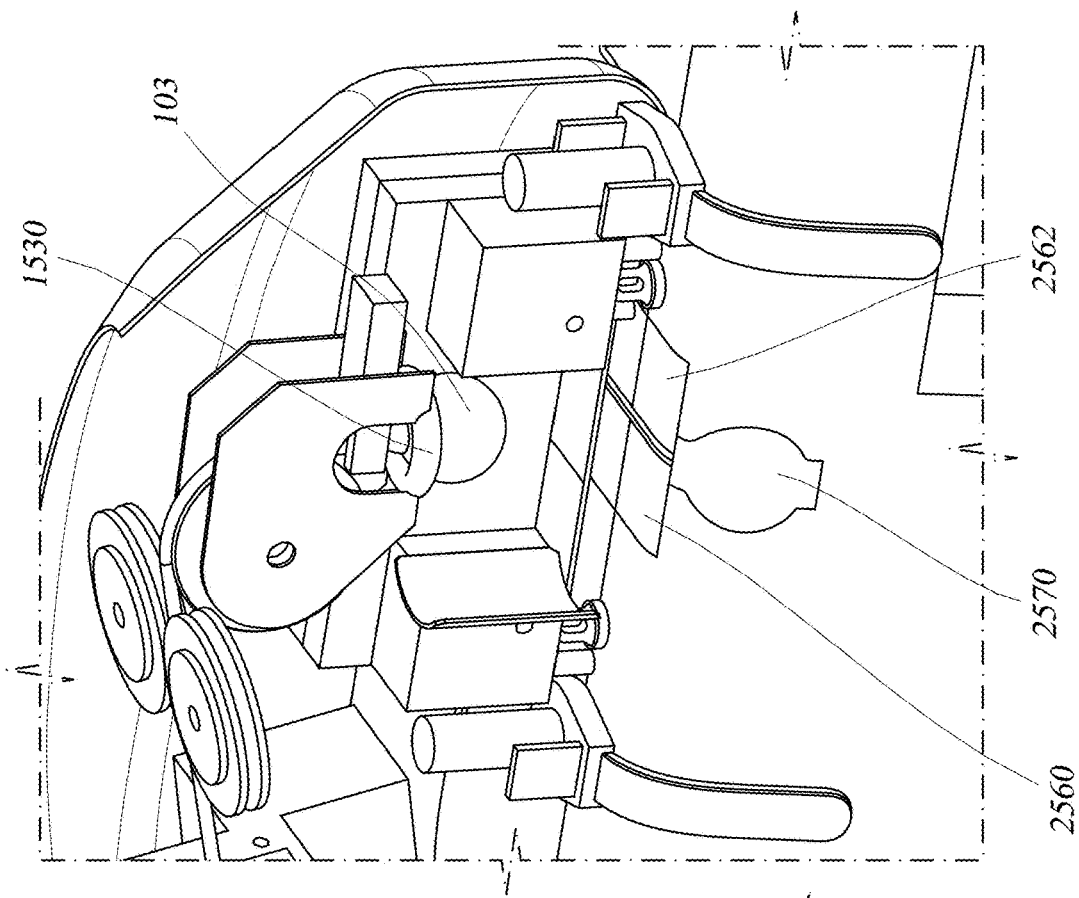
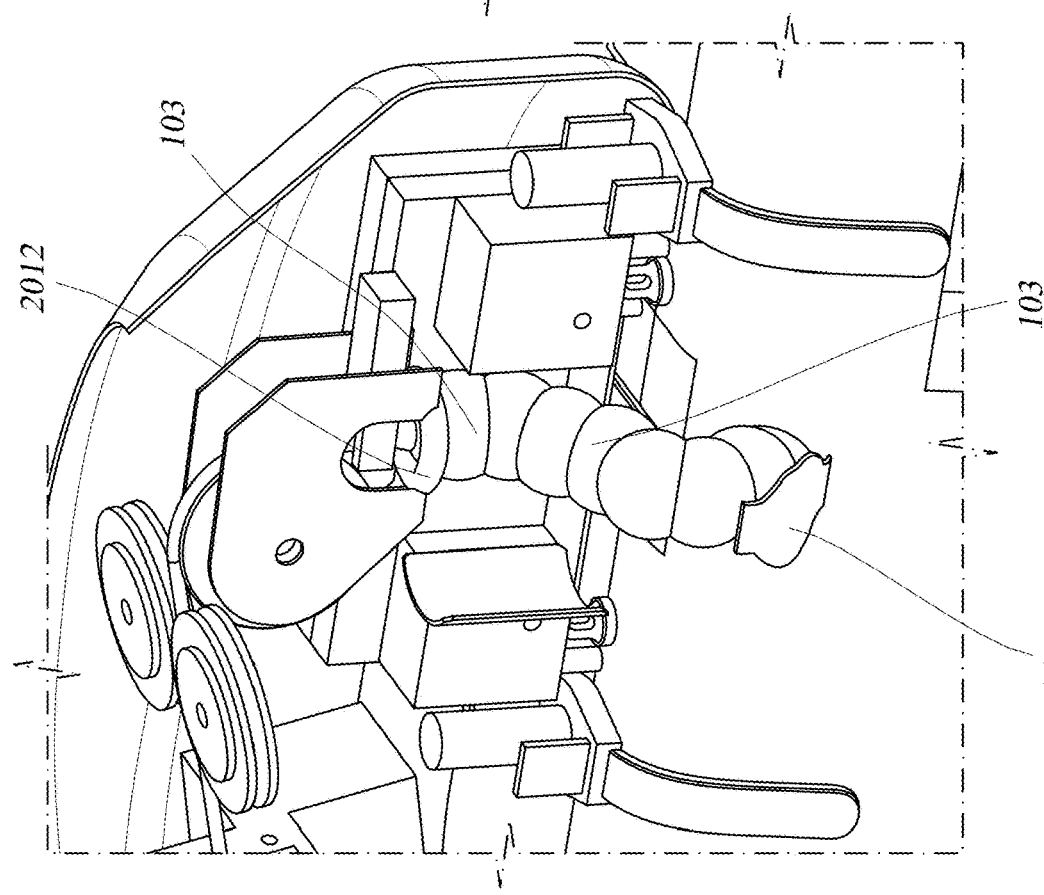

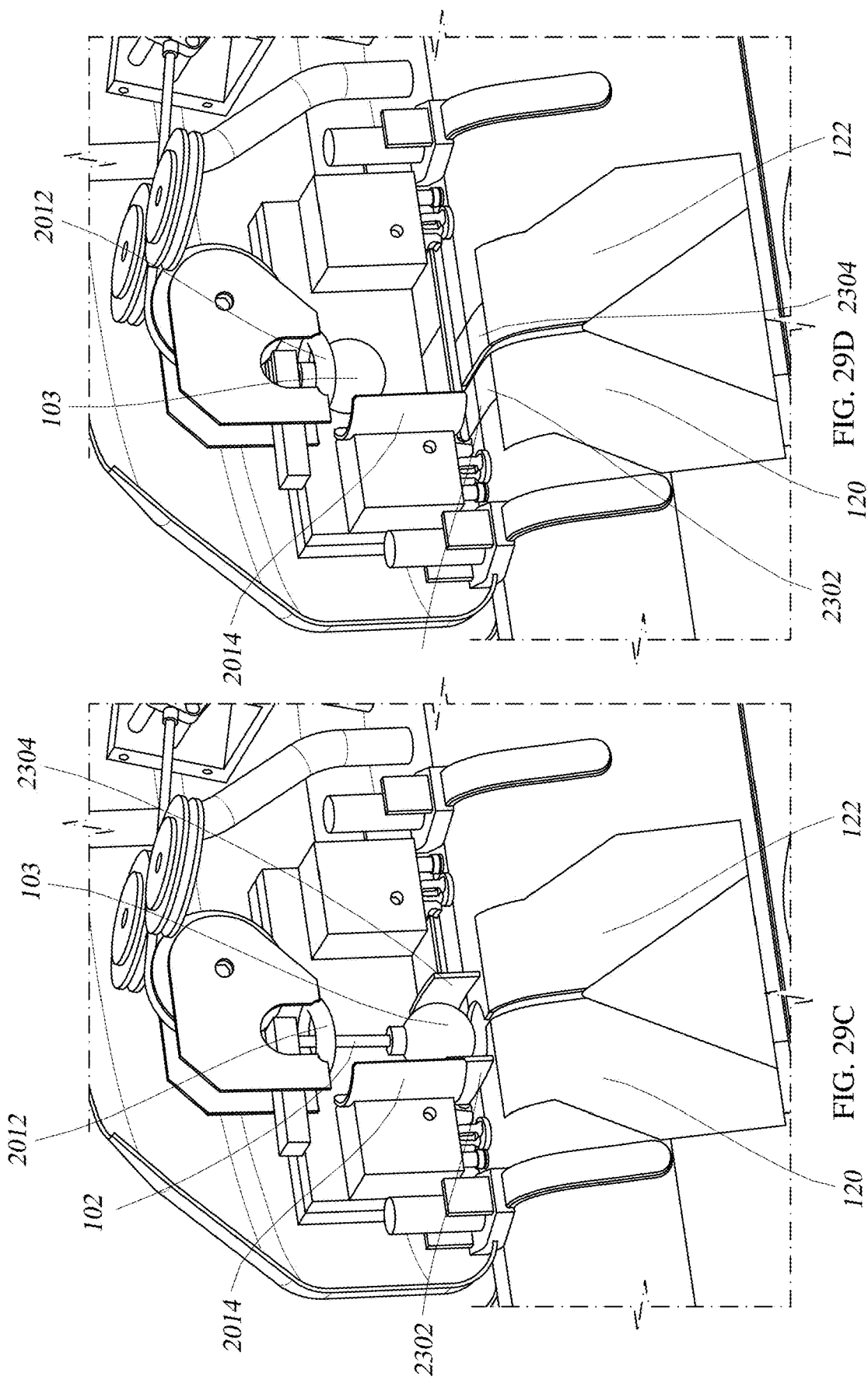

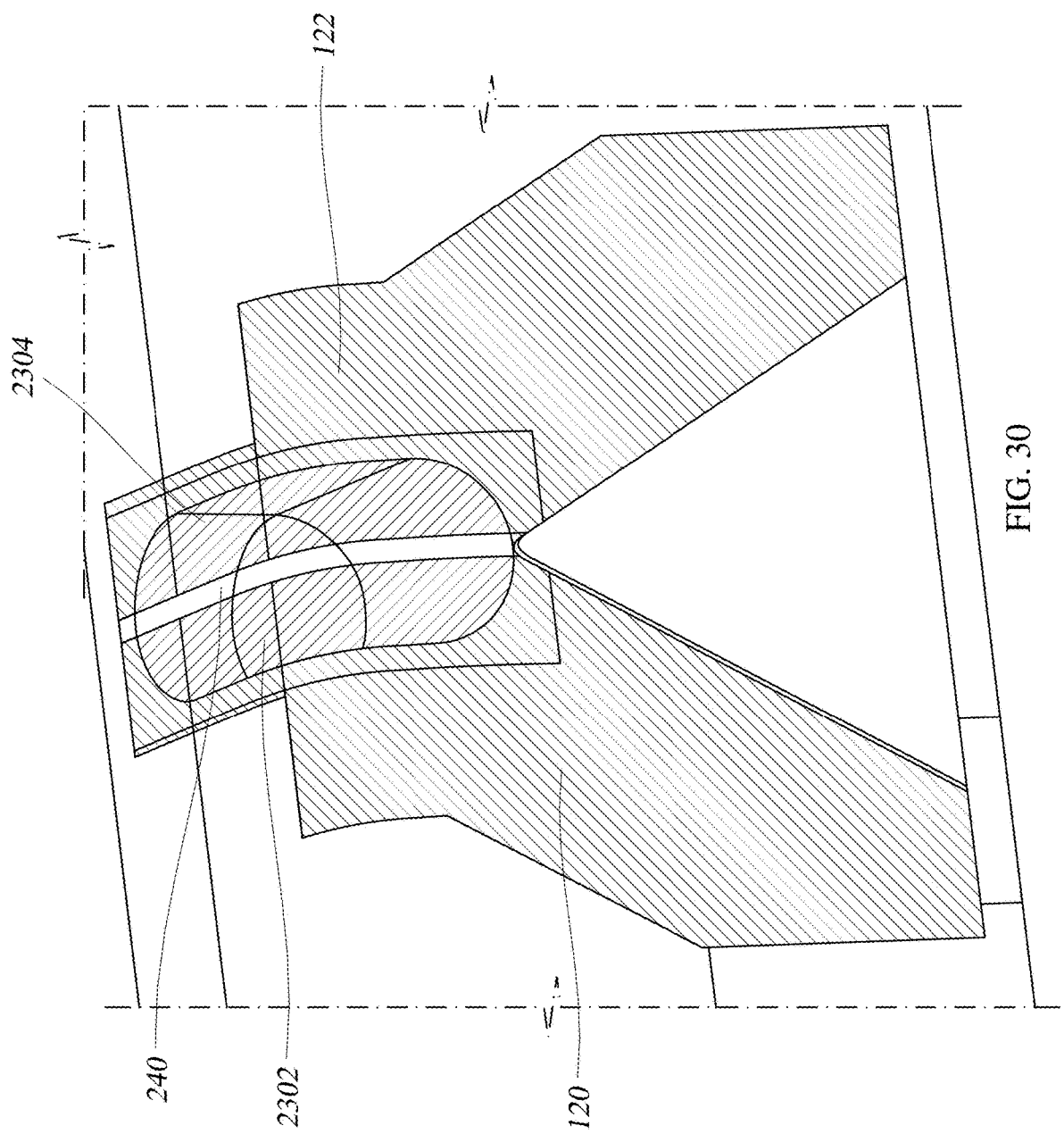

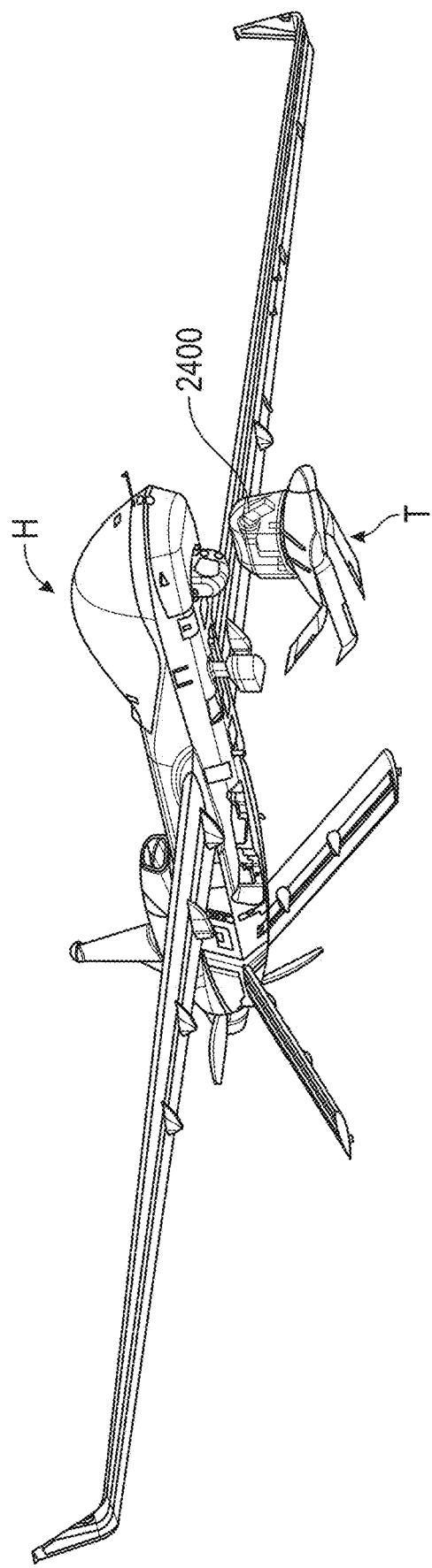

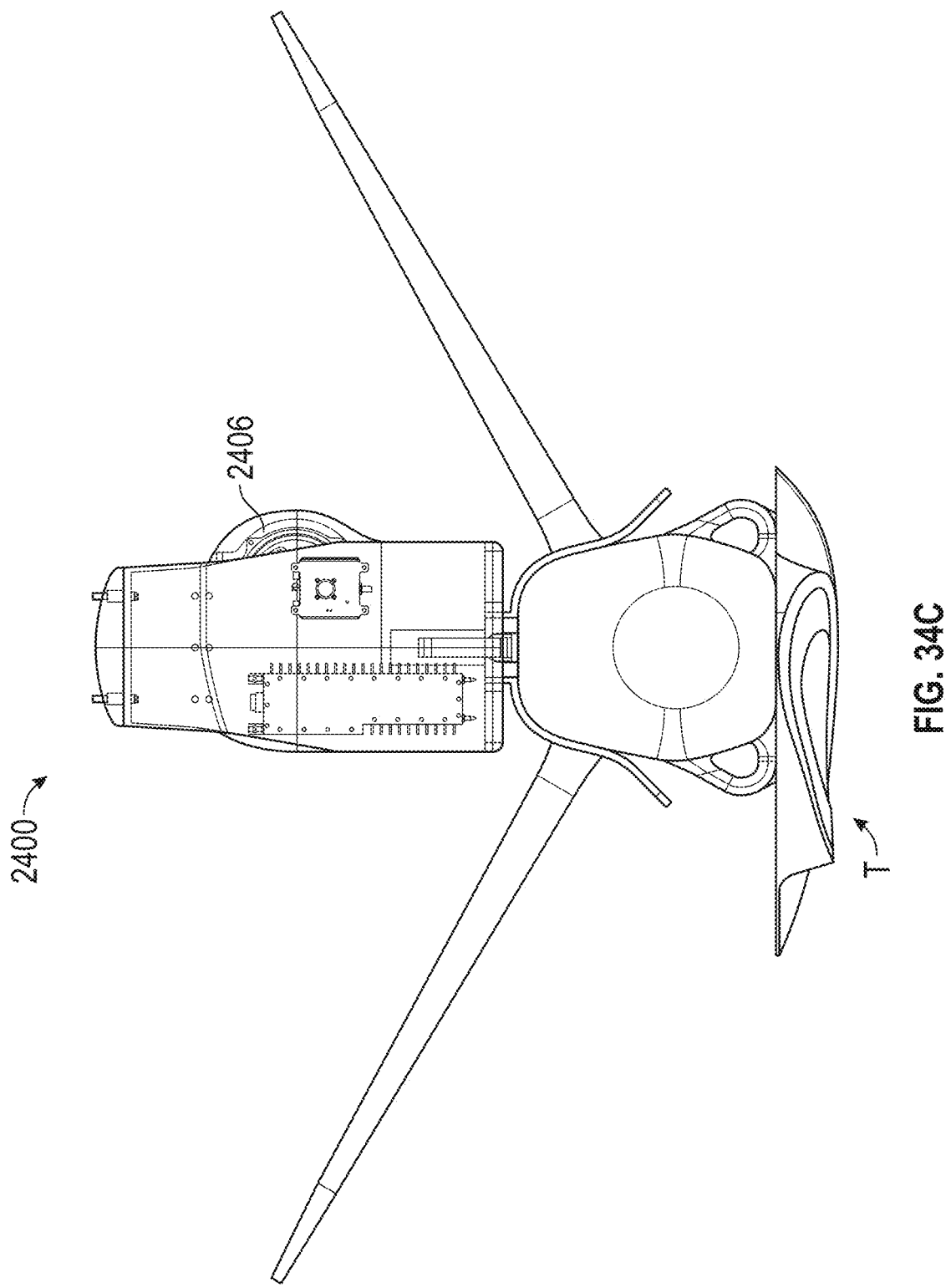

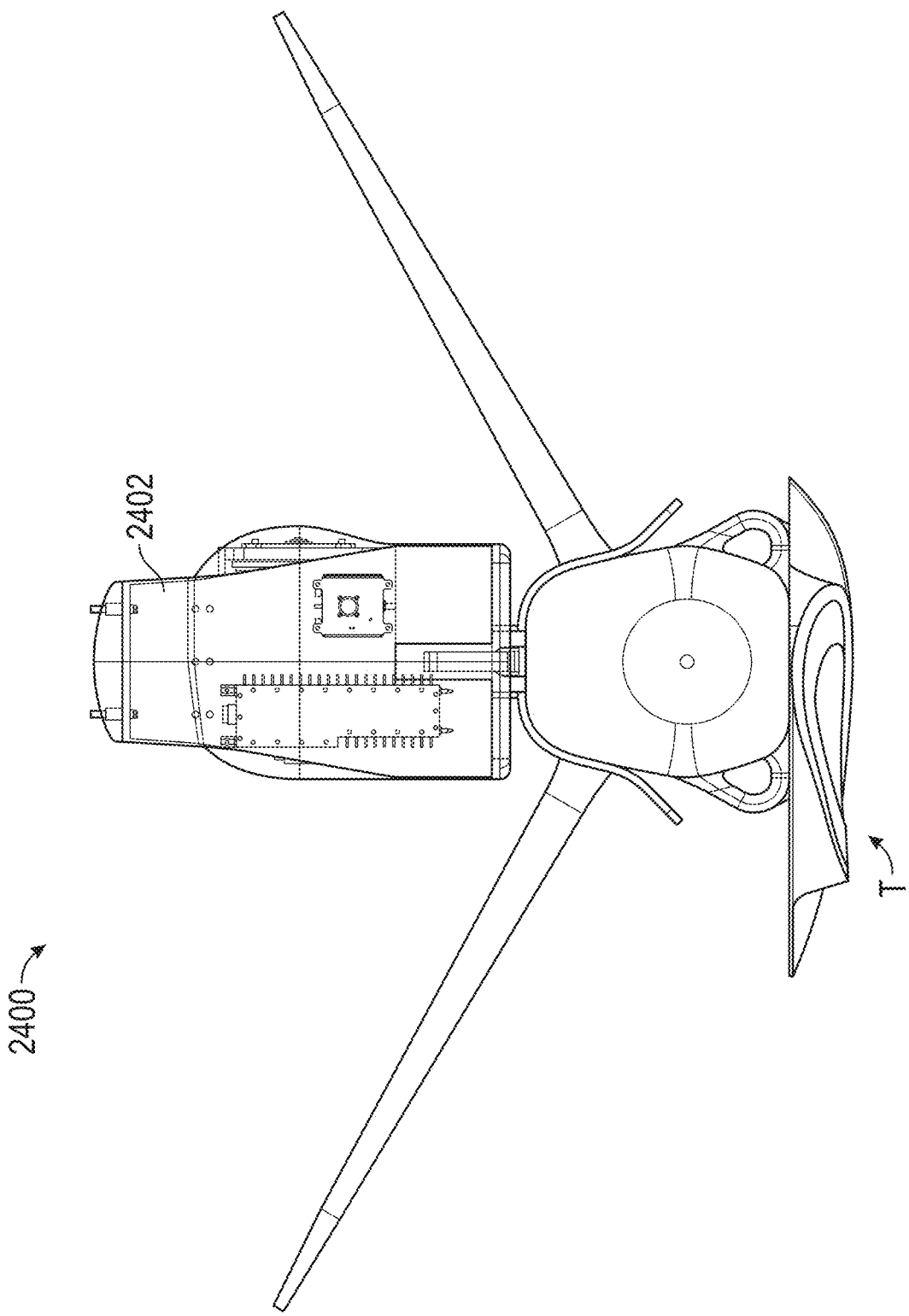

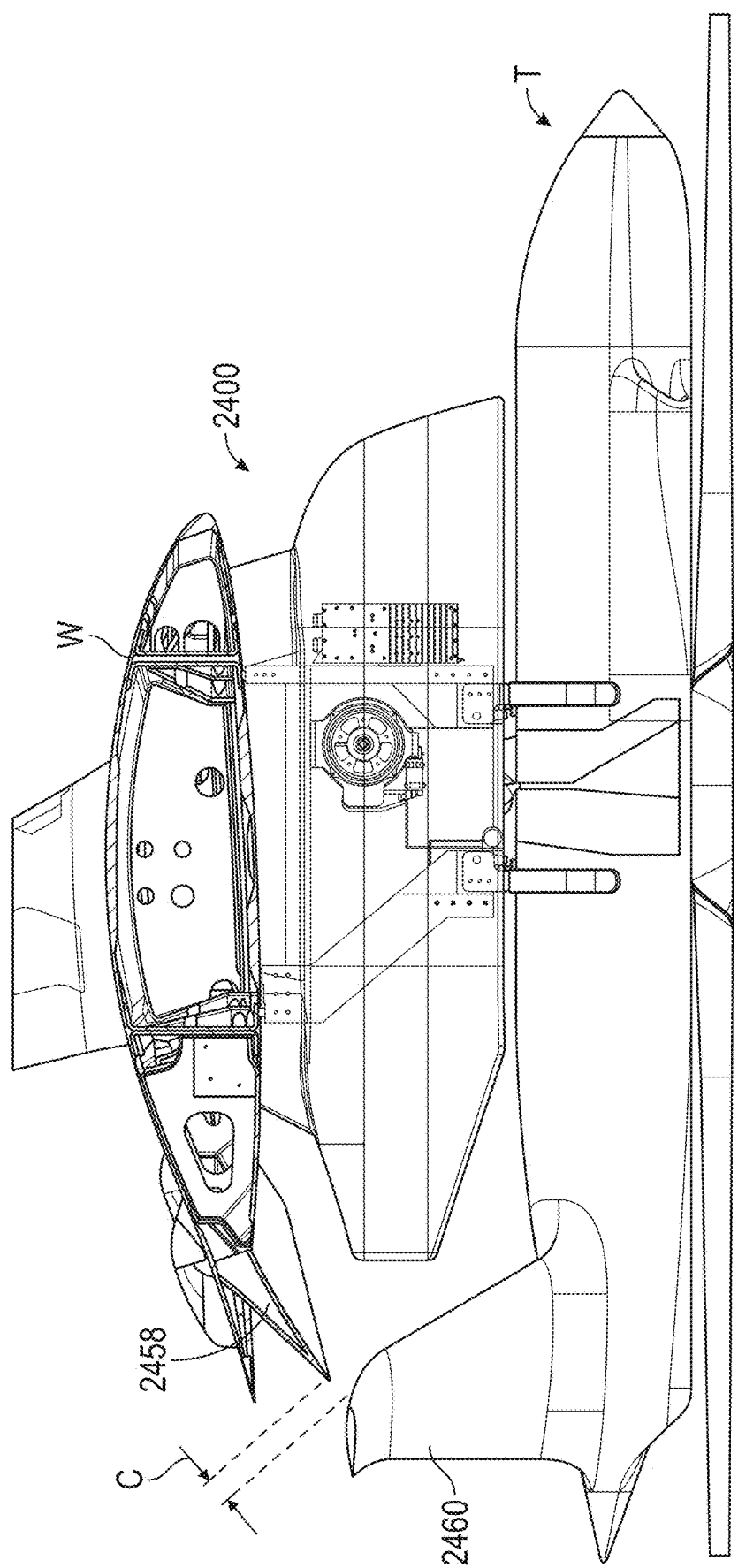

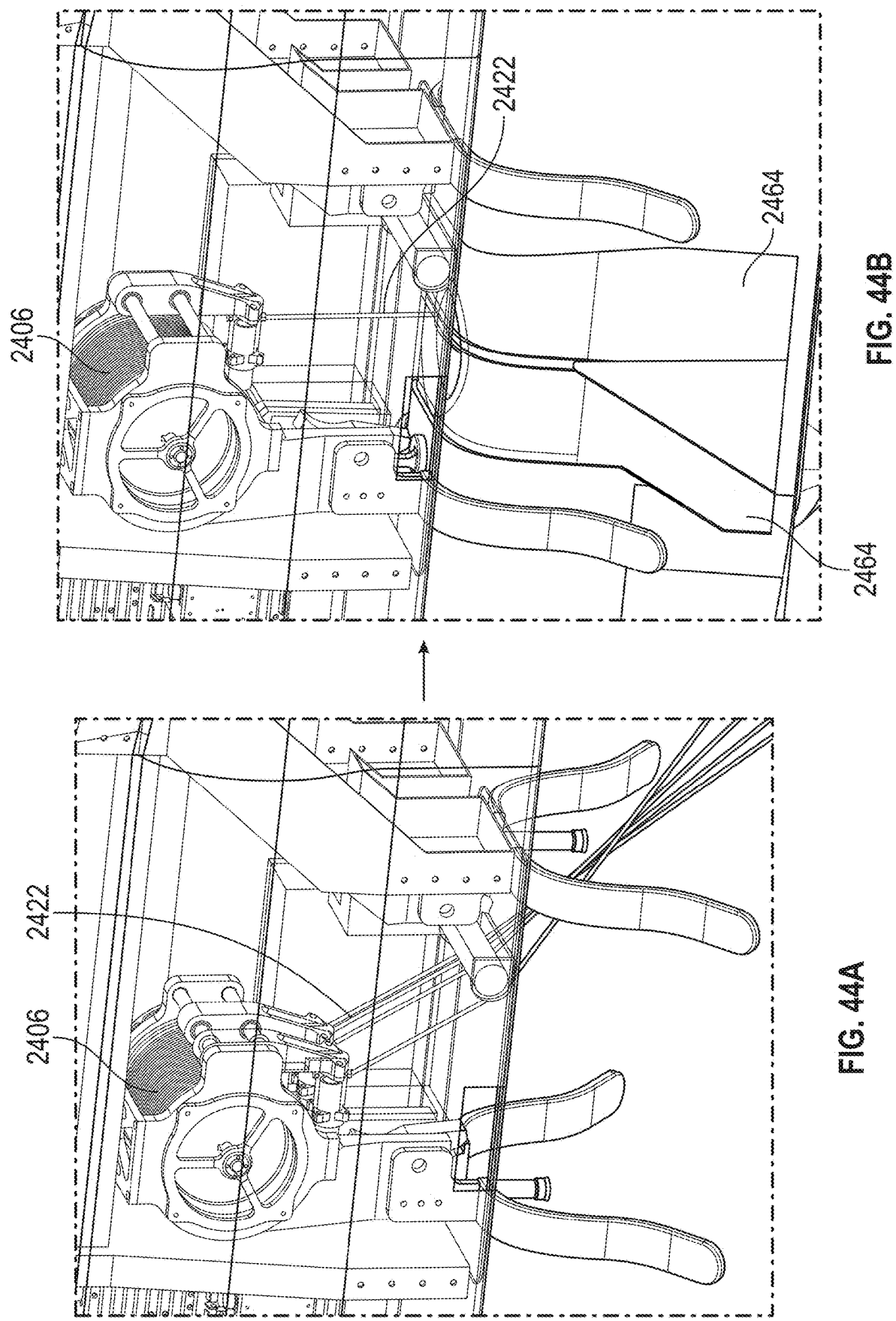

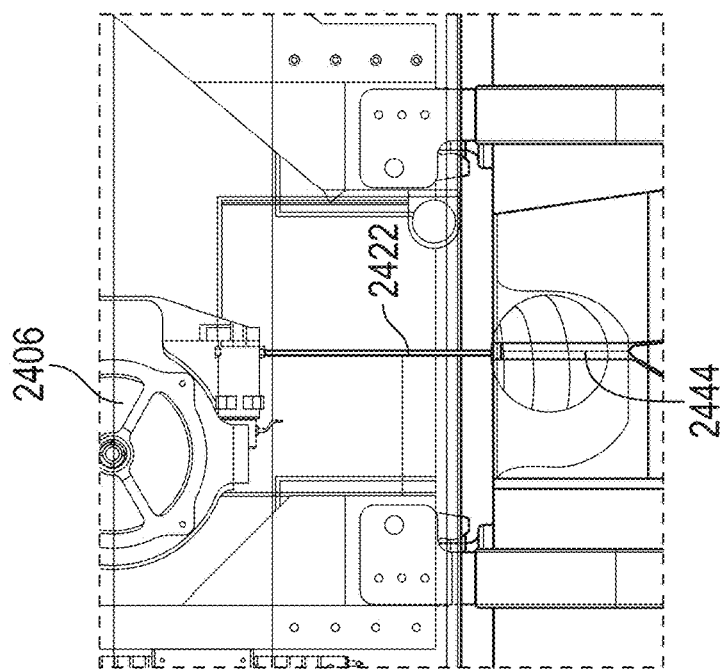
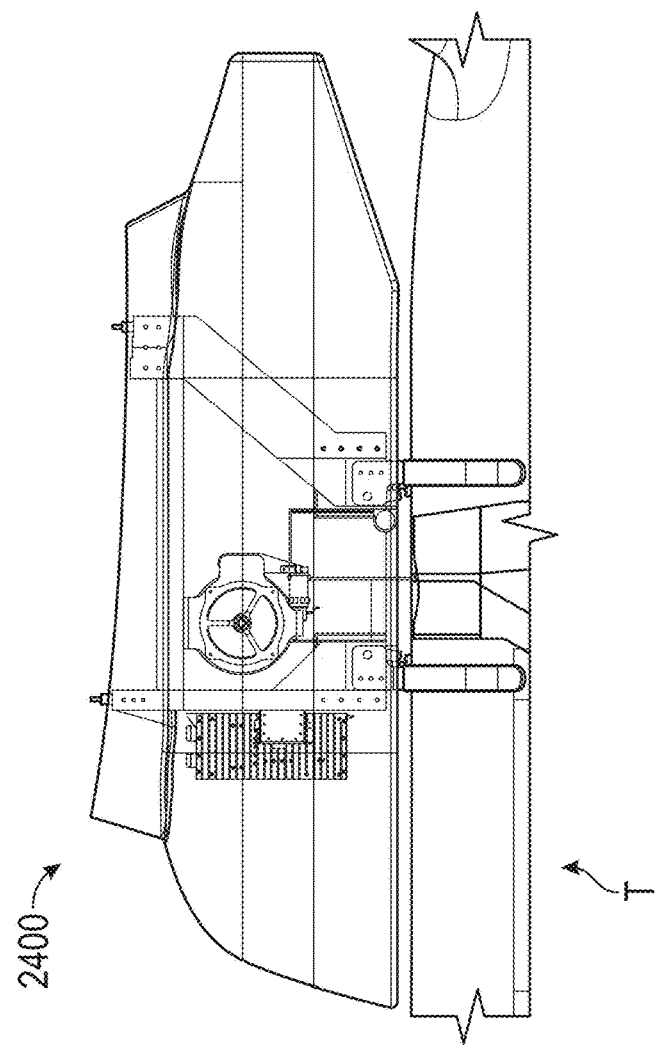
FIG. 45B

SYSTEMS AND METHODS FOR AIRBORNE RECOVERY AND LAUNCH OF AERIAL VEHICLES

INCORPORATION BY REFERENCE TO ANY PRIORITY APPLICATIONS

This application claims the benefit of U.S. Provisional Patent Application No. 63/388,931, titled "SYSTEMS AND METHODS FOR AIRBORNE RECOVERY AND LAUNCH OF AERIAL VEHICLES," filed Jul. 13, 2022, the entire contents of which is incorporated by reference herein and forms a part of this specification for all purposes as if fully set forth herein.

BACKGROUND

Field

This disclosure relates generally to aerial vehicles, including, without limitation, unmanned aerial vehicles, in particular to systems and methods for recovery and deployment of an airborne aerial vehicle or other target aircraft by an airborne host aircraft.

Related Art

Unmanned aerial vehicles (UAV's) are aircraft that are piloted without a human pilot onboard. UAV's may be used for transport, surveillance, communications, weapons, and other uses. UAV's typically take off from the ground and return to the ground, which limits their versatility and usefulness. In-flight recovery and deployment of UAV's or other aircraft, including manned aircraft, may simplify missions and improve outcomes. Existing approaches to in-flight recovery are complex and unreliable. Improvements to these systems are desirable.

SUMMARY OF SOME EXEMPLIFYING EMBODIMENTS

The embodiments disclosed herein each have several aspects no single one of which is solely responsible for the disclosure's desirable attributes. Without limiting the scope of this disclosure, its more prominent features will now be briefly discussed. After considering this discussion, and particularly after reading the section entitled "Detailed Description," one will understand how the features of the embodiments described herein provide advantages over existing systems, devices, and methods for recovering unmanned aerial vehicles (UAV's) or other aircraft in flight.

The following disclosure describes non-limiting examples of some embodiments. Other embodiments of the disclosed systems and methods may or may not include the features described herein. Moreover, disclosed advantages and benefits may apply only to certain embodiments of the invention and should not be used to limit the disclosure.

Disclosed herein are embodiments of a recovery and deployment pylon for recovering and relaunching a target aircraft that can include a housing configured to be coupled with an aircraft, a motorized winch within the housing, a towline coupled with the winch and configured to be paid out and reeled in using the winch, a fitting coupled with the towline, the fitting having a width that is larger than a width of the towline, and a first latching mechanism configured to selectively engage with a first lug of the target aircraft when the target aircraft is in a first position relative to the recovery and deployment pylon. In some embodiments, the target aircraft can be in the first position when the target aircraft is within a predetermined distance of the recovery and deployment pylon.

Any embodiments of the devices, systems, and methods disclosed herein can include, in additional embodiments, one or more of the following features, components, and/or details, in any combination with any of the other features, components, and/or details of any other embodiments of the devices, systems, and methods disclosed herein, all combinations of which are to be understood to be included in this disclosure as if expressly stated herein: wherein the pylon further includes a movable ejector configured to extend away from the housing, wherein the ejector is configured to exert a force on the target aircraft upon activation of the ejector to cause the target aircraft to move away from the pylon when the target aircraft is positioned within the predetermined distance of the recovery and deployment pylon, including wherein the predetermined distance is about 0.5 inches; wherein the predetermined distance is about 0.25 inches; including a refueling line configured to be selectively engaged with the target aircraft when the target aircraft is engaged with the pylon and to transfer fuel to the target aircraft; wherein the ejector can include an elongate member that is configured to move axially between a first position in which the ejector is retracted and a second position in which the ejector is extended; including a first shock absorber extending away from the housing in an operable state, the first shock absorber configured to contact an upper surface of the target aircraft as the target aircraft is brought into engagement with the pylon; including a second latching mechanism configured to selectively engage with a second lug of the target aircraft when the target aircraft is in the first position; wherein the first latching mechanism and the second latching mechanism are configured to be in a normally latched state; including a first alignment member coupled with the housing on an underside surface of the housing, the first alignment member projecting away from the underside surface of the housing in a downward direction and configured to laterally constrain a target aircraft engaged with the pylon; wherein the housing is configured to be coupled with an underside of an aircraft; including a recharging line including one or more electrical power wires configured to be selectively engaged with the target aircraft when the target aircraft is engaged with the pylon and to transfer power to the target aircraft; including one or more sensors configured to determine when the target aircraft is in the first position; wherein the pylon is configured so that the host aircraft can refuel, recharge, and/or rearm the target aircraft at least when the target aircraft is in the first position; including a plurality of fleet pulleys supported within the housing, wherein the towline extends from the winch through the plurality of fleet pulleys; including an upper sheave supported within the housing, wherein the towline extends from the fleet pulleys and around the upper sheave; wherein the plurality of fleet pulleys comprise two pulleys oriented approximately horizontally; further including a latch block configured to secure the towline connector in a desired position; wherein the winch can include a cartridge through which the towline extends, wherein the cartridge is movable along an axle such that a portion of the towline between the winch and the plurality of fleet pulleys may sweep a total angle of up to thirty degrees; further including a bottom sheave configured to guide vertical movement of the towline connector; further including a forward ejector and an aft ejector; wherein the forward ejector is configured to be initiated before the aft ejector; further included a proximity sensor; and/or further including a forward bulkhead, an aft bulkhead, a connecting member, and a rack unit; wherein the forward bulkhead and aft bulkhead are configured to be mechanically coupled to the host aircraft; wherein the connecting member is mechanically coupled to the forward bulkhead and the aft bulkhead; wherein the rack unit is mechanically coupled to at least one of the forward bulkhead, the aft bulkhead, or the connecting member; and/or wherein the rack unit is shaped to provide a central cavity such that the towline can be released through a central portion of the recovery and deployment pylon. In any embodiments disclosed herein, the winch can be laterally oriented such that an axis of rotation is oriented in a lateral direction that is perpendicular to a longitudinal axis of the recovery and deployment pylon or the winch can be longitudinally oriented.

Also disclosed herein are embodiments of a system including any of the embodiments of the pylon disclosed herein and a capture mechanism configured to be coupled with a target aircraft. The capture mechanism can be configured to move between a first state in which the capture mechanism is configured to secure the fitting in the capture mechanism to permit the target aircraft to be pulled toward the pylon when the towline is reeled in and a second state in which the capture mechanism is configured to release the fitting. In some embodiments, the system can include a fitting release hatch configured to selectively open to release the end fitting from the capture mechanism. In some embodiments, the capture mechanism of the target aircraft can include one or more flaps configured to deploy and stow, wherein the one or more flaps deploy to define an opening through which the towline is received, and wherein the flaps stow to guide the end fitting into a recess of the target aircraft.

Also disclosed herein are embodiments of a recovery and deployment pylon for recovering and launching a target aircraft. In some embodiments, the recovery and deployment pylon can include a housing configured to be coupled with a host aircraft, a motorized winch within the housing, a towline coupled with the motorized winch and configured to be selectively paid out and reeled in using the motorized winch, a fitting coupled with the towline, the fitting having a width that is larger than a width of the towline, and a movable ejector configured to extend away from the housing, wherein the ejector is configured to exert a force on the target aircraft upon activation of the ejector to cause the target aircraft to move away from the pylon when the target aircraft is positioned within the predetermined distance of the recovery and deployment pylon.

Any embodiments of the devices, systems, and methods disclosed herein can include, in additional embodiments, one or more of the following features, components, and/or details, in any combination with any of the other features, components, and/or details of any other embodiments of the devices, systems, and methods disclosed herein, all combinations of which are to be understood to be included in this disclosure as if expressly stated herein: further including a refueling line configured to be selectively engaged with the target aircraft when the target aircraft is engaged with the pylon and to transfer fuel to the target aircraft; further including a first alignment member coupled with the housing on an underside surface of the housing, the first alignment member projecting away from the underside surface of the housing in a downward direction and configured to laterally constrain a target aircraft engaged with the pylon; further including a recharging line comprising one or more electrical power wires configured to be selectively engaged with the target aircraft when the target aircraft is engaged with the pylon and to transfer power to the target aircraft; and/or further including a forward bulkhead, an aft bulkhead, a connecting member, and a rack unit; wherein the forward bulkhead and the aft bulkhead are configured to be mechanically coupled to the host aircraft; wherein the connecting member is mechanically coupled to the forward bulkhead and the aft bulkhead; wherein the rack unit is mechanically coupled to at least one of the forward bulkhead, the aft bulkhead, or the connecting member; and/or wherein the rack unit is shaped to provide a central cavity such that the towline can be released through a central portion of the recovery and deployment pylon.

Also disclosed herein are embodiments of a method of servicing a target aircraft using a recovery and deployment pylon coupled with a host aircraft. In some embodiments, the method can include extending a towline from the recovery and deployment pylon, coupling the towline with the target aircraft, reeling in the towline to move the target aircraft to a predetermined position relative to the recovery and deployment pylon, latching the target aircraft to the recovery and deployment pylon by engaging a first lug on the target aircraft with a first latching mechanism of the recovery and deployment pylon, servicing the target aircraft, decoupling the towline from the target aircraft, and releasing the target aircraft from the recovery and deployment pylon.

Any embodiments of the devices, systems, and methods disclosed herein can include, in additional embodiments, one or more of the following features, components, and/or details, in any combination with any of the other features, components, and/or details of any other embodiments of the devices, systems, and methods disclosed herein, all combinations of which are to be understood to be included in this disclosure as if expressly stated herein: wherein servicing the target aircraft can include rearming, refueling, and/or providing power to the target aircraft; wherein rearming, refueling, and/or providing power to the target aircraft can include advancing a refueling conduit from the recovery and deployment pylon and coupling the refueling conduit with the target aircraft; wherein rearming, refueling, and/or providing power to the target aircraft can include advancing an electrical connector from the recovery and deployment pylon and coupling the electrical connector with the target aircraft; and/or wherein releasing the target aircraft from the recovery and deployment pylon can include actuating an ejector mechanism to exert a force on the target aircraft that causes the target aircraft to move away from the recovery and deployment pylon.

Some embodiments described herein can be configured to allow the recovery of a target aircraft, including UAV's (or other or smaller aircraft) to a larger host aircraft, which may be manned or unmanned. The target aircraft can be transported by the host aircraft to the target aircraft's mission point via captive carriage on the host aircraft where the target aircraft is then launched. The target aircraft can conduct its mission and then be recovered by the host aircraft, as desired. The host aircraft of some embodiments herein can be configured to service (e.g., refuel, recharge, rearm, etc.) the target aircraft and launch the target for another mission without having to return to base. In some embodiments, the target may be recovered by a different host and refueled, recharged, rearmed, etc. The target aircraft can be configured to operate in orbits based on the orbits of larger host aircraft, which can allow the target aircraft to perform missions indefinitely without returning to base.

Currently, some embodiments of small UAV's can be limited in their range and utility. Most are considered disposable because recovery methods (e.g., skid landing or net arrest) risk significant damage. Thus, UAV's often do not carry expensive, advanced sensors, which can limit their effectiveness and restrict the types of missions they can be used to perform. Reliable airborne recovery may remove these barriers. According to some embodiments herein, a host aircraft (e.g., a manned aircraft or larger unmanned aircraft) can transport a target aircraft (e.g., a small UAV) long distances to a mission point, and there may be little risk of damage upon recovery, thereby making it feasible for small UAV's to carry expensive, advanced sensors and other equipment.

Target aircraft can be recovered using horizontal (or nearly horizontal) towlines in some circumstances. However, horizontal towlines present various challenges. For example, a horizontal towline may need to be weighted to control its shape and may not be able to recover some types of aircraft, such as UAV's that use propellers. According to some embodiments herein, a vertical (or nearly vertical) towline and hoist may be used and may enable recovery of a broad range of target aircraft with different airframe shapes and different propulsion methods and locations.

Disclosed herein are embodiments of a recovery and deployment device for recovering and/or deploying a target aircraft. The device can include a housing configured to be coupled with an aircraft, a motorized winch within the housing, a towline coupled with the winch and configured to be paid out and drawn into the housing using the winch, a fitting coupled with the towline, the fitting having a size that is larger than a size of the towline, a capture mechanism configured to be coupled with the target aircraft and to selectively capture the fitting coupled with the towline, and a first latching mechanism configured to selectively engage with a first lug of the target aircraft when the target aircraft is in a first position relative to the device. In some embodiments, the device can include a shock absorber configured to extend away from the housing. In some embodiments, the device can include a movable ejector configured to extend away from the housing. In some embodiments, the target aircraft is in the first position when the target aircraft is within a predetermined proximity of the recovery and deployment device. The capture mechanism can be configured to move between a first state in which the capture mechanism is configured to secure the fitting in the capture mechanism to permit the target aircraft to be pulled toward the recovery and deployment device when the towline is reeled in and a second state in which the capture mechanism is configured to release the fitting. The ejector can be configured to exert a force on the target aircraft upon activation of the ejector configured to cause the target aircraft to move away from the device when the target aircraft is positioned within the predetermined proximity of the device.

Features for airborne recovery of an unmanned aerial vehicle (UAV). A towline may be deployed by a host aircraft in-flight in order to recover a target UAV that is also in-flight. The towline or a portion thereof may be oriented nearly vertical. The towline may have a fitting thereon. A capture mechanism on the target UAV may have one or more movable portions such as deployable flaps that deploy and engage with the fitting on the near vertical towline. The flaps may stow to secure the target aircraft to the towline and fitting. The host aircraft may then retract the towline to pull in the target UAV to the host aircraft using a hoist system having a winch. A latching system located in a pylon of the host aircraft, which may be under a wing, may have a latch housing that secures with a towline connector coupled with the towline end fitting and that engages with and secures the target UAV. The host aircraft may have multiple hoist systems for deployment and/or recovery of multiple target UAV's.

Disclosed herein are embodiments of a system for recovery of a target aircraft by a host aircraft during forward flight that can include a towline including a proximal section configured to be coupled with the host aircraft and a distal section configured to be paid out from the host aircraft, a fitting coupled with the distal section of the towline, and a capture mechanism including a first movable portion and a second movable portion configured to be coupled with a fuselage of the target aircraft.

Any embodiments of the devices, systems, and methods disclosed herein can include, in additional embodiments, one or more of the following features, components, and/or details, in any combination with any of the other features, components, and/or details of any other embodiments of the devices, systems, and methods disclosed herein: wherein the first movable portion of the capture mechanism can be configured to move from a first position to a second position in which the first movable portion extends away from the fuselage of the target aircraft; wherein the second movable portion of the capture mechanism can be configured to move from a first position to a second position in which the second movable portion extends at an angle away from the fuselage of the target aircraft; wherein the capture mechanism can be configured to receive the towline in an opening defined by the first and second movable portions in the second positions and to permit vertical movement of the towline through the opening; wherein the capture mechanism can be configured to prevent the fitting attached to the towline from moving vertically through the opening; wherein, in the first position, the first and second movable portions can be positioned near the fuselage, in line with the fuselage, or against the fuselage of the target aircraft; wherein the first and second movable portions can be configured to move to a capture position, or return to respective first positions, to secure the target aircraft to the towline; wherein the opening can be smaller than a maximum cross-sectional size of the fitting; wherein the first movable portion and the second movable portion can be configured to rotate between the respective first and second positions; wherein the first movable portion of the capture mechanism can be configured to move independent of the position of the second movable portion; wherein the first movable portion can be integral with or rigidly attached to the second movable portion such that the first and second movable portions move together as one unit between the first and second positions; wherein the capture mechanism can be configured to receive the towline in the opening with the distal section of the towline oriented less than 30 degrees off a vertical direction; wherein the host aircraft includes a system for securing a target aircraft to a host aircraft, the system including a winch configured to be supported by a wing of the host aircraft and to have a deployable towline carried by the winch, one or more fleet pulleys, the towline configured to extend from the winch through the one or more fleet pulleys, an upper sheave, the towline configured to extend from the fleet pulley to the upper sheave, and a towline connector, the towline configured to extend below the aircraft and be reeled in by the winch to secure the target aircraft with the host aircraft.

Also disclosed herein are embodiments of a system for recovery of a target aircraft by a host aircraft during forward flight, wherein the system can include a wing root region defined by an intersection of a wing and a fuselage of the target aircraft, the wing root region configured to receive from the host aircraft a towline having a fitting, one or more flaps configured to be moveably coupled with the fuselage, and one or more actuators configured to deploy the one or more flaps to a deployed position away from the fuselage. In some embodiments, the one or more flaps can define an opening configured to receive the towline therein, such that the fitting contacts the one or more flaps in response to relative vertical movement between the towline and the one or more flaps in the deployed position, and the one or more actuators can be further configured to stow the one or more flaps to a stowed position to secure the fitting and towline with the target aircraft.

Any embodiments of the devices, systems, and methods disclosed herein can include, in additional embodiments, one or more of the following features, components, and/or details, in any combination with any of the other features, components, and/or details of any other embodiments of the devices, systems, and methods disclosed herein: wherein, in the stowed position, the one or more flaps form an outer surface of the fuselage; wherein the one or more flaps include a first flap and a second flap; wherein the first and second flaps can be independently movable; wherein the fitting has a width greater than a width of the opening defined by the one or more flaps; wherein the one or more flaps can be configured to prevent the fitting from moving in an upward direction relative to the one or more flaps when the fitting has been moved into contact with the one or more flaps; and/or wherein the one or more flaps can be configured to receive the towline in the opening with at least part of the towline adjacent the fitting oriented less than 30 degrees off the vertical direction.

Also disclosed herein are embodiments of a method of recovering a target aircraft with a host aircraft during forward flight, wherein the method can include extending from the host aircraft a towline having a fitting, positioning the towline within a wing root region of the target aircraft with at least part of the towline oriented less than 30 degrees off a vertical direction, deploying one or more flaps from a fuselage of the target aircraft, positioning the towline within an opening defined by the one or more flaps in the deployed position, causing relative vertical movement between the one or more flaps and the towline to move the fitting near the one or more flaps, and stowing the one or more flaps with the fuselage to secure the target aircraft to the towline.

Any embodiments of the devices, systems, and methods disclosed herein can include, in additional embodiments, one or more of the following features, components, and/or details, in any combination with any of the other features, components, and/or details of any other embodiments of the devices, systems, and methods disclosed herein: further including retracting the towline into the host aircraft to move the target aircraft toward the host aircraft; wherein deploying the one or more flaps includes deploying a first flap and a second flap; and/or wherein the first and second flaps can be deployed independently of each other.

Also disclosed herein are embodiments of a system for securing a target aircraft to a host aircraft that can include a pylon attached to an underside of a wing of the host aircraft, a motorized winch supported within the pylon and having a towline carried by the winch, the winch configured to pay out and reel in the towline, a plurality of fleet pulleys supported within the pylon, the towline extending from the winch through the plurality of fleet pulleys, an upper sheave supported within the pylon, the towline extending from the fleet pulleys and around the upper sheave, and a towline connector on the towline. In some embodiments, the towline can be configured to extend from the upper sheave and exit the aircraft. An end fitting can be positioned on a distal end of the towline near the towline connector. The distal end of the towline can be configured to orient less than thirty degrees off a vertical direction for attachment of the end fitting with a target aircraft. The motorized winch can be configured to reel in the towline and target aircraft to secure the towline connector with the host aircraft.

Any embodiments of the devices, systems, and methods disclosed herein can include, in additional embodiments, one or more of the following features, components, and/or details, in any combination with any of the other features, components, and/or details of any other embodiments of the devices, systems, and methods disclosed herein: wherein the plurality of fleet pulleys include two pulleys oriented approximately horizontally; wherein the upper sheave can be oriented vertically; further including a latch housing configured to secure the towline connector; wherein the winch includes a cartridge through which the towline extends, the cartridge movable along an axle, such that a portion of the towline between the winch and the plurality of fleet pulleys may sweep a total angle of at least thirty degrees; further including one or more sway bars attached to an underside of the pylon and configured to laterally stabilize the secured target aircraft; wherein the one or more sway bars each extend laterally outward and downward from the pylon; further including a bottom sheave configured to guide vertical movement of the towline connector; and/or wherein the target aircraft includes one or more flaps configured to deploy and stow, wherein the flaps deploy to define an opening through which the towline is received, and wherein the flaps stow to guide the end fitting into a recess of the target aircraft.

Also disclosed herein are embodiments of a system for securing a target aircraft to a host aircraft that can include a winch configured to be supported by a wing of the host aircraft and to have a deployable towline carried by the winch, one or more fleet pulleys, the towline configured to extend from the winch through the one or more fleet pulleys, an upper sheave, the towline configured to extend from the fleet pulley to the upper sheave, and a towline connector on the towline configured to secure with the host aircraft, the towline configured to extend below the host aircraft and be reeled in by the winch to secure the target aircraft with the host aircraft.

Any embodiments of the devices, systems, and methods disclosed herein can include, in additional embodiments, one or more of the following features, components, and/or details, in any combination with any of the other features, components, and/or details of any other embodiments of the devices, systems, and methods disclosed herein: wherein the towline is configured to have a fitting on the towline to attach to the target aircraft; wherein a portion of the towline can be configured to be oriented less than thirty degrees off a vertical direction; further including a pylon attached to a wing of the host aircraft, the pylon supporting the winch; wherein the one or more fleet pulleys include first and second fleet pulleys oriented horizontally; wherein the upper sheave can be oriented vertically; further including a latch housing, wherein the towline connector can be configured to move up and down between a plurality of vertical positions, and wherein the latch housing can be configured to secure the towline connector at one or more of the plurality of vertical positions; and/or wherein the target aircraft includes one or more flaps configured to deploy and stow, wherein the flaps deploy to define an opening through which the towline can be received, and wherein the flaps stow to guide the end fitting into a recess of the target aircraft.

Also disclosed herein are embodiments of a method of securing a target aircraft to a host aircraft that can include deploying a towline from a winch, stabilizing the towline as it exits the winch, guiding the towline downward to cause the towline to exit the host aircraft, reeling in the towline using the winch after the towline has secured with the target aircraft, stabilizing the target aircraft under a wing of the host aircraft, and operating a latching system to secure the target aircraft with the host aircraft. In some embodiments, operating the latching system can include securing a towline connector of the towline to prevent the towline connector from movement vertically downward. In some embodiments, stabilizing the towline can include guiding the towline through a fleet pulley assembly.

In another aspect, a system for in-flight recovery of a target aircraft by a host aircraft during forward flight is described. The system may include a hoist or reel, a towline, and a capture mechanism. The reel is configured to attach with the host aircraft. The towline comprises an aft section with a fitting attached to the aft section, where the reel is configured to pay out the towline from the reel to extend the fitting away from the host aircraft during forward flight. The capture mechanism is configured to attach with the target aircraft and to transition from a first configuration to a second configuration. The capture mechanism is configured to capture the towline and/or a fitting thereof with the towline in a near-vertical orientation, e.g., less than 30 degrees relative to a vertical direction. In some embodiments, the capture mechanism can be configured to capture the towline and/or a fitting thereof with the towline at less than 45 degrees relative to a vertical direction. The towline may initially be greater than 30 degrees but the re-orient to be less than 45 or 30 degrees, etc.

In another aspect, a system for in-flight recovery of a target aircraft by a host aircraft during forward flight is described. In some embodiments, the system may include a towline that may include a proximal section configured to be coupled with a host aircraft and a distal section configured to be paid out from the host aircraft, a fitting coupled with the towline, and a capture mechanism that may include a first movable portion and a second movable portion configured to be coupled with or integral to a fuselage of the target aircraft. In any embodiments disclosed herein, the first movable portion of the capture mechanism may be configured to move between a first position in which the first movable portion is positioned in line with or against the fuselage of the target aircraft and a second position in which the first movable portion extends at an angle away from the fuselage of the target aircraft. Further, in any embodiments disclosed herein, the second movable portion of the capture mechanism may be configured to move between a first position in which the second movable portion is positioned in line with or against the fuselage of the target aircraft and a second position in which the second movable portion extends at an angle away from the fuselage of the target aircraft and the capture mechanism may be configured to receive the towline in an opening in the capture mechanism at least when the first and second movable portions are in the second position and to permit a movement of the towline through the opening in the capture mechanism until the fitting attached to the towline has moved into engagement with the capture mechanism. In any embodiments disclosed herein, the first and second movable portions may be configured to move to the first position to further restrain the fitting attached to the towline after the fitting has been moved into engagement with the first and second movable portions.

Further, any aspects or embodiments of the methods, devices and systems for in-flight recovery of a target aircraft by a host aircraft or the embodiments of the capture mechanisms disclosed herein may include, in additional embodiments, one or more of the following steps, features, components, and/or details, in any combination with any of the other steps, features, components, and/or details of any other embodiments disclosed herein: wherein the capture mechanism may be configured such that the towline cannot continue to be reeled in through the opening in the capture mechanism when the fitting is in contact with an underside surface of the first and second movable portions; wherein the opening is smaller than a maximum cross-sectional size of the fitting; wherein the first and second movable portions may be configured to prevent the fitting from moving in an upward direction relative to the capture mechanism when the target aircraft is in an operable state and when the fitting has been moved into contact with an underside surface of the first movable portion and an underside surface of the second movable portion; wherein the first movable portion and the second movable portion may be configured to rotate between the first and second positions; wherein the opening is a space between the first and second movable portions; wherein the first movable portion of the capture mechanism may be configured to move between the first and second positions independent of the position of the second movable portion; wherein the fitting has body portion having a conical shape; and/or wherein the system may include a hoist configured to be integrated into or attached to the host aircraft and configured to draw out or reel in the towline.

In another aspect, a capture mechanism for an unmanned aircraft is described. In some embodiments, the capture mechanism may include a first movable portion and a second movable portion configured to be coupled with or integral to a fuselage of the target aircraft and configured to capture and secure a towline to the target aircraft. In any embodiments, the first movable portion of the capture mechanism may be configured to move between a first position in which the first movable portion is configured to be positioned in line with or against the fuselage of the target aircraft and a second position in which the first movable portion is configured to extend at an angle away from the fuselage of the target aircraft. In any embodiments, the second movable portion of the capture mechanism may be configured to move between a first position in which the second movable portion is configured to be positioned in line with or against the fuselage of the target aircraft and a second position in which the second movable portion configured to extend at an angle away from the fuselage of the target aircraft. Some embodiments of the capture mechanism may be configured to receive a towline in an opening in the capture mechanism at least when the first and second movable portions are in the second position and configured to permit a movement of the towline through the opening in the capture mechanism until a fitting attached to the towline has moved into contact with the capture mechanism. In some embodiments, the first and second movable portions may be configured to move to the first position to further restrain the fitting attached to the towline after the fitting has been moved into engagement with the first and second movable portions.

Any embodiments of the methods, devices and systems for in-flight recovery of a target aircraft by a host aircraft or the embodiments of the capture mechanisms disclosed herein may include, in additional embodiments, one or more of the following steps, features, components, and/or details, in any combination with any of the other steps, features, components, and/or details of any other embodiments disclosed herein: wherein the capture mechanism may be configured such that a towline cannot continue to be reeled in through the opening in the capture mechanism when a fitting attached to the towline is in contact with an underside surface of the first and second movable portions; wherein the opening is smaller than a maximum cross-sectional size of the fitting; wherein the first and second movable portions may be configured to prevent the fitting from moving in an upward direction relative to the capture mechanism when the fitting has been moved into contact with an underside surface of the first and second movable portions; wherein the first movable portion and the second movable portion may be configured to rotate between the first and second positions; wherein the opening is a space between the first and second movable portions; and/or wherein the first movable portion of the capture mechanism may be configured to move between the first and second positions independent of the position of the second movable portion.

In another aspect, a method of capturing a target aircraft in flight is described. In any embodiments disclosed herein, the method of capture a target aircraft may include maneuvering a target aircraft having a capture mechanism may include a first movable portion and a second movable portion toward a towline from a host aircraft so that the towline is directed to a wing root on the target aircraft, positioning at least a leading edge of the second movable portion aft of the towline by moving the second movable portion to a second position in which the second movable portion extends away from the fuselage of the target aircraft and is positioned aft of the towline, positioning at least a trailing edge of the first movable portion forward of the towline by moving the first movable portion to a second position in which the first movable portion extends away from the fuselage of the target aircraft and is positioned forward of the towline, causing upward vertical movement of the towline relative to the target aircraft to move a fitting on the towline in contact with the first and second movable portions, moving the first and second movable portions to a first position of the first and second movable portions to prevent the fitting from moving away from the first and second movable portions, and/or reeling in the towline to move the target aircraft toward the host aircraft.

Any embodiments of the methods, devices and systems for in-flight recovery of a target aircraft by a host aircraft or the embodiments of the capture mechanisms disclosed herein may include, in additional embodiments, one or more of the following steps, features, components, and/or details, in any combination with any of the other steps, features, components, and/or details of any other embodiments disclosed herein: wherein the first or second movable portions are approximately in line with or adjacent to a fuselage of the target aircraft in the first position of the first and second movable portions; may include moving the second movable portion to the second position before moving the first movable portion to the second position, wherein the second movable portion is aft of the first movable portion; may include moving the first and second movable portions to the second position simultaneously; wherein the first movable portion is integral with the second movable portion; and/or wherein the method may further include securing the target aircraft to the host aircraft.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawing, may be arranged, substituted, combined, and designed in a wide variety of different configurations, all of which are explicitly contemplated and make part of this disclosure.

FIGS. 10A-10D are various views of the target aircraft of FIGS. 9A-9C showing the target aircraft wings in deployed and stowed positions.

FIG. 11 is a perspective view of the host and target aircrafts of FIGS. 9A-9C showing the host aircraft recovering the target aircraft in flight via a towline extending from one of the hoist systems.

FIGS. 12A-12C are perspective, side, and front views, respectively, of to target aircraft secured to a hoist system.

FIG. 15A is a side view of a schematic of an embodiment of a latching system that may be used with the hoist systems of FIGS. 9A-9C.

FIG. 15B is a side view of a portion of the embodiment of the towline, towline connector, and end fitting as shown in FIG. 14A.

FIG. 15C is a top view of the embodiment of the latch assembly shown in FIG. 15A.

FIGS. 26A-26D are partial views of additional embodiments of pylons and/or target aircraft components, showing features and methods that can be used in any pylon embodiments disclosed herein.

FIGS. 27A-27D are partial views of additional embodiments of pylons and/or target aircraft components, in which some components of the pylon are transparent for clarity purposes, showing features and methods that can be used in any pylon embodiments disclosed herein.

FIGS. 28A-28D are partial views of additional embodiments of pylons and/or target aircraft components including a covered cavity on the target aircraft, showing features and methods that can be used in any pylon embodiments disclosed herein.

FIGS. 29A-29F are partial views of additional embodiments of pylons and/or target aircraft components, showing features and methods that can be used in any pylon embodiments disclosed herein.

FIG. 30 is a perspective view an embodiment of a recess of a target aircraft.

FIG. 32 is a perspective view of a target aircraft coupled to a host aircraft via a recovery pylon according to some embodiments.

FIGS. 34A-34D are views of a recovery pylon having a longitudinally oriented hoist according to some embodiments.

FIGS. 35A-35C are views of a recovery pylon having a laterally oriented hoist according to some embodiments.

FIG. 43 is a side view illustrating the positioning of a recovery pylon and target aircraft with respect to a wing of a host aircraft according to some embodiments.

FIGS. 44A-44F illustrate an example recovery process according to some embodiments.

FIGS. 45A and 45B illustrate a recovery pylon with a target aircraft secured thereto according to some embodiments.

DETAILED DESCRIPTION OF SOME EXEMPLIFYING EMBODIMENTS

The following detailed description is directed to certain specific embodiments of the development. In this description, reference is made to the drawings wherein like parts or steps may be designated with like numerals throughout for clarity. Reference in this specification to "one embodiment," "an embodiment," or "in some embodiments" means that a particular feature, structure, or characteristic described in connection with the embodiment is included in at least one embodiment of the invention. The appearances of the phrases "one embodiment," "an embodiment," or "in some embodiments" in various places in the specification are not necessarily all referring to the same embodiment, nor are separate or alternative embodiments necessarily mutually exclusive of other embodiments. Moreover, various features are described which may be exhibited by some embodiments and not by others. Similarly, various requirements are described which may be requirements for some embodiments but may not be requirements for other embodiments.

Figure 1:
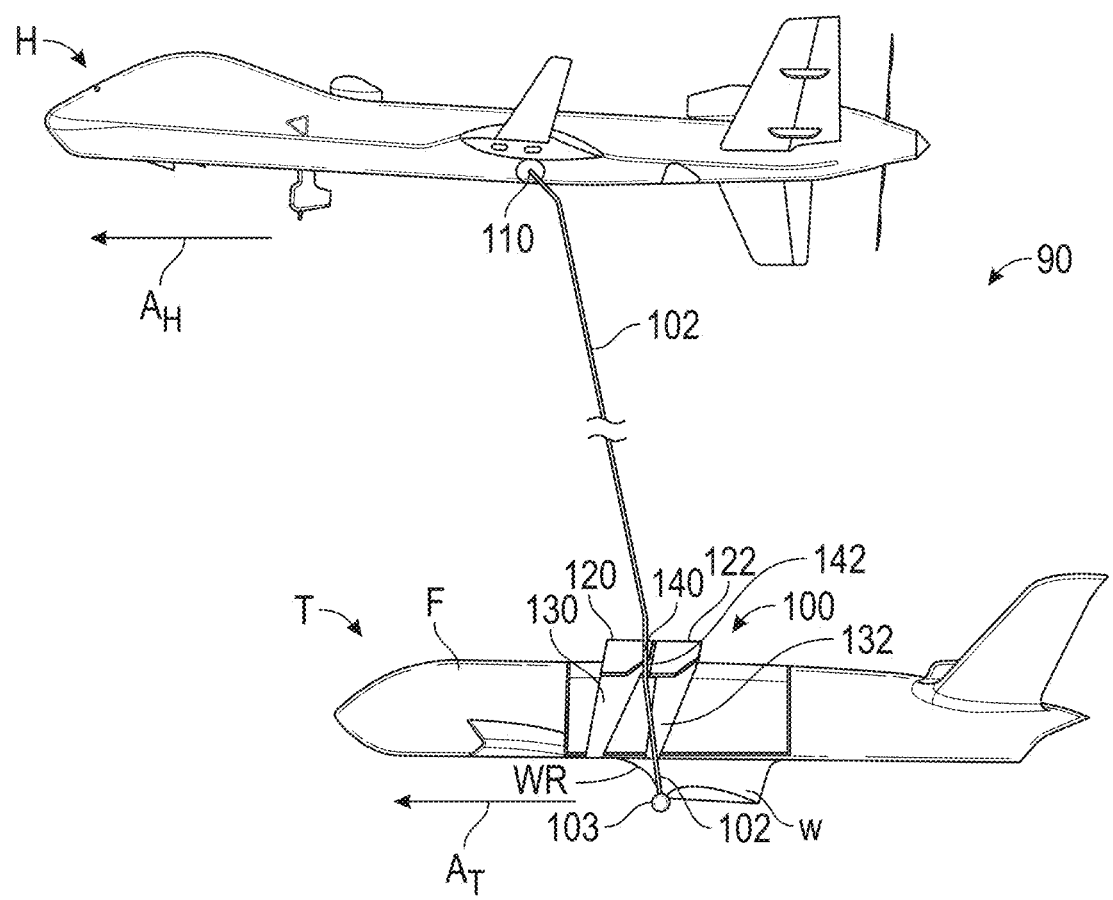
FIG. 1 shows a side view of an embodiment of a system for recovery of a target aircraft by a host aircraft.

FIG. 1 depicts an embodiment of a system 90 for airborne or in-flight recovery of a target aircraft T (also referred to herein as small aircraft) having a capture mechanism 100, using a towline from a host aircraft H. Some embodiments disclosed herein include an improved capture mechanism and system for unmanned aerial vehicles (UAV's) or other target aerial vehicles (collectively, target aerial vehicle(s) or target aircraft) for capturing a towline tethered to a host aircraft. For clarity, in FIG. 1 the host aircraft H, towline 102, and the target aircraft T are not necessarily to scale. The host aircraft H may be any type of manned or unmanned aircraft. The host aircraft H may be a conventional aircraft such as a jet or prop-driven aircraft, UAV, or other aircraft type. The target aircraft T may be any type of UAV or, in some embodiments, aircraft that is smaller than the host aircraft, although the target aircraft T may also be a manned or piloted aircraft in any embodiments disclosed herein. The host and/or target aircraft H, T in any embodiments disclosed herein may be forward flying aircraft. In some embodiments, one or both of the host and target aircraft H, T may be in vertical flight, such as a vertical takeoff and landing (VTOL) aircraft, helicopter, or other types of aircraft.

UAV's are aircraft without a human pilot onboard. UAV's may be piloted manually by a remote operator and/or through autonomous or semi-autonomous controls. The remote operator may pilot the UAV based on the UAV's flight cameras, gauges, and other control sensors. The target aircraft T may be a UAV with a fuselage F, one or more flight surfaces, such as wings W, extending outwardly from the fuselage, and a propulsion system, such as a combustion or electric engine. UAV's may be used in a number of roles, such as aerial reconnaissance and ground surveillance, monitoring terrestrial objects and people, scientific experiments, geological surveys, military or non-military contexts, weapon delivery, and others.

Larger aircraft may generally have greater operable ranges than smaller or lighter UAV's. Thus, carrying a UAV on the host aircraft H and launching therefrom may expand the useful range of the UAV. However, safely landing the UAV for terrestrial recovery may be difficult or impossible in certain circumstances. For example, the geography may lack sufficient landing space, or the landing spaces may be in undesirable locations (e.g., under enemy control). Moreover, existing methods of aerial recovery of UAV's are impractical and unreliable. Accordingly, a need exists for the reliable recovery of a UAV in-flight.

Some embodiments disclosed herein include a capture mechanism to enable airborne recovery of a wide range of small, unmanned aerial vehicles or other target aircraft T in flight using the towline 102 with a simple, passive end feature or fitting deployed from the host aircraft H. Some embodiments of the capture mechanism on the target aircraft may be scalable and/or tunable to conform to a wide range of airframe shapes and sizes. In some embodiments, the components and methods of capture employ existing airframe features (e.g., leading or trailing edge of wing, left or right hand side of fuselage) to funnel or bias the towline 102 to the capture mechanism. Using these relatively large airframe features as a towline funnel or guide increases reliability and leads to very high probability of recovery, even for a small UAV with poor or moderate flight control.

Once the target aircraft T captures the towline fitting, some embodiments of the target aircraft T may be transitioned to a passively stable towed body by retracting or rotating its wings and reducing or stopping thrust. In some embodiments, the host aircraft H may use a hoist system in a pod on or in the host aircraft H to reel-in the target aircraft T (e.g. as shown in FIGS. 9A-15). The target aircraft T may be refueled or recharged by the host aircraft H and sent on a subsequent sortie, have maintenance performed on the target aircraft T, be transported to a mission point via captive carriage on the host aircraft H where the target aircraft T may be launched, or other actions taken. In some embodiments, the target aircraft T may conduct its mission and then be recovered by the host aircraft H. The host aircraft H may then transport the target aircraft T back to base for service (e.g., refuel, rearm, maintenance, etc.). Or, such maintenance, refueling, rearming, etc., may be provided to the target aircraft T while attached to the host aircraft H so that the target aircraft T may be launched or re-launched from the host aircraft H for another mission without having to return to base. Some embodiments of the capture mechanisms disclosed herein use a simple towline and hoist and may be used for capturing a very broad array of small UAV's (e.g., different airframe shapes, propulsion types, propulsion locations, etc.). Some embodiments of the capture mechanisms disclosed herein may be integrated into the fuselage during manufacturing of the UAV's and/or may be retrofit to existing fuselages of UAV's.

Existing solutions for in-flight recovery of aircraft are complex and unreliable. Today, some small UAV's may be very limited in their range and utility. Recovery of UAV's using conventional methods (e.g., skid landing or net arrest) risks significant damage. This precludes them from carrying expensive, advanced sensors and other equipment. The recovery systems according to the present disclosure provide reliable airborne approaches that may overcome these drawbacks. The host aircraft H may transport a small UAV or other target aircraft T long distances to a mission point. With little risk of damage to the target aircraft T upon recovery, small UAV's may carry expensive, advanced sensors with less risk of damage to such sensors. Therefore, providing reliable, robust systems for recovering UAV's has significant benefits. The capture mechanism 100 with deployable flaps and using the wing root as a guide for the near-vertical towline 102, among other features of the present disclosure described herein, provide such enhanced reliability and robustness, and can do so in a simpler recovery process.

As further shown in FIG. 1, the capture mechanism 100 may be coupled with or integrally formed with a portion of the target aircraft T, such as the fuselage F as shown. The target aircraft T may be traveling in a horizontal direction. The direction of travel is indicated by arrow $A_T$. The capture mechanism 100 may be configured to capture the towline 102 tethered to the host aircraft H while traveling in a horizontal direction, indicated by arrow $A_H$, which may be the same or similar direction as the direction $A_T$ of the target aircraft T. "Horizontal" as used herein has its usual and customary meaning and includes, without limitation, directions perpendicular to the direction of gravity, and directions that are approximately perpendicular to the direction of gravity, for example within +/−5 degrees, +/−10 degrees, +/−20 degrees, or +/−30 degrees of horizontal. The host and target aircraft H, T may be in horizontal or forward flight, and includes any aircraft or flying machine intended to fly horizontally. In some embodiments, the host aircraft H and/or target aircraft T may be flying only vertically, both horizontally and vertically, or they may be stationary in-flight without horizontal or vertical movement.

The target aircraft T in any of the embodiments disclosed herein may be any suitable or desired aerial vehicle. For example and without limitation, the target aircraft T shown in FIGS. 1 and 2A-2K may be a Sparrowhawk Small Unmanned Aircraft System (SUAS), by General Atomics Aeronautical Systems, Inc. In other embodiments disclosed herein, the target aircraft T may be any suitable or desired vertical lift aircraft, or any other suitable or desired manned or unmanned aircraft. The host aircraft H may be an MQ-9 or other aircraft. The target aircraft T may have a deployed-wing wingspan of between 2 to 75 feet (ft), between 3 and 50 ft, between 4 and 25 ft, or between 5 and 15 ft. The target aircraft T may have a length of between 3 and 50 ft, between 3 and 25 ft, between 3 and 15 ft, or between 3 and 10 ft. As used herein, the ranges are to be understood to include the stated values.

In some embodiments, the host aircraft H may include a hoist 110. The hoist 110 may include a winch. The hoist 110 may have some or all of the same or similar features and/or functions as the hoist system 1300 described with respect to FIGS. 9A-15, and vice versa. The hoist 110 may be configured to pay out or release the towline 102 and may be configured to reel in the towline 102, which may be done after the towline 102 has been captured by the target aircraft T. In this manner, the host aircraft H may tether the target aircraft T and move the target aircraft toward the host aircraft H. The hoist 110 may be attached to the fuselage and/or to the wing of the host aircraft H. In some embodiments, the hoist 110 may be an electric hoist. The host aircraft H may have some or all of the same or similar features and/or functions as the host aircraft 1100 described with respect to FIGS. 8A-14, and vice versa.

With reference to FIG. 1, the capture mechanism 100 may include a first movable portion 120 and second movable portion 122, such as arms or flaps. The first and second movable portions 120, 122 may be configured to rotate or move between a first stowed position in which the movable portion is in a closed or stowed state, and a second deployed position in which the movable portion is in an open or extended position. In FIG. 1, the movable portions 120, 122 are shown in deployed positions.

The towline 102 is shown extended downward with a portion 142 of the towline 102 located between a space 140 defined by the movable portions 120, 122. The towline 102 further extends through a wing root WR in front of the wing W and adjacent the fuselage F, which may be a region adjacent the aircraft, as further described. A fitting 103 is located on a distal end of the towline 102, which may be at the end of the towline 102 as shown. In some embodiments, there may be some length of the towline 102 extending beyond, e.g. through and beyond, the fitting 102. The wing root WR and movable portions 120, 122 may guide the towline into the space 140 to then stow the movable portions 120, 122 and thereby capture the fitting 103, as further described. The fitting 103 may be spherical as shown, or other shapes, as further described herein for example with respect to FIGS. 8A-8H.

The movable portions 120, 122 may be elongated arms or flaps. The movable portions 120, 122 may be made of metal, composite, other suitable materials, or combinations thereof. The movable portions 120, 122 may each have a thickness that is less than a width or average width. The length of each movable portion 120, 122 may be greater than the width and/or thickness. The movable portions 120, 122 may have a variety of shapes, sizes, and configurations, such as prongs, poles, bars, members, or any other structure that may operate to secure the fitting 103 to the target aircraft T as described herein.

In some embodiments, the first and/or second movable portions 120, 122 may have a contour that is rounded. The contour of the movable portions 120, 122 may match a contour of the fuselage of the target aircraft T, for example to optimize the aerodynamics of the capture mechanism 100 and the target aircraft T when the first and second movable portions 120, 122 are in the closed position. The movable portions 120, 122 may be configured to reduce the aerodynamic drag of the capture mechanism 200 when the first and second movable portions 220, 222 are in the first and second positions. For example, the movable portions 120, 122 may be made from a thin sheet metal or other rigid material.

The movable portions 120, 122 may move between various positions. For example, as shown in FIG. 2F, the first movable portion 120 is shown in a first position where it is closed or stowed in line with the fuselage, and the second movable portion 122 is shown in the second position where it is open or deployed. In some embodiments, the first and second movable portions 120, 122 may be configured to move independently of one another—e.g., the first movable portion 120 may be moved independently of the second movable portion 122 and the second movable portion 122 may be moved independently of the first movable portion 120. In some embodiments, first and second movable portions 120, 122 may be connected and/or configured to move simultaneously and/or equal amounts. In some embodiments, there may be three, four, or more movable portions. Further, the movable portions 120, 122 may move to any positions that are between the deployed and stowed positions, such as partially deployed positions, half-deployed positions, etc.

The capture mechanism 100 may have a first recess 130 (see, e.g., FIGS. 1, 2F and 2G) configured to receive the first movable portion 120 therein when the first movable portion 120 is in the closed position. The capture mechanism 100 may have a second recess 132 (see FIGS. 1, 2F and 2G) configured to receive the second movable portion 122 therein when the second movable portion 122 is in the closed position. The recesses 130, 132 may be different portions of one single, larger recess. The recesses 130, 132 may be openings or spaces in the fuselage F.

Figure 2A:
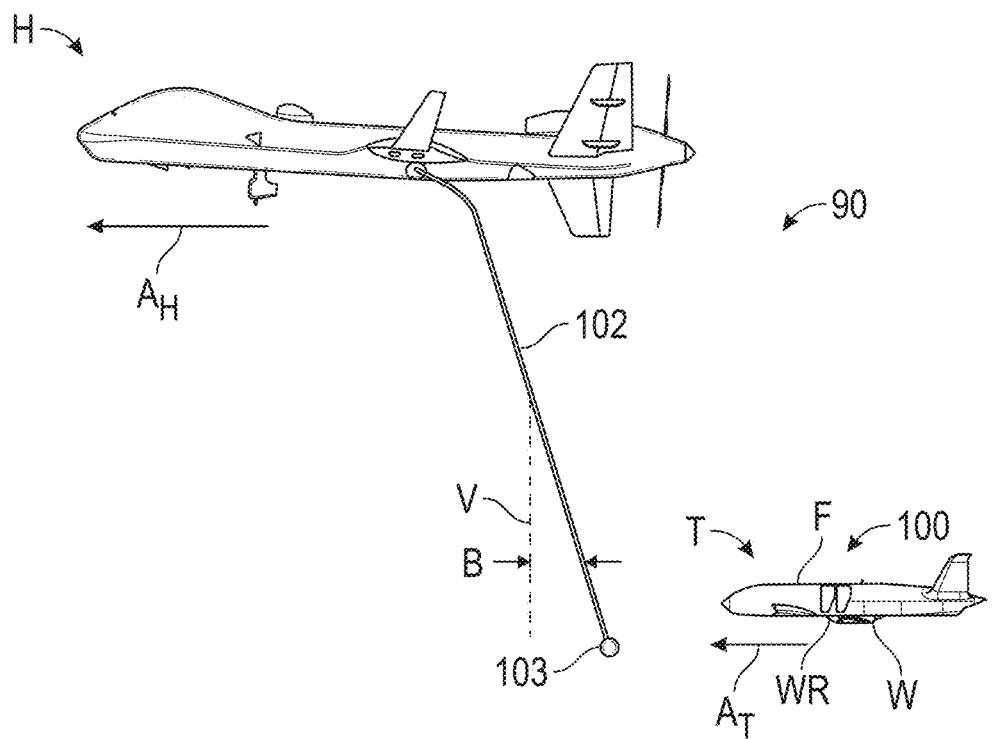
FIGS. 2A-2K show sequential side views of a host and target aircraft in-flight illustrating an embodiment of a method of recovering the target aircraft using the recovery system shown in FIG. 1.
Figure 2B:
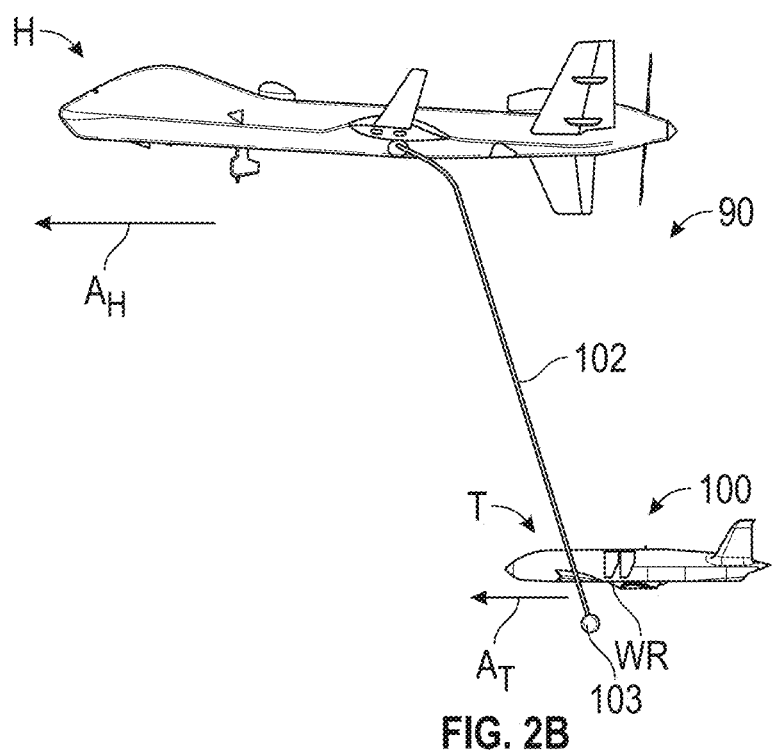
Figure 2C:
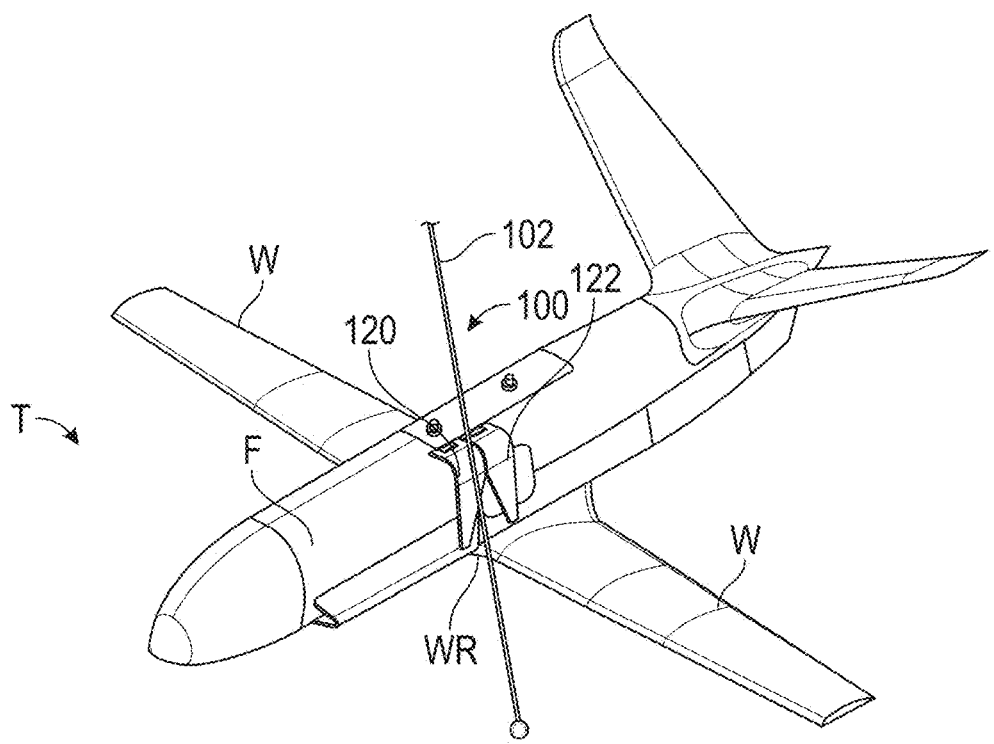
Figure 2D:
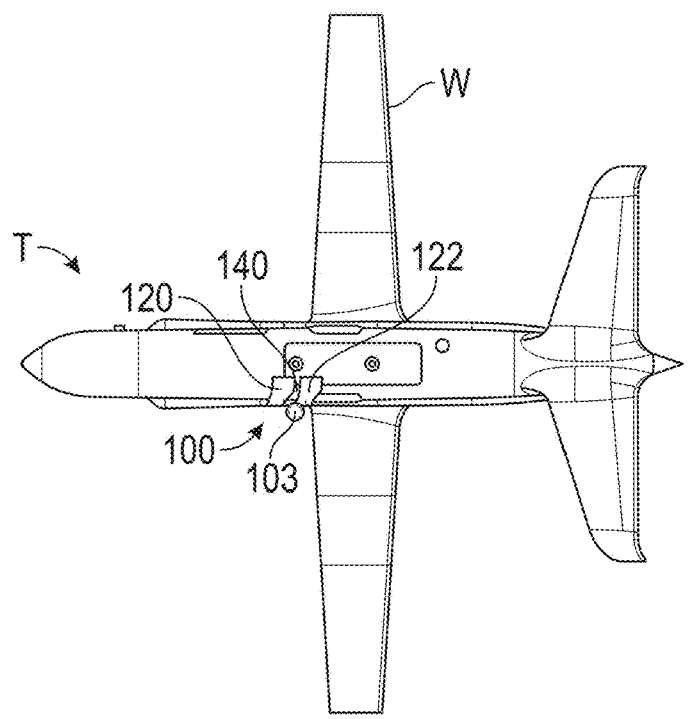
Figure 2E:
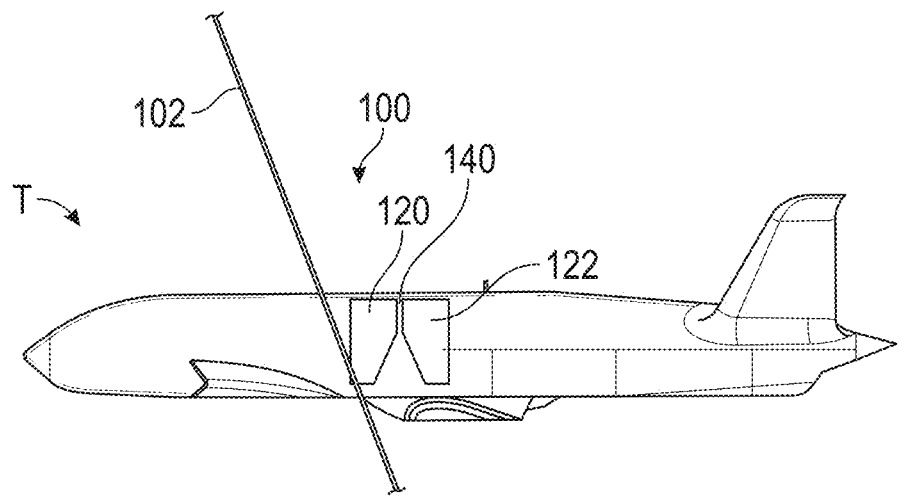
Figure 2F:
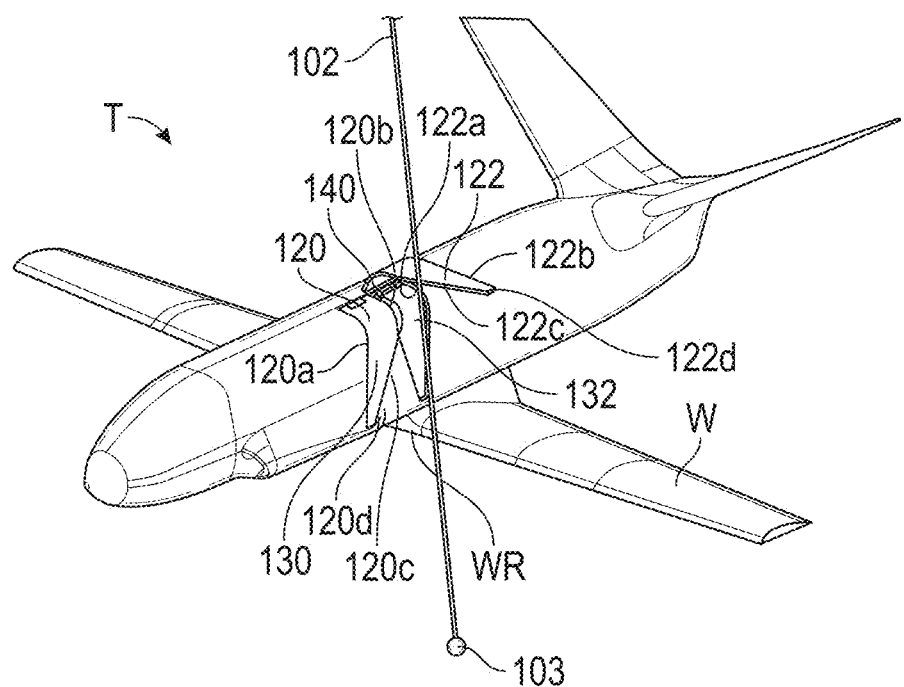
Figure 2G:
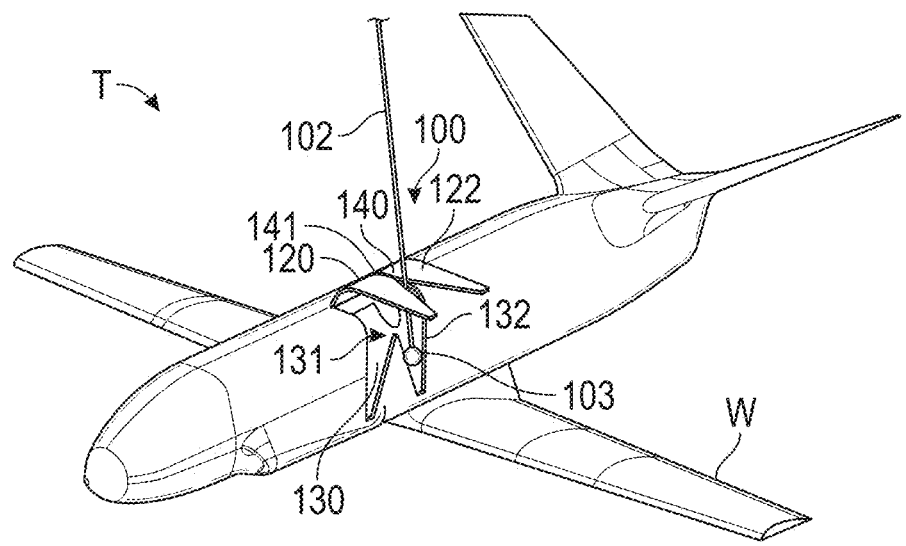

The capture mechanism 100 may have or define a cavity 131, as shown for example in FIG. 2G. The cavity 131 may be located underneath the stowed movable portions 120, 122. The cavity may be an open or empty space which receives the fitting 103 and part of the towline 102. The movable portions 120, 122 in the stowed positions close over the cavity 131 with the fitting 103 and part of the towline 102 therein to secure the towline 102 to the target aircraft T. The recesses 130, 132 may form an outer portion of the cavity 131.

As shown in FIG. 2F, the first movable portion 120 may have a straight leading or forward edge 120a and an opposite aft or trailing edge 120b. The first movable portion 120 may have a lower or outer edge 120d at a distal end of the first movable portion 120. The first movable portion 120 may have a rearward edge 120c, which may be angled as shown. The rearward edge 120c may be adjacent to the aft or trailing edge 120b. The rearward edge 120c may extend from the outer edge 120d to the aft edge 120b. The rearward edge 120c may be configured to guide or bias the towline 102 to a space 140 (also referred to as an opening or a gap) between the first and second movable portions 120, 122. The second movable portion 122 may have a leading edge 122a and an opposite, straight aft or trailing edge 122b. An angled forward edge 122c may extend from the leading edge 122a to a lower or outer edge 122d. The angled rearward edge 120c of the first movable portion and the angled forward edge 122c of the second movable portion 122 may face each other and partially define an outer receiving portion of the opening 140. The opening 140 may thus decrease in width in the direction of the target aircraft T. The straight aft edge 120b of the first movable portion 120 and the straight leading edge 122a of the second movable portion 122 may face each other and partially define an inward securing portion of the opening 140. The opening 140 may thus have a constant width between the straight aft edge 120b and the straight leading edge 122a. The towline 102 may be guided into the decreasing width portion of the opening 140 and then into the constant width portion of the opening 140, as further described.

With reference to FIGS. 2A-2K, sequential views of an embodiment of the recovery system 90 are shown illustrating a method of capturing the target aircraft T having the capture mechanism 100 with the host aircraft H. As further described, in some embodiments, a method for in-flight recovery of the target aircraft T by the host aircraft H during forward flight may include, for example, deploying the towline 102 downward and away from the host aircraft H, receiving a vertically-oriented portion of the towline 102 into the wing root WR of the target aircraft T, deploying first and second movable portions 120, 122 of the target aircraft T to deployed positions to define the opening 140, maneuvering the target aircraft T to move the capture mechanism 100 toward the towline 102, guiding the towline 102 into the opening 140, guiding the fitting 103 toward undersides of the deployed movable portions 120, 122, stowing the movable portions 120, 122 to capture the fitting 103, retracting the towline 102 toward the host aircraft H to direct the target aircraft T toward the host aircraft H, and/or securing the target aircraft T with the host aircraft H.

As shown in FIG. 2A, the target aircraft T may be maneuvered into an optimal position relative to the host aircraft H, and/or vice versa. The target aircraft T may be below and behind the host aircraft H. The target aircraft T may be laterally in line with the host aircraft H (with respect to directions into and out of the plane of the figure as oriented), or the target aircraft T may be laterally offset from the host aircraft H. The towline 102 may be deployed from the host aircraft H either prior to or after relative positioning of the aircraft H, T.

The towline 102 or portion or thereof, such as a distal end containing the fitting 103, may be oriented vertically or near vertical. "Vertical" as used herein has its usual and customary meaning and includes without limitation a direction aligned with the direction of gravity. In some embodiments, "vertical" may refer to a direction perpendicular to a horizontal component of travel of the host and/or target aircraft H, T. The towline 102 may form an angle B with the vertical direction V, as shown in FIG. 1. In some embodiments, the portion of the towline 102 adjacent to or otherwise near the fitting 103, such as any portions that would interact with the capture mechanism 100, may form the angle B. The angle B may be less than 5 degrees, less than 10 degrees, less than 15 degrees, less than 20 degrees, less than 25 degrees, less than 30 degrees, less than 35 degrees, less than 40 degrees, or less than 45 degrees off the vertical direction V. In some embodiments, the towline 102 in free space (e.g., prior to contact with the target aircraft T) may be angled more than 30 degrees, or more than 45 degrees, and then form the angle B in response to contacting the wing and/or fuselage of the target aircraft. The towline 102 may thus form the angle B immediately prior to the towline 102 entering the space defined between the movable portions.

As shown in FIG. 2B, the towline 102 extends through the wing root WR of the target aircraft T. As the target aircraft T is maneuvered, the towline 102 may be directed along the fuselage F and/or the wing W of the target aircraft T toward the wing root WR. As used herein, the "wing root WR" may include a region of the target aircraft T where the leading or trailing edge of the wing W intersects the fuselage F. This region is not limited to the surfaces of the wing W and fuselage F, and includes space adjacent to these surfaces extending forward from the wing W and laterally outward away from the fuselage F. The wing root WR may include a triangular region, defined between the nose of the aircraft, the outer tip of the wing, and the intersection of the fuselage and leading edge of the wing. The target aircraft T may be maneuvered relative to the towline 102 so that the towline 102 makes contact directly at the wing root WR of the target aircraft T without contacting the wing W or the fuselage F of the target aircraft T.

As shown in FIG. 2C, the target aircraft T may be maneuvered toward the towline 102 to cause the towline 102 to contact the target aircraft T along the wing W of the target aircraft T and/or the fuselage F of the target aircraft T. The towline T may make some contact with the wing W and/or fuselage F of the target aircraft T before the towline 102 is captured by the capture mechanism 100 of the target aircraft. In some embodiments, the target aircraft T may be maneuvered toward the towline 102 to bring the towline 102 in proximity with the wing W or the fuselage F of the target aircraft T, without necessarily having the towline 102 make contact with the fuselage F or the wing W of the target aircraft T. For instance, the recovery system 90 may use a natural funneling effect to cause the towline 102 to move toward the wing root WR of the target aircraft T, which may be due to contact with the wing W and/or fuselage F, and/or due to aerodynamic forces acting on the towline 102 and/or fitting 103. The leading edge of wing W and side of fuselage F may create and/or enhance an airflow funnel and/or reduced pressure zone that may guide or bias the towline 102 toward the wing root WR and/or toward the fuselage F.

With reference to FIGS. 2C-2E, in some embodiments, the target aircraft T may be maneuvered such that, once the towline 102 reaches the wing root WR and/or with the towline 102 located within the opening 140 as further described, the flight path of the target aircraft T may be altered. For example and without limitation, the target aircraft T may be maneuvered to roll toward the towline 102, yaw toward the towline 102, and/or decrease altitude so that the fitting 103 is brought into proximity with the capture mechanism 100. In some embodiments, at a certain proximity from the towline 102, the target aircraft T may roll, maneuver laterally toward the towline 102, and/or maneuver vertically up or down to bring the towline 102 and/or fitting 103 into proximity with the capture mechanism 100. The first and second movable portions 120, 122 may be in a stowed position during these maneuvers. In some embodiments, the target aircraft T may maneuver laterally toward the towline 102 a distance of five feet or less, ten feet or less, fifteen feet or less, twenty feet or less, twenty-five feet or less, or thirty feet or less. The target aircraft T may lower relative to the towline 102, e.g. decrease the target aircraft T's altitude if the towline 102 is vertically stationary, by one foot or less, two feet or less, three feet or less, four feet or less, five feet or less, six feet or less, seven feet or less, eight feet or less, nine feet or less, ten feet or less, fifteen feet or less, or twenty feet or less. The target aircraft T may roll, i.e. rotate along its longitudinal axis, toward the towline 102 an angular amount, which may be five degrees or less, ten degrees or less, fifteen degrees or less, or twenty degrees or less. This rotation may be relative to a current roll orientation of the target aircraft T, or relative to the horizon.

In any embodiments of the recovery systems disclosed herein, the target aircraft T may approach aft of and to the lateral side of the towline 102, such as from the right of the towline 102 as shown. For capture mechanisms that open to the right side of the target aircraft T, the target aircraft T may approach from the aft and left side of the towline 102. Looking down at the target aircraft T, for instance as shown in FIG. 2D, the target aircraft T may be moved at an angle toward the towline 102, such as at a forty-five degree angle or an approximately forty-five degree angle relative to the towline 102. In some embodiments, the target aircraft T may be maneuvered toward the towline 102 at a vertical distance of approximately ten to one hundred feet, twenty to eighty feet, thirty to fifty feet, or forty feet below the host aircraft H. FIG. 2B shows the target aircraft T nearing contact with the towline 102. In some embodiments, visual navigation by the remote controller or autonomous flight system of the target aircraft T may be used to assist in the navigation and/or maneuvering of the target aircraft T relative to the towline 102 once the target aircraft T is in close proximity with the towline 102, for example and without limitation, when the target aircraft T is within ten feet or approximately ten feet of the towline 102, or within five feet or approximately five feet of the towline, or within five to twenty feet of the towline 102.

As shown in FIG. 2F, in some embodiments, with the towline 102 either moving along the leading edge of the wing W toward the wing root WR, and/or along the fuselage F toward the wing root WR, and/or in contact with or in proximity of the wing root WR, the second movable portion 122 may be moved to or toward the open or deployed position. The second movable portion 122 may be deployed prior to the towline 102 being deployed and/or being near the target aircraft T. The second movable portion 122 may be located aft of the first movable portion 120. The second movable portion 122 may be positioned on the target aircraft T and configured so that a leading or forward edge 122a of the second movable portion 122 will be aft of the towline 102 during the capture operation, e.g., when the towline 102 is in contact with or proximal to the wing root WR, or as the towline 102 is moving along the leading edge of the wing W of the target aircraft T. In this configuration, the towline 102 may be captured forward of the second movable portion 122 so that the capture mechanism 100 may capture the towline 102 between the first and second movable portions 120, 122.

The towline 102 may be guided into the opening 140, such as a gap or space, defined by and located between the first and second movable portions 120, 122, as the first movable portion 120 is moved to or toward the open position, as shown in FIG. 2E. In some embodiments, the first movable portion 120 may already be deployed prior to movement of the towline toward the opening 140. The opening 140 may have a decreasing width from an outer edge of the movable portions 120, 122 in the inward direction toward the aircraft T between the angled portion 120c of the first movable portion 120 and the outward part of the leading edge 122a of the second movable portion 122. This may create a funnel-shape between the movable portions 120, 122. The opening 140 may then have a constant width section between the trailing edge 120b of the first movable portion 120 and the inward part of the leading edge 122a of the second movable portion. The towline 102 may be received into the decreasing width portion of the opening 140 and then into the constant width portion of the opening 140.

The opening 140 may have an inner-most endpoint 141, for example as shown in FIG. 2G, which may be a region of the opening 140, that limits further lateral travel of the towline 102. The endpoint 141 may be aligned with a longitudinal axis of the aircraft T, for example located directly over such axis, such that this endpoint 141 is near the middle of the fuselage F as viewed from the top. In some embodiments, this endpoint 141 may be aligned with the center of gravity of the target aircraft T. In some embodiments, the opening 140 may be forward or aft of the center of gravity of the target aircraft T. In some embodiments, the opening 140 may be slightly forward of the center of gravity of the target aircraft T to create a passively stable towed body once the wings are folded or moved to a collapsed state (if the wings are folded or moved to a collapsed state) and/or the engine of the target aircraft is shut down. In some embodiments, the opening 140 may be forward or aft of the center of gravity of the target aircraft T by a particular percentage of the overall longitudinal length of the aircraft, for example by from 2% or less, less than 5%, less than 10%, less than 15% or less than 20% of the length of the aircraft. The opening 140 may have other configurations, such as a uniform width, a changing width, a decreasing width, an increasing width, or combinations thereof.

As shown in FIG. 2G, once the target aircraft T and/or towline 102 have been maneuvered so that the towline 102 is positioned forward of and adjacent to the forward edge 122a of the second movable portion 122, the first movable portion 120 may be deployed to or toward the open position so that the towline 102 is positioned between the aft edge 120b of the first movable portion 120 and the forward edge 122a of the second movable portion 122. With the towline 102 positioned between the aft edge 120b of the first movable portion 120 and the forward edge 122a of the second movable portion 122, the towline 102 and/or target aircraft T may move such that the towline 102 moves vertically upward relative to the target aircraft T, which movement may be toward the host aircraft H, and is drawn upward through the opening 140 of the capture mechanism 100. The fitting 103 or other limiting object fixed to the towline 102 at a particular position on the towline 102 may thus be moved into contact with the capture mechanism 100, for example and without limitation, moved into contact with a lower surface of the first and second movable portions 120, 122.

In some embodiments, the capture mechanism 100 and the fitting 103 may be configured such that the fitting 103 has a width that is larger than a width of an inner section of the opening 140. This inner section may be a portion of the opening 140 that has a constant width, or that otherwise has a width smaller than the width of the fitting 103. The width of the fitting 103 may be larger than a perpendicular distance between the aft edge of the first movable portion 120 and the forward edge of the second movable portion 122. This inner section of the opening 140 may be at or near a base of the first and second movable portions 120, 122. The inner section may be configured such that the fitting 103 cannot vertically pass through the opening 140 between the first and second movable portions 120, 122 as the towline 102 is moved upwardly through the inner section of the opening 140 between the first and second movable portions 120, 122 when the first and second movable portions 120, 122 are in the stowed or deployed positions. In this manner, the capture mechanism 100 may be used to capture or secure the towline 102 to the target aircraft T.

In some embodiments, the target aircraft T may maneuver to locate the towline 102 within the opening 140, into the inner section of the opening 140, and/or into the endpoint 141 of the opening 140. The target aircraft T may roll, yaw, pitch, etc. as previously described.

Figure 2H:
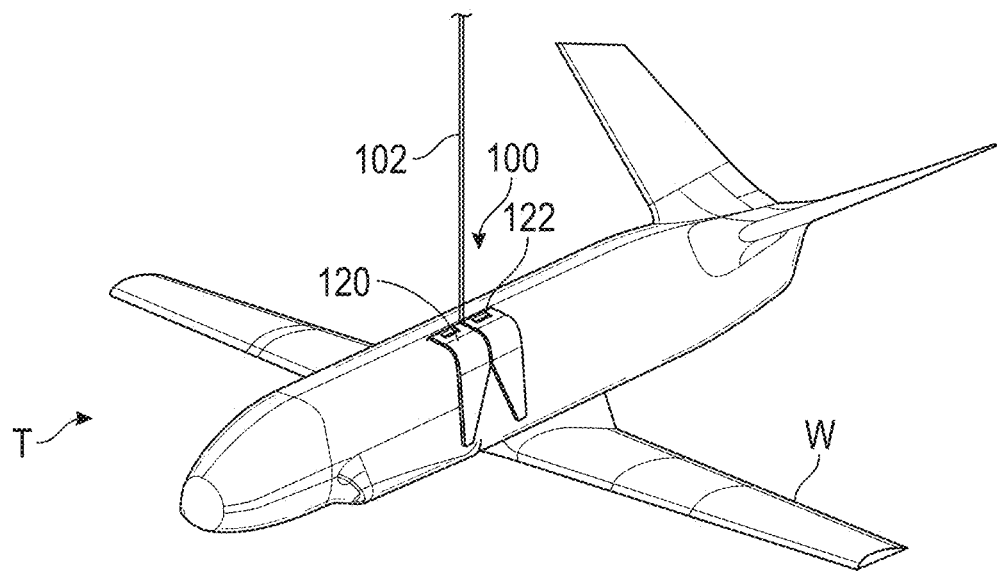

As shown in FIG. 2H, with the fitting 103 located in the inner section and/or at the endpoint 141 of the opening 140, the first and second movable portions 120, 122 may be moved, e.g. simultaneously, toward their respective stowed positions to prevent the towline 102 and/or the fitting 103 from escaping the fuselage F of the target aircraft T or otherwise moving out of engagement with the capture mechanism 100. The towline 102 may extend from the endpoint 141 of the opening 140, or from the inner section of the opening 140.

Figure 2I:
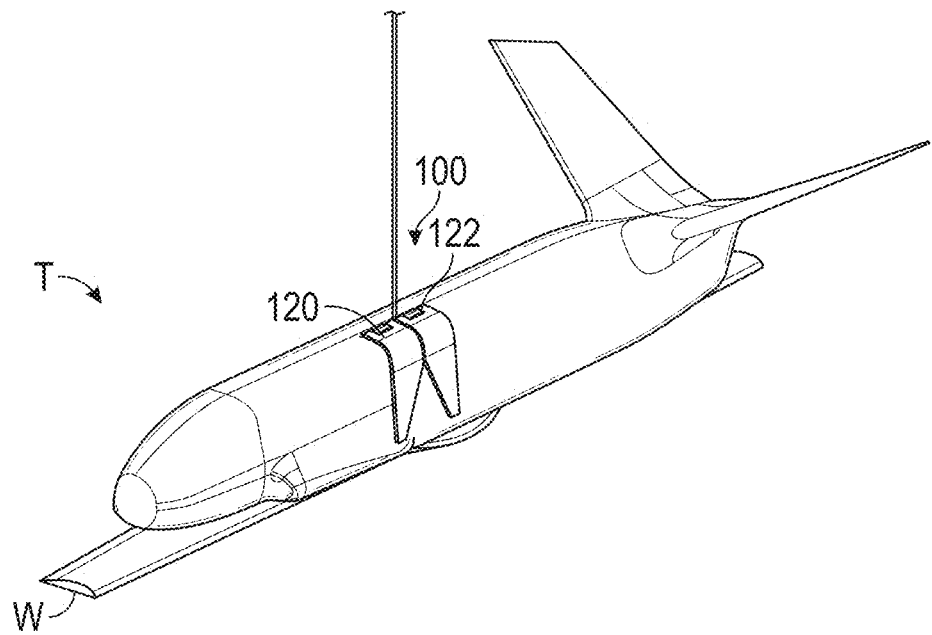
Figure 2J:
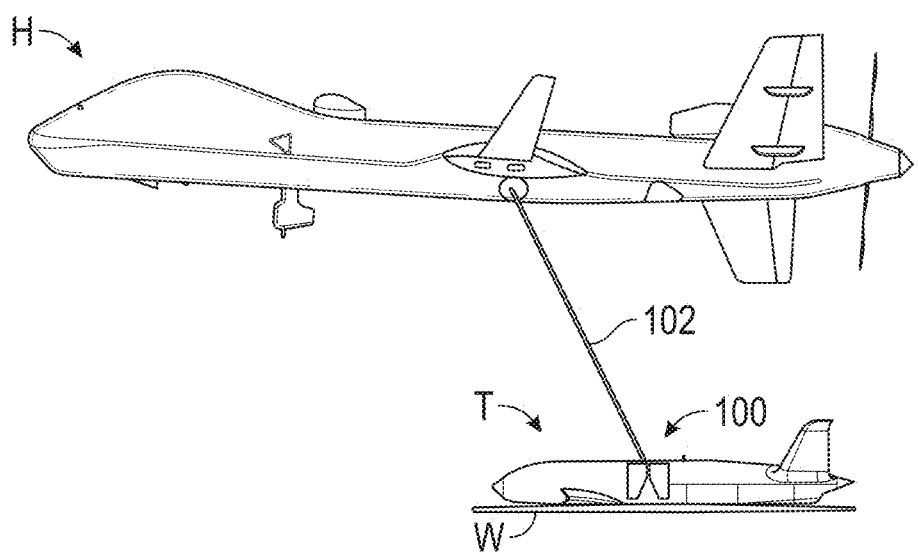

As shown in FIGS. 2I and 2J, some embodiments of the target aircraft T may be configured to take a passive towed body configuration. For example, the wings W may move or rotate to a stowed position. In this example, the wings W move in line with the fuselage F of the target aircraft T.

Further details of towed body configurations of the target aircraft are shown in and described with respect to FIGS. 10A-10D.

Figure 2K:
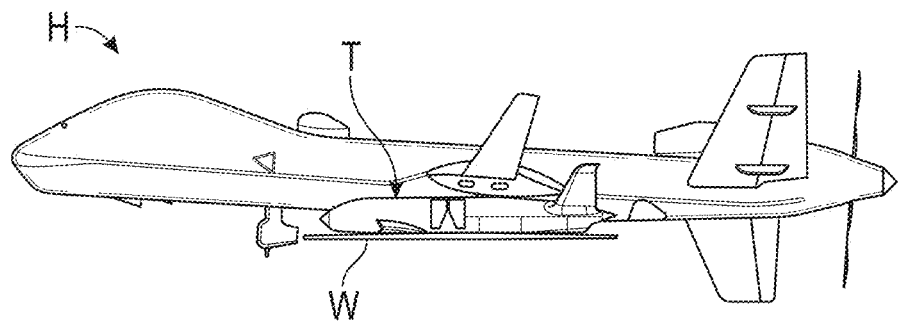

As shown in FIG. 2K, the towline 102 may be reeled in by a hoist system having a winch to pull the target aircraft T toward the host aircraft H. Once the towline 102 is retracted, the target aircraft T may be securely attached to or secured by the host aircraft H. For example, the target aircraft T may attach to a pylon of the host aircraft H. Further details of various embodiments of hoist systems and securement features are shown in and described with respect to FIGS. 9A-15. Optionally, the target aircraft T may also be deployable from the host aircraft H before and/or after recovery. The recovery or deployment may occur during any phase of flight. The recovery or deployment can occur during forward flight, ascending or descending flight, takeoff, landing, when the host aircraft and/or the target aircraft are stationary, or during other phases.

Figure 3:
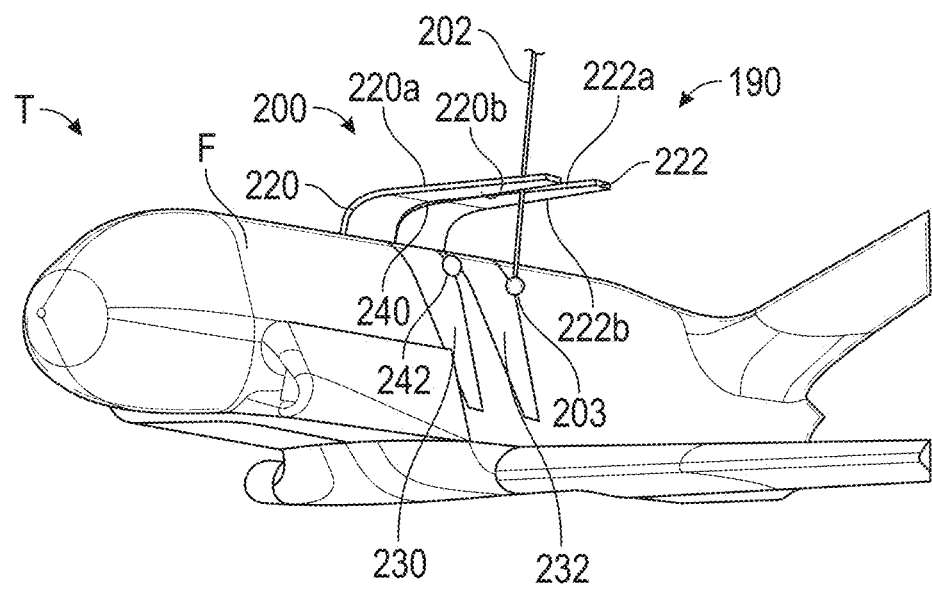
FIG. 3 is a perspective view of another embodiment of a target aircraft having a capture mechanism with a towline extending downward from a host aircraft.

FIG. 3 depicts another embodiment of a system 190 for recovery of a target aircraft T having a capture mechanism 200. The recovery system 190 may have the same features and/or functions as the recovery system 90, and vice versa. For example, the capture mechanism 200 may be coupled with a fuselage F of a target aircraft T and may be configured to capture a towline 202 tethered to a host vehicle (not shown). The capture mechanism 200 may include a first movable portion 220 and second movable portion 222. The first movable portion 220 may have a leading edge 220a and a trailing edge 220b, and the second movable portion 222 may have a leading edge 222a and a trailing edge 222b. The first and second movable portions 220, 222 may be configured to rotate or move between a first, closed or stowed position and a second, open or extended position. For example and without limitation, FIG. 3 shows the first and second movable portions 220, 222 in a second, open position. The capture mechanism 200 may have a first recess 230 configured to receive the first movable portion 220 therein when the first movable portion 220 is in the closed position, and a second recess 232 configured to receive the second movable portion 222 therein when the second movable portion 222 is in the closed position, to optimize the aerodynamics of the capture mechanism.

Further, the capture mechanism 190 may include a catch 242 configured to receive the fitting 203. The catch 242 may be located within the recess 230 and/or recess 232. The catch may be a device the secures, for example grabs, the fitting 203. In some embodiments, the catch 242 may be a round opening in the cavity or recesses configured to receive the fitting 203 therein as the movable portions 220, 222 close and move the fitting 203 through and/or into the catch 242.

Figure 4A:
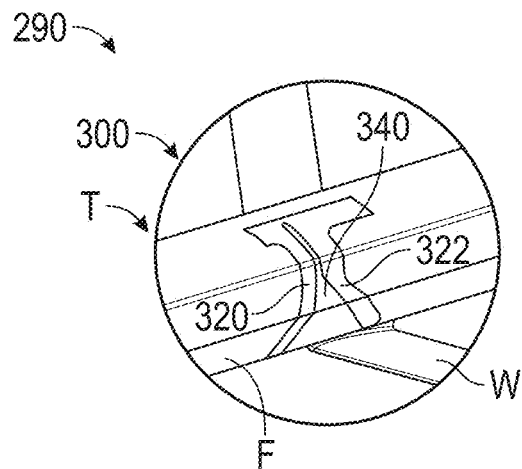
FIGS. 4A-4D are partial sequential perspective views of another embodiment of a capture mechanism on a target aircraft capturing a towline extending downward from a host aircraft.
Figure 4B:
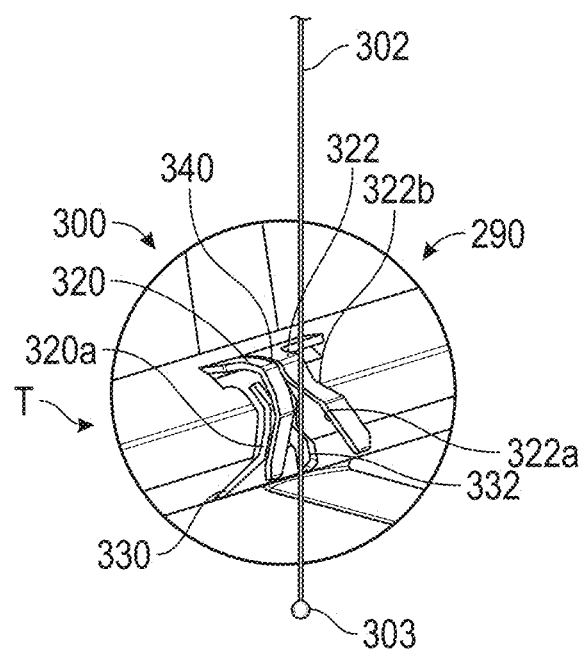
Figure 4C:
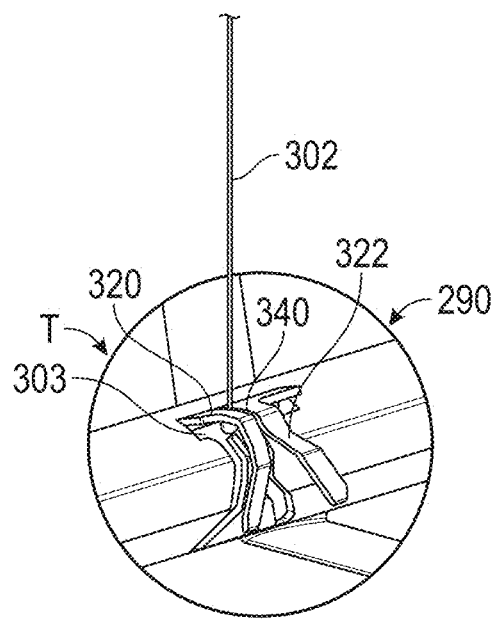
Figure 4D:
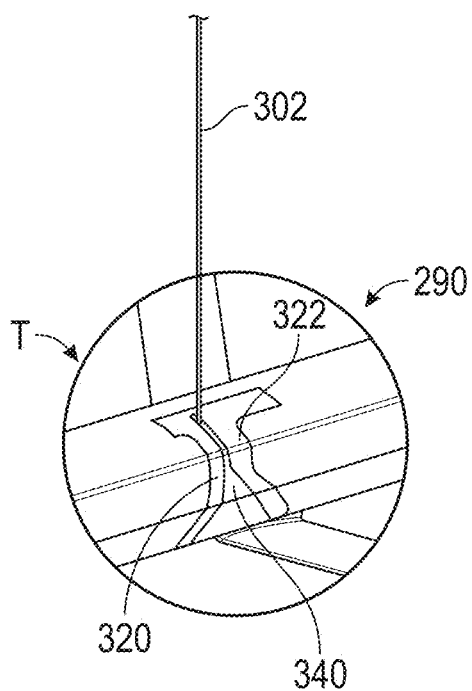
Figure 5A:
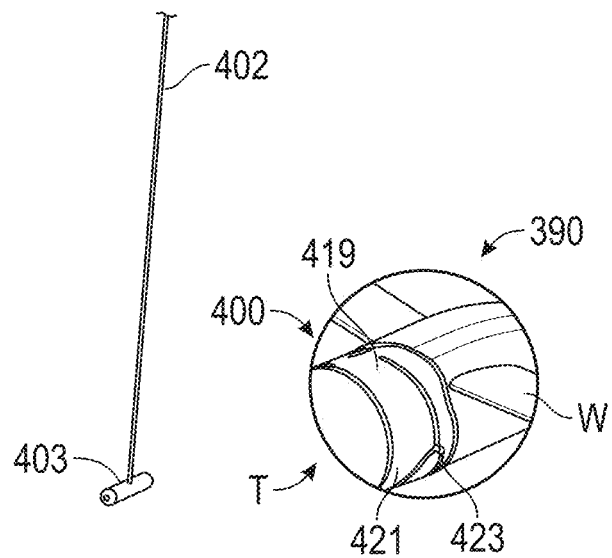
FIGS. 5A-5F are partial sequential perspective views of another embodiment of a capture mechanism on a target aircraft capturing a towline extending downward from a host aircraft.
Figure 5B:
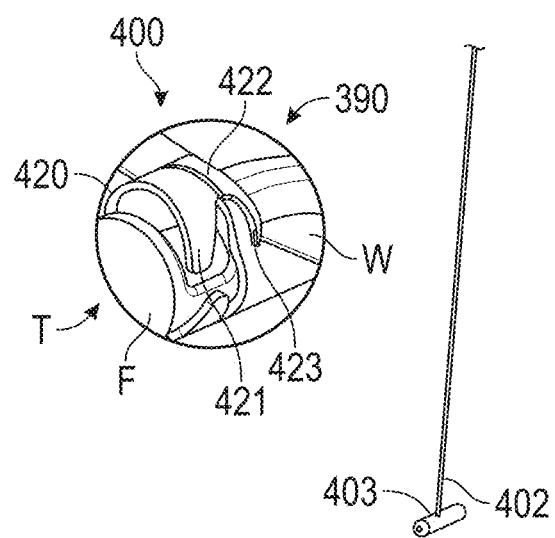
Figure 5C:
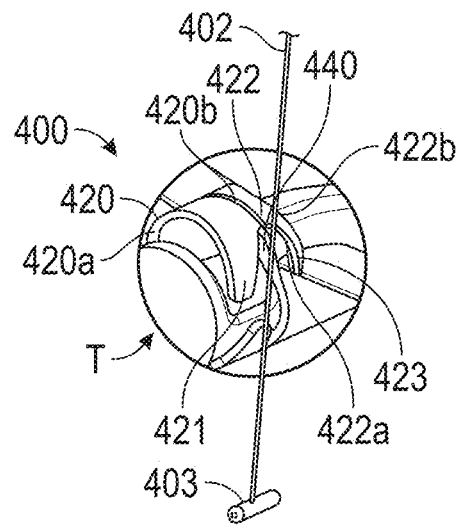
Figure 5D:
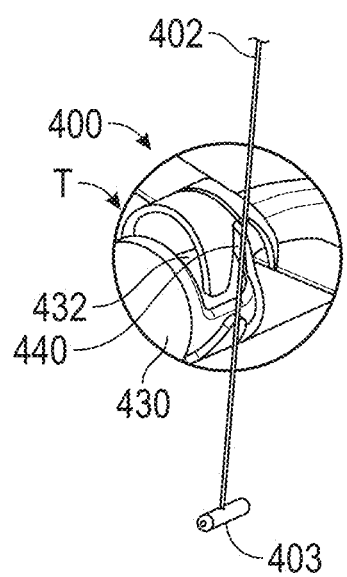
Figure 5E:
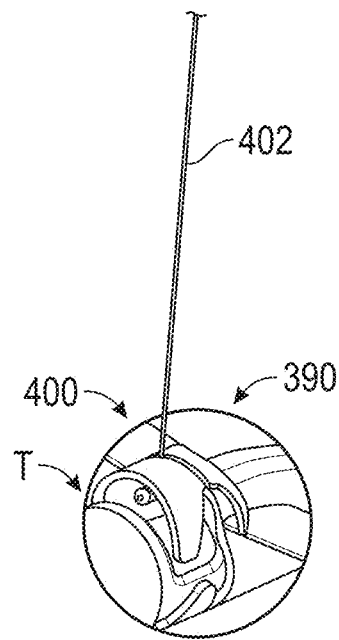
Figure 5F:
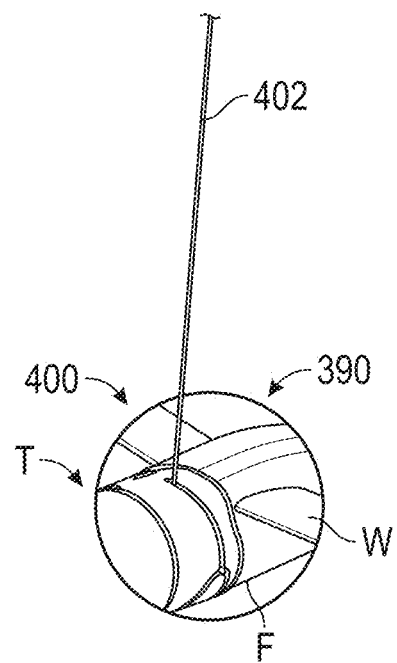
Figure 6A:
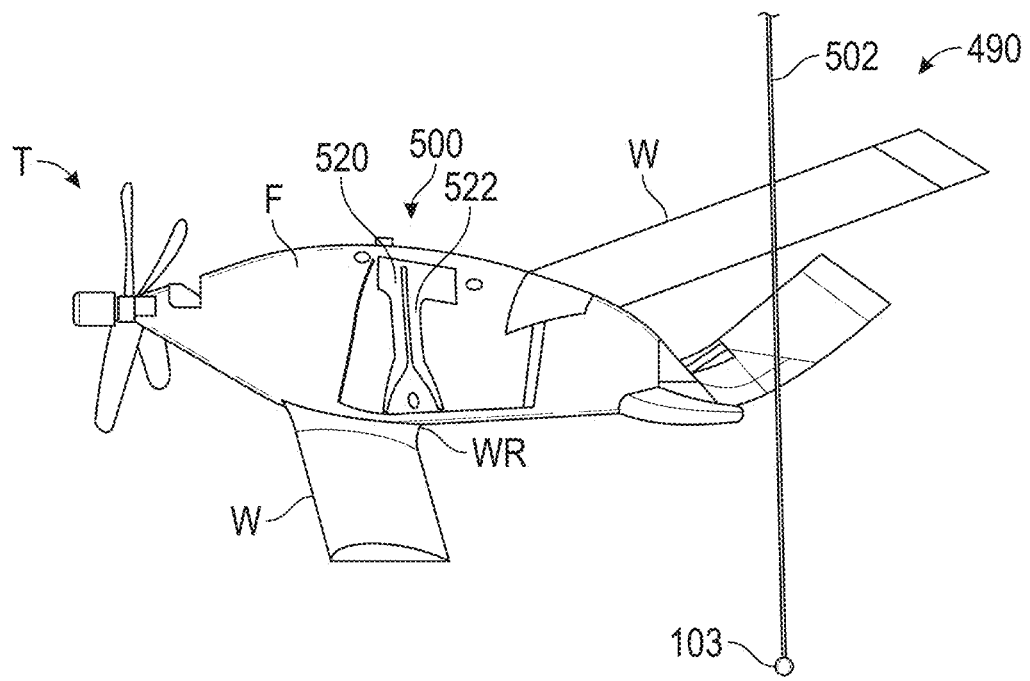
FIGS. 6A-6F are sequential side views of another embodiment of a target aircraft having a capture mechanism with a towline extending downward from a host aircraft and located rearward of the target aircraft wing.
Figure 6B:
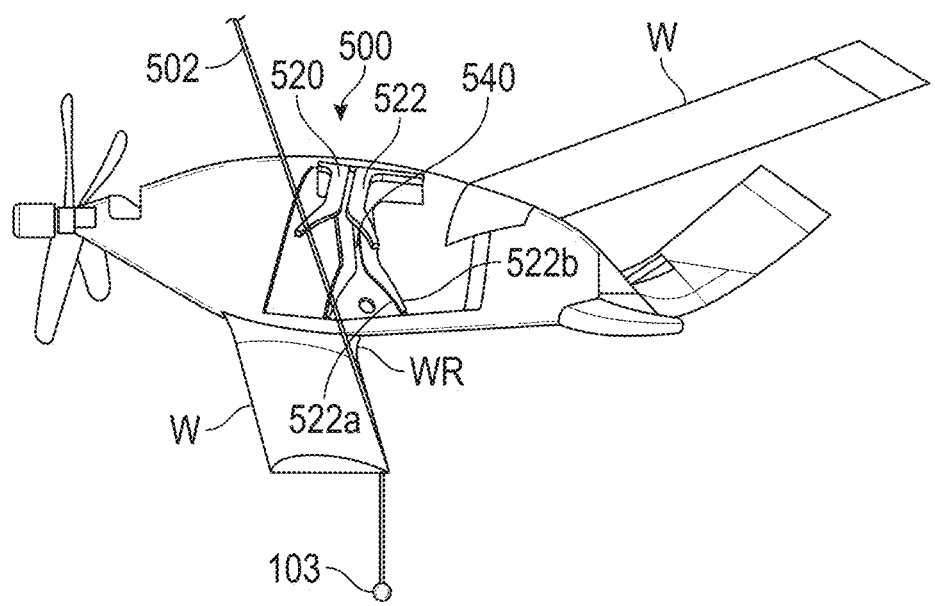
Figure 6C:
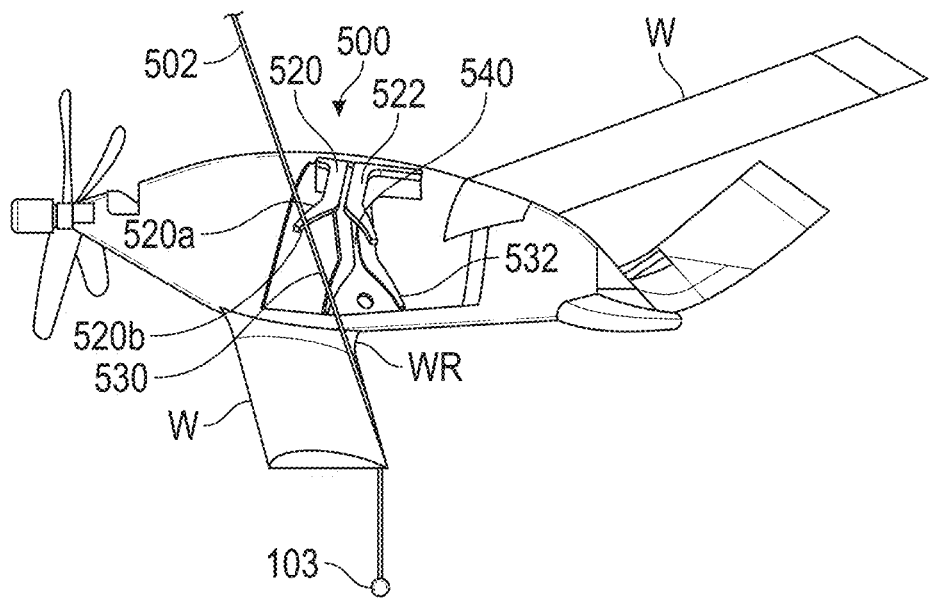
Figure 6D:
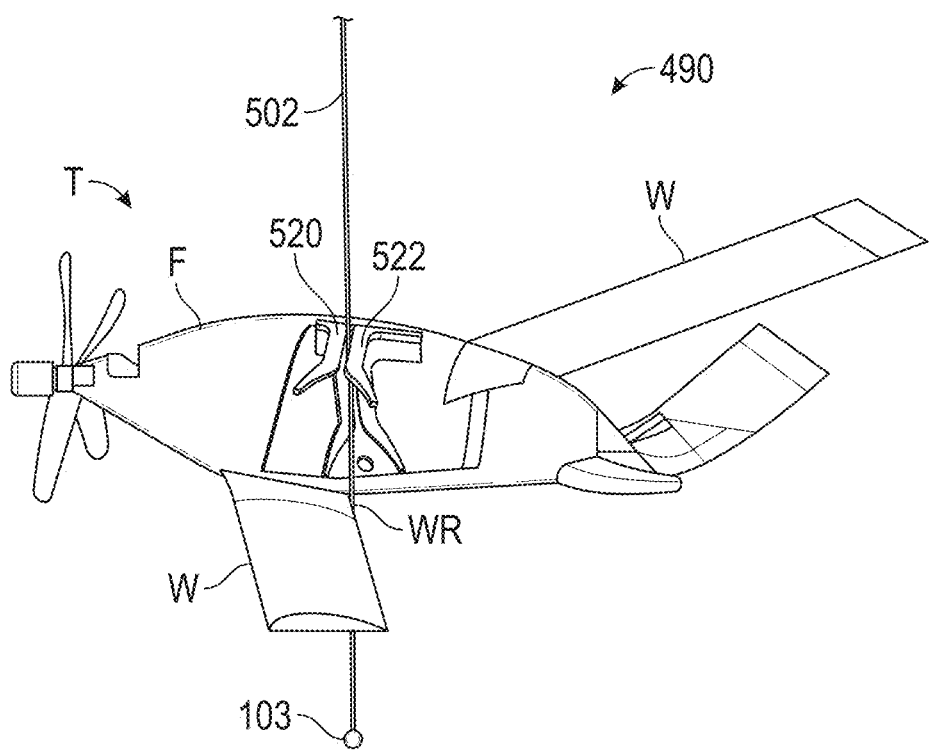
Figure 6E:
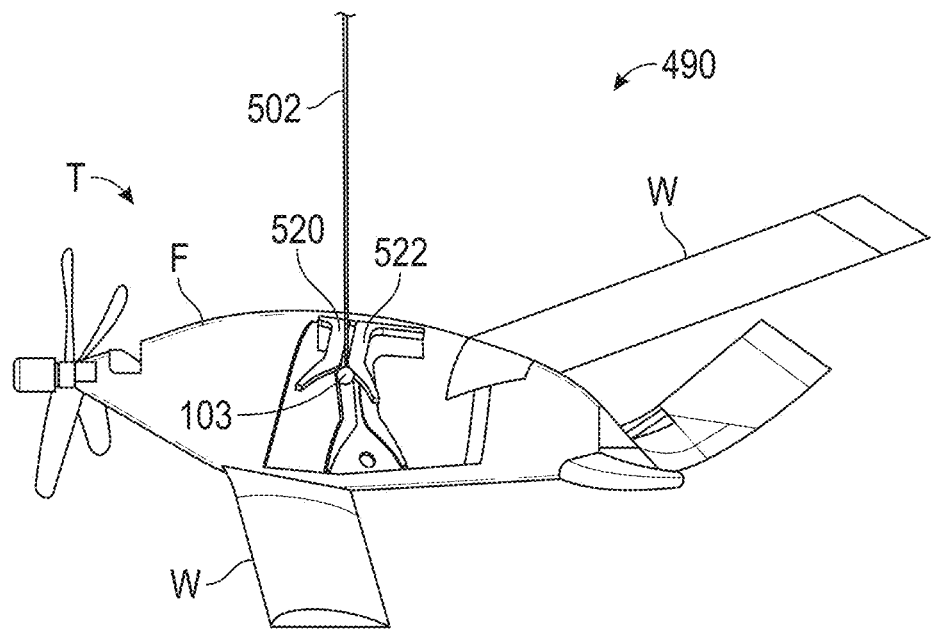
Figure 6F:
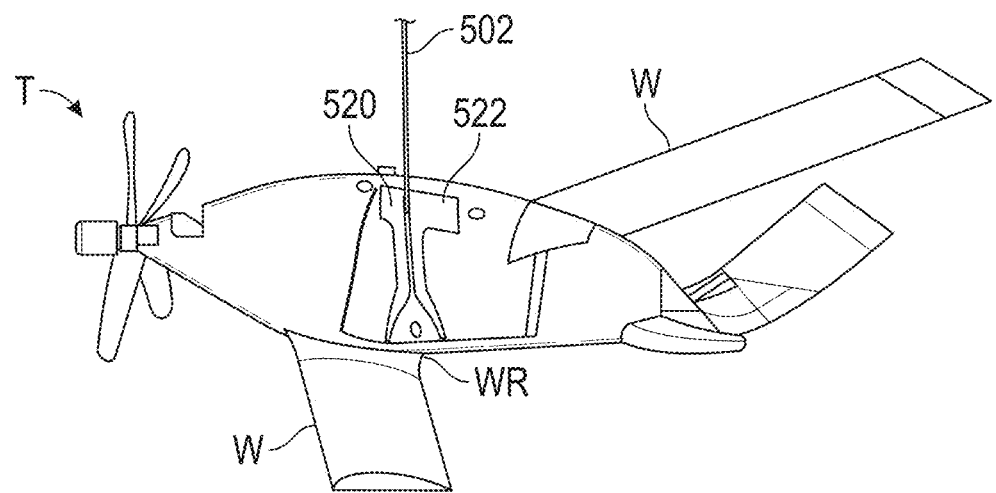

FIGS. 4A-4D depict sequential views of another embodiment of a recovery system 290 for recovery of a target aircraft T having a capture mechanism 300. The recovery system 290 may have any of the same features and/or functions as the recovery system 90 or 190, and vice versa. For example, the capture mechanism 300 may be coupled with a fuselage F of a target aircraft T and may be configured to capture a towline 302 tethered to a host vehicle (not shown). The capture mechanism 300 may include a first movable portion 320 and second movable portion 322. The first movable portion 320 may have a leading edge 320a and a trailing edge 320b, and the second movable portion 322 may have a leading edge 322a and a trailing edge 322b. The first and second movable portions 320, 322 may be configured to rotate or move between a first, closed or stowed position and a second, open or extended position. For example and without limitation, FIG. 4B shows the first and second movable portions 320, 322 in a second, open position. The capture mechanism 300 may have a first recess 330 configured to receive the first movable portion 320 therein when the first movable portion 320 is in the closed position, and a second recess 332 configured to receive the second movable portion 322 therein when the second movable portion 322 is in the closed position.

Further, the first and/or a second movable portions 320, 322 may have a segmented "ski" shape. The movable portions 320, 322 may be elongated members with multiple segments to match the contour of the fuselage F and provide a wider outer opening 340 for the towline 302. The inner segments of each movable portion 320, 322 may be spaced to define a constant width opening therebetween. A second outward segment adjacent the inner segment of each movable portion 320, 322 may angle away from each other and have an increasing width therebetween in a direction away from the base of the movable portions 320, 322. A third outer segment adjacent the second segment of each movable portion 320, 322 may angle outward even more than the second segments, and have an increasing width therebetween that increases at a faster rate in an outer direction as compared to the distance between the second segments. This configuration may create a larger outermost width of an opening 340 located between outer endpoints of the movable portions 320, 322 to increase reliability of receiving the towline 302 between the movable portions 320, 322 and into the inner section of the opening 340.

FIGS. 5A-5F depict sequential views of another embodiment of a recovery system 390 for recovery of a target aircraft T having a capture mechanism 400. The recovery system 390 may have any of the features and/or functions as the recovery systems 90, 190, or 290, and vice versa. For example, the capture mechanism 400 may be coupled with a fuselage F of the target aircraft T and may be configured to capture a towline 402 tethered to a host vehicle (not shown). The capture mechanism 400 may include a first movable portion 420 and second movable portion 422. The first movable portion 420 may have a leading edge 420a and a trailing edge 420b, and the second movable portion 422 may have a leading edge 422a and a trailing edge 422b. The first and second movable portions 420, 422 may be configured to rotate or move between a stowed position and a deployed position. The capture mechanism 400 may have a first recess 430 configured to receive the first movable portion 420 therein when the first movable portion 420 is in the closed position, and a second recess 432 configured to receive the second movable portion 422 therein when the second movable portion 422 is in the closed position.

Further, the first and second movable portions 420, 422 may be integral and move together. The movable portions 420, 422 may have a single shared base 419 that rotates outward, and include two prongs 421, 423 respectively extending outwardly from the base 419. The base 419 may rotate about an axis that is located on an opposite side, for example right side, of the fuselage F as the side from which the towline 402 is incoming, for example the left side. The base 419 and/or movable portions 420, 422 may have a rounded, e.g., circular, or elliptical, contour to match the fuselage cross-sectional shape. An opening 440 may be defined between the two prongs 421, 423 having a width that decreases in an inward direction toward the aircraft T to a smaller width inner section, which may have a constant width. A fitting 403 may have an elongated shape, such as cylindrical and, in some embodiments, have rounded edges near the longitudinal ends of the fitting 403, as shown. In any embodiments disclosed herein, the fitting 403 can be cylindrical in shape, as shown in FIGS. 5A-5E, but may be shorter or longer in length than shown. For example and without limitation, the fitting 403 of any embodiments can have more of an elongated pill shape. The fitting 403 may be long enough to not fit through the inner section of the opening 440. The fitting 403 may be rounded to match a rounded contour of the underside of the movable portions 420, 422, for example to self-center itself underneath the movable portions 420, 422 in the stowed position.

FIGS. 6A-6F depict sequential views of another embodiment of a system 490 for recovery of a target aircraft T having a capture mechanism 500. The recovery system 490 may have any of the features and/or functions as the recovery systems 90, 190, 290 or 390, and vice versa. For example, the capture mechanism 500 may be coupled with a fuselage F of the target aircraft T and may be configured to capture a towline 502 tethered to a host vehicle (not shown). The capture mechanism 500 may include a first movable portion 520 and second movable portion 522. The first movable portion 520 may have a leading edge 520a and a trailing edge 520b, and the second movable portion 522 may have a leading edge 522a and a trailing edge 522b. The first and second movable portions 520, 522 may be configured to rotate or move between a stowed position and a deployed position.

Further, the wing root WR may be a region located aft of the wing, as shown. This region may include space aft of the wing and laterally to the left side of the fuselage. The region may be bounded by the intersection of the trailing edge of the wing and the fuselage, the tail, and the outer tip of the left wing. Thus, the towline 502 may be located aft of the wing and/or to the left of the fuselage. The target aircraft T may slow its speed while maneuvering to have the towline 502 located within this aft wing root WR. Additionally, the first and second movable portions 520, 522 may be separate and configured to move independently of one another or to move simultaneously and equally depending on the desire of the operator or of the autonomous system. For example, the towline 502 may be at an angle or position where only one, or both, movable portions 520, 522 should be deployed, and the mechanism can be operated accordingly. The movable portions 520, 522 may also have a length that, when deployed, extends an outermost tip of the movable portions 520, 522 farther outward to allow for capture of the towline 502 located farther from the fuselage F. For example, the movable portions 520, 522 may deploy to locate the outermost tips beyond an outer, lateral side of the fuselage F, and/or beyond the intersection of the wing W and fuselage F, and/or beyond 5%, beyond 10%, beyond 15%, or beyond 20% or more of the wingspan as measured between opposite tips of the wings W.

The following details apply to any recovery system and any capture mechanism embodiments disclosed herein. In some embodiments, servos, electric motors (e.g., high torque geared motors), linear or rotational actuators (for example and without limitation, screw driven linear actuators), hydraulic, pneumatic, and/or other actuation mechanisms may be used to move the first and second movable portions between the first and second positions. For example and without limitation, a first servo, motor, and/or actuator may be configured to rotate a shaft or axle that the first movable portion is coupled with to rotate the first movable portion between the first and second positions. A second servo, motor, and/or actuator may be configured to rotate a shaft or axle that the second movable portion is coupled with to rotate the second movable portion between the first and second positions. The first and second servo, motor, and/or actuators may be independently controlled. In some embodiments, a single servo, motor, actuator, and/or combination thereof may be used to move both the first and second movable portions.

In some embodiments, the first and second movable portions may be integrally formed—e.g., may be formed as a single structure, and/or may be separately formed and rigidly connected. In this arrangement, the capture mechanism may be configured such that the first and second movable portions move as a single unit, such that they both moved between the first, close position and a second, open position simultaneously.

In some embodiments, the first and second movable portions may be configured to rotate around one or two shafts or axes. For example and without limitation, embodiments wherein the first and second movable portions are connected, made from a single piece, or otherwise configured to move together and simultaneously, the first and second movable portions may rotate about a single shaft or axis.

In some embodiments, the shaft or axis of rotation that the first and second movable portions may be configured to move or rotate about may be located on the same side of the fuselage as the target wing root toward which the towline will be directed. In some embodiments, the shaft or axis of rotation that the first and second movable portions may be configured to move or rotate about may be located on the opposite side of the fuselage as the target wing root toward which the towline will be directed, as in the embodiment of the capture mechanism 400 shown in FIGS. 5A-5F, or on an upper portion of the fuselage, as in the embodiment of the capture mechanism 100 shown in FIGS. 1-2K.

In any embodiments disclosed herein, the capture mechanism and/or fuselage of the target aircraft T may be configured to have a recess or chamber sized and positioned to receive the fitting therein so that the fitting does not prevent or inhibit the moving of the capture mechanism to the second, closed state. For example and without limitation, any embodiments of the capture mechanism or the fuselage of the target aircraft T may have a recess, chamber, or space formed therein that is sized and configured to receive the fitting therein as the towline is being advanced into the space or recess between the first and second movable portions of the capture mechanism. In some embodiments, the recess or space configured to receive the fitting may be generally aligned with the space or recess between the first and second movable portions of the capture mechanism since, in some embodiments, the capture mechanism may be configured to bias the towline and the fitting toward the space between the first and second movable portions of the capture mechanism. In some embodiments, the recess or space configured to receive the fitting may have sloping side portions and/or be configured to bias the fitting toward a middle of the recess or space, or otherwise facilitate the movement of the fitting into the recess or space.

Additionally, in some embodiments, though not required, the capture mechanism may have latch mechanisms or other securing mechanisms to selectively latch or secure the first and second movable portions in the closed position to prevent the first and second movable portions from moving toward the open position as the target aircraft T is being lifted toward the host aircraft H (e.g., as an upward force is exerted on the first and second movable portions from the towline and fitting). The latch mechanisms in some embodiments may be electronically controlled so that the latch mechanisms may be released or opened before the first and second movable portions are desired to be moved to the open position. In some embodiments, the latch mechanism may include sliding pins and complementary receiving features.

Figure 7:
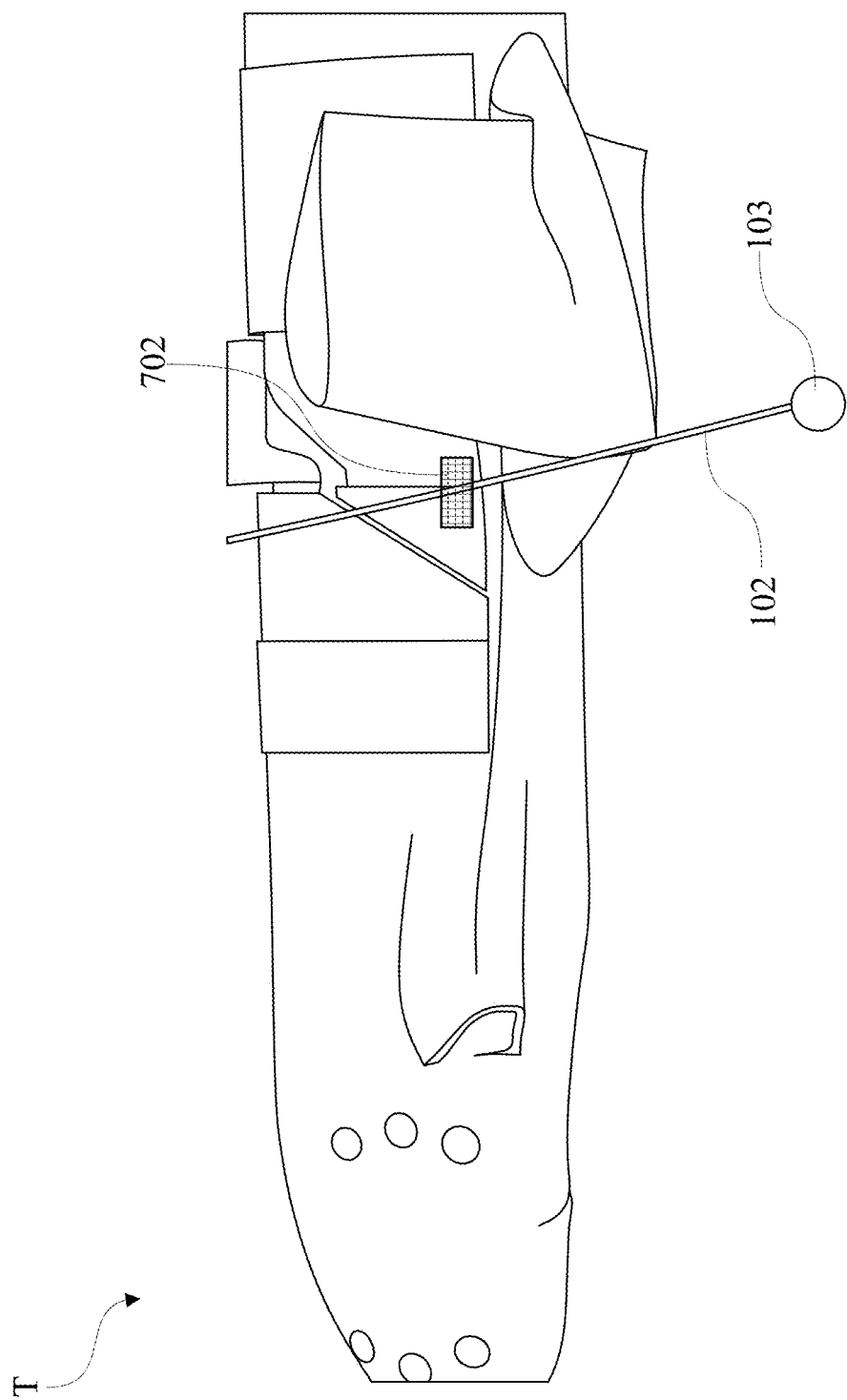
FIG. 7 is a view that shows the placement of an arrival sensor according to some embodiments.

In any embodiments disclosed herein, though not required, the capture mechanism and or the target aircraft can include a sensor (e.g., an inductive sensor) that can detect arrival of the towline and/or the fitting. The sensor (e.g., an inductive sensor) can be configured to detect ferrous and/or non-ferrous metals and can use this sensing technology to determine when the towline and/or end fitting are near (e.g., within a predetermined distance of) the sensor. Ferrous and/or non-ferrous metals can be present in the towline, the fitting, or both. FIG. 7 shows an example of a target aircraft T illustrating one possible location of a sensor 702 (e.g., an inductive arrival sensor). For example, the inductive arrival sensor can be disposed at or near a wing root of the target aircraft T, although it will be appreciated that other placements are possible. In some embodiments, an inductive sensor can have a maximum sensing range of 10 millimeters (mm) or about 10 mm, 15 mm or about 15 mm, 20 mm or about 20 mm, 25 mm or about 25 mm, 30 mm or about 30 mm, 40 mm or about 40 mm, 50 mm or about 50 mm, 100 mm or about 100 mm, or any number between these numbers, or more or less depending upon the specific sensor and its placement.

In any embodiments disclosed herein, though not required, the capture mechanism can be configured to couple with the fitting or couple with the towline so that the towline extends from the target aircraft T at an approximately lateral center of the target aircraft so that the force exerted on the target aircraft by the towline as the towline is being reeled in is approximately at a lateral center of the target aircraft. In some embodiments, the capture mechanism may be configured to bias the fitting or the towline so that the towline extends from the target aircraft T at an approximately lateral center of the target aircraft so that the force exerted on the target aircraft by the towline as the towline is being reeled in is approximately at a lateral center of the target aircraft. In other embodiments, the capture mechanism may be configured to bias the fitting or the towline so that the towline extends from the target aircraft T offset from the lateral center of the target aircraft. In these embodiments, the target aircraft may be configured to counteract any off-center force applied to the target aircraft T by the towline as the towline is being reeled in toward the host aircraft. In some embodiments, the towline can extend from the center of gravity or the approximate center of gravity of the target aircraft T. In some embodiments, the towline can extend from a distance forward of the center of gravity of the target aircraft T, for example from 1 inch or about 1 inch to 10 inches or about 10 inches, or more or less depending upon characteristics of the target aircraft (e.g., size, mass distribution, and so forth).

In any embodiments of the systems for recovering a target aircraft disclosed herein, including without limitation the embodiments of the systems 90, 190, 290, 390, and 490, the towline may be a simple, uniform towline and may include a fitting (such as, without limitation, fitting 103, 203, 303, 403, 503) positioned along a length thereof. The towline of any embodiment herein may have a width between 0.1 to 1.0 inch (in), or between 0.125 to 0.75 in, or between 0.125 to 0.625 in, or between 0.25 to 0.5 in. The towline maybe steel, stainless steel, improved plow steel, aluminum, synthetic such as nylon, aramid, dyneema, or any other material suitable for extended outdoor use in moderately harsh environments. The towline may have a core that is strand, fiber, or independent wire rope core (IWRC). The towline finish may have a corrosion resistant coating (e.g., zinc, nickel, galvanized steel), or be unfinished. The towline may be uncoated, or coated for abrasion, chemical and/or weather resistance. The towline may have a breaking strength of between 1,000 and 10,000 pound-force (lbf), or between 1,500 and 7,500 lbf, or between 2,000 and 5,000 lbf.

As described above, the fitting of any embodiments of the system for recovering a target aircraft disclosed herein may be configured to provide a stop on the towline, when the fitting engaged with the capture mechanism, to prevent further movement of the towline in at least an upward direction relative to the capture mechanism. Further, at least when the capture mechanism is in a closed position, the fitting may be captured by the capture mechanism and be prevented from moving out of contact with or away from the capture mechanism. In some embodiments, all or a portion of the fitting may be sufficiently rigid so as to remain substantially undeformed or uncollapsed during any recovery operation. For example and without limitation, all or a portion of the fitting may be rigid enough to remain substantially undeformed and uncollapsed when the fitting has been captured by the capture mechanism, when the capture mechanism moves to the second, closed state, and/or when the target aircraft is being reeled in toward the host aircraft during a recovery operation by reeling in the towline that the fitting is coupled with.

In any embodiments, the fitting may have any desirable weight and size, and may have any desired shape. For example and without limitation, in any embodiments, the fitting may have a spherical shape, a conical shape, an oblong shape, or any other desired shape, as further described.

FIGS. 8A-8H illustrate different embodiments of fittings that may be used with or as part of any embodiments of the recovery systems disclosed herein. Any of the fittings shown in FIGS. 8A-8H may be used with any of the various recovery systems described herein. Further, any features of one of the fittings may be applied to any of the other fittings.

Figure 8A:
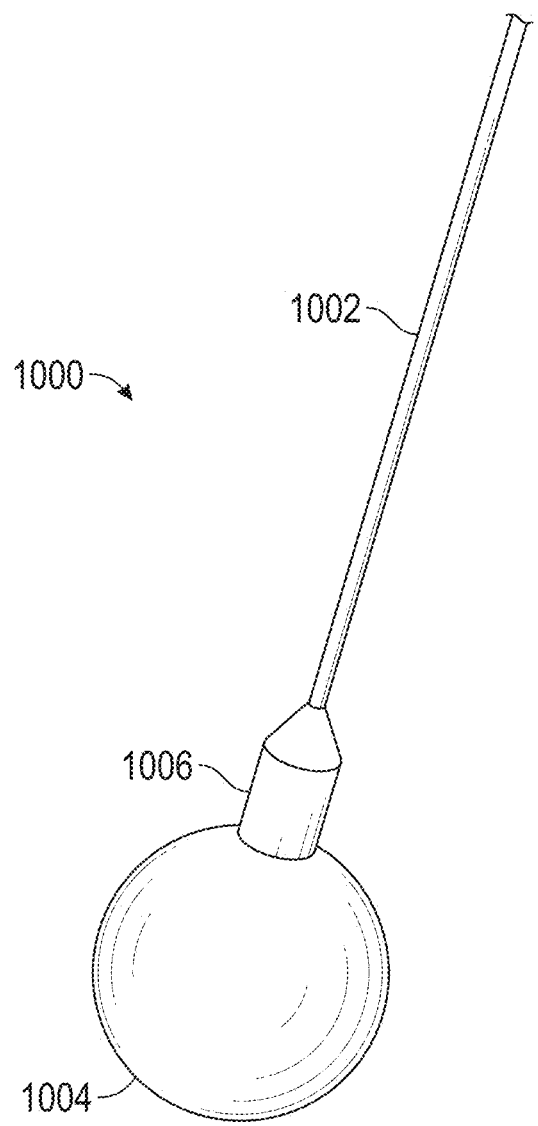
FIGS. 8A-8H are various views of various embodiments of end fittings that may be attached to a towline for any of the recovery systems described herein.

FIG. 8A shows an embodiment of a fitting 1000 coupled with or attached to a towline 1002. The fitting 1000 may have a distal portion 1004 (also referred to herein as a body portion) that may be spherical and a proximal portion 1006 (also referred to herein as a leading portion) that may be generally cylindrical. The distal portion 1004 may be solid, hollow, thin walled, or combinations thereof. The proximal portion 1006 may be coupled with the distal portion 1004 or may be integrally formed. A proximal end of the proximal portion 1006 may be pointed or tapered. The proximal portion 1006 may extend through the opening formed by the flaps of the capture mechanism. The distal portion 1004 may be too large to fit through the opening, such that the flaps contact and engage the distal portion to move the fitting 1000 into the recess of the fuselage when the flaps move from the deployed position to the closed position.

A diameter or size of the proximal portion 1006 may be less than a maximum diameter or size of the distal portion 1004, such as, without limitation, at a distal end of the distal portion 1004. In some embodiments, the diameter or size of the proximal portion 1006 may be 10%, less than 10%, or approximately 10% of a size or diameter of the distal portion, or from 10% to 40% or approximately 40% of a maximum size or diameter of the distal portion 1004. In some embodiments, the spherical portion of the fitting 1000 may have a width, e.g., diameter, from 1 to 10 inches (in), from 2 to 8 in, from 3 to 7 in, from 4 to 6 in, or about 5 in. The fitting 1000 may weigh from 1 to 20 pounds (lbs), from 1 to 15 lbs, from 2 to 10 lbs, or from 4 to 8 lbs. These width and weight features may apply to any of the embodiments of the fittings described herein.

In some embodiments, a maximum diameter or size of the distal portion 1004 of the fitting 1000 may be many times greater than a diameter of the towline 1002, for example and without limitation, at least fifty times greater than a diameter of the towline, or from twenty times greater to eighty times greater than a diameter of the towline, or from thirty times greater to sixty times greater than a diameter of the towline.

Figure 8B:
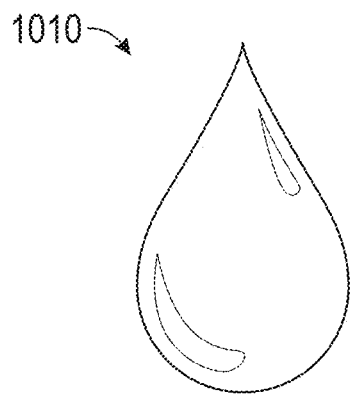

FIG. 8B is a side view of another embodiment of a fitting 1010 having a tear-drop shape. The fitting 1010 may increase in width from a top to a bottom portion and then decrease in width. The contour may be smooth, with a conical upper portion and spherical lower portion. The conical upper portion may extend through the opening of the flaps and the width of the bottom portion may prevent the fitting from traversing the opening completely.

Figure 8C:
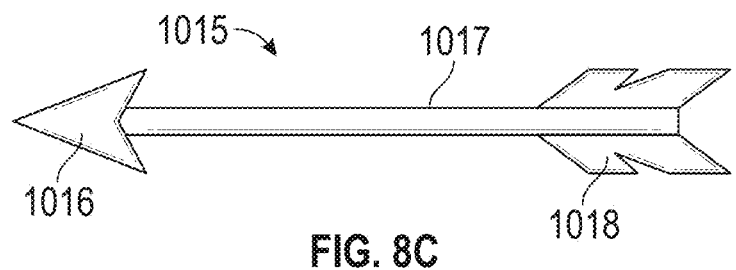

FIG. 8C is a side of another embodiment of a fitting 1015 having an arrow shape. The fitting 1015 may have a forward angular portion 1016 attached via an elongated member 1017 to an aft feathered portion 1018. The angular portion 1016 may form a vertex pointing forward and increase in width in the aft direction. The angular portion 1016 may be planar or three-dimensional, e.g., a conical shape. The feathered portion 1018 may have various protrusions extending outward and aft, and may be planar or three-dimensional. In use, the towline may attach along the member 1017, with the towline extending through the opening of the flaps, and the fitting 1015 engaging with the underside of the flaps.

Figure 8D:
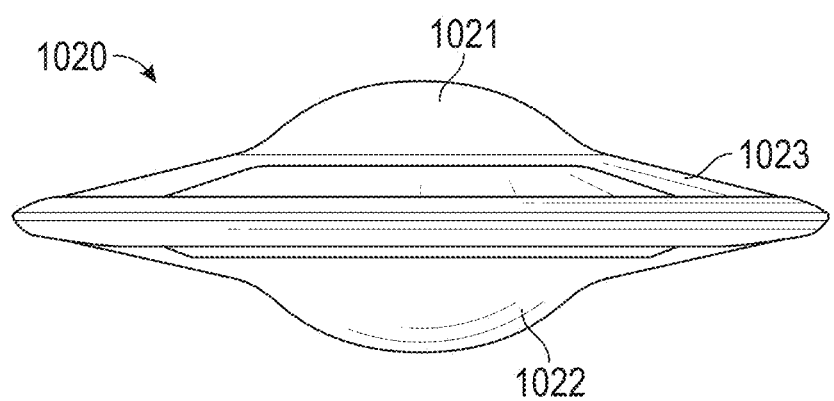

FIG. 8D is a side view of another embodiment of a fitting 1020 having a flying saucer shape. The fitting 1020 may have upper and lower portions 1021, 1022 that have contours (e.g., spherical contours) bulging upward and downward from a ring-like middle portion 1023. The middle portion 1023 may extend radially farther than the upper and lower portions 1021, 1022. The upper and lower portions 1021, 1022 may be symmetric about the middle portion 1023.

Figure 8E:
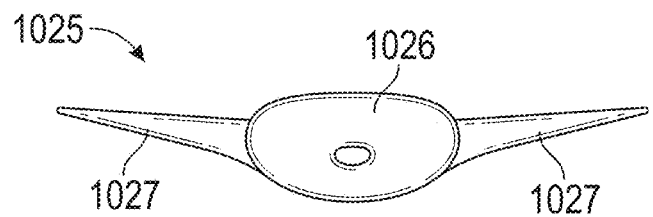
Figure 8F:
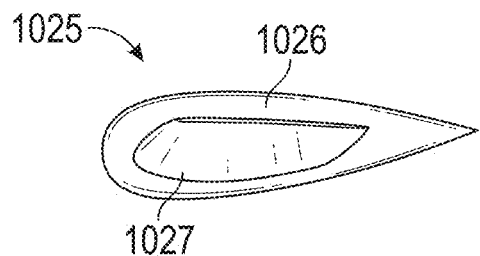

FIGS. 8E and 8F are front and side views respectively of a fitting 1025 having a blended-wing body shape with dihedral wings 1027 attached on both sides of a center portion 1026. The wings 1027 may extend upward from the center portion 1026. The center portion 1026 may have an airfoil profile, for example a rounded, blunt forward end that tapers to a point or reduced height at an aft end, as shown in FIG. 8F. In use, the towline may extend through the opening of the flaps, with the wings 1027 preventing the fitting 1025 from completely traversing the opening.

Figure 8G:
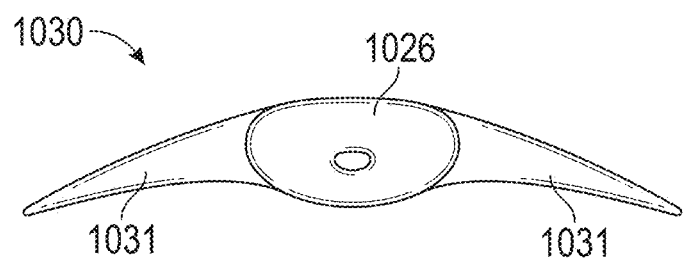
Figure 8H:
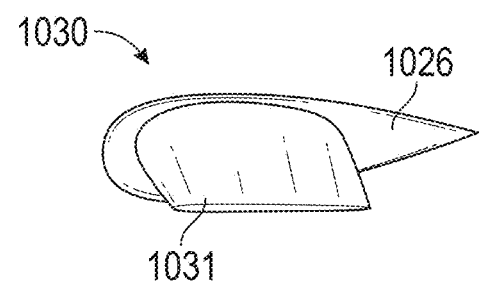

FIGS. 8G and 8H are front and side views respectively of a fitting 1030 having a blended-wing body shape with anhedral wings 1027 attached on both sides of the center portion 1026. The wings 1027 may extend downward from the center portion 1026. In use, the towline may extend through the opening of the flaps, with the wings 1031 preventing the fitting 1030 from completely traversing the opening.

Figure 9A:
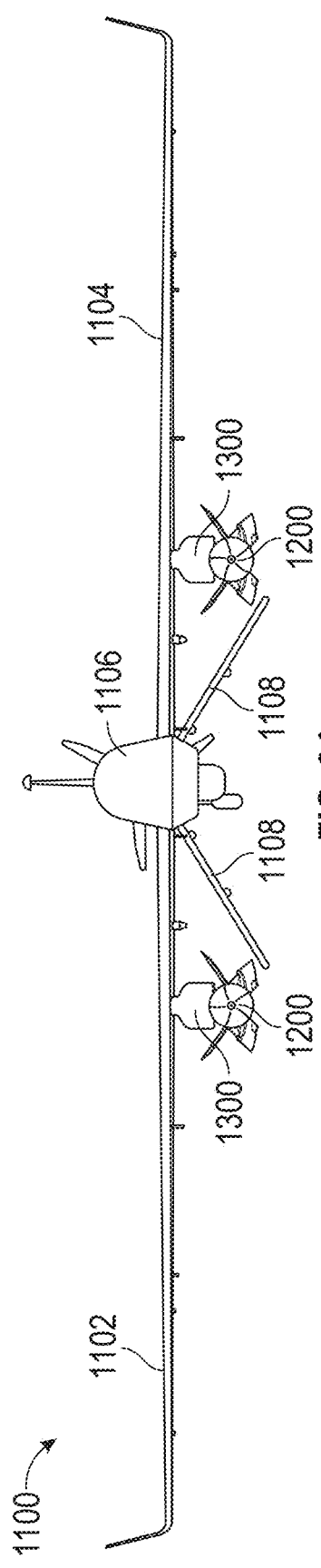
FIGS. 9A-9C are front, perspective, and top views respectively of a host aircraft in flight having multiple target aircrafts secured to the host aircraft wings via hoist systems.
Figure 9C:
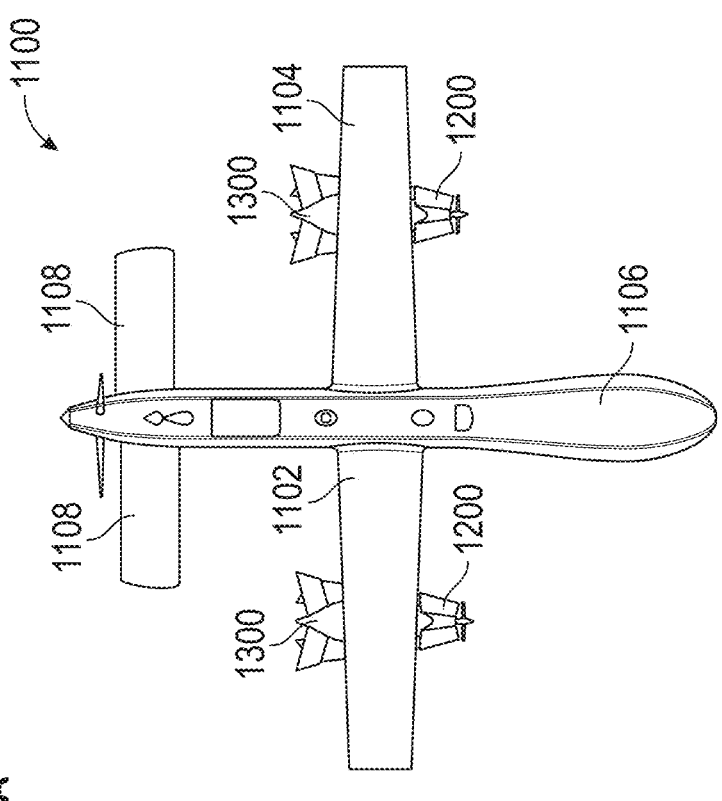
Figure 9B:
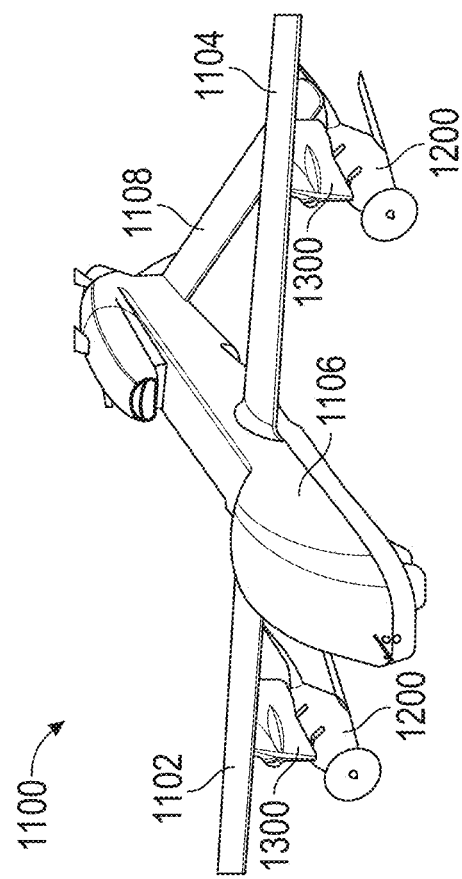

FIGS. 9A-9C are front, perspective, and top views respectively of a host aircraft 1100 in flight having multiple target aircrafts 1200 secured via hoist systems 1300 (also referred to herein as pods or pylons). The aircraft 1100 includes a right wing 1102, a left wing 1104, a central fuselage 1106, and an inverted-V tail 1108. The host aircraft 1100 may be unmanned, and it may be autonomously flown or remote controlled by a human operator. Other types and configurations of the aircraft 1100 may be used, and this is merely one example embodiment.

The hoist systems 1300 are attached to an underside of a respective wing 1102, 1104. The hoist system 1300 may have some or all of the same or similar features and/or functions as the hoist 110 described with respect to FIG. 1, and vice versa. There may be fewer than or greater than one hoist system 1300 per wing. There may be zero, one, two, three, four, five, six or more hoist systems 1300 per wing. The hoist system 1300 in flight may deploy one or more towlines to capture a respective target aircraft 1200, reel in the respective target aircraft 1200 toward the host aircraft 1100 by reeling in the respective towline, and secure the respective target aircraft 1200 to a respective hoist system 1300, as further described herein.

Figure 10B:
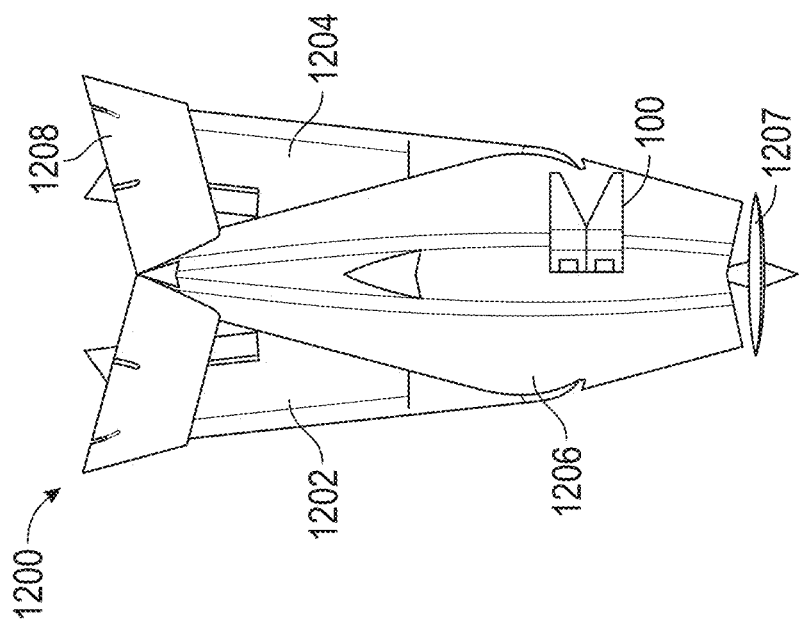
Figure 10A:
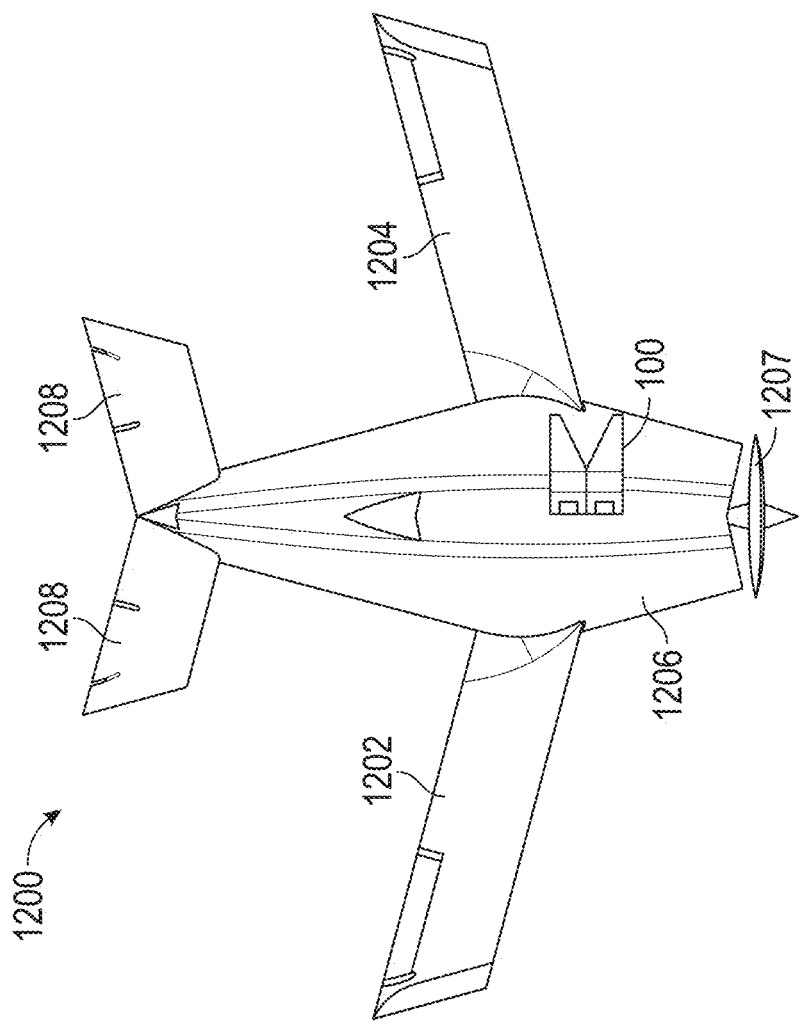

FIGS. 10A and 10B are top views of the target aircraft 1200 shown with the wings 1202, 1204 deployed and stowed, respectively. FIGS. 10C and 10D are front views of the target aircraft 1200 showing the wings 1202, 1204 deployed and stowed, respectively. The 1202, 1204 are rotatably attached to a center fuselage 1206 and may move from a deployed configuration having a larger width for horizontal flight to a stowed configuration having a smaller width for recovery by the host aircraft and hoist system. The target aircraft 1200 has a propeller 1207 shown schematically. The target aircraft 1200 may be propeller driven, or it may have a turbofan, turbojet, or other type engine.

FIG. 11 is a perspective view of the host aircraft 1100 recovering the target aircraft 1200 in flight via the towline 102 extending from the hoist system 1300. The hoist system 1300 includes a pylon 1310 attached to an underside of the left wing 1104. The other hoist systems 1300 are removed for clarity, but other hoist systems on either wing may be included. The pylon 1310 is a supporting structure made of metal, composite, or combinations thereof, that supports and protects the various components of the hoist system 1300, as further described.

FIGS. 12A-12C are perspective, side, and front views respectively of the hoist system 1300 securing the target aircraft 1200 to the wing 1104. The wing 1104 is removed in FIG. 12A for clarity. The hoist system 1300 may be located to avoid interference with the wing flap 1105 and wing flap hinge 1109. A clearance 1107 may exist between the pylon 1310 and the lowered flap 1105, as shown most clearly in FIG. 12B. The side of the pylon 1310 may avoid interference with the wing flap hinge 1109, as shown in FIG. 12C.

The hoist system 1300 includes forward and aft sway bars 1312, 1314 that extend outward and downward from a bottom end of the pylon 1310. The sway bars 1312 surround an upper portion of the fuselage target aircraft 1200 for lateral stability of the target aircraft 1200 and for ensuring alignment of the target aircraft 1200 during the last phase of reeling in the target aircraft 1200. In some embodiments, the sway bars 1312, 1314 may guide the target aircraft 1200 with stowed wings into position so that a securement mechanism, as further described, may engage with the target aircraft 1200. The pylon 1310 and sway bars 1312, 1314 are further shown in, and described with respect to, FIGS. 13A-13D.

In FIGS. 12A-12C, the pylon 1310 is shown transparently for clarity purposes, to show components of the hoist system 1300 therein. The hoist system 1300 may include a motorized winch 1400. The winch 1400 may be located in an aft section of the pylon 1310 relative to other components of the hoist system 1300. The hoist system 1300 may include a latching system 1500 located forward of the winch 1400. The towline 102 may extend from the winch 1400 to the latching system 1500 and to the target aircraft 1200. The latching system 1500 may guide the towline 102 along a path. There may be a fleet pulley assembly 1510 through the towline 102 extends, a top sheave 1520 along which the towline 102 wraps around down through a latch housing 1530 located beneath the top sheave 1520. Further details of the winch 1400 and latching system 1500 are described herein with respect to FIGS. 14A-15. The target aircraft 1200 may be secured with the hoist system 1300 with the center of gravity CG of the target aircraft 1200 located toward a forward portion of the pylon 1310, as shown. The latch housing 1530 or other engaging features of the hoist system 1300, as described herein, may be located generally above and in line with the center of gravity CG of the target aircraft 1200.

Figure 13A:
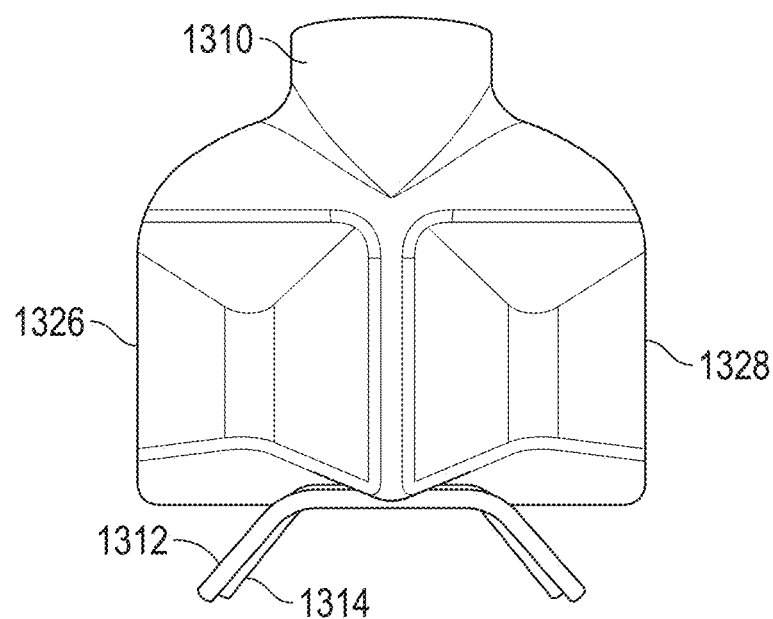
FIGS. 13A-13D are various views of a pylon of the hoist systems of FIGS. 9A-9C.
Figure 13B:
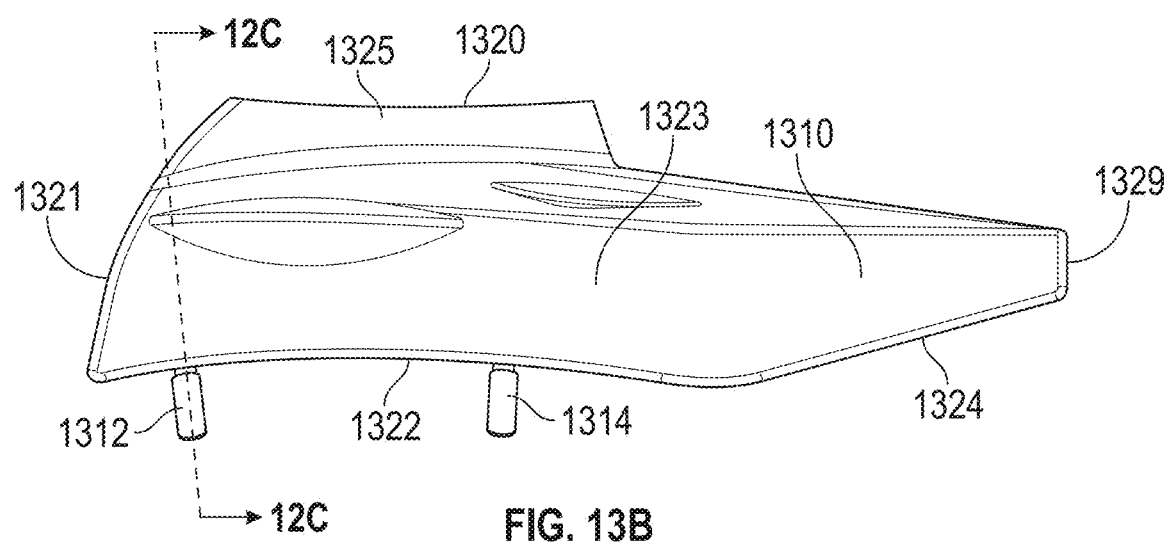
Figure 13C:
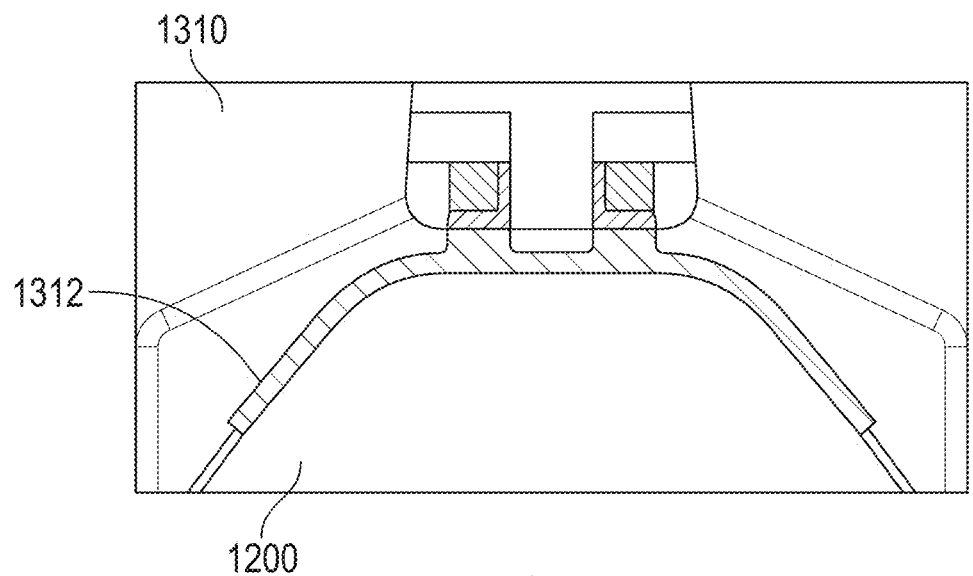
Figure 13D:
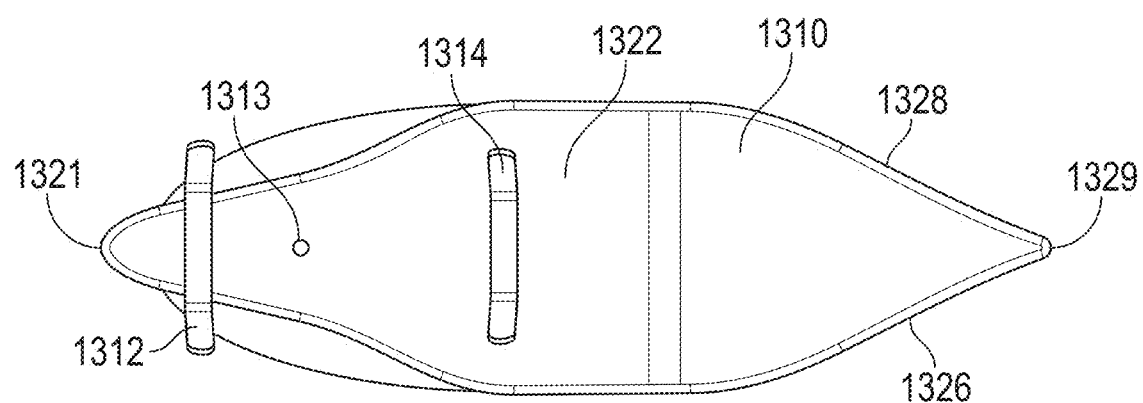

FIGS. 13A-13D are front, side, cross-section, and bottom views of the pylon 1310. FIG. 13C is a cross-section, taken from FIG. 13B along the line 12C-12C, and includes a cross-sectional part of the target aircraft 1200 for illustration. The shape, size, configuration, etc., of the pylon 1310 is merely one example embodiment, and other variations of the pylon may be incorporated.

The pylon 1310 extends from a forward end 1321 to an aft end 1329, each end having tapering profiles for aerodynamic efficiency. Opposing lateral sidewalls 1326, 1328 may increase in width from the forward end 1321 in the aft direction to a central portion 1323, and then decrease in width from the central portion 1323 to the aft end 1329. The sidewalls 1328 may have a maximum width at the central portion 1323, which width may be sized based on size of the hoist system 1300 components therein, based on the width of the stowed target aircraft 1200, and/or based on the configuration of the host aircraft wing 1104 and associated features of the host aircraft 1100. The pylon 1310 may have a length of between and 200 inches (in), between 45 and 90 in, between 55 and 80 in, or between 65 and 70 in. The pylon 1310 may have a width of between 5 and 100 in, between 10 and 50 in, or between and 25 in. The pylon 1310 may have a height of between 5 and 100 in, between 10 and 50 in, or between 15 and 25 in.

The pylon 1310 may include an upper attachment portion 1325 for attaching the pylon 1310 to the wing. The upper attachment portion 1325 may have a smaller width than that between the sidewalls 1326, 1328. There may be an upper side 1320 having a contour that matches that of the underside of the wing. The upper side 1320 may be an upper surface of A gap may exist between the upper side 1320 and the lower side of the wing, or there may not be a gap. The pylon 1310 may include a lower side 1322 having a contour that matches an upper portion of the fuselage of the target aircraft 1200. A gap may or may not exist between the fuselage and the lower side 1322.

The sway bars 1312, 1314 may be located on the lower side 1322 at forward portions of the pylon 1310 as shown, or in other locations. The forward sway bar 1312 may be located at or near a lower portion of the forward edge 1321. The aft sway bar 1314 may be located at or near the central portion 1323 of the pylon 1310. An opening 1313 in the lower side 1322 of the pylon 1310 may be located in between the sway bars 1312, 1314. The towline may extend from the latching system 1550 through the opening 1313 and out to the target aircraft 1200.

As shown in FIG. 13C, the sway bar 1312 may match the contour of the target aircraft 1200 fuselage. The sway bar 1312 may extend along the upper and side surfaces of the upper portion of the target aircraft 1200 fuselage after securing the target aircraft 1200 to the hoist system 1300. Similar relationships may exist for the aft sway bar 1314 and a rearward portion of the fuselage of the target aircraft 1200.

Figure 14A:
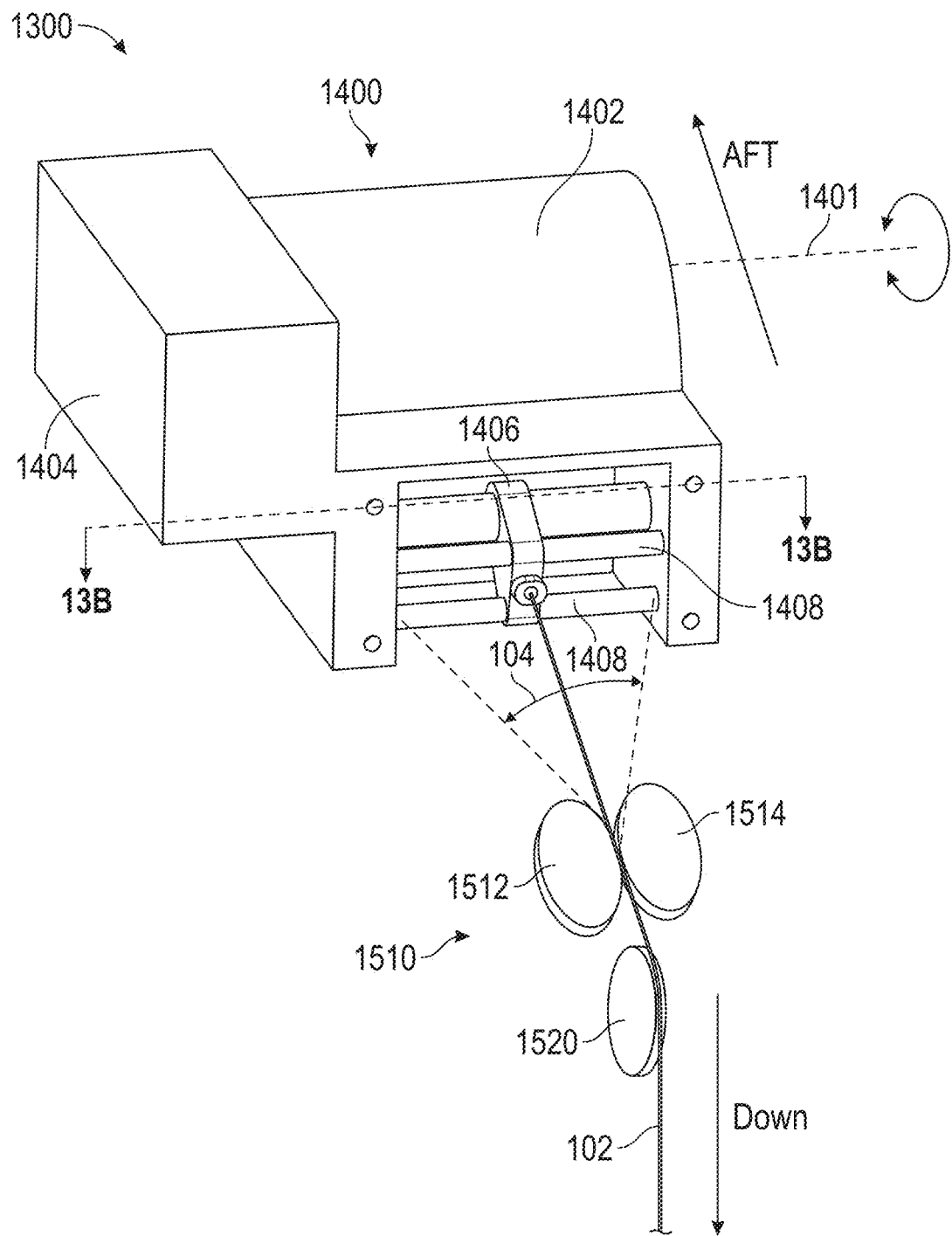
FIGS. 14A and 14B are perspective and cross-section views, respectively, of a motorized winch and pulley/sheave system of the hoist systems of FIGS. 9A-9C.
Figure 14B:
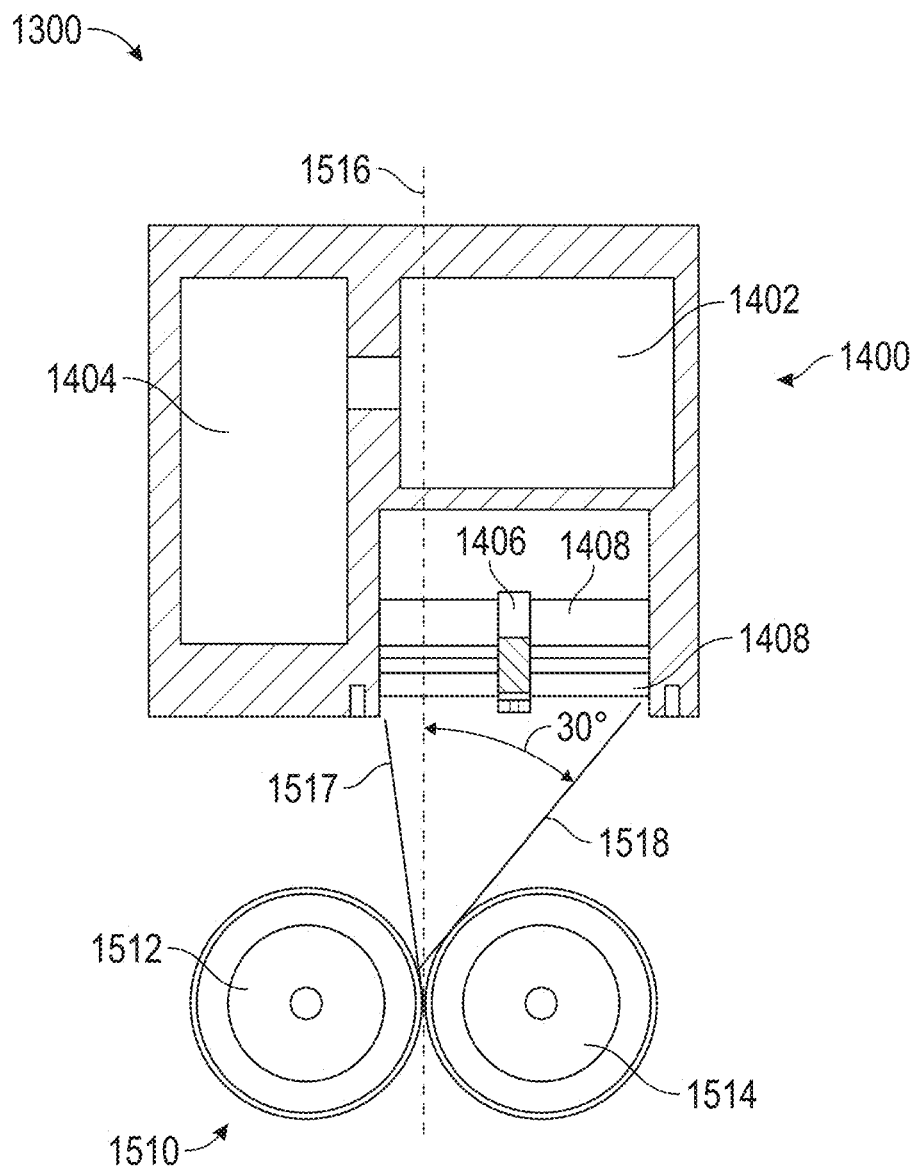

FIG. 14A is a perspective view of a schematic of part of the hoist system 1300, showing the winch 1400, fleet pulley assembly 1510, and top sheave 1520 in isolation from other components. FIG. 14B is a cross-section view taken from FIG. 14A along the line 14B-14B.

The winch 1400 includes a rotating drum 1402 around which the towline 102 is wrapped. The drum 1402 may be cylindrical. A motor 1404 rotates the drum 1402 to control the length of the towline 102 that is paid out from the host aircraft. The motor 1404 may be controlled based on desired length of towline 102, based on speed of paying our or reeling in of the towline 102, based on vertical position of the target aircraft (not shown), etc. According to some embodiments, the winch 1400 can have a width, height, and depth no greater than 18 inches, 12 inches, and 16 inches, respectively.

The towline 102 may extend through a movable cartridge 1406 at a forward portion of the winch 1400. The cartridge 1406 may move axially along one or more axles 1408. The cartridge 1406 may move in response to the relative lateral position of the towline 102 on the drum 1402. As the towline 102 unwraps from the drum 1402 to pay out, the towline 102 may extend from various lateral locations of the drum 1402. "Lateral" refers to a direction that is parallel to the axis of rotation 1401 of the drum 1402, which axis may be perpendicular to a longitudinal axis of the host aircraft fuselage 1106.

The cartridge 1406 may move such that the towline 102 portion located between the fleet pulley assembly 1510 and the drum 1402 may sweep out an angle 104 of at least ten degrees, at least twenty degrees, at least thirty degrees, at least forty degrees, at least fifty degrees, at least sixty degrees, at least seventy degrees, at least eighty degrees, or at least ninety degrees. In some embodiments, the angle 104 is sixty degrees or about sixty degrees. In some embodiments, the angle 104 is not symmetric about the towline 102. As shown in FIG. 14B, the fleet pulley assembly 1510 may be located along a geometric reference line 1516 that is optimized for the pylon 1310 geometry. The line 1516 may be selected for example to allow the towline 102 to be at angle of about thirty degrees on one side but less than thirty degrees on the other side of the line 1516. These are just examples and other configurations and angles may be used.

The fleet pulley assembly 1510 may include a first pulley 1512 and a second pulley 1514 oriented generally horizontally and approximately vertically level with the outlet of the towline 102 at the cartridge 1406. The pulleys 1512, 1514 may be wheels rotatable on a central axis and supported by a support structure within the pylon 1310. The fleet pulley assembly 1510 stabilizes the horizontal or lateral direction of the towline away from the cartridge 1406. The pulleys 1512, 1514 may be positioned forward of the winch 1400 to prevent vertical separation of the towline 102 from the groove formed by the opposing pulleys 1512, 1514. In some embodiments, other guides besides pulleys may be used, such as sheaves, stationary and lubricated rounded surfaces, etc. An aft-most portion of the fleet pulley assembly 1510 may be located greater than 5 inches (in), greater than 6 in, greater than 7 in, greater than 8 in, greater than 9 in, or greater than 10 in forward of a forward-most portion of the winch. The sweep angle of the towline 102 may be with respect to this distance between the winch 1400 and fleet pulley assembly 1510. The centers of rotation of the pulleys

1512, 1514 may be located about 9 to 11 in from a forward-most portion of the winch 1400. Each of the pulleys 1512, 1514, and/or the top sheave as further described, may have a diameter between 2 and 12 in, between 4 and 10 in, between 6 and 8 in, or 7 in.

The top sheave 1520 may be located forward of the fleet pulley assembly 1510. The top sheave 1520 may guide the towline 102 in a downward direction as shown. The top sheave 1520 may be a rotating wheel. In some embodiments, the top sheave 1520 may be a stationary guide surface, or other type guide.

FIG. 15A is a perspective view of an embodiment of the latching system 1500. The latching system 1500 may include fewer or more components than shown. The towline 102 wraps around the top sheave 1520 and extends down to a towline connector 1528. The towline connector 1528 may define a channel through which the towline 102 extends. An upper opening of the towline connector 1528 may be located adjacent and below the top sheave 1520 to minimize the amount of towline 102 extending freely between the top sheave 1520 and the upper opening. The towline 102 may exit a lower opening in the towline connector 1528 to extend to the end fitting 103. In some embodiments, the towline 102 may not extend through the towline connector 1528. For example, the towline 102 may connect with the towline connector 1528, which may connect with or be integral to the end fitting 103, as further described.

In some embodiments, the towline connector 1528 may be used to couple the towline 102 with the end fitting 103. In some embodiments, the towline connector 1528 may be integrally formed with the end fitting 103 or may be separately formed and attached to or otherwise coupled with the end fitting 103.

With reference to FIG. 15B, some embodiments of the towline connector 1528 may have a first proximal portion 1531 and a second distal portion 1533 that is coupled with or integrally formed with the first portion 1531. The first portion 1531 may be tapered at a leading or proximal portion 1531a of the first portion 1531. Additionally, a distal section 1531b of the first portion 1531 of the towline connector 1528 may have a round cross-section, as shown, or can have a square cross-section, polygonal cross-section, or have any other suitably shaped cross-section. The second portion 1533 of the towline connector 1528 can have a round cross-section, as shown, or can have a square cross-section, polygonal cross-section, or have any other suitably shaped cross-section. The second portion 1533 can have a cross-sectional size or diameter that is smaller than a cross-sectional size or diameter of the first portion 1531 such that the towline connector 1528 has a shoulder or ledge 1535 that can engage with a latch assembly 1540, as will be described in greater detail below. The first and second portions 1531, 1533 of the towline connector 1528 can be coaxially aligned along a longitudinal axis of the first and second portions 1531, 1533. The towline connector 1528 may move up and down (or proximally and distally) along with the towline 102 in order to secure with the target aircraft 1200.

In some embodiments, the towline connector 1528 may include a tube with an opening or pin at the lower end thereof configured to secure with a corresponding structure of the target aircraft 1200, e.g., to secure with the capture mechanism 100. In some embodiments, the towline connector may be guided by a bottom sheave (not shown) located below the top sheave 1520 and adjacent to the towline connector 1528. The towline connector 1528 may be guided by the bottom sheave, for example a rotating wheel thereof.

In some embodiments, the towline connector 1528 may be guided by a stationary guide or other component.

The latching system 1500 may include a latch housing 1530. The towline connector 1528 may be located partially inside the latch housing 1530. The latch housing 1530 may vertically secure the towline connector 1528, for example by inserting one or more pins or bars through and/or around the adapter. For example, the latch assembly 1540 may be actuated (e.g., advanced and reeled in in a horizontally axially direction as oriented) to engage and disengage with the towline connector 1528 to vertically secure the towline connector 1528 in place. For example and without limitation, the latch housing 1530 may include the latch assembly 1540 that may move between a first, latched position (as shown in FIG. 15A) wherein the latch assembly 1540 is engaged with the towline connector 1528 so as to prevent any outfeed (e.g. movement vertically downward away from the latching system 1500) of the towline 102 and a second, unlatched position (not shown) wherein the latch assembly 1540 is axially withdrawn (e.g. leftward as oriented in the figure) and is disengaged from the towline connector 1528 so that the towline 102 can be fed out (e.g. move vertically downward away from the latching system 1500). The latch assembly 1540 may move within a channel or passageway within the latch housing 1530. In some embodiments, the latch assembly 1540 or a pin thereof may be spring-loaded. A spring may bias the latch assembly 1540 into the locked position as shown. The latch assembly 1540, whether spring-loaded or otherwise, may be actuated in response to receiving the tow connector, which may be automatic, performed by a control system of the latching system, or actuated by a remote operator.

In some embodiments, the latch assembly 1540 may have a main body portion 1541 and a distal portion 1542. The distal portion 1542 may have a recess or opening 1544 formed therein that maybe sized and configured to receive the second portion 1533 of the towline connector 1533 (e.g., may fit around an outside surface of the second portion 1533 of the towline connector 1533). The recess or opening 1544 formed in the distal portion 1542 maybe sized and configured to prevent the first portion 1531 of the towline connector 1533 from sliding therethrough such that, when the latch assembly 1540 is in the first, latched position (as shown in FIG. 15A), the shoulder 1535 of the towline connector 1528 maybe abutted against the distal portion 1542 of the latch assembly 1540. In some embodiments, the distal portion 1542 of the latch assembly 1540 can have an angled or beveled lower surface configured to cause the latch assembly 1340 to axially move or withdraw toward the unlatched position when the towline connector 1528 is reeled in (e.g., withdrawn) and forced into contact with the beveled lower surface of the latch assembly 1540. In this arrangement, the latch assembly 1540 can be caused to automatically move to the unlatched position when the towline connector 1528 is reeled in and forced into contact with the beveled lower surface of the latch assembly 1540. In some embodiments, the latch assembly 1540 may include a pin extending outwardly away from the body 1541 which extends through the towline connector 1528. Therefore, a variety of different latching connections may be implemented.

In some embodiments, the latching system 1500 may include a cutter assembly 1542. The cutter assembly 1542 may be configured to cut the towline 102. The cutter assembly 1542 may include a blade, edge, knife, rotating saw, or other sharp edge to sever the towline 102. The towline 102 may be cut in case of emergency where the target aircraft 1200 must be cut loose from the host aircraft 1100, for instance if the winch 1400 or other mechanism has failed during recovery operations.

Any embodiments of the pod or pods disclosed herein (also referred to herein as hoist systems or pylons), including without limitation hoist system 1300, can have any of the components, features, or other details of any other embodiments of the pods disclosed below or elsewhere herein or illustrated in the figures, and/or be used according to any of the steps of any other method embodiments disclosed below or elsewhere herein or illustrated in the figures, in any combination with any of the components, features, or details of the pods disclosed herein, including without limitation hoist system 1300 or methods of use disclosed herein.

Similarly, any embodiments of the target aircraft T disclosed herein can have any of the components, features, or other details of any other embodiments of the target aircraft described below or elsewhere herein or illustrated in the figures, and/or be used according to any of the steps of any other method embodiments disclosed below or elsewhere herein or illustrated in the figures, in any combination with any of the components, features, or details of the target aircraft disclosed herein or methods of use disclosed herein.

Accordingly, any embodiments of the recovery system embodiments 190, 290, 390, 490 or the capture mechanism thereof including without limitation capture mechanism embodiments 100, 200, 300, 400, 500 can have any of the components, features, or other details of any other embodiments of the recovery systems and/or the capture mechanisms described below or elsewhere herein or illustrated in the figures, and/or be used according to any of the steps of any other method embodiments disclosed below or elsewhere herein or illustrated in the figures, in any combination with any of the components, features, or details of the recovery system embodiments or capture mechanism embodiments, including without limitation the aforementioned recovery system and capture mechanism embodiments.

Some embodiments of the system for recovery and/or deployment of aircraft disclosed herein can be configured to recover, refuel, rearm, resupply, recharge, and/or deploy a target aircraft with a host aircraft. Some embodiments of the system can secure the target aircraft to the host aircraft so that the host aircraft can transport the target aircraft to a mission point of the target aircraft, where the system can be used to launch (e.g., deploy) the target aircraft. The target aircraft can be recovered by the host aircraft at any desired time, including without limitation after the target aircraft has completed its mission. In some embodiments, host aircraft can be configured to service (refuel/recharge/rearm) the target aircraft and launch the target aircraft for another mission without having to return to base. Moreover, in some embodiments of the system, the system can be configured such that a first host aircraft launches a target aircraft and a second host aircraft recovers, refuels, rearms, resupplies, recharges, and/or deploys the target aircraft. Because some embodiments of the system can be used with a wide range of host aircraft, the first and second host aircraft can be different types or models of aircraft in some embodiments of the system and be configured to recover, refuel, rearm, resupply, recharge, and/or deploy any number of target aircraft. Some embodiments of the system can be used to recover a target aircraft from a first orbit and launch the target aircraft in a separate orbit. As used herein, aircraft includes manned and unmanned aircraft.

Pylon

During in flight recovery of target aircraft by a host aircraft, the target aircraft is often guided toward a towline that can be captured by the target aircraft. The towline can be tethered to the host aircraft and can be paid out and reeled in by the host aircraft. The target aircraft can be manned or unmanned and is generally navigated toward the host aircraft and controlled to be on a similar flight path as compared to the host aircraft to bring the target aircraft into a close proximity to the host aircraft. Then, the target aircraft can be navigated more precisely to the towline so that a capture mechanism on the target aircraft can capture the towline.

The capture mechanism on the target aircraft can include clamping mechanisms that are designed to capture and clamp to the towline. An end fitting at the end of the towline can be used to secure the towline to the capture mechanism on the target aircraft. Once the towline is captured, the host aircraft can reel in the towline to reel the target aircraft to the host aircraft. Some embodiments of the target aircraft and/or the methods of recovering the target aircraft disclosed herein can be configured such that the target aircraft will change into a passive, stable towed body (e.g., by folding wings or deploying spoilers, eliminating thrust by stopping engines, motors, rockets, etc.) once the towline is secured to the capture mechanism or at any desired time. This can be done remotely, automatically, or otherwise.

The host aircraft can have what is referred to as a pylon or a pod (these terms are meant to be interchangeable) that is supported by the host aircraft on an underside of the host aircraft. In some embodiments, the pylon can be supported on the underside of a host aircraft, for example on the underside of a wing of the host aircraft. In some embodiments, the pylon can be attached at a hard point of a wing of the host aircraft, for example at an inboard station, at a mid-station, and/or at an outboard station. In some embodiments, the inboard station may not be suitable due to potential interference with a landing gear of the host aircraft. In some embodiments, the outboard station may not be suitable because, for example, the total weight of the pylon and a target aircraft may exceed the weight limit of the outboard station. In some embodiments, the pylon may be designed or modified to accommodate placement on a hard point of the wing by, for example, reducing a height of the pylon, reducing a weight of the pylon, and so forth. For example, a maximum load on a wing at an outboard station can be less than a maximum load at a mid-point station or an inboard station, and thus a lighter pylon may be desired when placing the pylon at an outboard station. Any embodiments of the pylon disclosed herein may be designed with a relatively short height to prevent or reduce the likelihood of the target aircraft making contact with the ground during takeoff and/or landing operations.

In some embodiments, the longitudinal placement of the pylon (e.g., how far forward or aft the pylon is placed) can vary. In some embodiments, attachment points between the pylon and the target aircraft, as described in more detail herein, can be positioned more forward or aft. In some embodiments, attachment points on the pylon for the target aircraft can vary. The positioning of the target aircraft relative to the host aircraft can depend on, for example, the target aircraft and/or the host aircraft. For example, it can be important to position the target aircraft relative to the host aircraft such that the target aircraft, when captured, does not interfere with control surfaces of the wings of the host aircraft.

As mentioned above, the total weight of a recovery pylon and target aircraft can be limited by the maximum load of the wing of the host aircraft. In some embodiments, a target aircraft can make up a substantial portion of the total weight of the recovery pylon and target aircraft. For example, a General Atomics Eaglet aircraft can have a weight of about 250 pounds, and a General Atomics MQ-9 Predator B aircraft can have a weight of about 600 pounds.

The pylon can be designed to have a reel in a housing of the pylon that can reel the towline out and in. The pylon can have a shock system to protect the pylon and the target aircraft from excessive forces during engagement of the target aircraft with the pylon, as described below. The pylon can also have sway bars to help constrain the target aircraft and/or to guide the target aircraft into position. The pylon can also have a latch system designed to engage lugs coupled with the target aircraft to secure the target aircraft to the pylon.

In some embodiments, the pylon can be configured to release or eject the target aircraft during flight. The pylon can have one or more ejectors meant to rapidly move the target aircraft away from the pylon when the target aircraft is released from the pylon.

As mentioned, the pylon can have a reel/hoist system to be able to pay out and reel in the towline and to hold the towline secure once the target aircraft is engaged with the pylon. The reel/hoist system can have components that are similar to hoist systems used in rescue operations, or any other suitable reel/hoist system, including custom reel/hoist systems.

So that the target aircraft can be released from the pylon, the pylon can be configured to completely reel in the towline, including the end fitting, from the capture mechanism of the target aircraft.

Any features of the embodiments of the host aircraft, the pylon, the target aircraft, including without limitation, the capture mechanism of the target aircraft described above can be used in any combination with any of the other embodiments of the host aircraft, the pylon, the target aircraft, and/or the capture mechanism of the target aircraft disclosed below.

Figure 16:
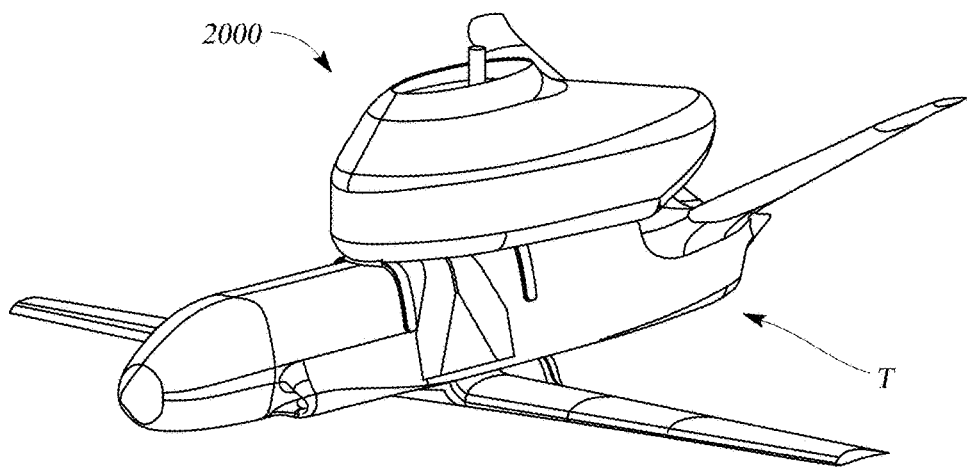
FIG. 16 is a perspective view of an embodiment of a pylon and an example target aircraft engaged with the pylon.
Figure 17:
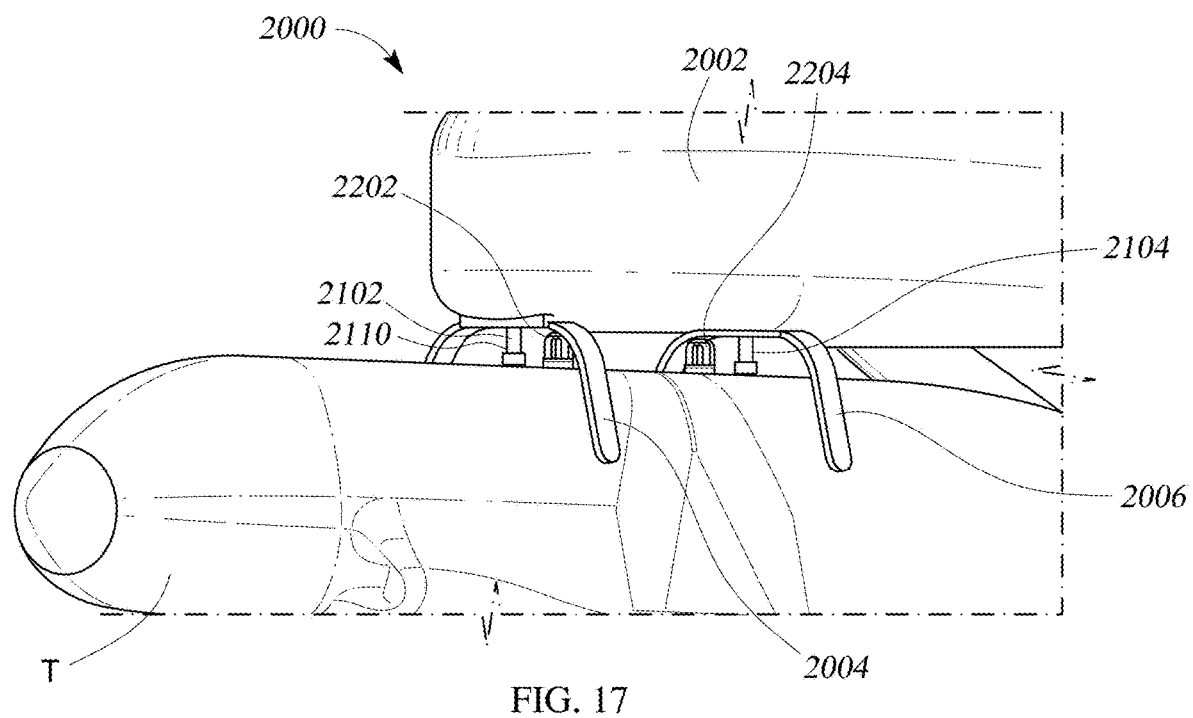
FIG. 17 is a perspective view of a portion of the embodiment of the pylon shown in FIG. 16.
Figure 18:
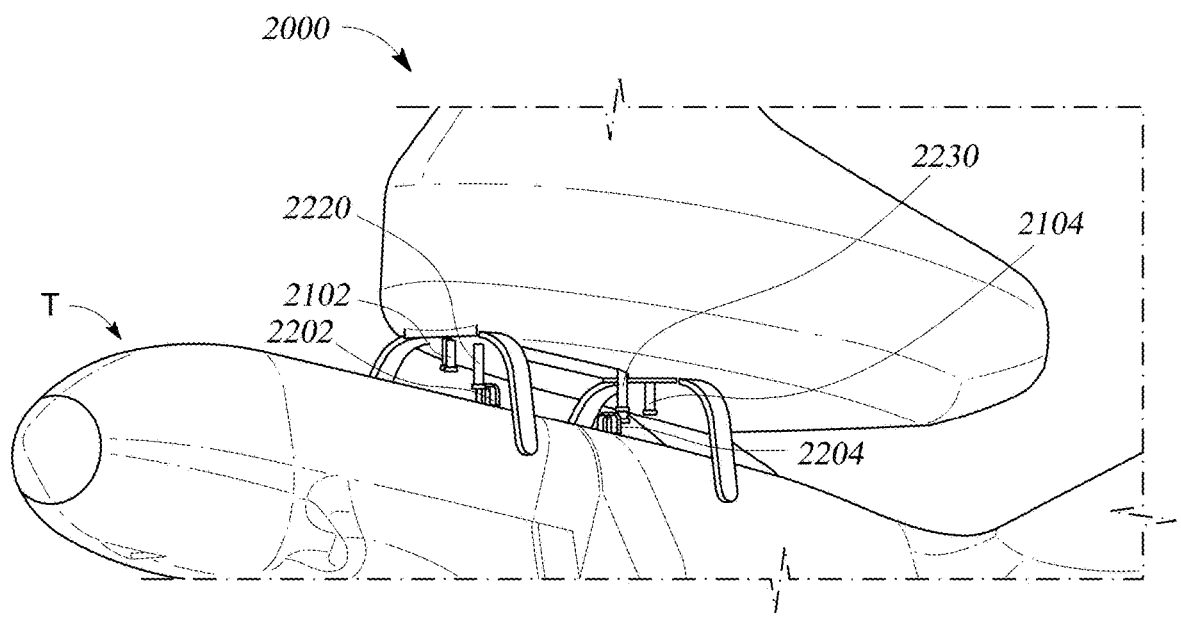
FIG. 18 is another perspective view of a portion of the embodiment of the pylon shown in FIG. 16.

FIG. 16 is a perspective view of an embodiment of a pylon 2000, showing a target aircraft T in proximity to the pylon 2000. FIGS. 17 and 18 are additional perspective views of the embodiment of the pylon 2000, showing a target aircraft T in proximity to the pylon 2000. In any embodiments disclosed herein, any components, features, or other details of the pylon 2000 can have any of the components, features, or other details of any other pylon embodiments disclosed herein or be used according to any of the steps of any other method embodiments disclosed herein, including without limitation any of the embodiments of the pylon 1310 or methods of use thereof described herein, in any combination with any of the components, features, or details of the system 2000 or methods of use disclosed herein. Similarly, any components, features, steps, or other details of any of the other pylon or method embodiments disclosed herein can have any of the components, features, steps, or other details of any embodiments of the pylon 2000 or methods of use thereof disclosed herein in any combination with any of the components, features, or details of the pylon. The pylon 2000 is shown separated from the host aircraft for clarity reasons. The pylon 2000 may be attached to the underside of the wing of the host aircraft H or to other portions of a host aircraft.

In some embodiments, the pylon 2000 can have a housing 2002 that can be coupled with a host aircraft, for example and without limitation, to an underside surface of a wing or a fuselage of a host aircraft. In some embodiments, two or more, or three or more pylons 2000 can be coupled with a host aircraft, under the wings and/or fuselage of the host aircraft. In some embodiments, the pylon 2000 can have a first sway bar 2004 and/or a second sway bar 2006 (also referred to herein as aft sway bars). The target aircraft T may be stabilized by the first and second sway bars 2004, 2006, and the sway bars 2004, 2006 can have any of the features or details of the aft sway bars 1312 and 1314 disclosed above.

Shocks

Some embodiments of the pylon 2000 can have a first shock 2102 and/or a second shock 2014. The shocks 2102, 2014 can be configured to dampen the impact to the pylon from the target aircraft T as the target aircraft and or towline is reeled into proximity to or engagement with the pylon. The shocks can include hydraulic type shock absorbers, oil filled shock absorbers, air filled shock absorbers, coil spring type shock absorbers, elastomeric shock absorbers, friction type shock absorbers, or any other suitable type of shock absorber.

In some embodiments, each of the shocks can have a plunger portion 2110 that extends away from the bottom surface of the housing 2002. The plunger portion 2110 can have a rubber end or bumper that can contact an upper surface of the target aircraft when the target aircraft is brought within a particular proximity or distance to the pylon, for example and without limitation, within 3 inches or approximately 3 inches, or within 2 inches, approximately 2 inches, or less than 2 inches to 4 inches, approximately 4 inches, or more than 4 inches from a bottom surface of the housing 2002 of the pylon, or within 2 inches, approximately 2 inches, or less than 2 inches to 3 inches, approximately 3 inches, or more than 3 inches from a bottom surface of the housing 2002 of the pylon, or any distance or approximate distance or range of distances in any of the foregoing ranges.

In some embodiments, the range of travel of any of the shocks can be 2 inches, approximately 2 inches, or less than 2 inches, or from 1 inch or approximately 1 inch to 3 inches, approximately 3 inches, or more than 3 inches, or any distance or approximate distance or range of distances in the foregoing range.

Figure 19:
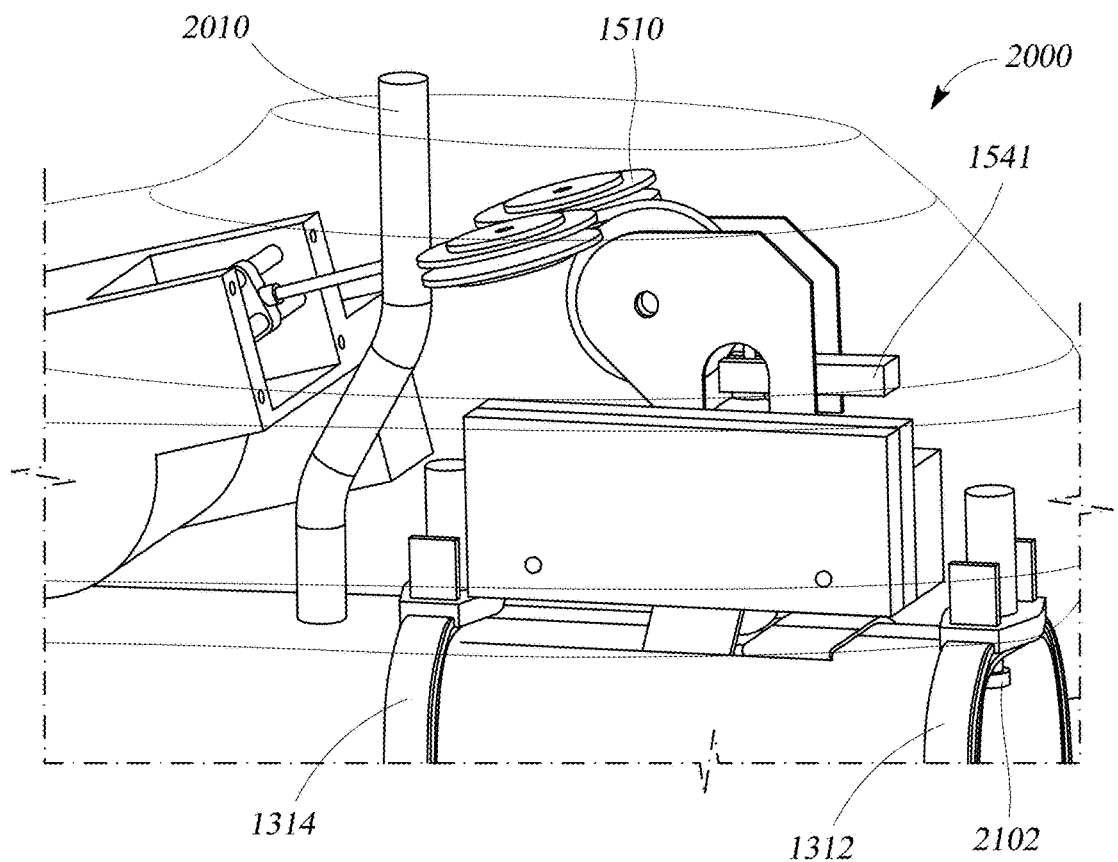
FIGS. 19 and 20 are perspective views of a portion of the embodiment of the pylon shown in FIG. 16, with the housing shown transparently for clarity purposes.
Figure 20:
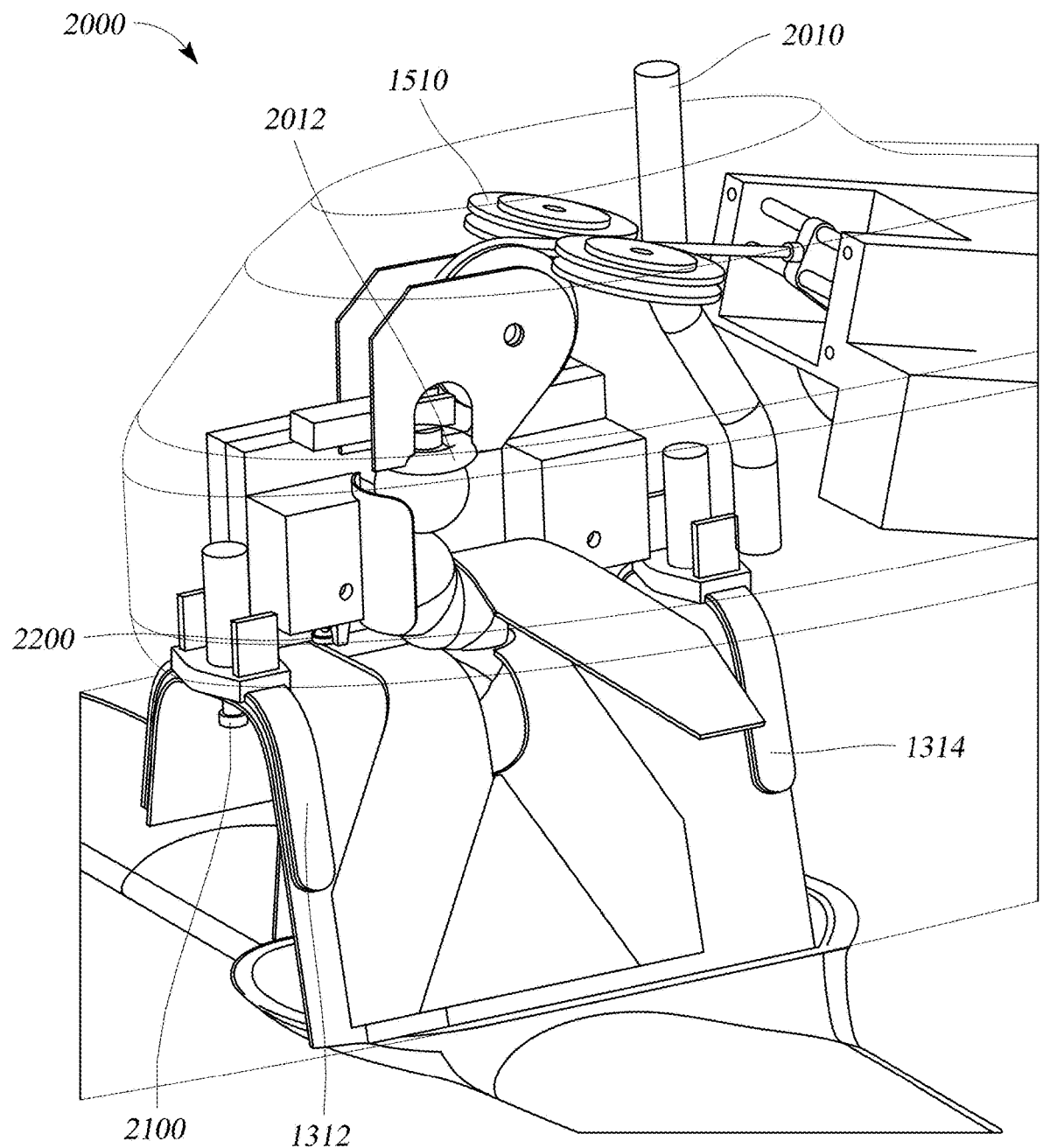
Figure 21:
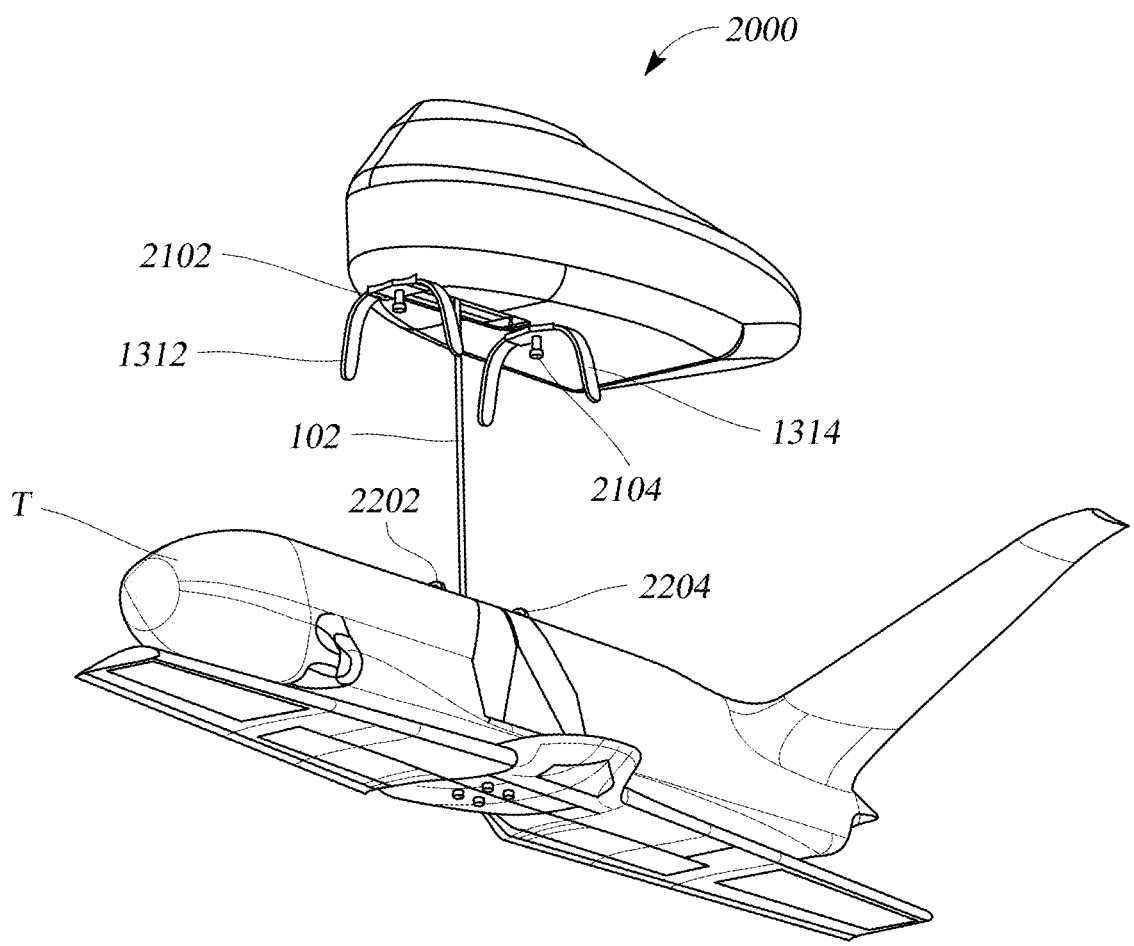
FIG. 21 is a perspective view of the embodiment of the pylon shown in FIG. 16, showing the target aircraft spaced apart from the pylon and coupled with a towline of the pylon.

FIGS. 19 and 20 are perspective views of a portion of an embodiment of a pylon. In FIGS. 21, a target aircraft T coming into proximity with the pylon 2000. In some embodiments, a first shock 2102 may come into contact with the upper surface of the fuselage of the target aircraft when the target aircraft T reaches a predetermined proximity with respect to the pylon 2000 (e.g., within 4 inches or approximately 4 inches, or within 3 inches, approximately 3 inches, or less than 3 inches to 5 inches, approximately 5 inches, or more than 5 inches from a bottom surface of the housing 2002 of the pylon, or within 3 inches, approximately 3 inches, or less than 3 inches to 5 inches, approximately 5 inches, or more than 5 inches from a bottom surface of the housing 2002 of the pylon, or any distance or approximate distance or range of distances in any of the foregoing ranges). The first shock 2202 may be forward relative to the towline 102, or on a first side or a second side of the towline 102. Additionally, in some embodiments, the pylon can have a second shock 2104 that can be positioned aft of the towline, or on a second side of the towline 102 which is opposite to the first side of the towline. The second shock 2104 can also be configured to contact the upper surface of the fuselage of the target aircraft T when the target aircraft T reaches a predetermined proximity with the pylon 2000. The shocks 2102, 2104 can protect the pylon 2000 and the target aircraft T from excessive forces during engagement of the target aircraft T with the pylon 2000 and also during transportation of the target aircraft T, as the host aircraft H and/or the target aircraft T are moved around as a result of turbulence, wind, or other effects. The shocks can also be configured to ensure that the target aircraft T is maintained in contact with the pylon 2000, even as the target aircraft moves up and down relative to the sway bars 2004, 2006.

As mentioned, in some embodiments, the composition of the shocks may be that of an elastomeric shock system, a pneumatic shock system, a hydraulic shock system, a gas shock system, or a mechanical shock system or any combination of shocks. If there are multiple shocks in any embodiment, the systems may be the same type of system or may be different types of systems. In this or any embodiment, there may be no shocks or there may be one shock, or more than one shock coupled with the pylon 2000 or attached to the target aircraft T. Some embodiments of the pylon 2000 and/or the target aircraft T can have one, two, three, four, or more shocks. The shocks can be coupled with the housing 2002 of the pylon or coupled with a frame inside the housing 2002, extending through the housing. The one or more shocks can be coupled with the housing 2002 by welding, bolting, or otherwise fixing the shocks to the housing. As mentioned, the shocks can alternatively be attached to the outer fuselage of the target aircraft T or be configured to advance through the fuselage of the target aircraft T.

In some embodiments, the shock system(s) can be configured to exert a force on the target aircraft T to act as an ejector to move the target aircraft away from the pylon during a release of the target aircraft T.

Latching Mechanism

Some embodiments of the pylon 2000 can have a latching system 2200 that can have one or more or two or more latches or hooks 2206, 2208 (two being shown) that can be configured to selectively engage with one or more lugs 2202, 2204 on the target aircraft T, as shown in FIG. 21. In some embodiments, the latching system 2200 can be configured to secure the target aircraft T to the pylon 2000.

An embodiment of the latching system 2200 is shown in more detail in FIGS. 22, 23A, 23B, 23C, and 24. In some embodiments, the lugs 2202, 2204 can be coupled with the target aircraft T and can extend away from the upper surface of the target aircraft T so that the lugs are accessible to the latches or hooks 2206, 2208 (truncated in FIG. 24) of the pylon 2000 when the target aircraft T is reeled into engagement with the pylon 2000. In some embodiments, the lugs 2202, 2204 can be attached to the upper fuselage of the target aircraft. The latches can be configured to secure the target aircraft T to the pylon 2000 when the latches are engaged with the lugs 2202, 2204 so as to inhibit the target aircraft T from inadvertently disengaging with the pylon 2000.

Figure 22:
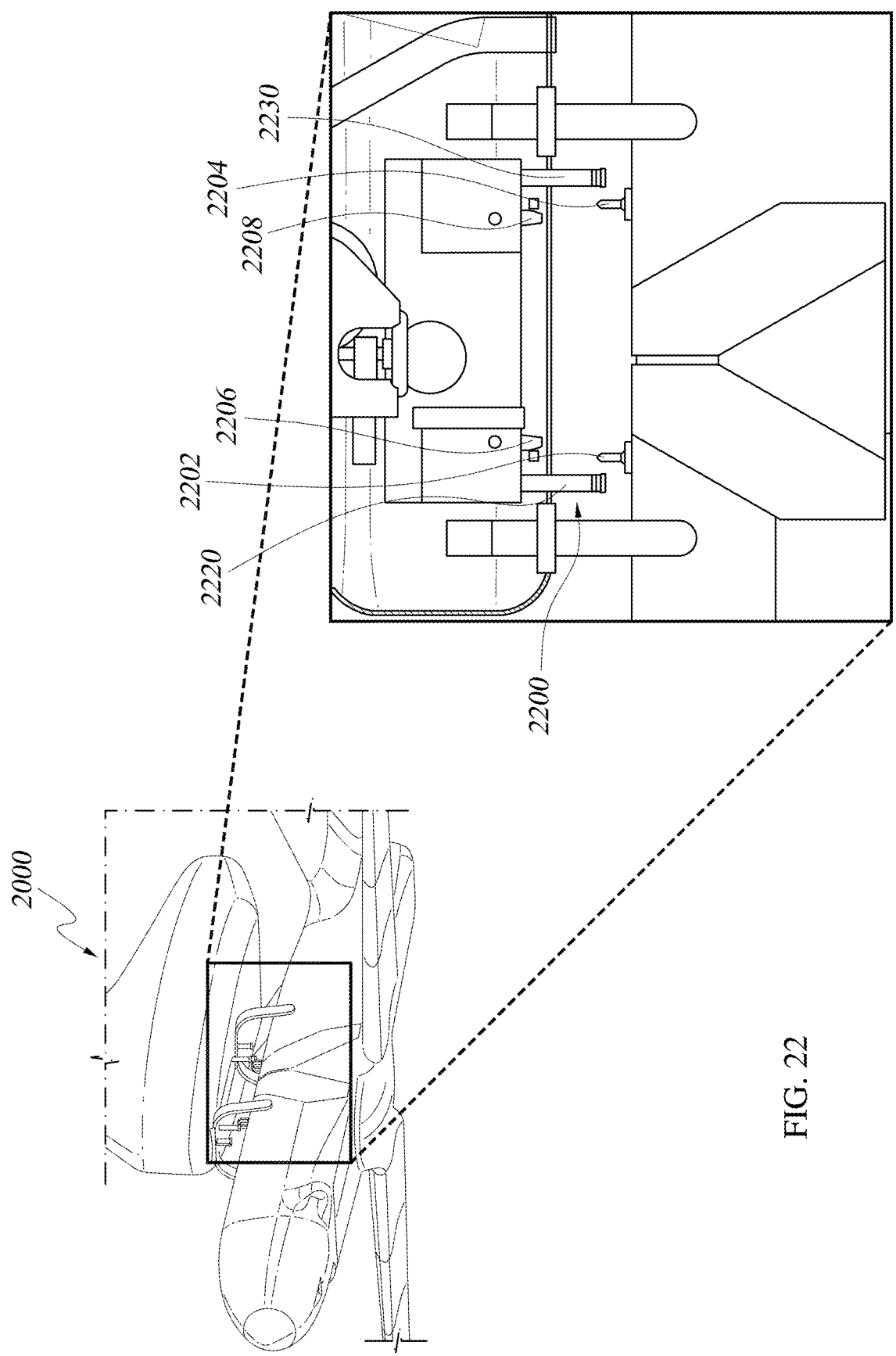
FIG. 22 is another perspective view of the embodiment of the pylon shown in FIG. 16, and a partial section view of a portion of the embodiment of the pylon.
Figure 23B:
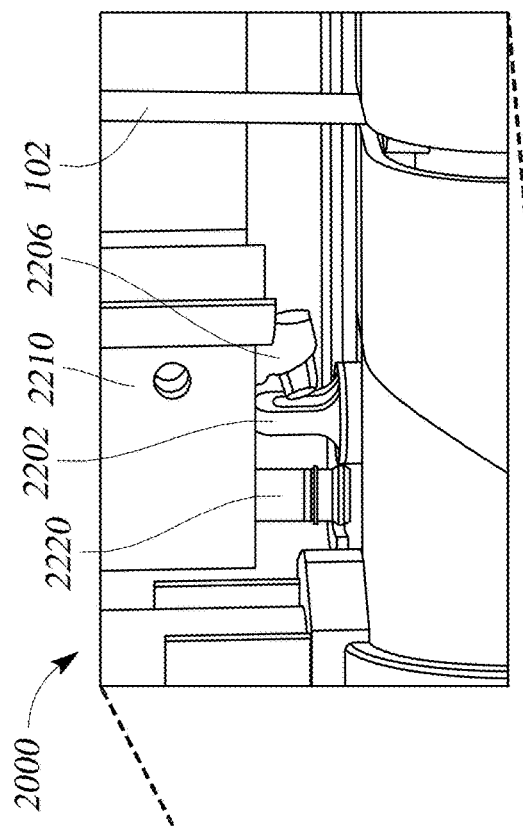
FIGS. 23A-23C are perspective views of a portion of the embodiment of the pylon shown in FIG. 16, with the housing cut away for clarity.
Figure 23C:
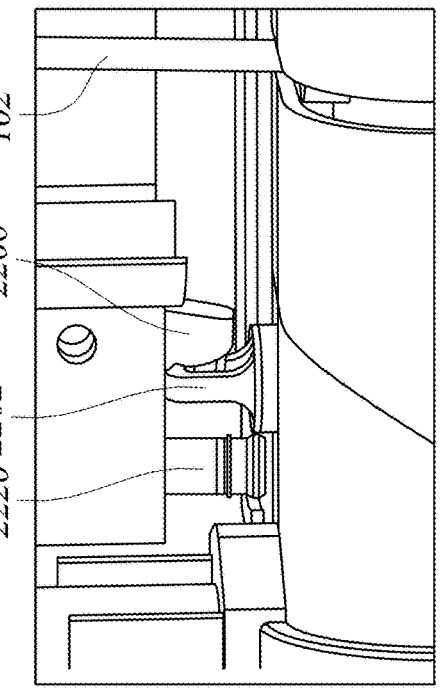
Figure 23A:
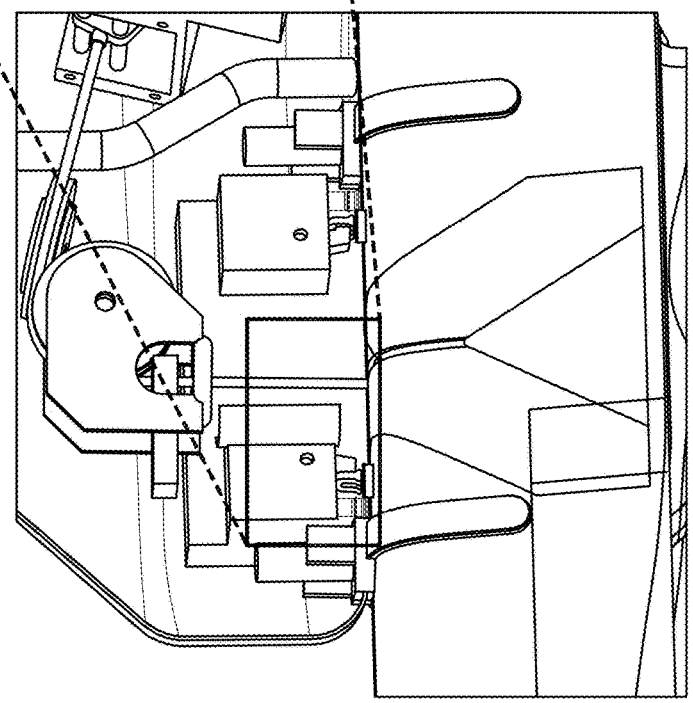

FIG. 22 illustrates an embodiment of pylon 2000 having a latching system 2200. In some embodiments, the latching system of the pylon can include one or more hooks 2206 and one or more actuators configured to move the one or more hooks 2206, 2208 between a first position where the hooks 2206, 2208 are disengaged from the one or more lugs of the target aircraft (as shown in FIG. 23B) and a second position where the one or more hooks 2206, 2208 are engaged with the one or more lugs of the target aircraft (as shown in FIG. 23C). The latching system can be configured such that, when the one or more hooks 2206 are in the first position, the target aircraft can be moved relative to the pylon without being inhibited by the latching system and such, when the one or more hooks 2206, 2208 are in the second position, the target aircraft will be inhibited from moving relative to the pylon. In this arrangement, the hooks 2206, 2208 can be maintained in the first, open position before the target aircraft is moved into engagement with the pylon and can be moved to the second position when the target aircraft is moved within a predetermined distance from the pylon. One or more sensors can be used to determine when the target aircraft is at or within a predetermined distance of the pylon.

In some embodiments, the one or more hooks 2206, 2208 can be configured to advance through an opening in the one or more lugs 2202 when the hooks are moved from the first position to the second position. In some embodiments, the hooks 2206, 2208 can be moved from the first position to the second position by rotating or translating the one or more hooks about a shaft or axis.

In some embodiments, the lugs can be built into the fuselage of target aircraft T. In some embodiments, a portion of the lugs can pass through the fuselage and be coupled with internal framework or structure of the target aircraft. In any embodiments, the lugs can be welded externally or otherwise coupled with the fuselage, internal frame or structure of the target aircraft, or otherwise. Furthermore, in some embodiments, the lugs may be built and spaced apart according to the relevant United States Military Standard (e.g., without limitation, MIL-STD-8591 or MIL-STD-2088). In some embodiments, the lugs can be configured to support the weight of target aircraft T and/or the drag forces associated with the target aircraft when coupled with the latching system 2200 during transport of the target aircraft, which forces may be in excess of a 2 g force.

In some embodiments, the one or more hooks can be coupled with linkage that is coupled with one or more ejectors 2220, 2230 that can extend downwardly away from a lower surface of the pylon 2000. The details of some embodiments of the ejectors 2220, 2230 will be described in greater detail below. In some embodiments, the latching system 2200 can be configured such that the hooks are moved from the first position to the second position as the ejectors are moved from a first position in which the ejectors are extended (e.g., without limitation, fully extended) away from the bottom surface of the pylon to a second position in which the ejectors are withdrawn or retracted (e.g., without limitation, fully withdrawn) toward the bottom surface of the pylon. In some embodiments, the one or more (e.g., two) ejectors can be moved from the first position to the second position by being pushed to the second position by the target aircraft T as the target aircraft T is moved into engagement with the pylon. As mentioned, moving the one or more ejectors to the second position of the one or more ejectors can cause the one or more hooks to move to the second position of the one or more hooks, thereby engaging the one or more lugs on the target aircraft T. A locking mechanism can selectively lock the latching mechanism in the second position of the latching mechanism.

In some embodiments, the latching system 2200 can be configured to automatically move the one or more ejectors from the first, extended position to the second, retracted position as the target aircraft disengages from the pylon and/or to automatically move the one or more hooks from the first position to the second position, as the target aircraft is moved into engagement with the pylon. In some embodiments, the pylon can have one or more sensors configured to determine a distance between the target aircraft and a reference point or plane of the pylon and to cause the ejectors and the hooks to move in accordance with such distance. For example and without limitation, the ejectors and the hooks can be moved by one or more actuators of the latching system as the target aircraft is moved relative to pylon.

In some embodiments, when the host aircraft is receiving a target aircraft, the ejectors and/or hooks can be in an extended position and can retract in response to a portion of the recovery pylon making contact with the target aircraft. For example, the ejectors and/or hooks can retract in response to the ejectors and/or other features (such as shock absorbers) making contact with the target aircraft. In some embodiments, the ejectors may not play a role in the recovery process and may instead be used only for an ejection process. For example, in some embodiments, separate shock absorbers may be used for aircraft recovery.

In some embodiments, when the host aircraft is ejecting the target aircraft, the hooks can retract to release the target aircraft, and the ejectors can be initiated to push the target aircraft away from the host aircraft. In some embodiments, the ejectors can retract once the target aircraft is a distance away from the host aircraft (e.g., once a top surface of the target aircraft is at least a minimum distance from the ejectors or another feature of the host aircraft or recovery pylon). For example, the ejectors and/or hooks may retract once the target aircraft is one inch or about one inch, two inches or about two inches, three inches or about three inches, four inches or about four inches, five inches or about five inches, six inches or about six inches, twelve inches or about twelve inches, or any value between these values, or more or less from the ejectors or another reference point on the host aircraft. In some embodiments, retraction of the ejectors can be based on time. For example, the ejectors may retract 1 second or about 1 second, 2 seconds or about 2 seconds, 3 seconds or about 3 seconds, 5 seconds or about 5 seconds, 10 seconds or about 10 seconds, or any value between these values, or more or less, after the target aircraft is ejected. In some embodiments, the ejectors and/or hooks can be maintained in a stowed or retracted position when the host aircraft is not engaged with a target aircraft.

In some embodiments, the ejectors can be controlled independently. For example, in some embodiments, a forward ejector can be initiated before an aft ejector is initiated. By staggering the initiation of the forward and aft ejectors, a desired pitch of the target aircraft can be achieved. For example, initiating the forward ejector before the aft ejector can induce a nose down pitching moment in the target aircraft. This can be beneficial because, for example, it can reduce the risk of collision between the host and target aircraft after the target aircraft is released.

In some embodiments, the hook can be housed within a latching system housing 2210. In some embodiments, the ejector can be housed within a latching system housing 2210. In some embodiments, both a hook 2206 and an ejector 2220 can be housed within the same latching system housing 2210 or, in some embodiments, can be housed in separate latching system housings. Other elements of the latching system or pylon can be supported or housed within the latching system housing 2210.

Described herein is another embodiment of a latching system 2200. In some embodiments, the latching system 2200 can have ejectors 2220, 2230. The ejectors 2220, 2230 can move from a first, extended position to a second, retracted position, and vice versa. Each of the ejectors can include an elongate member or piston 2224 that is configured to move axially between the first position in which the ejector is extended and the second position in which the ejector is retracted.

In some embodiments, the latching system can include a pressure reservoir or tank 2240 that can be used to move the ejectors 2220, 2230 between the first and second positions and/or the hooks 2206, 2208 between the first and second positions. Additionally, in some embodiments, the latching system can include a compressor configured to recharge the pressure reservoir. In some embodiments, the latching system can be configured to rapidly pressurize the cylinders of the first and second ejectors 2220, 2230 to rapidly move the first and second ejectors 2220, 2230 from the second, retracted position to the first, extended position to cause the ejectors to exert a force on the target aircraft T to rapidly move the target aircraft T away from the pylon. This sequence of ejection may be carried out in original launch of the target aircraft T or in the relaunch of the target aircraft T following capture.

In some embodiments, the suspension hooks 2202, 2204 can be spaced apart and may be independently self-latching. Additionally, in some embodiments, there may be a manual release lever, which may be used to open the hooks during ground operation. In some embodiments, when the hooks are locked, they may be prevented from opening until the cartridge or pressure reservoir 2240 is actuated or the manual release lever is pulled.

In some embodiments, the ejector 2220 can function to exert a force upon the target aircraft T away from the pylon 2000 upon the firing of the pressure reservoir 2240 when the target aircraft T is positioned within the predetermined proximity (e.g., within one inch or about one inch, two inches or about two inches, three inches or about three inches, five inches or about five inches, 6 inches or about 6 inches, or any value between these values, or more or less) of the pylon 2000. The ejector 2220 may help to achieve a desired ejection velocity and ensure safe separation. In some embodiments, the ejector may act as a shock absorber, aiding in protecting the pylon 2000 and the target aircraft T from excessive force upon engagement. In other embodiments, the ejector 2220 may replace a shock system 2100, i.e., such that the pylon 2000 operates without a separate shock system or separate shock absorbers. In any embodiments, the ejector may serve a shock absorber function in addition to additional shock systems or shock absorbers that are present. In some embodiments, the ejectors can be actuated sequentially so that the target aircraft may be ejected as to ensure nose down trajectory upon release.

Figure 24:
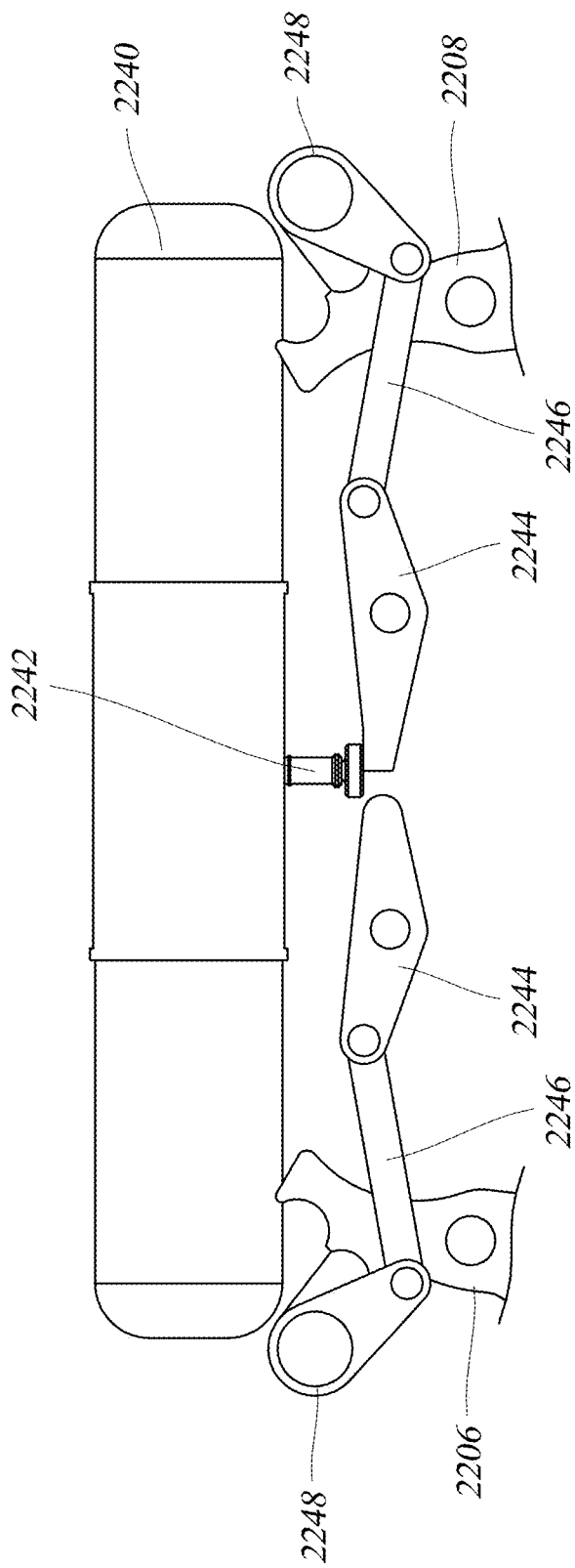
FIG. 24 shows an embodiment of a latching system that can be included in any pylon embodiments disclosed herein.

With reference to FIG. 24, some embodiments of the latching system 2200 can have one or more latches or hooks 2206, 2208, a pressure reservoir 2240, a plunger 2242 that is actuatable with air pressure within the pressure reservoir 2240, two or more cranks or linkage members 2244 that can be coupled with and be rotatable with respect to the plunger 2242, second cranks or linkage members 2246 coupled with and rotatable with respect to the linkage members 2244, and release cams 2248 that can be coupled with and rotatable with respect to the second cranks 2248. The release cams 2248 can be configured to rotate or move the hooks 2206, 2208 between the engaged and disengaged positions or at least the engaged and disengaged positions.

Any embodiments of the latching system 2200 shown in FIG. 24 can have any of the components, features, or other details of any other embodiments of the recovery systems and/or the latching mechanisms described herein and/or be used according to any of the steps of any other method embodiments disclosed herein or illustrated in the figures, in any combination with any of the components, features, or details of the recovery system embodiments or capture mechanism embodiments, including without limitation the aforementioned recovery system and capture mechanism embodiments.

In any embodiments disclosed herein, the lugs can be configured to fold down or otherwise move or rotate to a stowed position that can be inside the airframe or flush to the airframe of the target aircraft once the target aircraft is released from the pylon or the latching mechanism. Moving the lugs to a stowed position can reduce (e.g., eliminate) drag and observability of the lugs or at least reduce wind resistance of the lugs. In some embodiments, the lugs can be spring loaded and configured to automatically move to a stowed position (for example and without limitation, by an actuator) or biased toward a stowed position. In some embodiments, the lugs can be configured to move to a deployed or extended positioned to be engaged by the latches or hooks on the pylon. For example and without limitation, in some embodiments, the lugs can be configured to automatically move to a deployed or extended position (for example and without limitation, by an actuator) upon receiving an input command or upon interaction with or engagement by the latches or hooks of the pylon or other components of the capture mechanism of the pylon. For example and without limitation, the target aircraft can be configured to cause the lugs to move to the deployed or extended position upon contact from one or more of the shocks of the pylon with the airframe of the target aircraft, or actuators or switches on the target aircraft, or upon detection by one or more sensors on the target aircraft that the target aircraft is within a predetermined distance from the pylon (e.g., 2 feet, approximately 2 feet, or less than 2 feet, 1 foot, approximately 1 foot, or less than 1 foot, 6 inches, approximately 6 inches, or less than 6 inches, or between 5 feet or approximately 5 feet and 1 foot or approximately 1 foot). In some embodiments, the target aircraft can be configured to cause the lugs to move to the deployed or extended position once the target aircraft has captured the towline. In some embodiments, the target aircraft can be configured to cause the lugs to move to the deployed or extended position after intercepting the towline. In some embodiments, the target aircraft can be configured to cause the lugs to move to the deployed or extended position prior to intercepting the towline.

Other Details

In some embodiments, the pylon 2000 can include a supply line 2010, as illustrated in FIGS. 19 and 20. In some embodiments, the supply line can be a refueling line configured to selectively engage with the target aircraft when the target aircraft is within a predetermined proximity to the pylon 2000 and to transfer fuel to the target aircraft T. Alternatively or additionally, the supply line 2010 can be configured to provide a means for rearming and/or providing power or other supplies or resources to the target aircraft T.

Hoist System with Pylon

Figure 25:
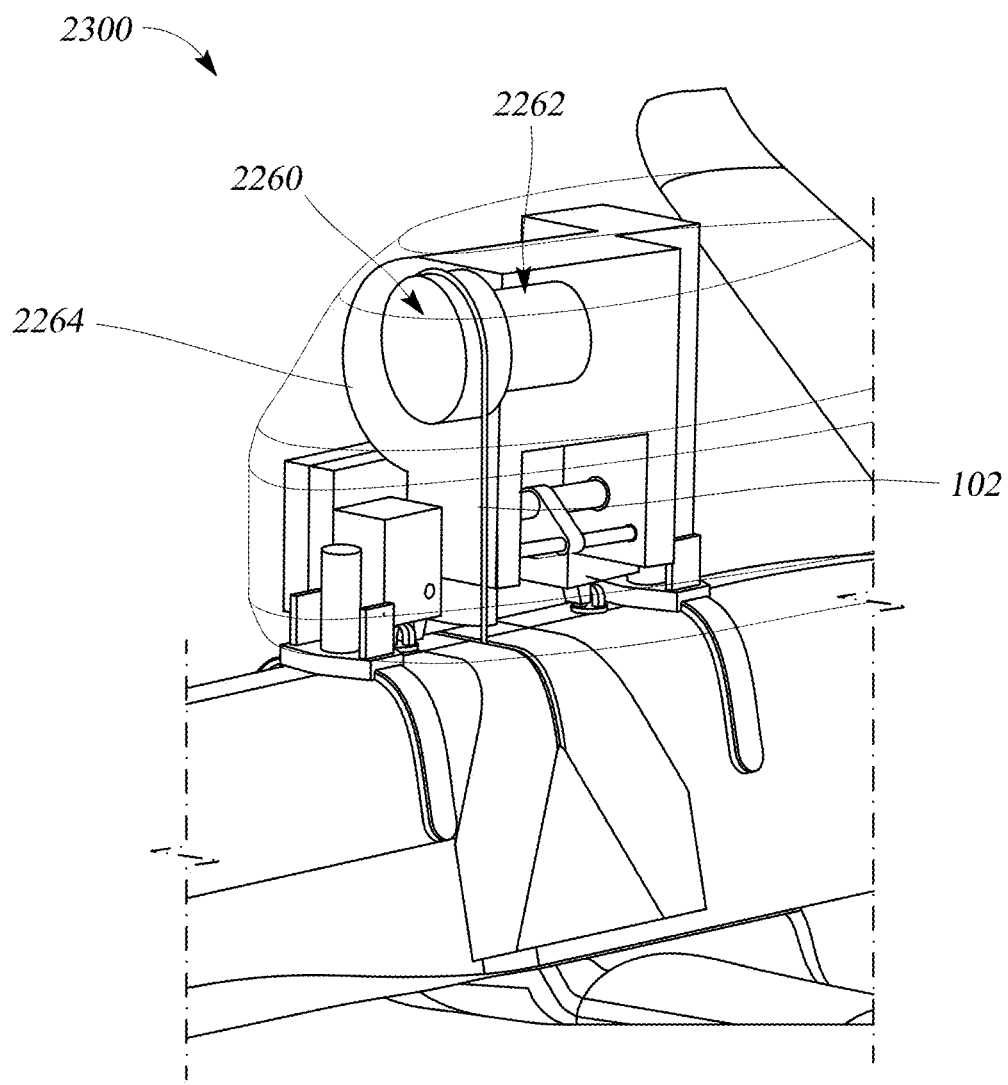
FIG. 25 shows a portion of an embodiment of a hoist system that can be included in any pylon embodiments disclosed herein.

FIG. 25 depicts an embodiment of a hoist system 2300 that can be used with any pylon embodiments disclosed herein, including the embodiments of the pylon 2000. In some embodiments, the hoist system 2300 can have any of the components or features of any of the other hoist system embodiments disclosed herein. In some embodiments, the hoist system 2300 can be an off-the-shelf hoist, such as a hoist from Breeze Eastern, or be similar to off-the-shelf hoists or have any components of off-the-shelf hoists or be a customized version of off-the-shelf hoists. In some embodiments, the hoist may have fewer components or otherwise be configured to have a lower profile so as to reduce an overall height of the pylon. In some embodiments, the hoist can use a level wind mechanism. Alternatively, a drum of the hoist system may move back and forth. With reference to FIG. 25, some embodiments of the hoist 2300 can have a drum 2260 and a motor and gearhead component 2262 coupled with the drum. The drum and motor and gearhead component can be positioned within a housing 2264 that can be positioned within the pylon housing. As shown, the drum 2260 can be configured so that the towline 102 can be wound onto the drum directly without requiring a level wind, a translating drum, additional pulleys, guiding mechanisms, winding mechanisms, or trolley mechanisms. In some embodiments, the drum 2260 can be configured so that the towline 102 can be wound onto the drum directly without requiring the towline to change directions or to significantly change directions before being wound on the drum. In some embodiments, the drum 2260 can be positioned and configured so that the towline 102 can be wound onto the drum when the towline is in a generally vertical orientation. In some embodiments, the hoist can have one or more guiding mechanisms configured to efficiently guide the towline 102 on the drum 2260 to provide a more consistent winding of the towline 102 on the drum. In some embodiments, the towline can be approximately 50 feet long so that the winding and drum system can be simplified, as described above. In some embodiments, the drum 2260 can be configured to translate axially back and forth to ensure a level winding of the towline.

Some embodiments of the pylon can have sensors (e.g., trip actuated sensors, optical sensors, etc.) to determine when the target aircraft is fully engaged with the pylon so that the hoist system can stop reeling in the towline. One or more sensors can also be configured to identify when the end fitting 103 has been released from the capture mechanism 100 to identify when to reel in the towline up to the bump stop spring 2012.

End Fitting Release Mechanisms

Figure 26C:
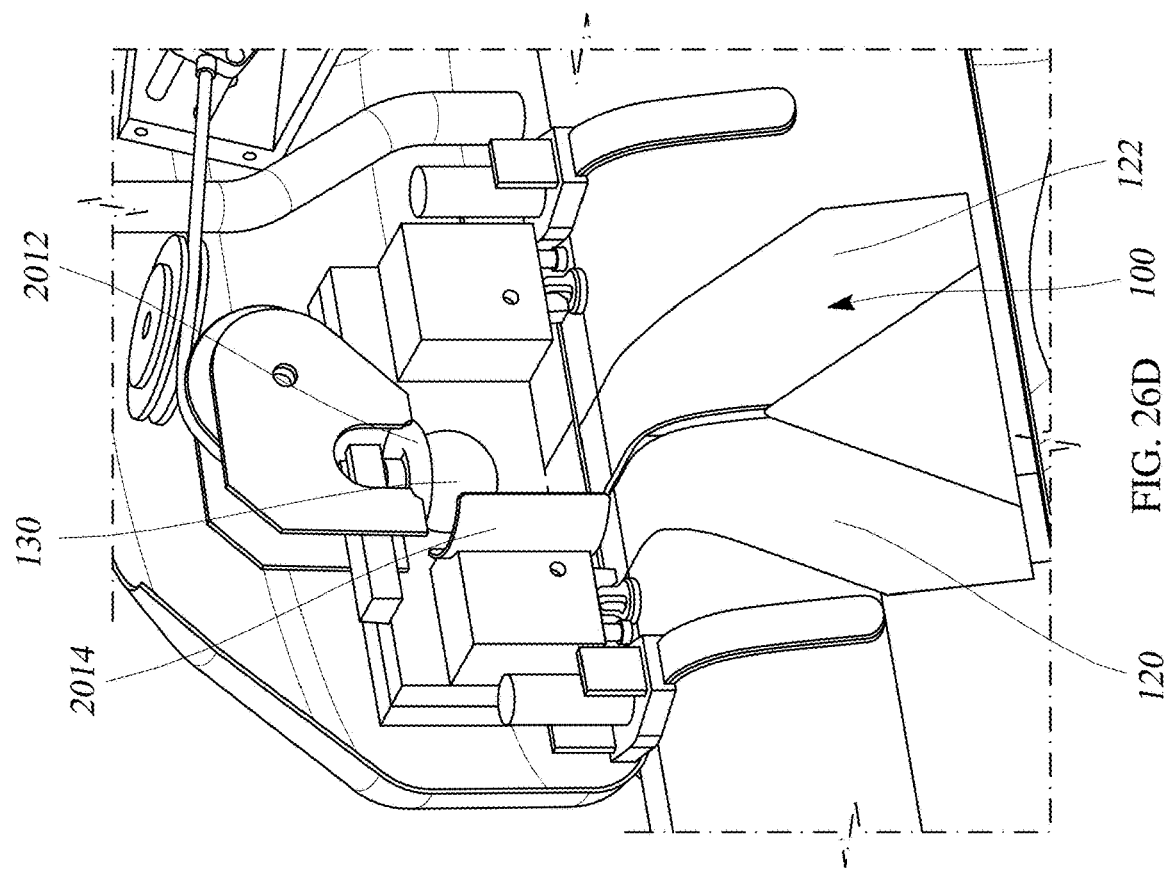
Figure 26D:
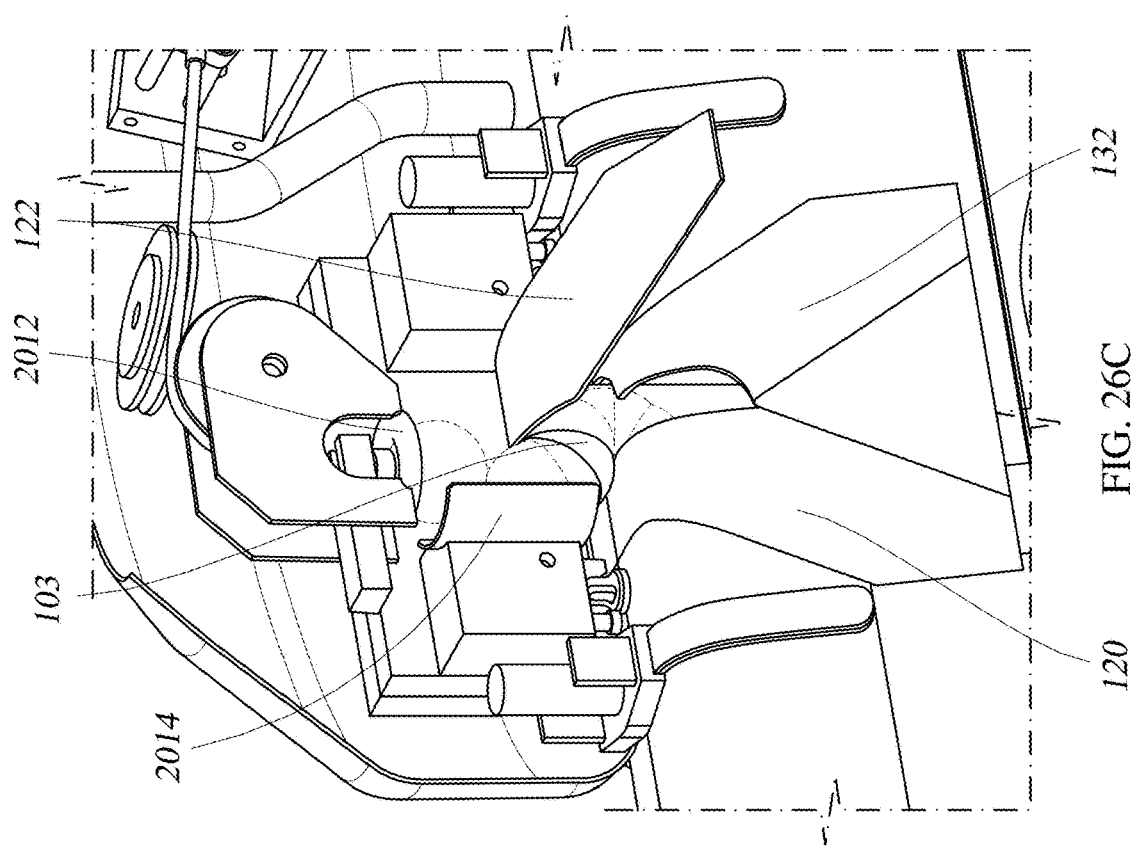
Figure 27D:
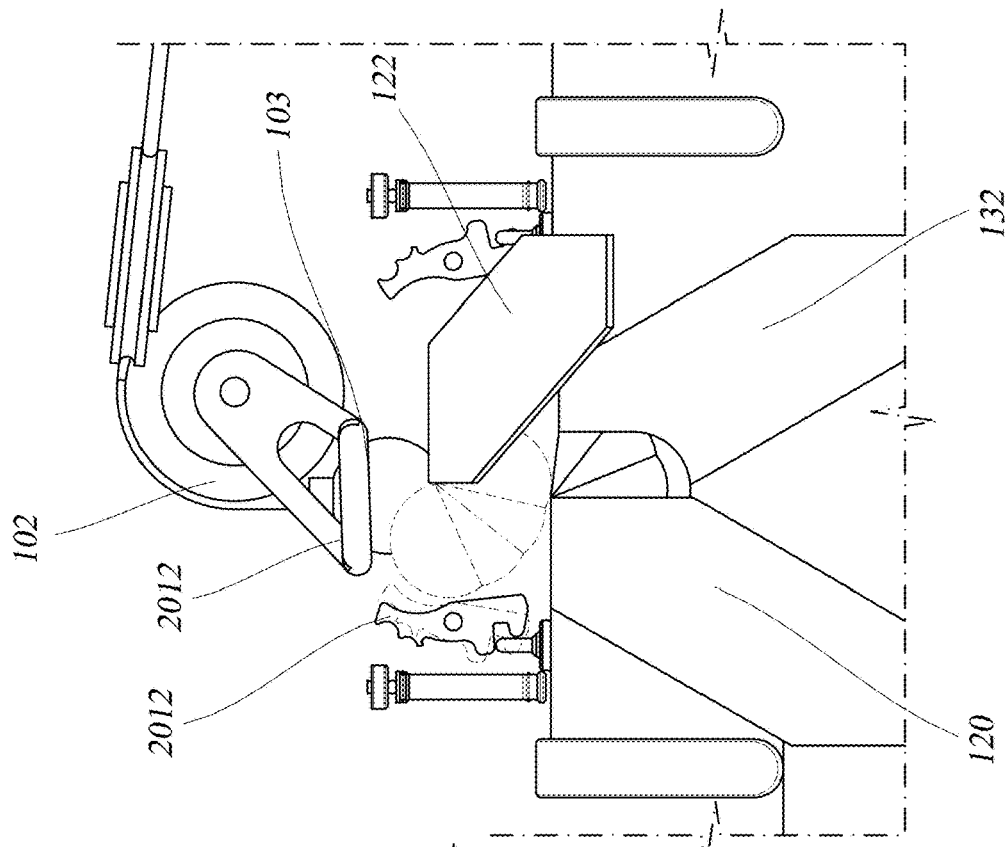
Figure 27C:
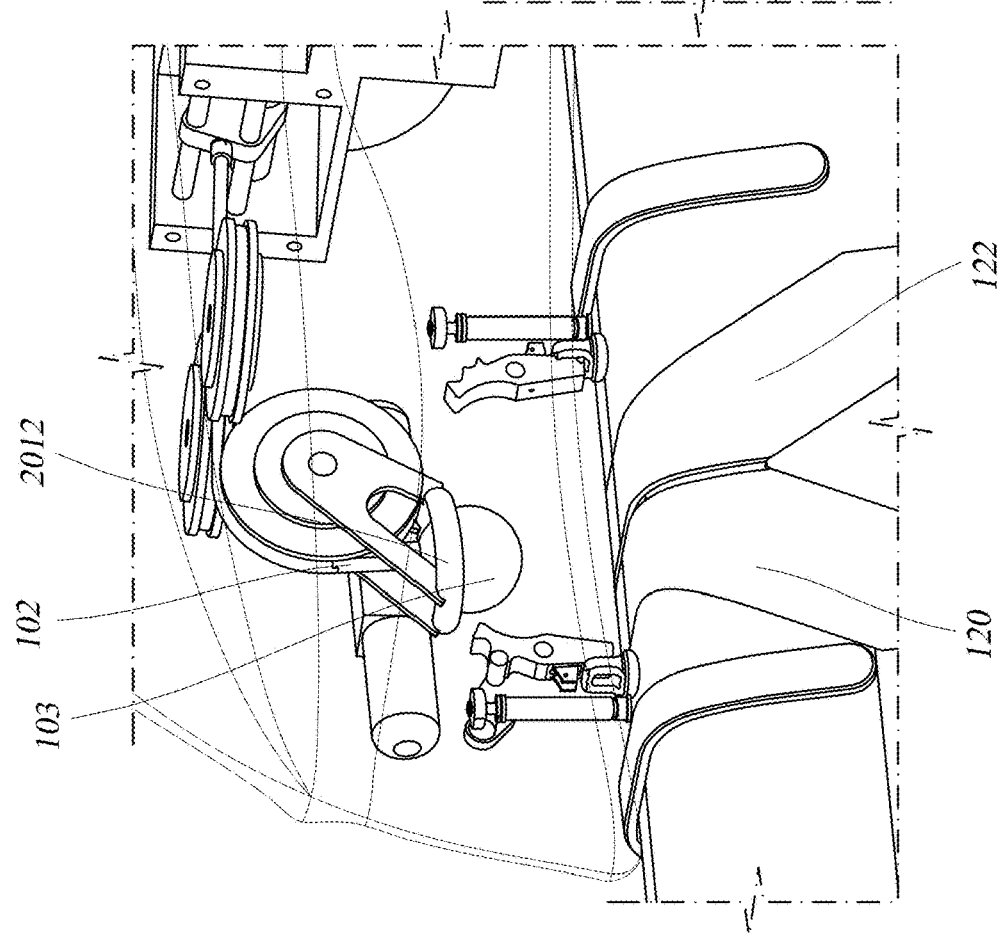

FIGS. 26A-26D depict in sequence an embodiment of the pylon showing the capture mechanism 100 of the target aircraft releasing an end fitting 103. FIGS. 27A-27D further depict a similar embodiment in a view wherein some components of the pylon are transparent for clarity purposes. In this embodiment, the towline 102 is decoupled from the target aircraft T. FIG. 26A illustrates a possible first position of the release of the end fitting 103, wherein the end fitting 103 is still positioned within the capture mechanism 100 and the target aircraft T is engaged with a pylon 2000. In FIG. 26B, the second movable portion 122 is raised, thereby uncovering or exposing an opening 2350 in the capture mechanism or fuselage of the target aircraft T through which the end fitting can pass as the towline is retracted further. The first movable portion 120 can also be raised, or both movable portions can be raised. Alternatively, in some embodiments there may only be one movable portion and that portion can be raised. Some embodiments of the pylon 2000 can have a recess or space on the underside thereof to allow for the full rotation or movement of the first and/or second movable portions. In some embodiments, the underside of the pylon may be open to allow the movable portion to enter the interior of the pylon as the movable portion is rotated away from the fuselage of the target aircraft. Once the movable portion has reached a predetermined position relative to the pylon 2000, as depicted in FIG. 26B, the towline can be reeled in by the hoist 110. An end feature guide 2014 can be configured to guide the end fitting 103 as the end fitting is being retracted. Additional end feature guides can optionally be implemented in this or other embodiments to direct the end feature away from the capture mechanism. FIG. 26C shows the end fitting 103 being retracted by the hoist 110. FIG. 26D shows the end fitting fully retracted to a predetermined position. The end fitting may be engaged with or restrained by a bump spring stop 2012 in the fully retracted position. After the end fitting 103 is fully retracted, the movable portion 120 or portions can be returned to their original position.

FIG. 28A-28D show another embodiment of the target aircraft, the capture mechanism of the target aircraft, and another embodiment of the pylon, showing a sequence of steps involved in the release of the end fitting. In this embodiment, there is a covered cavity 2312 on the target aircraft through which the end fitting 103 may be released. Once the target aircraft T is in a predetermined position relative to pylon 2000, the cavity cover 2310 can be removed or opened, allowing the end fitting 103 to pass through the opening uncovered or revealed by moving the cover 2310. In some embodiments, there may be a mechanism that aids in ejecting the end fitting from the fuselage of the target aircraft. For example and without limitation, there may be a piston or shaft within the cavity 2312 of the target aircraft T that pushes the end fitting from the cavity 2312. Alternatively, the end fitting 103 may be poised on a ramp element within the cavity 2312, allowing the end fitting 103 to exit the cavity 2312 by means of gravity. Alternative, sloped or ramped surfaces in the capture mechanism may case the end fitting to move laterally as the towline is being retracted, thereby causing the end fitting to move out of the capture mechanism.

FIG. 28C shows a possible means of removal where the hoist (e.g., the hoist 110 of FIG. 1) retracts the towline 102, pulling the end fitting 103 towards a specified second position relative to bump stop spring 2012. After the end fitting 103 is retracted to the second position in relation to the bump stop spring 2012, the cover 2310 may be placed back over the cavity 2312. In this or other embodiments, there may be one or more end feature guides 2014 to aid in the directionality of the motion of end fitting 103 (i.e., to cause the end fitting to move laterally away from the capture mechanism). The position of the cavity 2312 and cover 2310 may be on one side of the fuselage of the target aircraft T or there may be multiple cavities and/or covers on the fuselage. The cavity 2312 may be on the same side of the fuselage of target aircraft T as the moving portions 120, 122 of the capture mechanism 100. Alternatively, the cavity 2312 may be on the opposite side of the fuselage of the target aircraft T relative to the first and second moving portions 120, 122. In some embodiments, the size of the cavity may be larger than the size of the end fitting to allow for smooth exit of the end fitting from the capture mechanism. The shape of the cavity 2312 may be similar to that of the end fitting 103. Alternatively, the shape of the cavity 2312 may be substantially different than that of the end fitting 103.

FIGS. 29A-29F show another embodiment of an end fitting 103 release and tow line 102 retraction. In this embodiment, there are movable flaps 2302, 2304 separate from the movable portions of the capture mechanism, which allow the end fitting 103 to travel from a first position within the capture mechanism 100 to a second position through a cavity 2350 on the top side of the fuselage of the target aircraft T. The weight of the target aircraft T may not be fully supported by the movable flaps and may be supplementarily supported by reinforcements. For example and without limitation, a fork shaped member may be advanced around the towline and over the end fitting. The fork shaped member can be configured to prevent the end fitting from passing through the fork shaped member, while the towline is permitted to pass through the fork shaped member. In some embodiments, the reinforcements may be within the fuselage of the target aircraft T. The reinforcements may be attached to a movable flap or may be detached from the movable flaps and be located within the fuselage. There may be a combination of reinforcements both attached to movable flaps 2302, 2304 and separate within the fuselage.

In some embodiments, the movable flaps 2302, 2304 can be configured to open within the pylon 2000, with space being allotted inside the pylon 2000 for this full range of movement. There may also be an opening on the bottom side of the pylon 2000 to allow for this movement. The movable flaps 2302, 2304 may operate on a hinge along the axis vertical to the wings of the target aircraft T. In some embodiments, the movable flaps may operate along an axis perpendicular to the wings of target aircraft T. In some embodiments, there may also be a guard 2014 to direct the motion of the tow line 102 and end fitting 103. In any embodiments, there may be no guard or one guard or more than one guard.

Figure 29A:
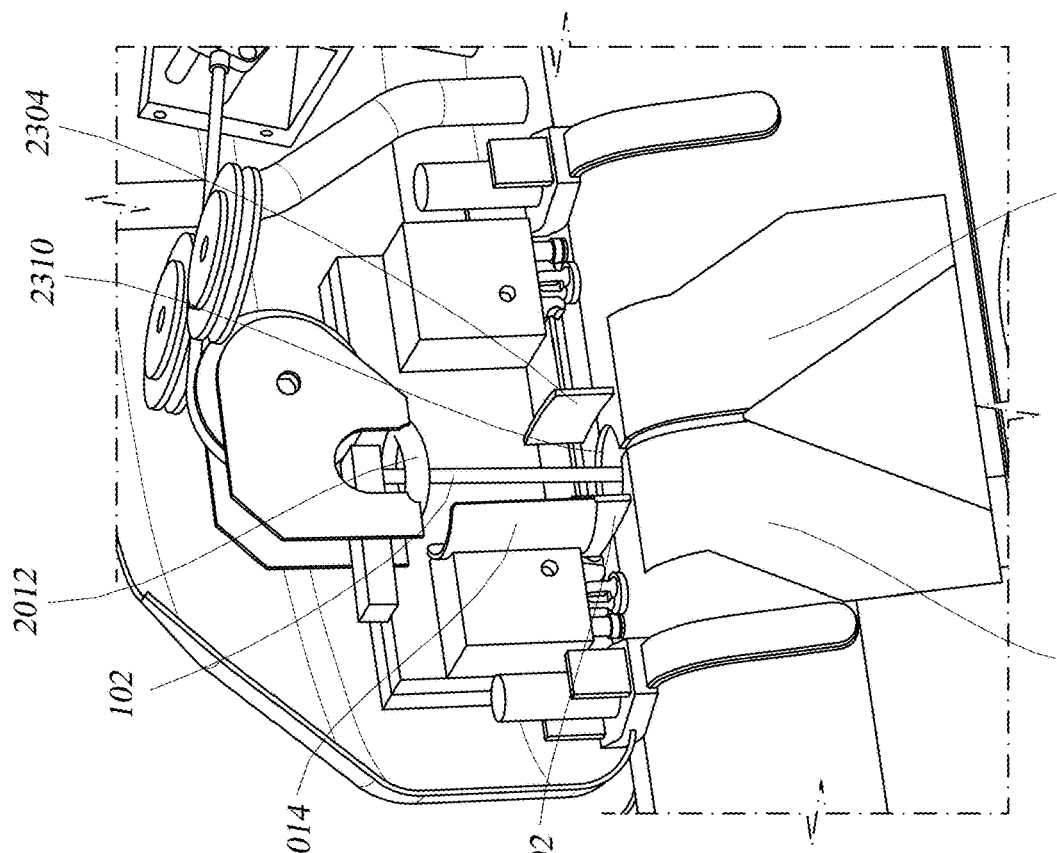
Figure 29B:
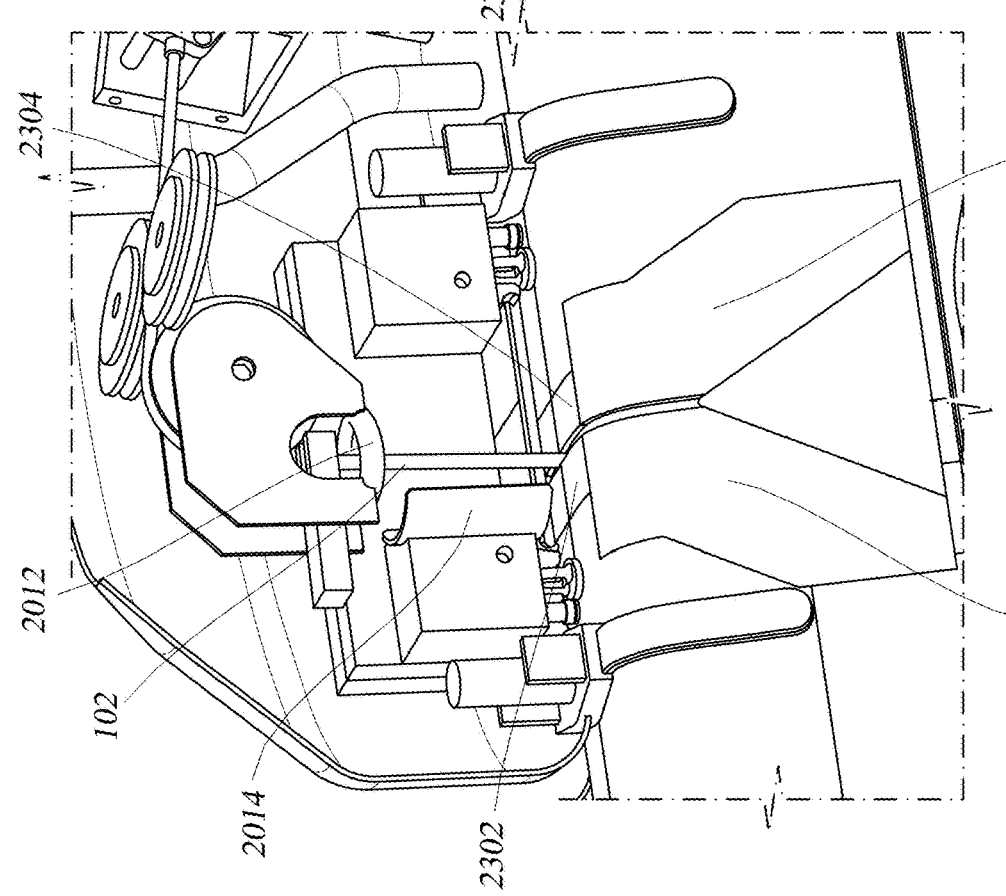
Figure 29F:
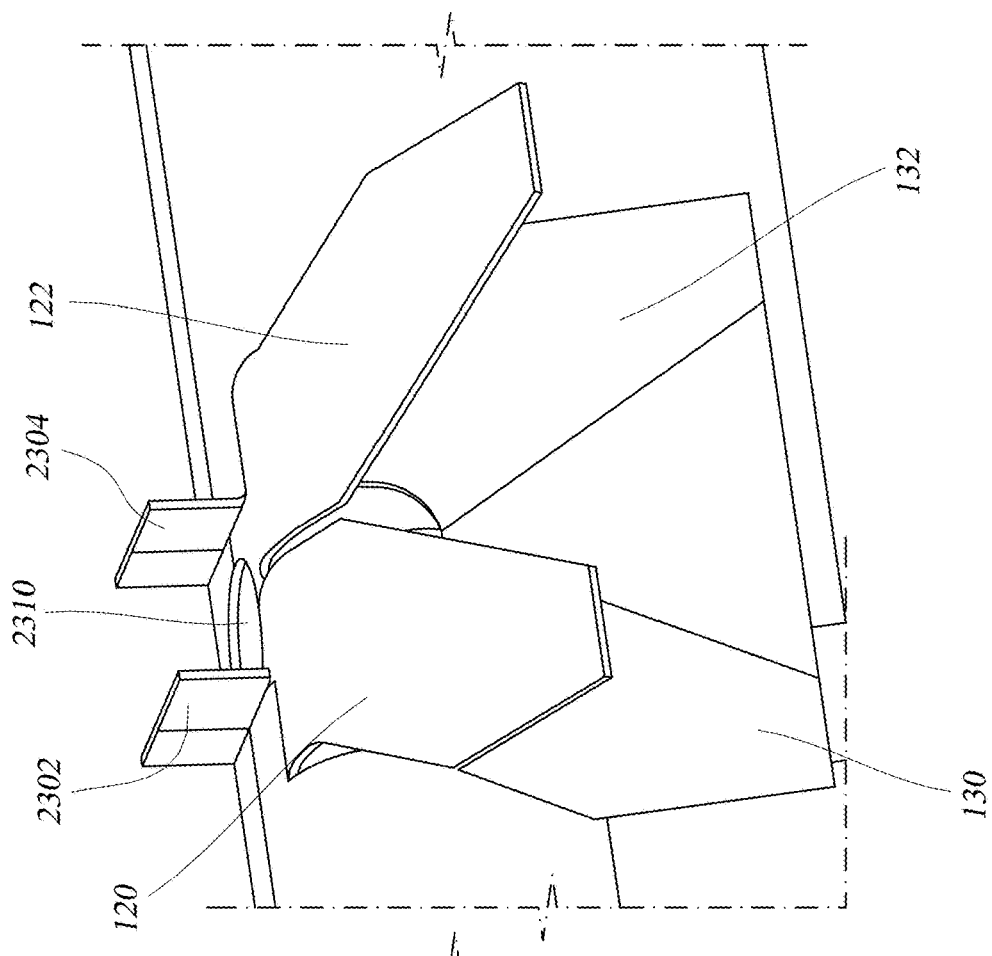
Figure 29E:
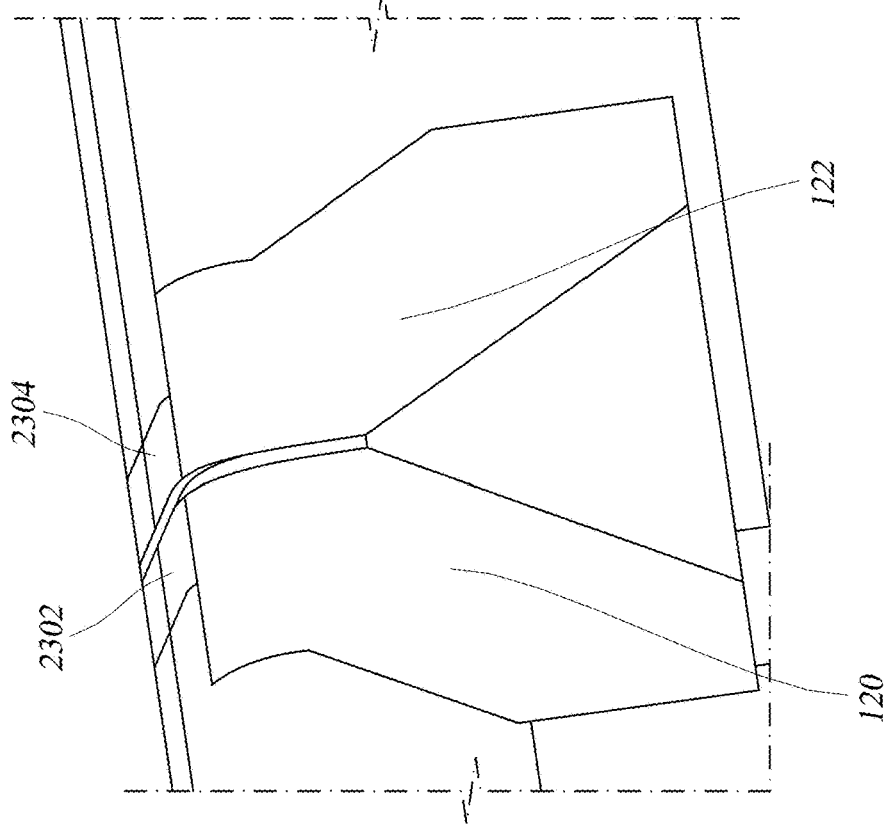
Figure 31:
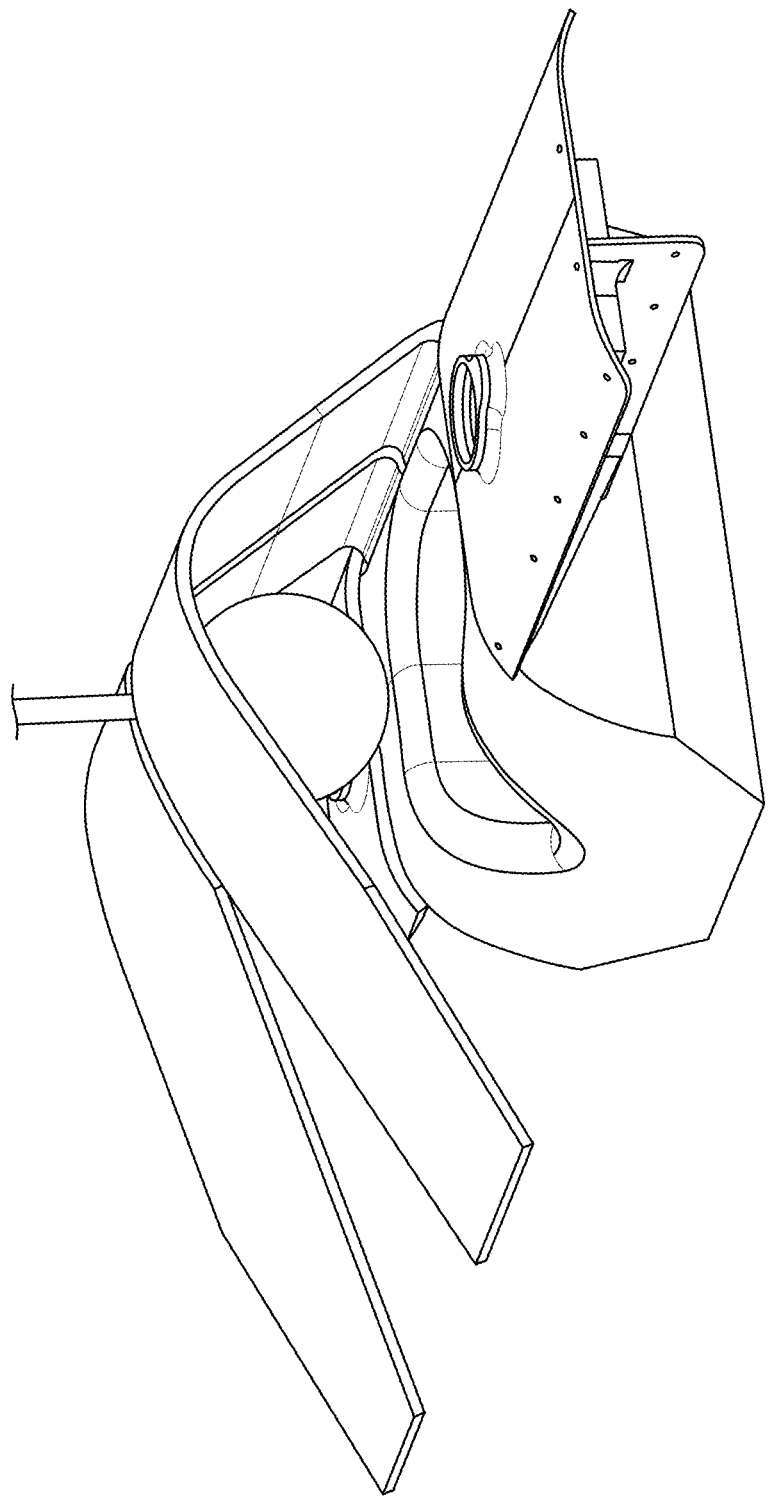
FIG. 31 is a perspective view of an embodiment of a capture mechanism of a target aircraft.

In some embodiments, with reference to FIGS. 29E-29F, the target aircraft can have first and second movable portions 120, 122 and first and second movable flaps 2302, 2304 that can be opened to allow the end fitting to be released from the capture mechanism when the target aircraft is fully engaged with the pylon. This configuration can reduce the amount of space required above the capture mechanism during release of the end fitting since the first and second movable portions 120, 122 will not be required to rotate as high as in other embodiments to release the end fitting. FIG. 30 shows an embodiment of a recess 240 in the target aircraft and the configuration of the first and second movable portions 120, 122. FIG. 31 shows an embodiment of a capture mechanism of a target aircraft in which the first and second movable portions 120, 122 are open and a fitting 103 is captured by the movable portions 120, 122.

FIG. 32 illustrates another example embodiment of a recovery system according to some embodiments. As shown in FIG. 32, a target aircraft T is coupled to a host aircraft H by way of a recovery pylon 2400. In any embodiments disclosed herein, any components, features, or other details of the recovery system or the pylon shown in any of FIGS. 32-46B can have any of the components, features, or other details of any other recovery system or pylon embodiments disclosed herein, including without limitation any embodiments of the recovery system 90 or pylon 1310, 2000 described above, in any combination with any of the components, features, or details of the embodiment of the recovery system or pylon 2400 disclosed below. Similarly, any components, features, or other details of any of the other recovery system embodiments or pylon embodiments disclosed herein can have any of the components, features, or other details of any embodiments of the pylon 2400 disclosed herein in any combination with any of the components, features, or details of the recovery system and/or pylon. As shown in FIG. 32, the recovery pylon 2400 can be disposed on a wing of the host aircraft H (e.g., without limitation, so as to be positioned on an underside of the wing).

Figure 33A:
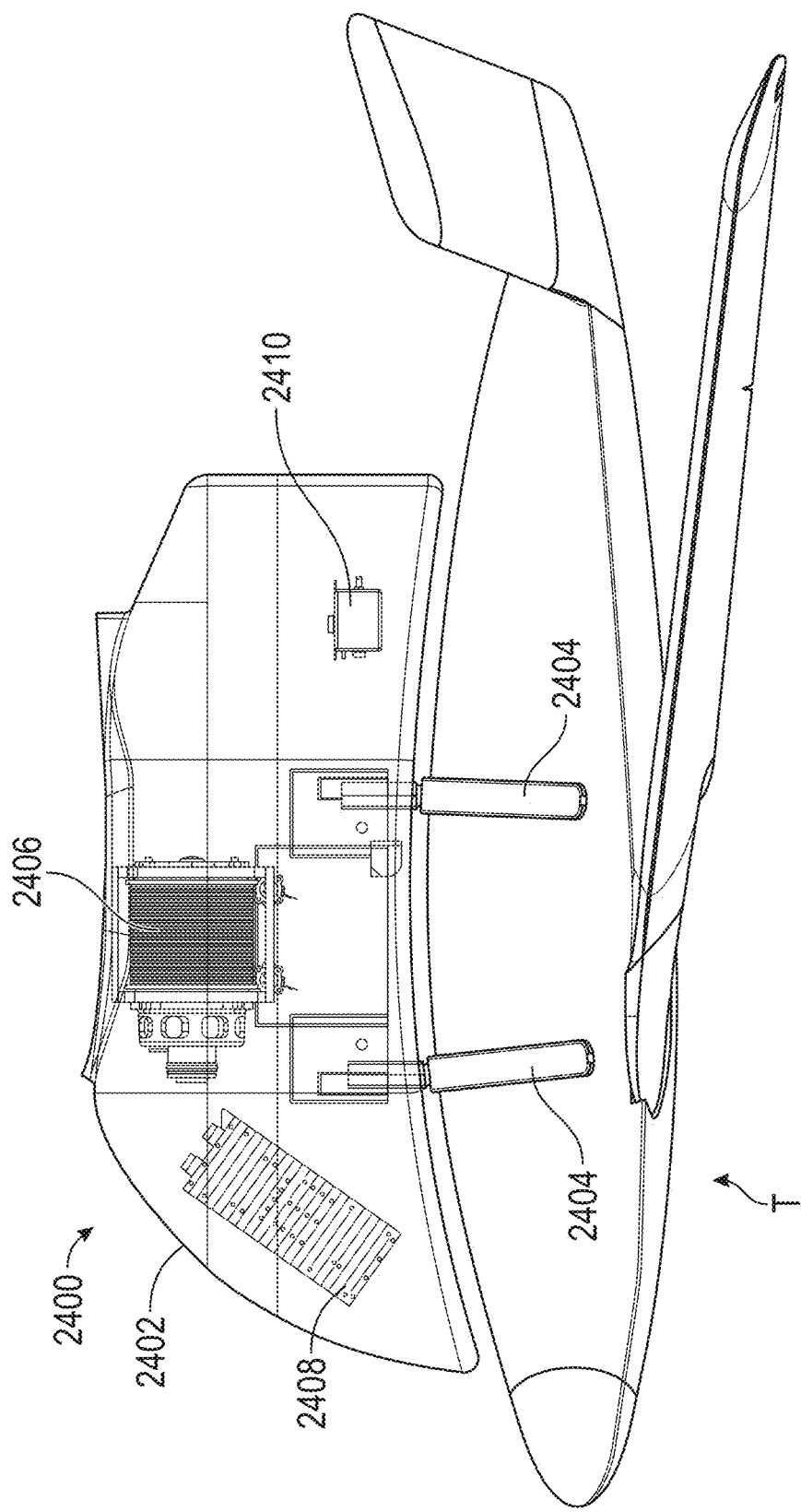
FIGS. 33A-33C are views of a recovery pylon having a longitudinally oriented hoist according to some embodiments.
Figure 33B:
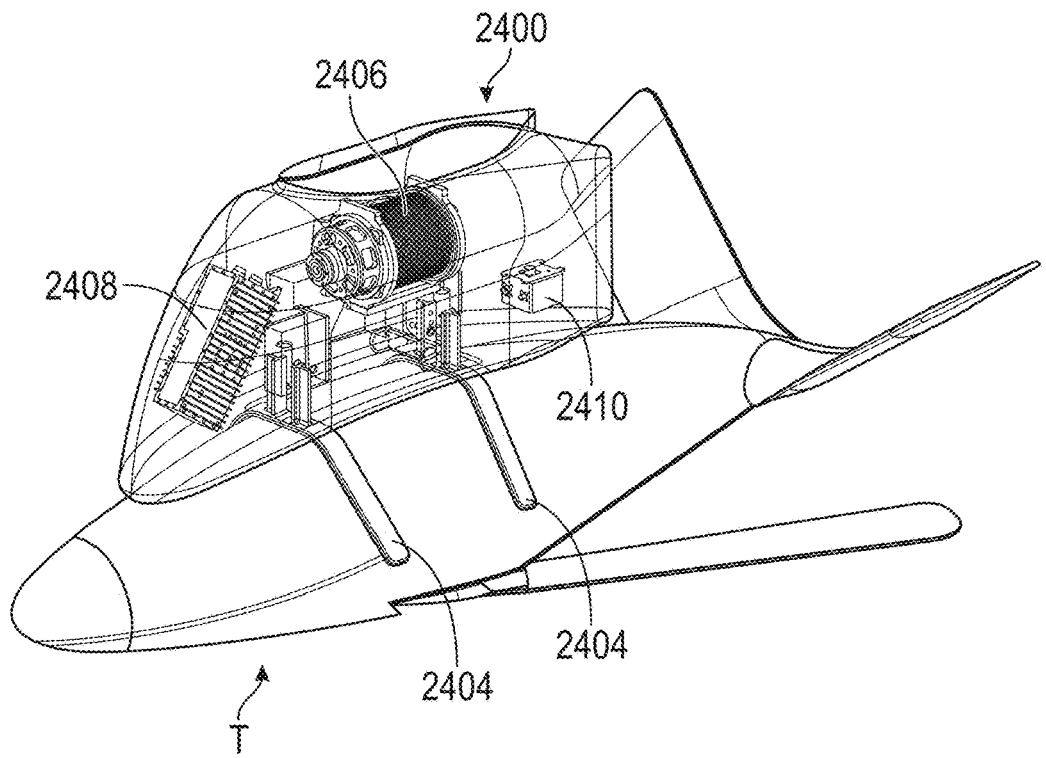
Figure 33C:
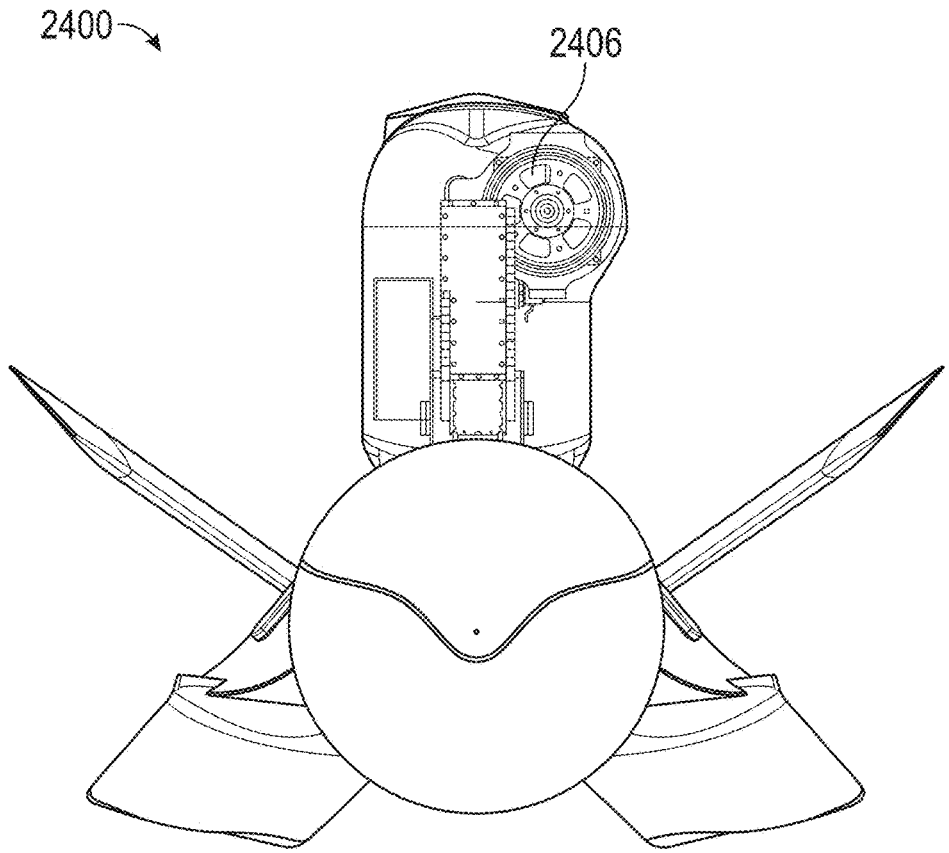
Figure 34A:
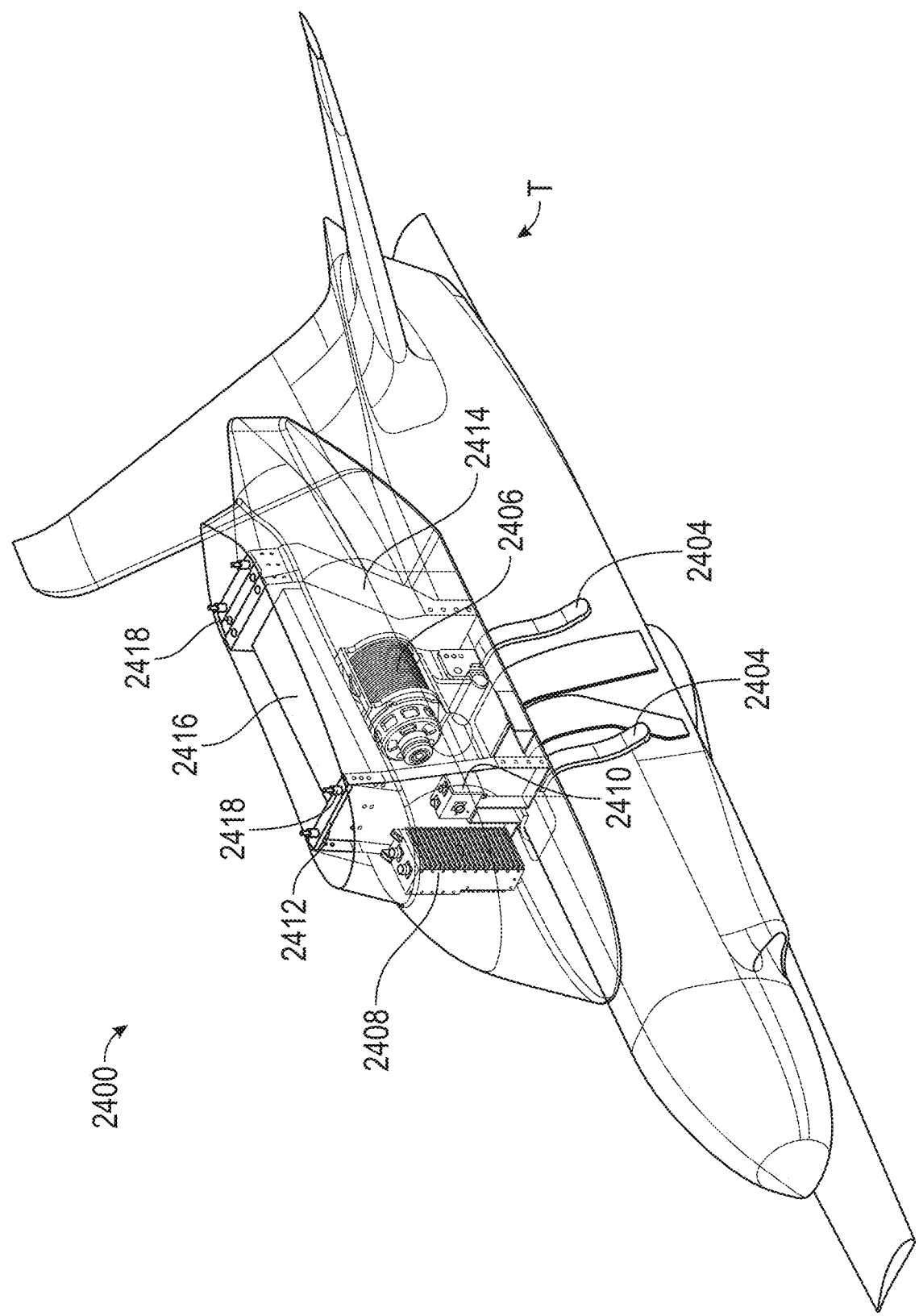
Figure 34B:
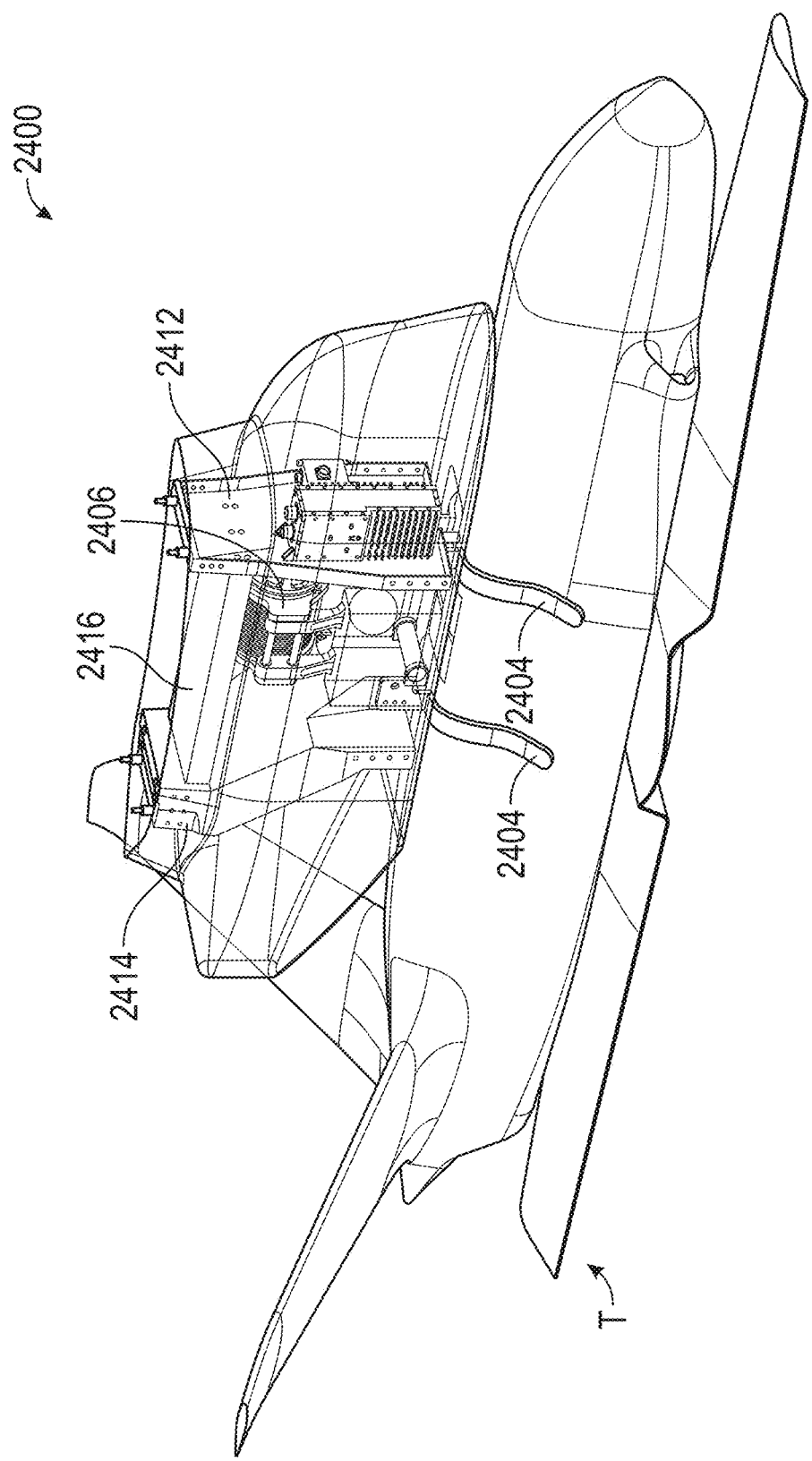
Figure 34D:
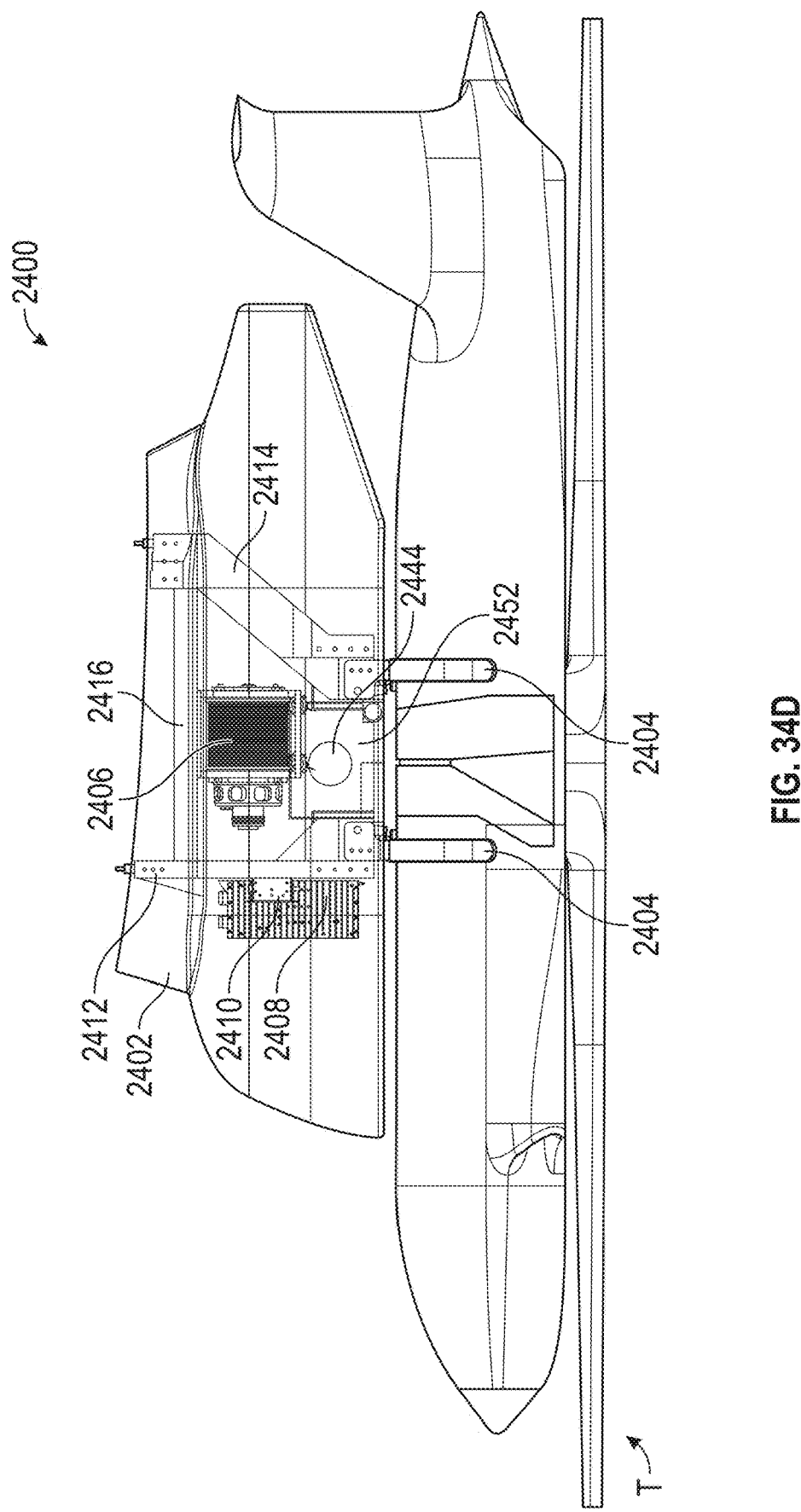

FIGS. 33A-33C illustrate features of some embodiments of the recovery pylon 2400. Any embodiments of the recovery pylon 2400 disclosed herein can include a housing 2402 (also referred to herein as fairing), one, two, three, or more sway braces 2404, a hoist 2406 (also referred to herein as a motorized winch), a driver 2408, and/or a circuit breaker module 2410 (also referred to herein as a circuit module). The driver 2408 can be used to provide power to the hoist

2406. In some embodiments, the driver 2408 can be a direct current driver. In some embodiments, the driver 2408 can output a voltage of from 50 V or about 50 V to 500 V or about 500 V, for example 270 V or about 270 V. The circuit breaker module 2410 can protect against overcurrent that could damage the hoist 2406. In the illustrated embodiment, the driver 2408 can be integrated into the recovery pylon 2400, however, it will be appreciated that in some embodiments, the driver 2408 may not be integrated into the recovery pylon 2400 and may instead be disposed in a host aircraft.

As shown in FIGS. 33A and 33B, in some embodiments, the housing 2402 can have a bottom surface that generally follows the contours of a target aircraft T. However, it will be appreciated that it is not necessary for the housing 2402 to follow the contours of the target aircraft T. In some embodiments, the housing 2402 can have a height of from 15 inches or about 15 inches to 30 inches or about 30 inches, for example 22 inches or about 22 inches. In some embodiments, the height may be constant. In some embodiments, the height may vary along a length of the housing 2402.

As shown in FIG. 33C, the housing 2402 can have a bulbous shape or a portion that protrudes outwardly, for example to accommodate the hoist 2406. In some embodiments, the housing 2402 can have a width of from 10 inches or about 10 inches to 24 inches or about 24 inches, or from 10 inches or about 10 inches to 14 inches or about 14 inches for example 12 inches or about 12 inches. In some embodiments, the width of the housing 2402 may not be constant.

FIGS. 34A-34D show views of a recovery pylon 2400 with a target aircraft T attached thereto. In FIGS. 34A-34D, the housing of the recovery pylon 2400 is transparent to provide a view of components therein. The recovery pylon 2400 can include one, two, three, or more sway braces 2404, a hoist 2406, a driver 2408, and/or a circuit breaker module 2410. A towline 2422 can be affixed to the hoist 2406 such that the towline 2422 can be reeled out and/or reeled in during aerial recovery operations. The recovery pylon 2400 can include various structural features. For example, in FIGS. 34A-34D, any embodiments of the recovery pylon 2400 can include a forward bulkhead 2412, an aft bulkhead 2414, and a connecting member 2416. The forward bulkhead 2412, aft bulkhead 2414, and connecting member 2416 can be the main structural components of the recovery pylon 2400. In other embodiments, the pylon 2400 can include other structural or support components. The forward bulkhead 2412 and aft bulkhead 2414 can include attachment features 2418 (e.g., mounting holes) for securing the recovery pylon 2400 to a host aircraft. In some embodiments, the forward bulkhead 2412 and/or the aft bulkhead 2414 can include multiple attachment features 2418, for example to accommodate attachment of the recovery pylon 2400 to different wings that may have different attachment points. The recovery pylon 2400 can include a fitting 2444 that can be used to mount various components. A fitting 2444 can be attached to a towline and can be stored in the recovery pylon 2400 when not in a deployed state.

As shown in FIGS. 34A-34D, the recovery pylon 2400 can include a roller 2420. During a reel in or reel out procedure, the towline 2422 can pass over the recovery pylon 2400. The recovery pylon 2400 can define and/or place a lower limit on the bend radius of the towline 2422. For example, it can be desirable to limit the amount of bending in the towline 2422 to prevent premature wear of the towline 2422, which could lead to increased maintenance costs, failure during operation, and so forth.

Figure 35A:
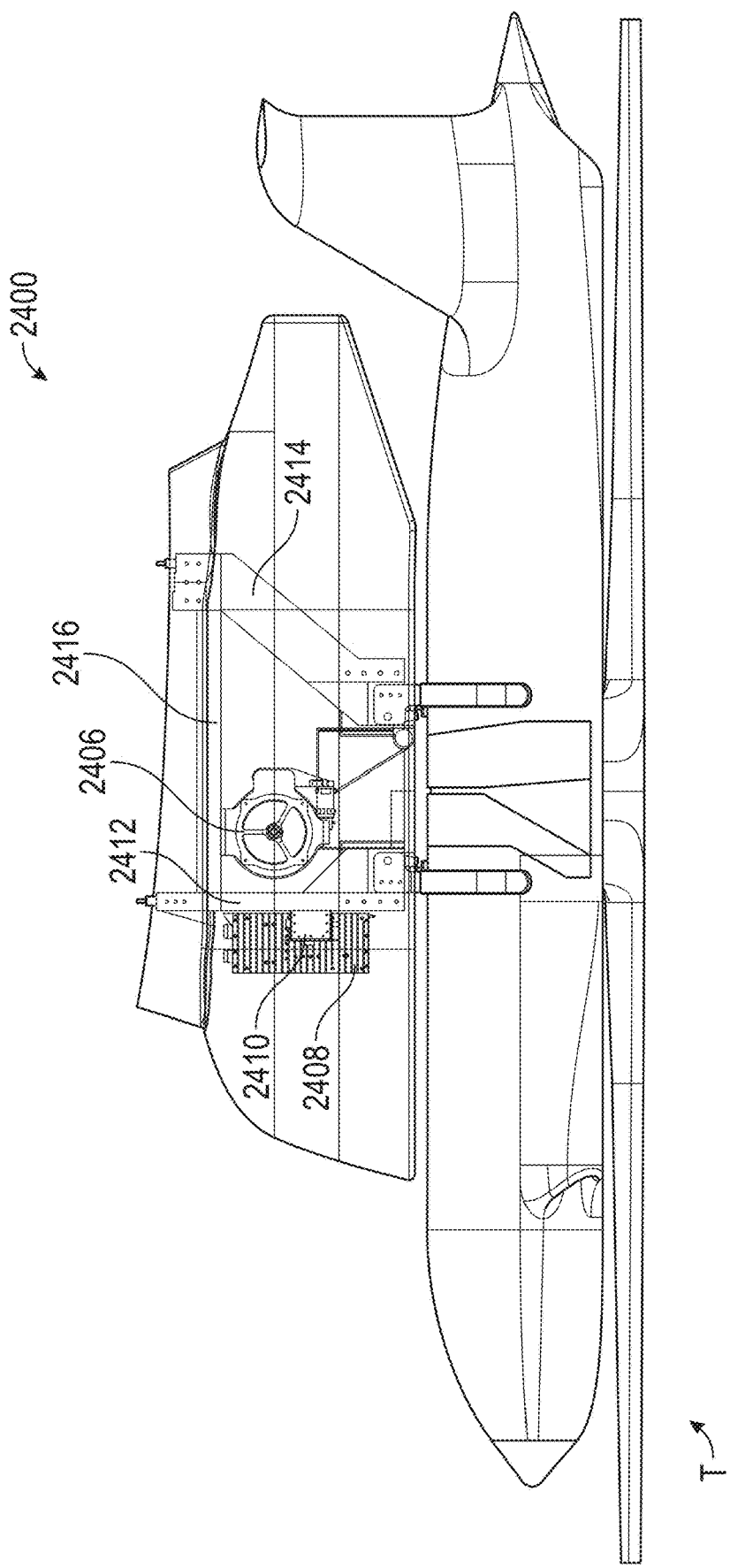
Figure 35B:
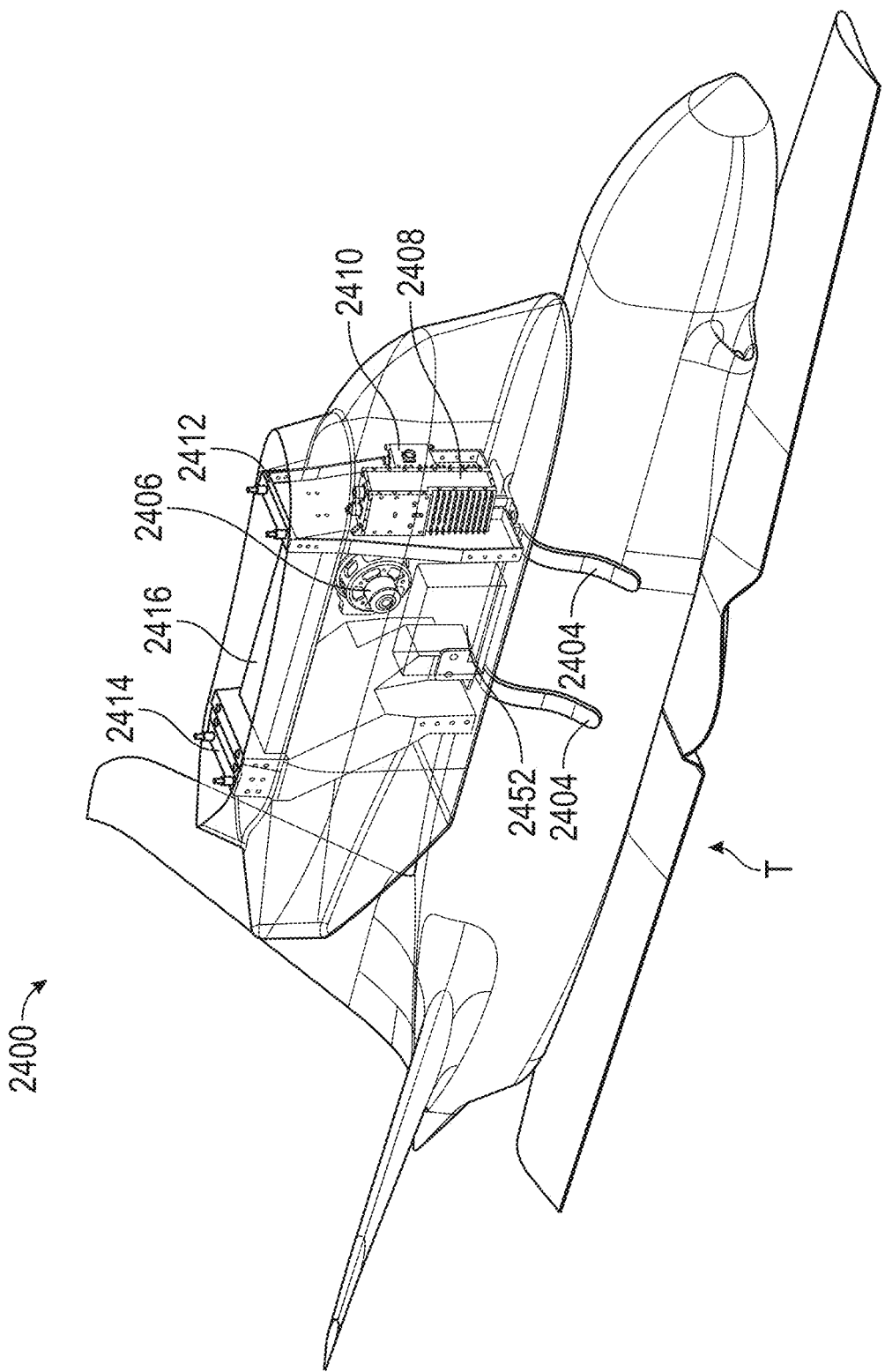

FIGS. 33A-34D illustrate an example implementation of the recovery pylon 2400 in which the hoist 2406 is in a longitudinal orientation. In some embodiments, the hoist 2406 may instead have a lateral orientation. FIGS. 35A-35C illustrate an example recovery pylon 2400 in which the hoist 2406 has a lateral orientation. The configuration depicted in FIGS. 35-A-35C is generally similar to that shown in FIGS. 33A-34D and can operate in a similar manner as described in more detail herein. A lateral hoist implementation can have several advantages, such as ensuring the towline always or almost always approaches a roller at the same angle or a similar angle. In contrast, when the hoist is oriented longitudinally, the angle at which the towline contacts the roller can change significantly over time as the towline is reeled out and/or reeled in, which can result in undesirable bending of the towline. Any embodiments herein can include a rack unit 2452 as illustrated in FIG. 35B.

Figure 36:
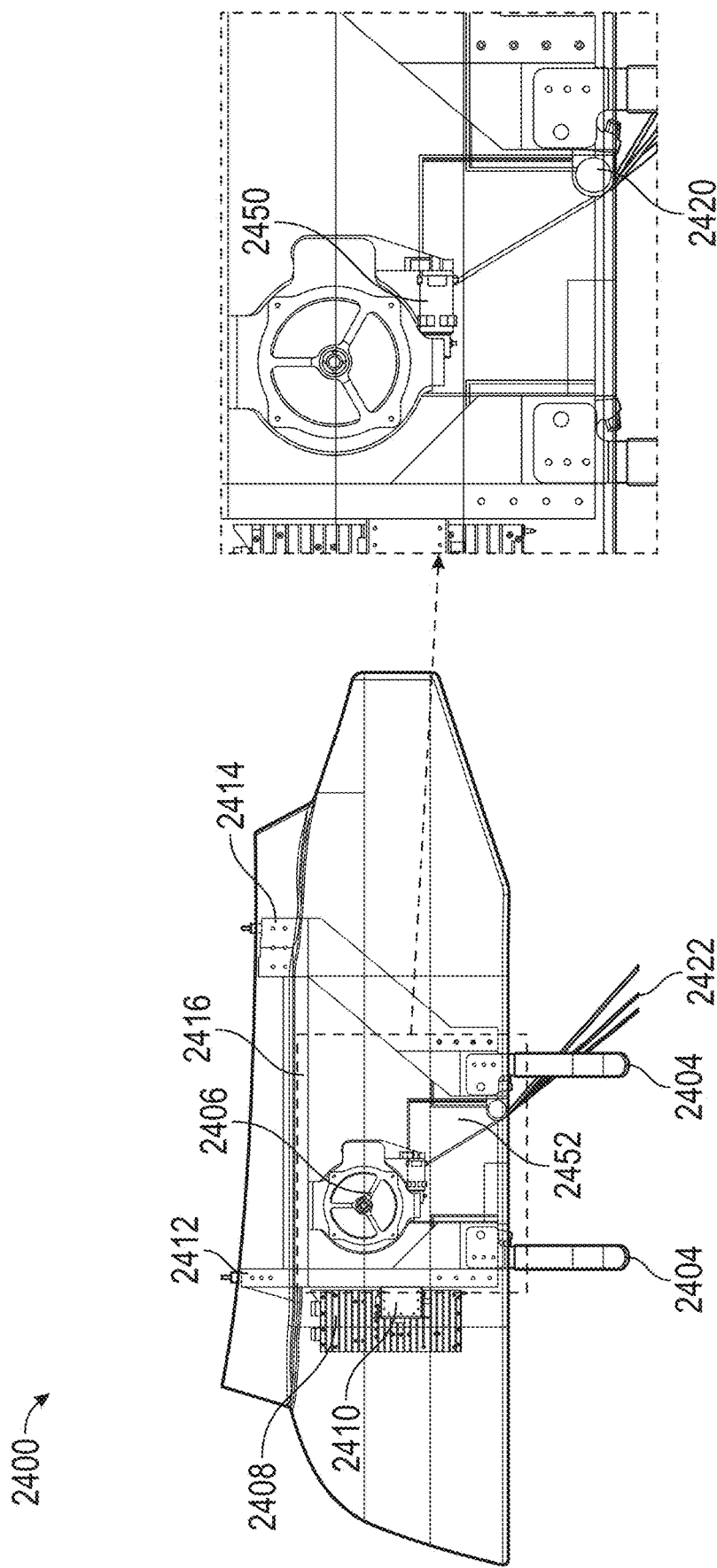
FIG. 36 is a side view of a recovery pylon and components thereof according to some embodiments.

FIG. 36 illustrates an example embodiment in which the hoist 2406 is laterally oriented (i.e., an axis of rotation of the hoist points in a lateral direction that is generally perpendicular to a longitudinal axis of the pylon 2400 and a direction of flight of the host aircraft). As shown in FIG. 36, a cable cutter 2450 can be included. The cable cutter 2450 can be included in any embodiment. The cable cutter 2450 can be used to cut the towline 2422 in various circumstances. For example, if the towline 2422 becomes tangled, a target aircraft attached to the towline loses control (for example, begins tumbling, swaying, rotating, or otherwise moving in a manner that would make aerial recovery dangerous), and so forth, the cable cutter 2450 can be used to cut the towline 2422 to free the target aircraft from the host aircraft.

Figure 37A:
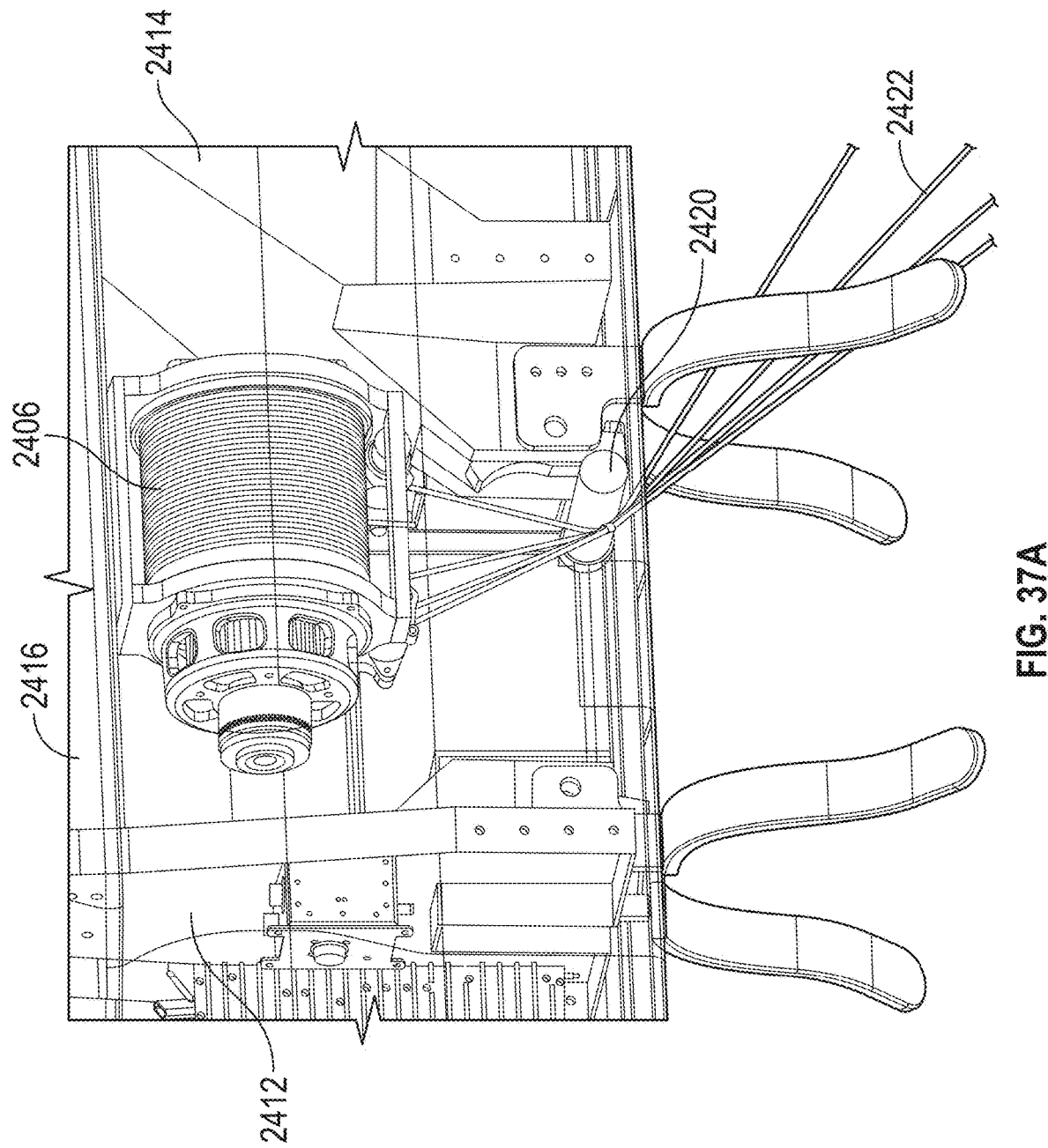
FIGS. 37A and 37B are perspective views that illustrate towline shapes for a longitudinally oriented hoist and a laterally oriented hoist, respectively, according to some embodiments.
Figure 37B:
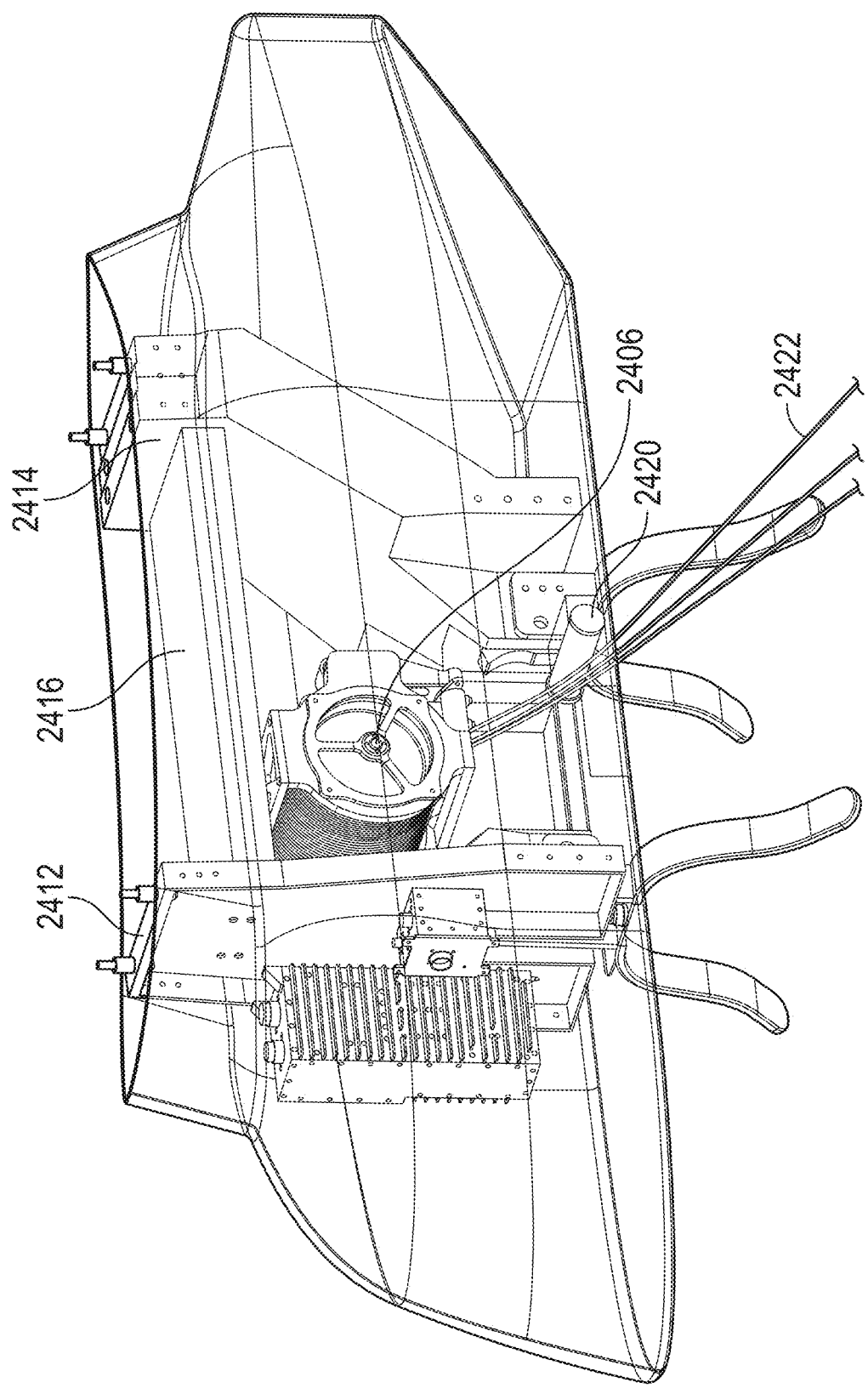

FIGS. 37A and 37B illustrate a towline at various stages of deployment when a hoist is oriented longitudinally and laterally, respectively. As shown in FIG. 37A, when the hoist 2406 is oriented longitudinally, the angle at which the towline 2422 contacts the roller 2420 can vary significantly, resulting in significant changes in the orientation of the roller 2420. For example, when the towline is unreeled from the hoist at a point near the forward end of the hoist, the towline can be nearly straight as it passes over the roller 2420. However, when the towline is unreeled near an aft point of the hoist 2406, the level of bending of the towline 2422 can be significantly greater. Such bending of the towline 2422 can result in wear on the towline 2422, which can lead to premature failure. In FIG. 37B, the hoist 2406 is oriented laterally. In this configuration, the position of the towline 2422 with respect to the roller 2420 changes relatively minimally as the towline 2422 is reeled in and out.

Figure 38:
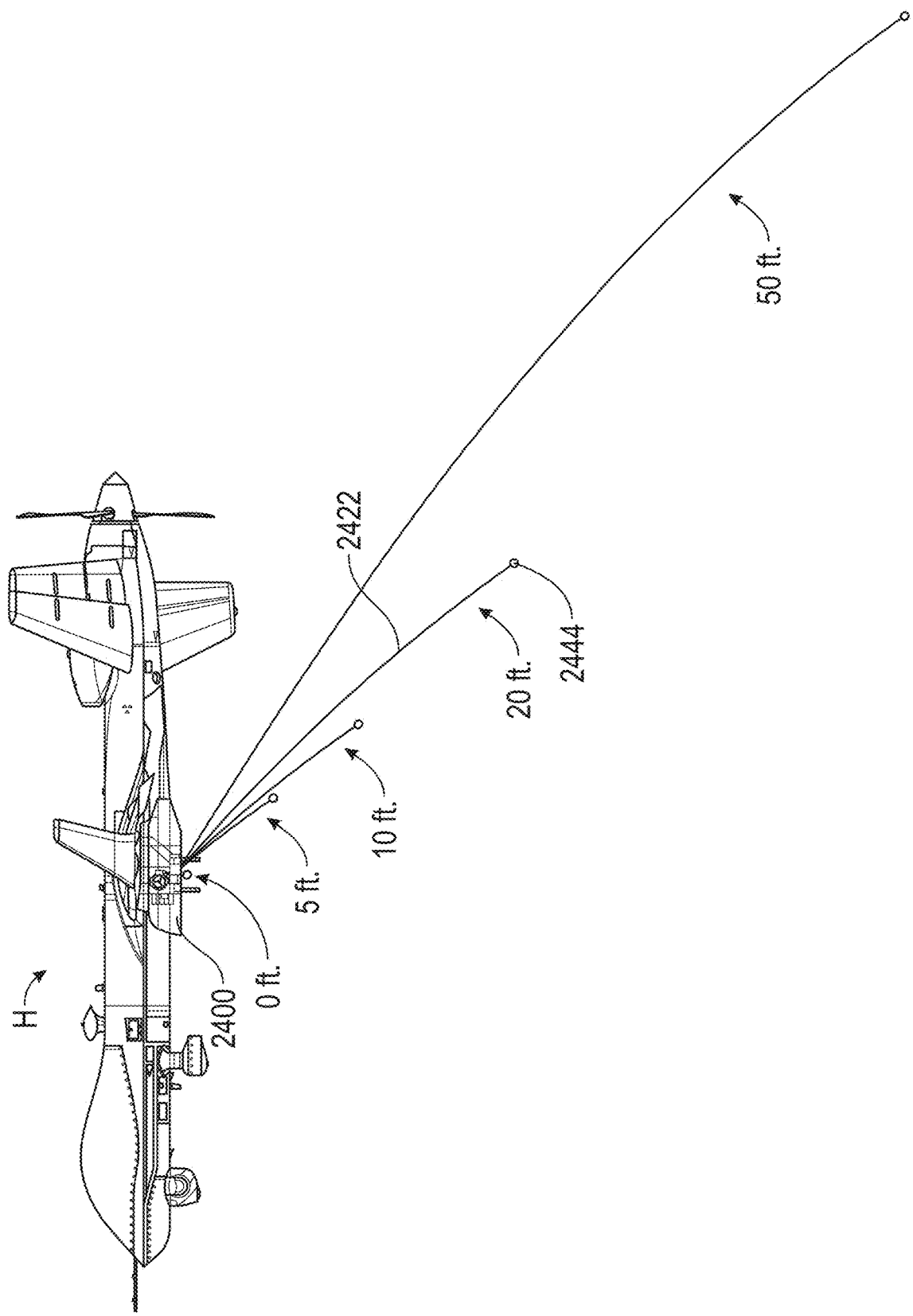
FIG. 38 is a side view of a host aircraft having a recovery pylon and a towline and fitting extending therefrom, according to some embodiments.

The bending of the towline around the roller can be especially pronounced when a towline is reeled out to a relatively long distance. As shown in FIG. 38, the angle of a towline 2422 with respect to a host aircraft H can increase as the towline is reeled farther out. The towline 2422 can include a weighted end fitting 2444. The towline width, weight of the towline 2422, weight of the fitting 2444, diameter of the fitting 2444, shape of the fitting 2444, and so forth can influence the location of the fitting 2444 with respect to the host aircraft H, and in some cases the fitting 2444 can be dragged significantly aft of the host aircraft H.

Figure 39:
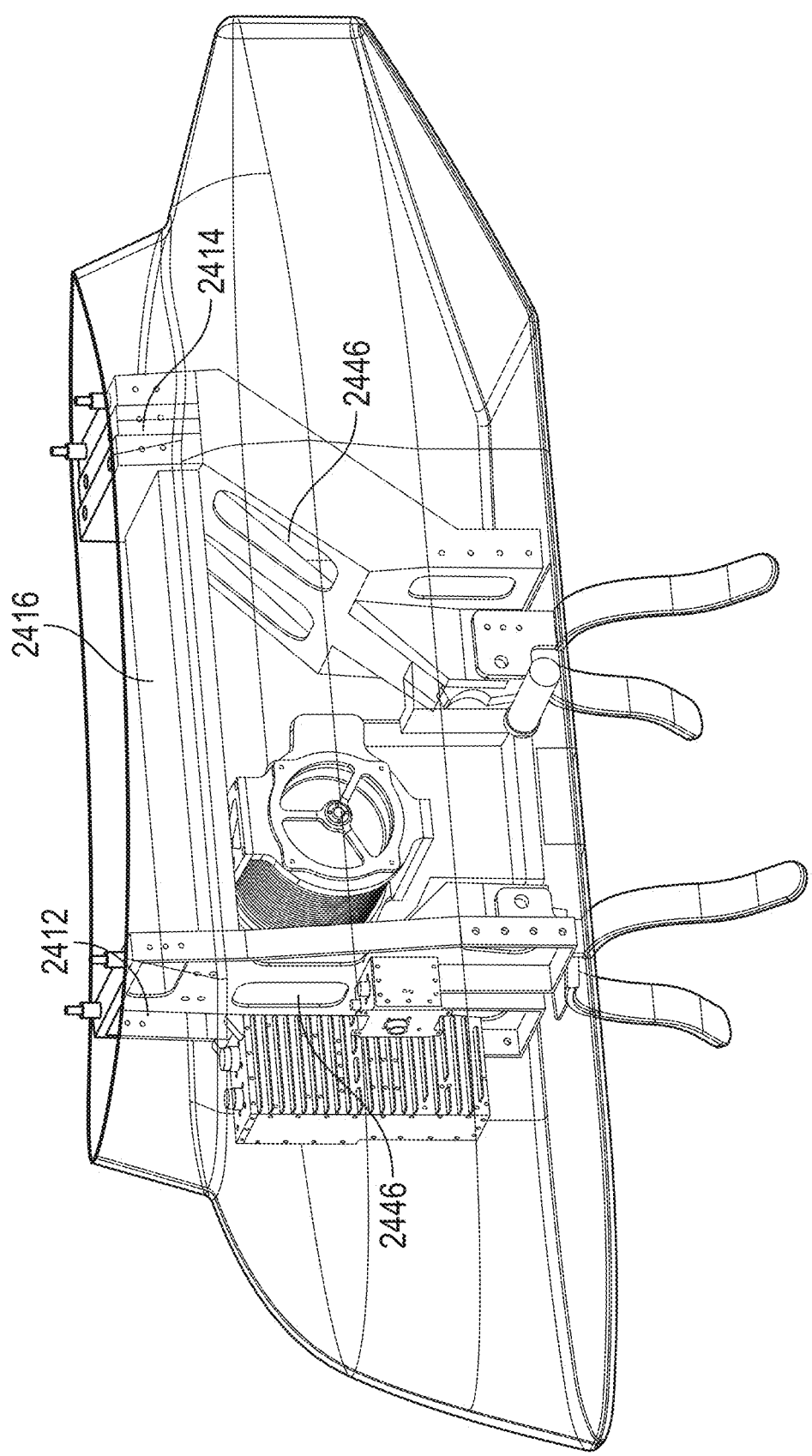
FIG. 39 is a perspective view of a recovery pylon having passthroughs according to some embodiments.

FIG. 39 illustrates another embodiment of a recovery pylon 2400. While the hoist 2406 is shown in a lateral orientation in FIG. 39, the features of FIG. 39 can be implemented in any embodiment disclosed herein, including and without limitation, a recovery pylon having a longitudinally mounted hoist. As shown in FIG. 39, in some embodiments, the forward bulkhead 2412 and/or the aft bulkhead 2414 can have one or more or a plurality of cutouts 2446. In some embodiments, the cutouts 2446 can be used as cable passthroughs. In some embodiments, the cutouts 2446 can be used to reduce the weight of the bulkheads.

In some embodiments, the sway braces 2404 can be mounting to the bulkheads at attachment points 2448. In some embodiments, the forward bulkhead 2412 and/or the aft bulkhead 2414 can have mounting features for attaching the housing 2402 (also referred to herein as fairing) to the bulkheads. As mentioned above, in some embodiments, the forward bulkhead 2412 and/or aft bulkhead 2414 can have attachment features 2418 that, in some embodiments, can be designed to accommodate a variety of hardpoint spacings on a host aircraft.

Figure 40:
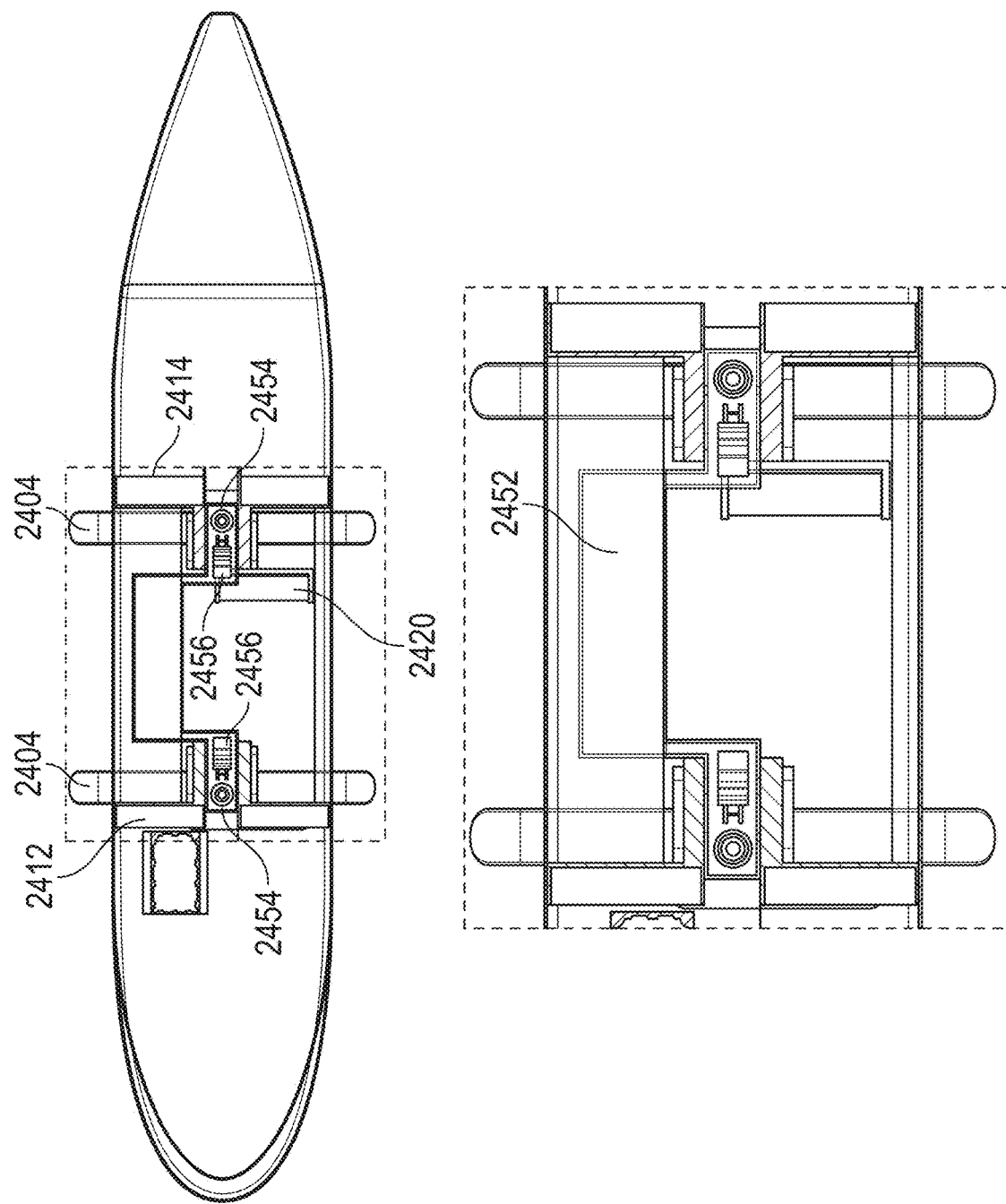
FIG. 40 is a top-down view of a recovery pylon and components thereof according to some embodiments.
Figure 41:
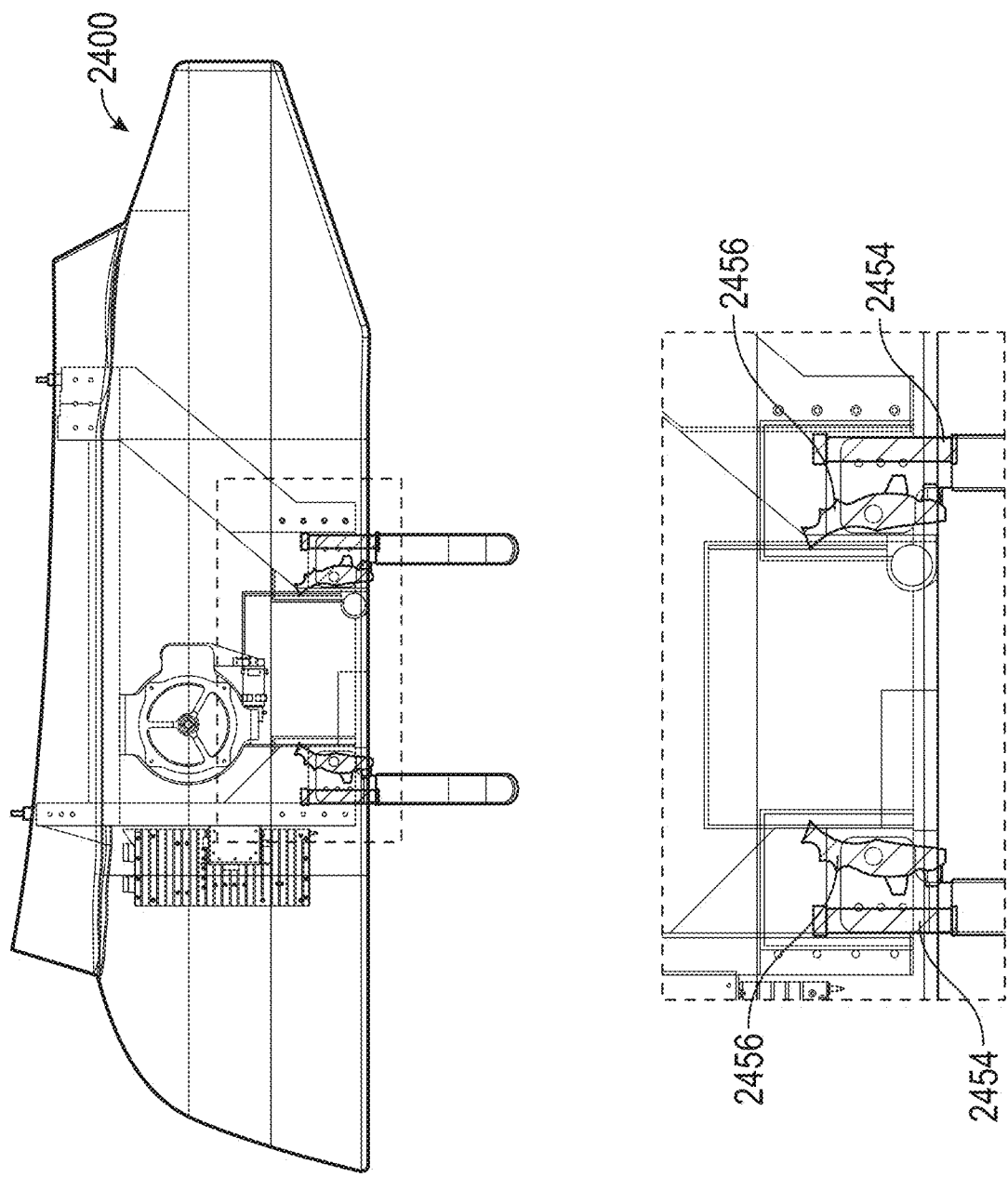
FIG. 41 is a side view of a recovery pylon and components thereof according to some embodiments.

FIG. 40 illustrates a top down view of some components of the pylon 2400 according to some embodiments. In FIG. 40, the hoist is omitted for clarity. FIG. 41 illustrates a side view of some components of the recovery pylon 2400 according to some embodiments. As shown in FIGS. 40 and 41, the recovery pylon 2400 can include rack unit 2452 that includes provisions for integration with bulkheads 2412 and 2414, sway braces 2404, and a cable roller 2420. The rack unit can have a shape such that a cavity 2468 can be provided within the recovery pylon 2400 to contain a hoist, towline, and fitting (not shown) such that the towline can be released through a center portion of the recovery pylon 2400. In some embodiments, ejectors 2454 and/or hooks 2456 can be affixed to the rack unit 2452.

In some embodiments, the hooks 2456 can be in a normally closed state. It will be appreciated that hooks in any other embodiment can also operate in a normally closed state. For example, the hooks can be normally positioned in the closed state such that, if present, the hooks would be engaged with lugs on a target aircraft such that the target aircraft would be mechanically coupled to the host aircraft via the hooks and lugs. During a recovery process, the hooks 2456 can be moved to an open position in order to capture a target aircraft or allow the target aircraft to move completely into engagement with the pylon. Once captured, the actuator controlling the hooks can be released such that the hooks return to a closed position. Such an approach can be desirable because, for example, in the event of a component failure (e.g., failure of an actuator or other means of moving the hooks), the hooks would remain in a closed state, thereby avoiding undesired release of a target aircraft from a host aircraft. As discussed elsewhere herein, in some embodiments, the ejectors 2454 can be configured to deploy simultaneously or to deploy in a sequential manner during release of a target aircraft. Additionally, in any embodiments, the hooks can also be configured to be disengaged from the lugs of the target aircraft or moved to the open position simultaneously or to be disengaged or moved to the open position in a sequential manner (e.g., forward hook first, then aft hook) during release of a target aircraft. In any embodiments, the hooks can be configured to be engaged with the lugs of the target aircraft or moved to the close position simultaneously or sequentially, though simultaneously may be preferred.

Figure 42:
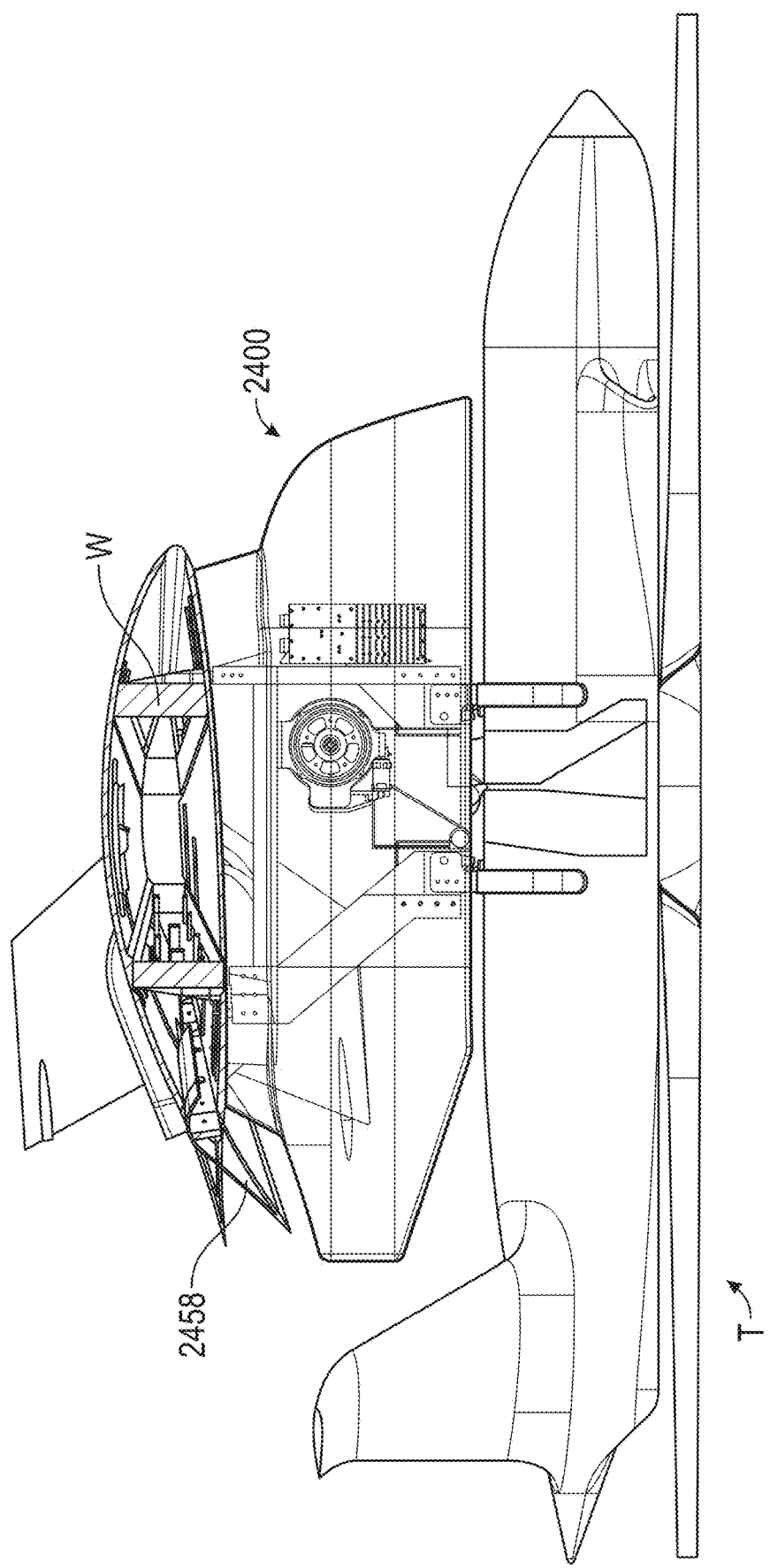
FIG. 42 is a side view illustrating the positioning of a recovery pylon and target aircraft with respect to a wing of a host aircraft according to some embodiments.

As mentioned above, it can be important to consider the host aircraft when designing a recovery pylon. For example, in some embodiments, the recovery pylon and target aircraft should not exceed a maximum load that a wing of the host aircraft can support. The recovery pylon should not interfere with control surfaces of the wings of the host aircraft. FIG. 42 shows an example of a pylon 2400 attached to a wing W according to some embodiments. The wing W in FIG. 42 can be relatively narrow compared to some other wings. As shown in FIG. 42, the pylon 2400 can be shaped such that the pylon does not interfere with wing control surfaces.

FIG. 43 shows an example of a pylon 2400 attached to a wing W of a host aircraft. The wing of FIG. 43 can be larger than the wing of FIG. 42. As shown in FIG. 43, it can be important to ensure that when a target aircraft T is secured to the recovery pylon 2400, the target aircraft (e.g., tail features of the target aircraft) do not interfere with control surfaces of the wing W. For example, in FIG. 43, a minimum clearance c can be maintained between the control surface 2458 and the tail 2460. The minimum clearance c can be, for example, 1 inch or about 1 inch or more, for example 1.6 inches or about 1.6 inches.

Figure 44C:
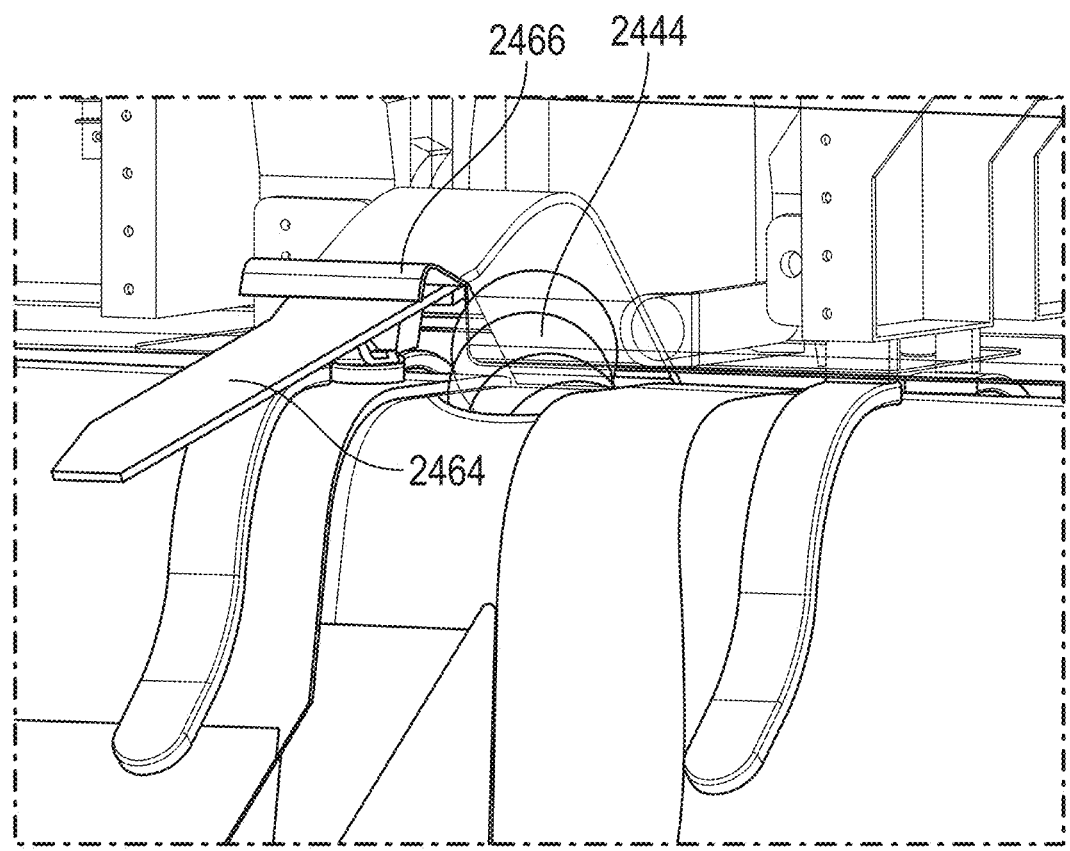

FIGS. 44A-44F illustrate an example recovery process according to some embodiments. While a laterally oriented hoist is depicted in FIGS. 44A-44G, it will be appreciated the same or a similar process can also be used in the case of a longitudinally oriented hoist. In FIG. 44A, the towline 2422 is attached to a target aircraft T and is being reeled in by the hoist 2406. In FIG. 44A, the ejectors 2454 are in a deployed position (also referred to herein as an extended position). The ejectors 2454 can provide cushioning or otherwise help prevent harsh collisions between a host aircraft and the target aircraft. In some embodiments, the ejectors 2454 may not be used and other features (not shown) such as shocks may be used instead. In some embodiments, such features may not be present.

In FIG. 44B, the target aircraft T has been reeled in toward the pylon so as to be engaged with and secured to the recovery pylon 2400 via hooks 2456 that are engaged with lugs 2462 of the target aircraft T. In FIG. 44B, the fitting 2444 is still captured by the capture mechanism of the target aircraft T (e.g., is positioned inside the capture mechanism and/or fuselage of the target aircraft T). In some embodiments, the target aircraft T can be raised past its resting position when secured to the recovery pylon 2400 and the hooks 2456 can be deployed to a closed state. The target aircraft T can drop down and hooks 2456 can engage with the lugs 2462.

In FIG. 44C, a movable flap 2464 of the target aircraft T can open so that the fitting 2444 can be disengaged from and lifted from the fuselage of the target aircraft T and retracted into the recovery pylon 2400. As shown in FIG. 44C, the housing 2402 of the recovery pylon 2400 can include a moveable portion 2466 to enable the movable flap 2464 to open, as otherwise movement of the movable flap 2464 may be restricted by the housing of the recovery pylon.

Figure 44D:
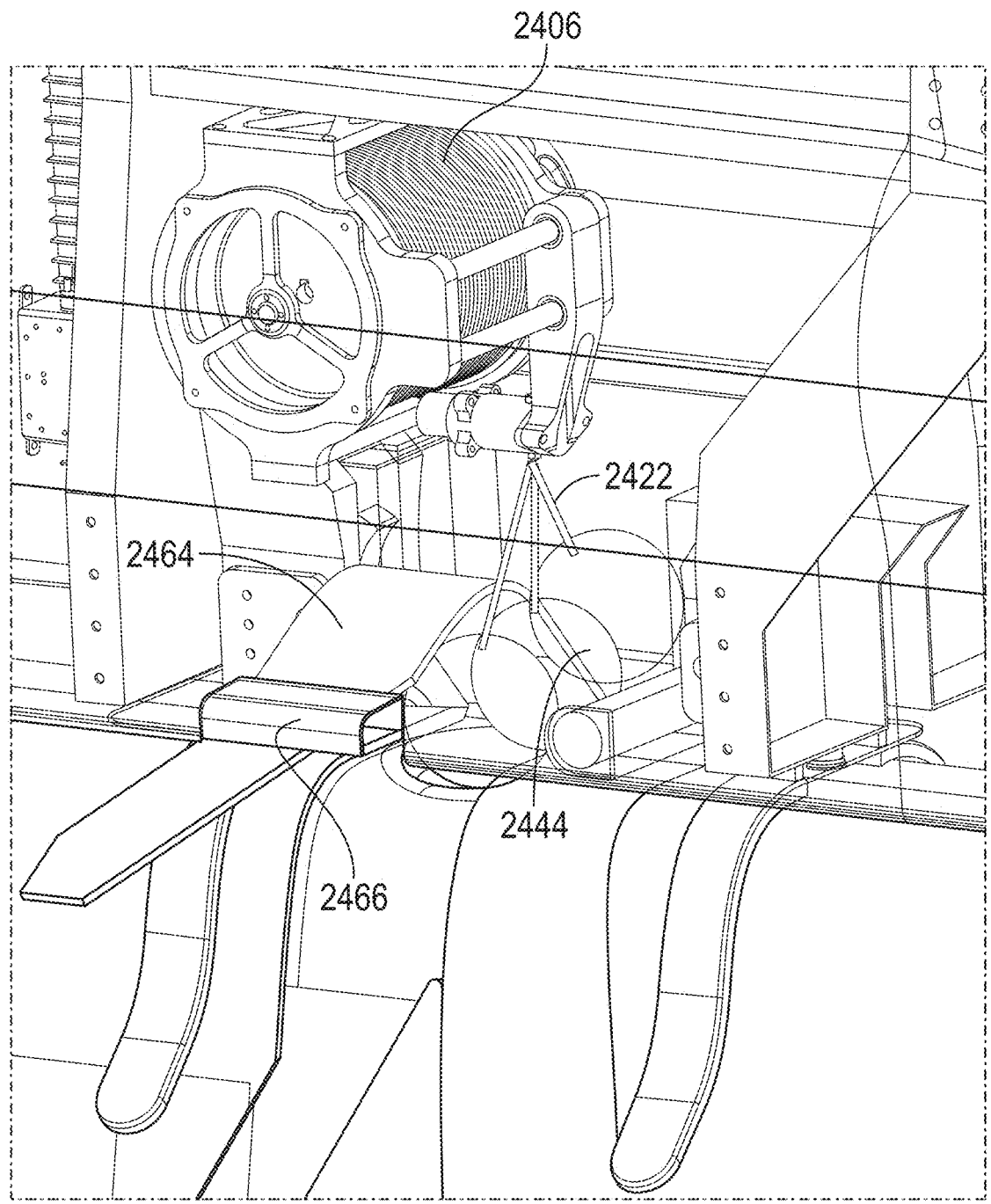
Figure 44E:
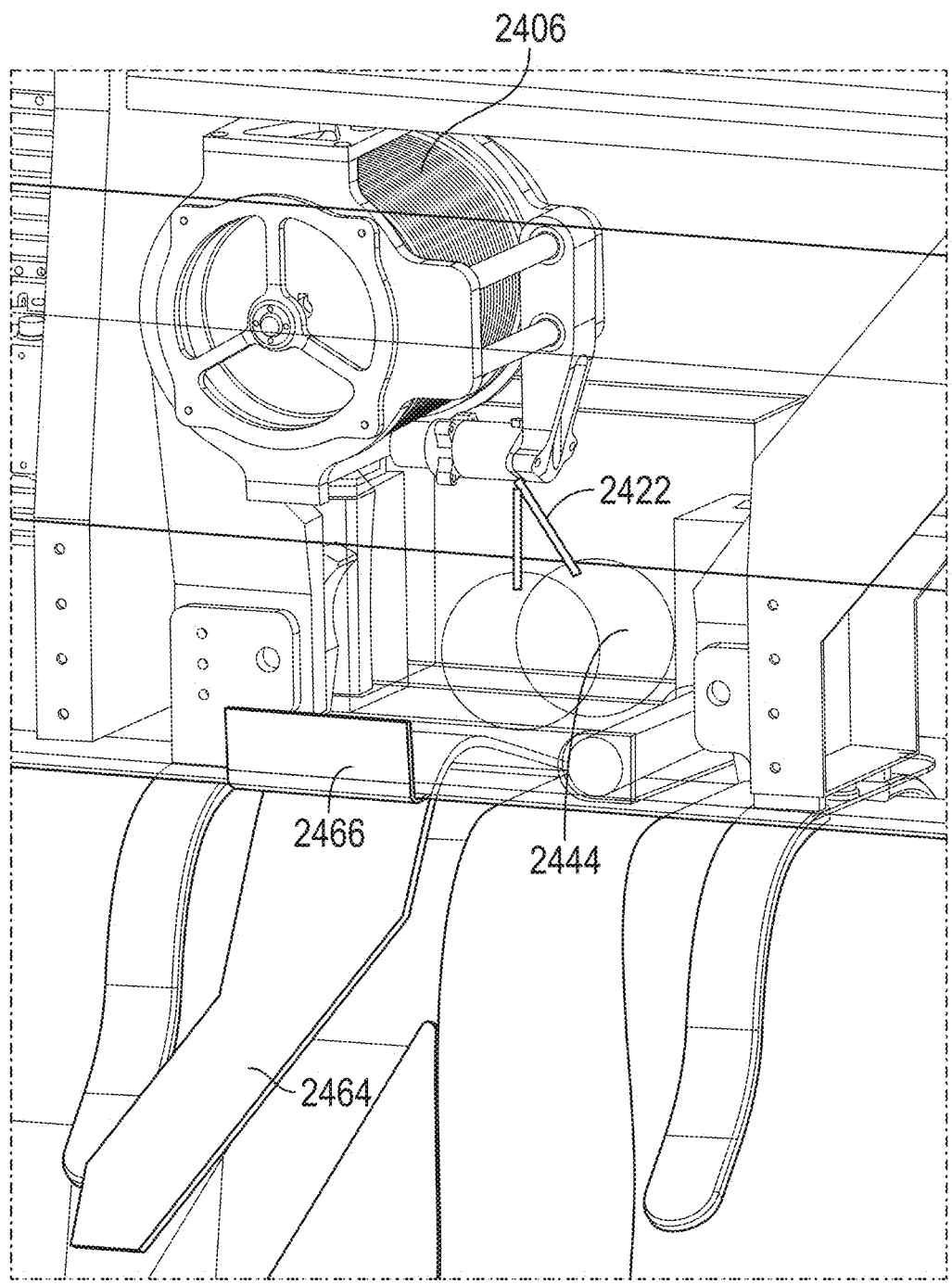
Figure 44F:
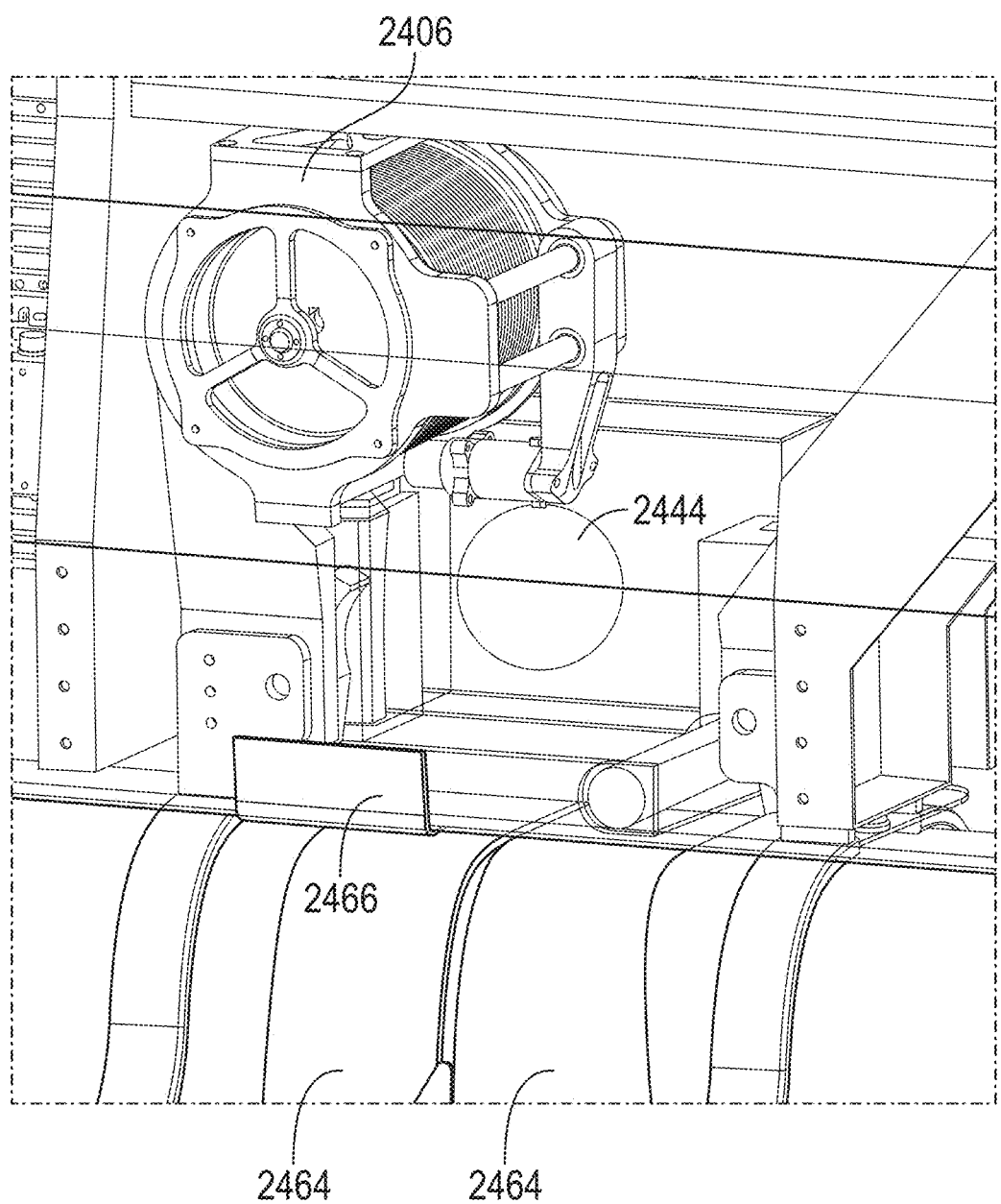

In FIG. 44D, the fitting 2444 can be rotated around the open movable flap 2464. In FIG. 44E, the movable flap 2464 can close and the moveable portion 2466 can return to a closed position. In some embodiments, the moveable portion 2466 can be opened and closed using an actuator or other control mechanism. In some embodiments, the moveable portion 2466 can be maintained in a normally closed position, for example using springs, hydraulics, elastic materials, or other actuators or otherwise, and the moveable portion 2466 can be pushed open by the movable flap 2464. In FIG. 44E, the fitting 2444 can be positioned inside the recovery pylon and the movable flap 2464 can return to a closed position, which can allow closing of the moveable portion 2466. In FIG. 44F, the hoist 2406 can reel in the towline 2422 to place the fitting 2444 in a resting position within the recovery pylon.

Figure 45A:
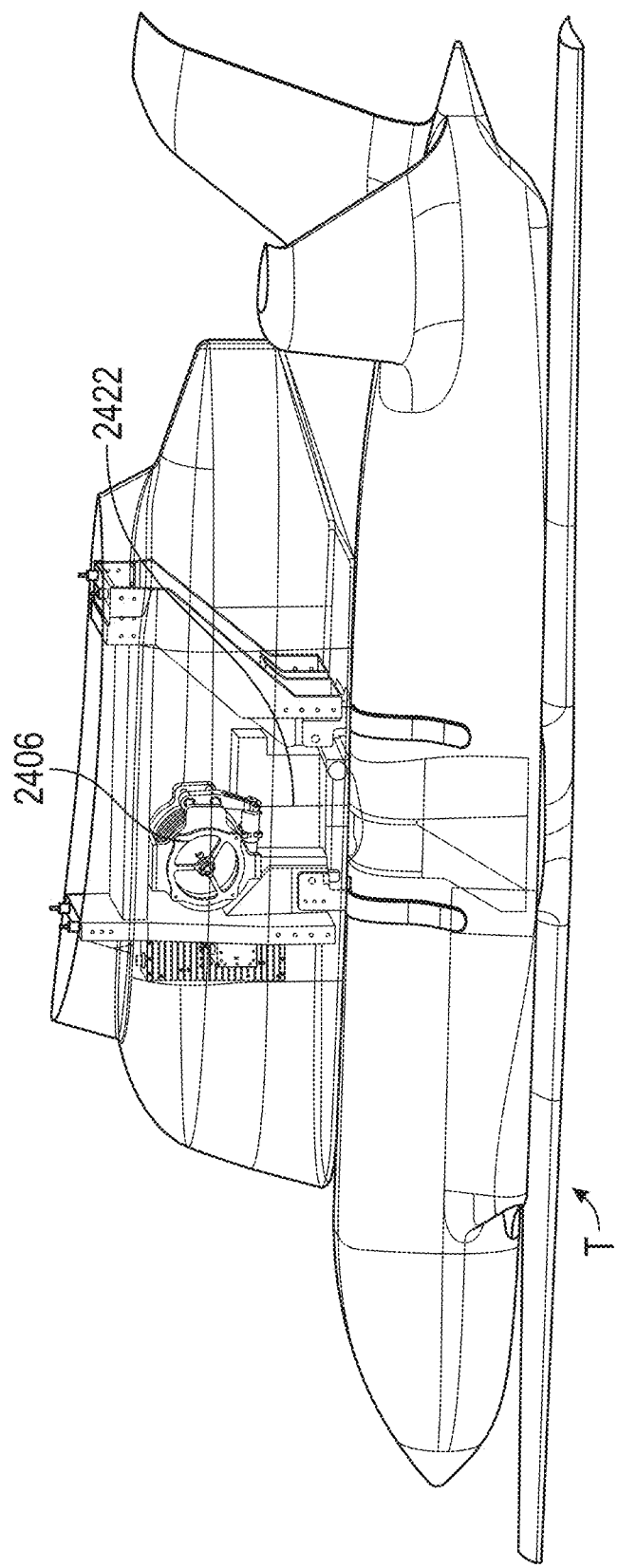

FIGS. 45A-45B illustrate an example of a target aircraft affixed to a recovery pylon. In FIGS. 45A-45B, the fitting 2444 has not been lifted from the target aircraft T to the recovery pylon 2400. As shown in FIGS. 45A and 45B, the hooks 2456 are engaged with the lugs 2462.

In some embodiments, a hoist can have a weight of from 40 pounds or about 40 pounds to 60 pounds or about 60 pounds. In some embodiments, a driver can have a weight of from 5 pounds or about 5 pounds to 10 pounds or about 10 pounds. In some embodiments, a circuit breaker module can have a weight of 0.5 pounds or about 0.5 pounds to 1 pound or about 1 pound. In some embodiments, a rack unit can have a weight of 15 pounds or about 15 pounds to 30 pounds or about 30 pounds. In some embodiments, bulkheads and the connecting member can have a total weight of 15 pounds or about 15 pounds to 40 pounds or about 40 pounds. In some embodiments, the bulkheads and connecting member can have a greater weight when configured for the capture of a relatively large aircraft (e.g., a Predator B aircraft) as compared to when configured to capture a smaller aircraft (e.g., an Eaglet aircraft). In some embodiments, the housing of a recovery pylon can have a weight from 5 pounds or about 5 pounds to 40 pounds or about 40 pounds. The weight of the housing can depend on the overall size of the recovery pylon. For example, a recovery pylon for capturing larger aircraft can be relatively large and the weight of the housing can be greater than the weight of the housing of a recovery pylon used for capturing smaller aircraft. For example, the housing for a recovery pylon for capturing an Eaglet can have a weight of 10 pounds or about 10 pounds, while the housing for a recovery pylon for capturing a Predator B can have a weight of 24 pounds or about 24 pounds.

Aircraft Capture Example Processes

A target aircraft can be captured in a variety of manners as discussed herein. Below, examples of aircraft approaches are described. It will be appreciated that these are merely examples, and other approaches are possible consistent with this disclosure.

Figure 46:
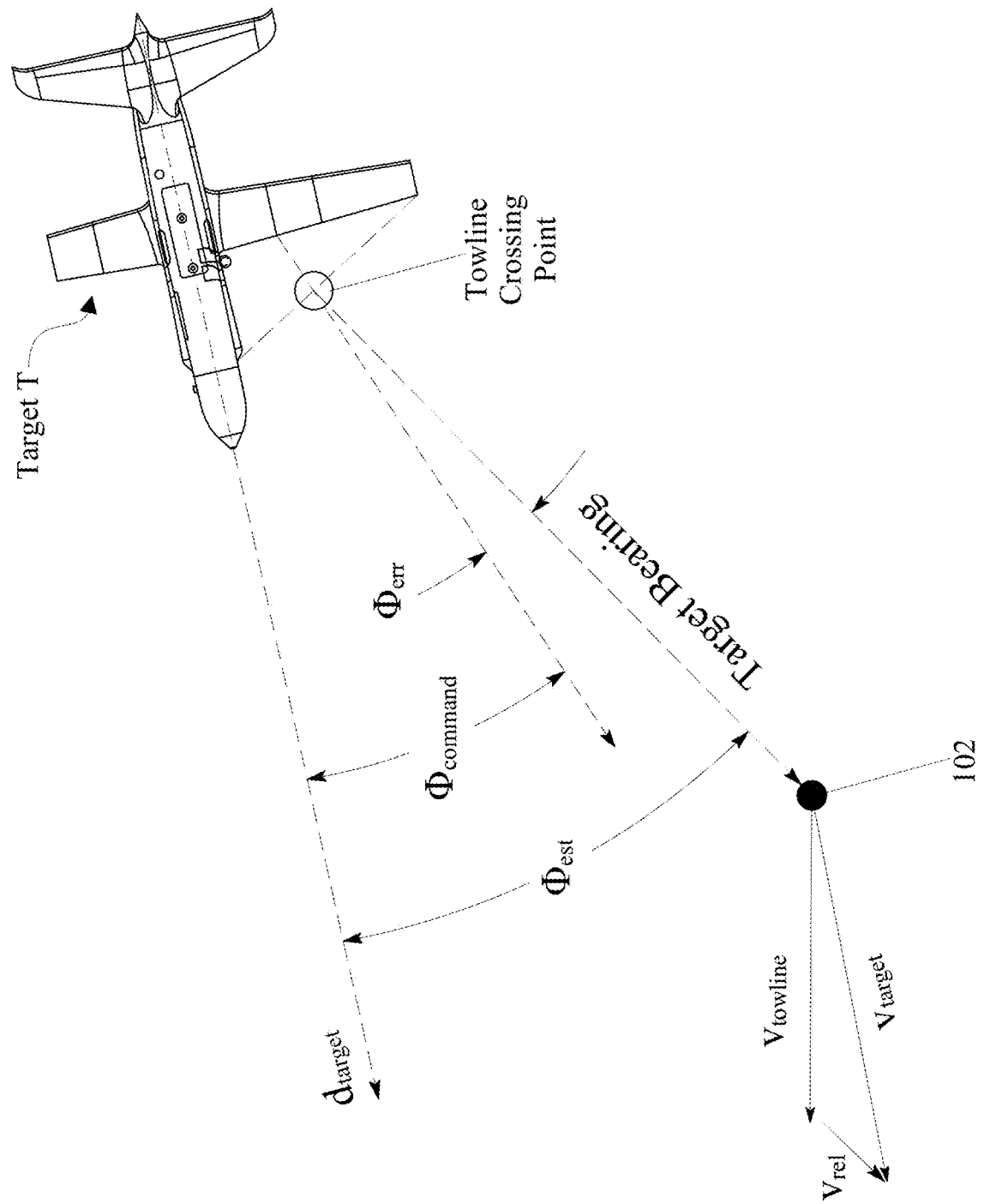
FIGS. 46 and 47 illustrate example embodiments of recovery approaches.

FIG. 46 illustrates a horizontal guidance scheme according to some embodiments. As shown in FIG. 46, a target aircraft can use the indicated sections of the fuselage and wing to define a catch basket for capturing a towline. The catch basket can include a segment of a wing edge and/or a segment of fuselage that the towline can move along (e.g., slide along) in order to align the towline 102 and fitting with the capture mechanism 100.

The target aircraft T can have a velocity $\vec{v}_{target}$ with direction $\vec{d}_{target}$. The towline 102 can have a velocity $\vec{v}_{towline}$. The relative velocity $\vec{v}_{rel}$ of the towline and target can be determined from the difference in $\vec{v}_{target}$ and $\vec{v}_{towline}$. A control system can direct the target aircraft to navigate to the towline 102 by commanding the target aircraft to turn to drive the estimated relative bearing of the towline $\varphi_{est}$ to match the commanded value $\varphi_{command}$, e.g., by commanding the target aircraft to perform a roll maneuver. In some embodiments, an estimated position and/or orientation of the target aircraft at the time of contact with the towline 102 can be used for navigating the target aircraft. The bearing and speed of the target aircraft can be adjusted over time so that the target aircraft changes heading at a desired rate and reaches the towline 102 from a desired direction at a speed that is within acceptable limits. A similar approach can be used for both horizontal and vertical navigation. For example and without limitation, in some embodiments, horizontal navigation may rely predominantly on roll commands to direct the target aircraft, while vertical navigation can rely primarily on vertical acceleration commands. In some embodiments using vertical towlines, the target aircraft can be configured to capture the towline some distance above the end fitting. For example, the target aircraft can be configured to capture the towline 3 feet or about 3 feet, 5 feet or about 5 feet, 10 feet or about 10 feet, or 15 feet or about 15 feet above the end fitting, or at any position between these positions, or more or less as may be desirable.

Figure 47:
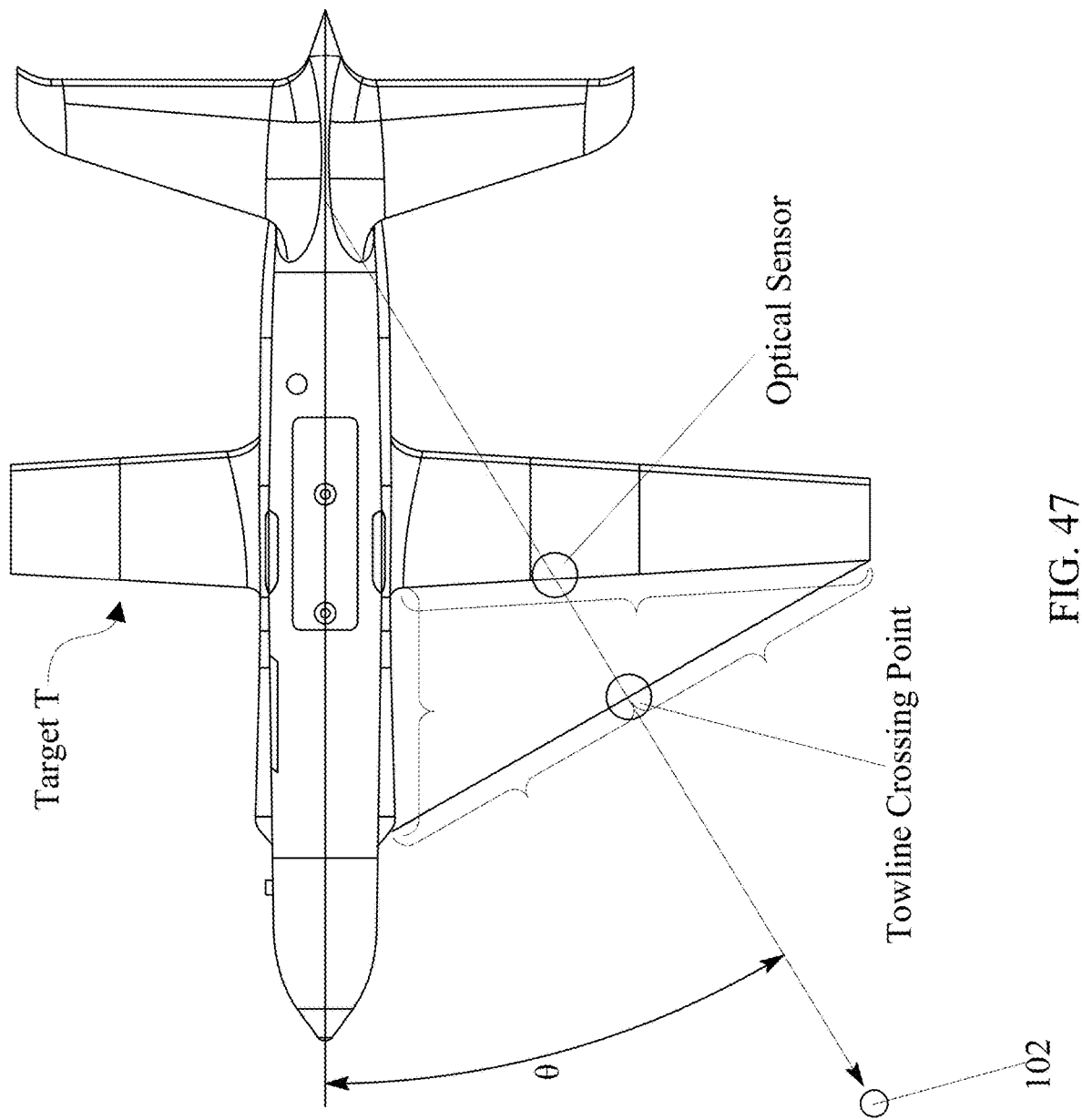

FIG. 47 illustrates a top-down view of an example of an approach according to some embodiments. As shown in FIG. 47, in some cases the target aircraft T can approach the towline at a relative approach angle θ. The relative approach angle θ can be, for example, from about 0° to about 40°, for example about 15° to about 30°. In some embodiments, the target aircraft can be equipped with one or more sensors for detecting the towline. For example, the target aircraft can have an optical sensor, LIDAR system, etc., mounted on the wing, on the fuselage, or elsewhere on the target aircraft that can detect the relative location and velocity of the towline. In some embodiments, such sensors may not be present, and the target aircraft can navigate using, for example, GPS location data, inertial measurement unit data, and so forth. In some embodiments, the target aircraft can have a proximity sensor disposed at or near the capture mechanism 100, for example as described above with reference to FIG. 7. In some embodiments, the proximity sensor can be an inductive sensor. For example, the towline and/or the fitting can be conductive (or contain conductive portions) that interact with a magnetic field provided by the proximity sensor.

Figure 48:
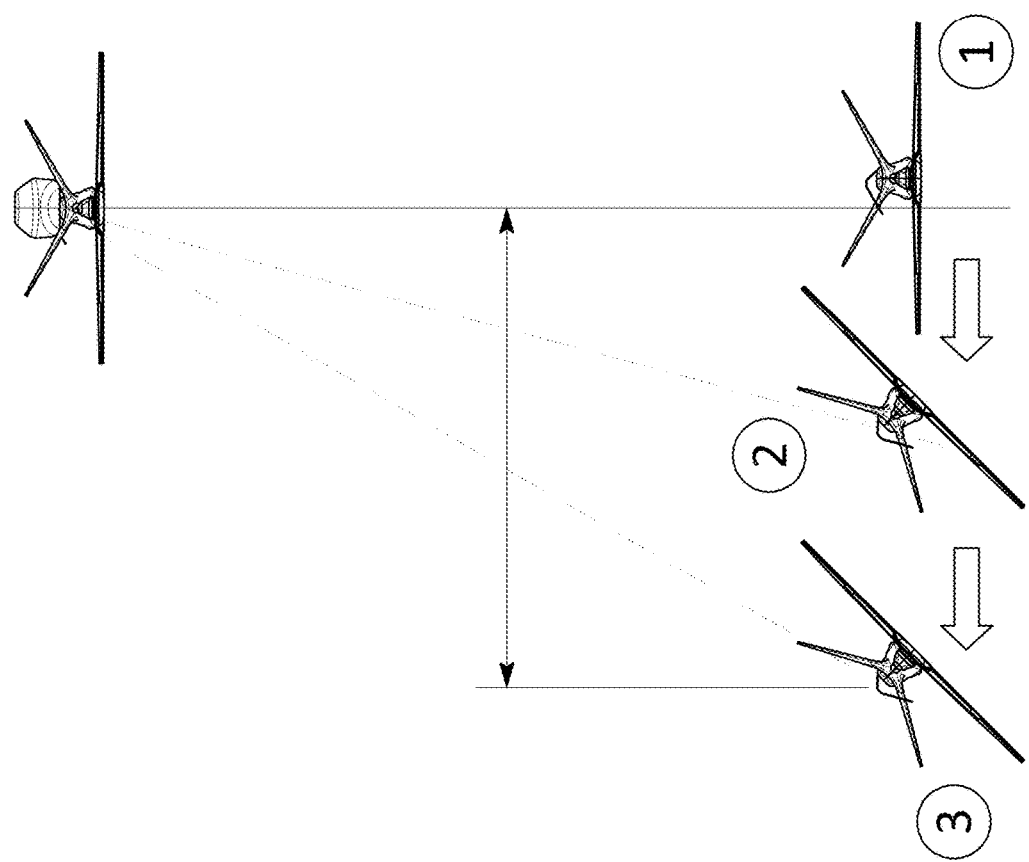
FIGS. 48-50 illustrate example embodiments of tow line capture by a target aircraft.
Figure 49:
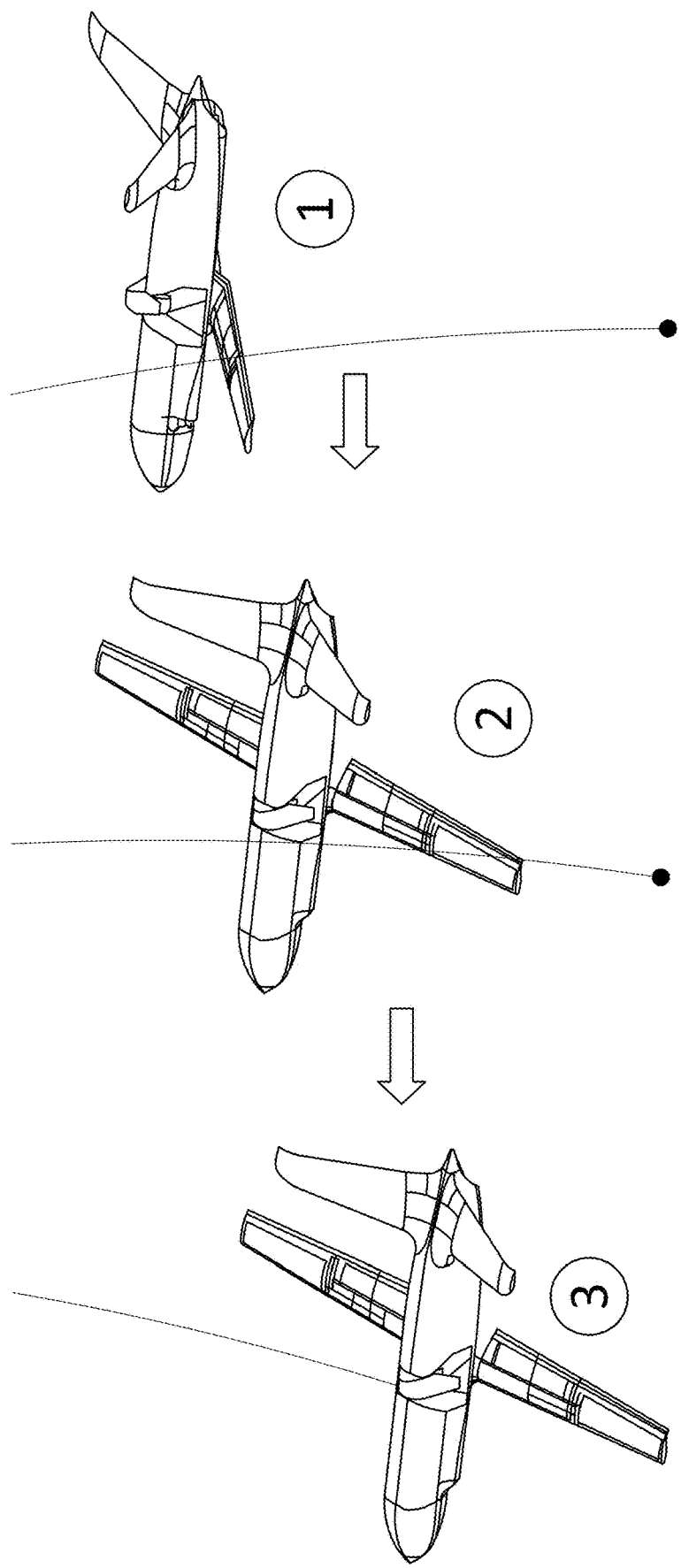
Figure 50:
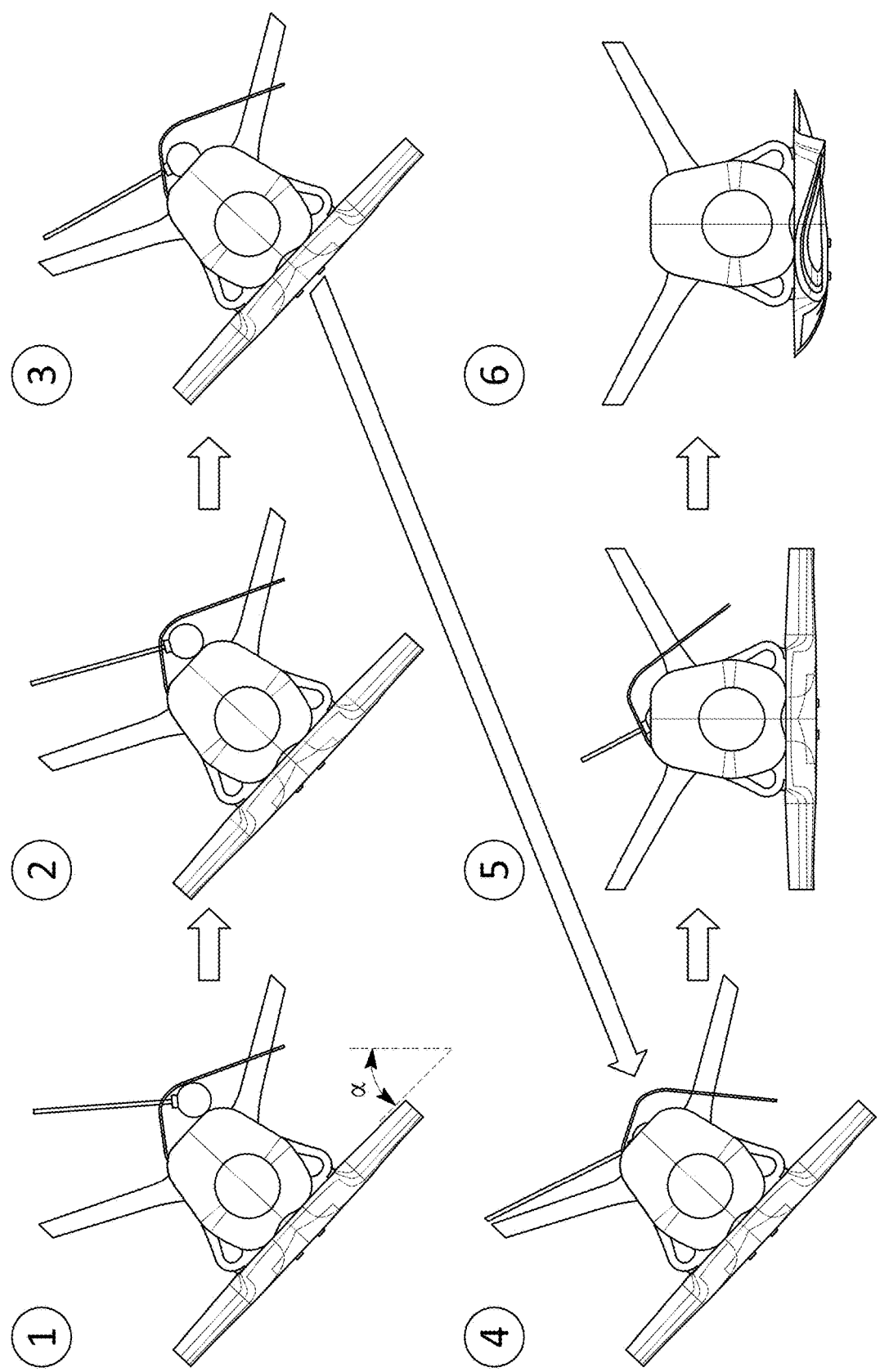

FIGS. 48-50 illustrate example embodiments of towline capture by a target aircraft. As shown in FIGS. 48 and 49, at (1), the target aircraft T can have can zero or approximately zero roll relatively to the host aircraft H. The target aircraft T can approach the towline 102 and/or the host aircraft H can approach the target aircraft T to bring the towline 102 near the target aircraft T. At (2), the target aircraft T can roll to an angle for capturing the towline by the recovery mechanism of the target aircraft T. At (3), the target aircraft T can move laterally such that the end fitting 103 is captured by the recovery mechanism.

FIG. 50 illustrates an example embodiment of the motion of a target aircraft T and a recovery mechanism thereof. In FIG. 50, the target aircraft T includes foldable or rotatable wings, as described herein, although it will be appreciated it is not necessary for a target aircraft to have wings that are foldable, rotatable, or otherwise collapsible. In FIG. 50, the end fitting 103 has already been captured by the recovery mechanism as described herein. At (1), the target aircraft T can have a roll angle α of from 20 degrees or about 20 degrees to 70 degrees or about 70 degrees, for example 45 degrees or about degrees. At (2), the target aircraft T can move relative to towline such that the fitting is moved inward toward a cavity of the target aircraft. At (3), the target aircraft T can continue to move laterally to drag the towline such that the tautness of the towline 102 is increased. As shown in FIG. 36, in some embodiments, the towline can be at an angle with respect to vertical, for example from 0 degrees or about 0 degrees to 45 degrees or about 45 degrees, for example 30 degrees or about 30 degrees. At (4), a sensor (e.g., an inductive sensor, optical sensor, mechanical switch, electrical switch, and/or other suitable sensor) can be used to detect that the towline is at the root of the slot between the forks of the capture mechanism and can close or partially close the forks of the capture mechanism. At (5), the target aircraft T can level out (e.g., the roll of the target aircraft T can tend to zero degrees or about zero degrees. At (6), the folding wings of the target aircraft T can be folded and the towline 102 can be taut.

It will be appreciated FIGS. 48-50 are merely examples and a towline and/or end fitting can be captured in a variety of manners. For example, in some embodiments, the target aircraft T may not roll. In some embodiments, capture can be achieved by bringing the towline into the slot between the forks and subsequently increasing the vertical separation between the target aircraft and a host aircraft to make the towline taut.

ADDITIONAL EMBODIMENTS

Any portion of any of the steps, processes, structures, and/or devices disclosed or illustrated in one example in this disclosure may be combined or used with (or instead of) any other portion of any of the steps, processes, structures, and/or devices disclosed or illustrated in a different example or flowchart. The examples described herein are not intended to be discrete and separate from each other. Combinations, variations, and some implementations of the disclosed features are within the scope of this disclosure.

While operations may be depicted in the drawings or described in the specification in a particular order, such operations need not be performed in the particular order shown or in sequential order, or that all operations be performed, to achieve desirable results. Other operations that are not depicted or described may be incorporated in the example methods and processes. For example, one or more additional operations may be performed before, after, simultaneously, or between any of the described operations. Additionally, the operations may be rearranged or reordered in some implementations. Also, the separation of various components in the implementations described above should not be understood as requiring such separation in all implementations, and it should be understood that the described components and systems may generally be integrated together in a single product or packaged into multiple products. Additionally, some implementations are within the scope of this disclosure.

Terms of orientation used herein, such as "top," "bottom," "proximal," "distal," "longitudinal," "lateral," and "end," are used in the context of the illustrated example. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that may be measured from side-to-side. Terms relating to shapes generally, such as "circular," "cylindrical," "semi-circular," or "semi-cylindrical" or any related or similar terms, are not required to conform strictly to the mathematical definitions of circles or cylinders or other structures, but may encompass structures that are reasonably close approximations.

Conditional language, such as "may," "could," "might," or "may," unless specifically stated otherwise, or otherwise understood within the context as used, is generally intended to convey that certain examples include or do not include, certain features, elements, and/or steps. Thus, such conditional language is not generally intended to imply that features, elements, and/or steps are in any way required for one or more examples.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain examples require the presence of at least one of X, at least one of Y, and at least one of Z.

The terms "approximately," "about," and "substantially" as used herein represent an amount close to the stated amount that still performs a desired function or achieves a desired result. For example, in some examples, as the context may dictate, the terms "approximately," "about," and "substantially," may refer to an amount that is within less than or equal to 10% of the stated amount. The term "generally" as used herein represents a value, amount, or characteristic that predominantly includes or tends toward a particular value, amount, or characteristic. As an example, in certain examples, as the context may dictate, the term "generally parallel" may refer to something that departs from exactly parallel by less than or equal to 20°. All ranges are inclusive of endpoints.

Several illustrative examples of towlines and related systems and methods have been disclosed. Although this disclosure has been described in terms of certain illustrative examples and uses, other examples and other uses, including examples and uses which do not provide all of the features and advantages set forth herein, are also within the scope of this disclosure. Components, elements, features, acts, or steps may be arranged or performed differently than described and components, elements, features, acts, or steps may be combined, merged, added, or left out in various examples. All possible combinations and subcombinations of elements and components described herein are intended to be included in this disclosure. No single feature or group of features is necessary or indispensable.

Certain features that are described in this disclosure in the context of separate implementations may also be implemented in combination in a single implementation. Conversely, various features that are described in the context of a single implementation also may be implemented in multiple implementations separately or in any suitable subcombination. Moreover, although features may be described above as acting in certain combinations, one or more features from a claimed combination may in some cases be excised from the combination, and the combination may be claimed as a subcombination or variation of a subcombination.

Further, while illustrative examples have been described, any examples having equivalent elements, modifications, omissions, and/or combinations are also within the scope of this disclosure. Moreover, although certain aspects, advantages, and novel features are described herein, not necessarily all such advantages may be achieved in accordance with any particular example. For example, some examples within the scope of this disclosure achieve one advantage, or a group of advantages, as taught herein without necessarily achieving other advantages taught or suggested herein. Further, some examples may achieve different advantages than those taught or suggested herein.

Some examples have been described in connection with the accompanying drawings. The figures may or may not be drawn and/or shown to scale, but such scale should not be limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components may be added, removed, and/or rearranged. Further, the disclosure herein of any particular feature, aspect, method, property, characteristic, quality, attribute, element, or the like in connection with various examples may be used in all other examples set forth herein. Additionally, any methods described herein may be practiced using any device suitable for performing the recited steps.

For purposes of summarizing the disclosure, certain aspects, advantages, and features of the inventions have been described herein. Not all, or any such advantages are necessarily achieved in accordance with any particular example of the inventions disclosed herein. No aspects of this disclosure are essential or indispensable. In many examples, the devices, systems, and methods may be configured differently than illustrated in the figures or description herein. For example, various functionalities provided by the illustrated modules may be combined, rearranged, added, or deleted. In some implementations, additional or different processors or modules may perform some or all of the functionalities described with reference to the examples described and illustrated in the figures. Many implementation variations are possible. Any of the features, structures, steps, or processes disclosed in this specification may be included in any example.

In summary, various examples of towlines and related systems and methods have been disclosed. This disclosure extends beyond the specifically disclosed examples to other alternative examples and/or other uses of the examples, as well as to certain modifications and equivalents thereof. Moreover, this disclosure expressly contemplates that various features and aspects of the disclosed examples may be combined with, or substituted for, one another. Accordingly, the scope of this disclosure should not be limited by the particular disclosed examples described above, but should be determined only by a fair reading of the claims.

What is claimed is:

1. A recovery and deployment pylon for recovering and relaunching a target aircraft, the pylon comprising:
   a housing configured to be coupled with a host aircraft;
   a motorized winch within the housing;
   a towline coupled with the motorized winch and configured to be selectively paid out and reeled in using the motorized winch;
   a plurality of fleet pulleys supported within the housing, wherein the towline extends from the motorized winch through the plurality of fleet pulleys;
   a fitting coupled with the towline, the fitting having a width that is larger than a width of the towline; and
   a first latching mechanism configured to selectively engage with a first lug of the target aircraft when the target aircraft is in a first position relative to the recovery and deployment pylon,
   wherein the motorized winch further comprises a cartridge through which the towline extends, and
   wherein the cartridge is movable along an axle such that a portion of the towline between the motorized winch and the plurality of fleet pulleys may sweep a total angle of up to thirty degrees.

2. The recovery and deployment pylon of claim 1, further comprising a movable ejector configured to extend away from the housing, wherein the ejector is configured to exert a force on the target aircraft upon activation of the ejector to cause the target aircraft to move away from the pylon when the target aircraft is positioned within a predetermined distance of the recovery and deployment pylon.

3. The recovery and deployment pylon of claim 2, wherein the ejector comprises an elongate member that is configured to move axially between a first position in which the ejector is retracted and a second position in which the ejector is extended.

4. The recovery and deployment pylon of claim 1, further comprising a first shock absorber extending away from the housing in an operable state, the first shock absorber configured to contact an upper surface of the target aircraft as the target aircraft is brought into engagement with the pylon.

5. The recovery and deployment pylon of claim 1, comprising a second latching mechanism configured to selectively engage with a second lug of the target aircraft when the target aircraft is in the first position.

6. The recovery and deployment pylon of claim 1, further comprising a first alignment member coupled with the housing on an underside surface of the housing, the first alignment member projecting away from the underside surface of the housing in a downward direction and configured to laterally constrain a target aircraft engaged with the pylon.

7. The recovery and deployment pylon of claim 1, further comprising one or more sensors configured to determine when the target aircraft is in the first position.

8. The recovery and deployment pylon of claim 1, comprising an upper sheave supported within the housing, wherein the towline extends from the fleet pulleys and around the upper sheave.

9. The recovery and deployment pylon of claim 1, wherein the plurality of fleet pulleys comprises two pulleys oriented approximately horizontally.

10. The recovery and deployment pylon of claim 1, wherein the motorized winch is laterally oriented such that an axis of rotation is oriented in a lateral direction that is perpendicular to a longitudinal axis of the recovery and deployment pylon.

11. The recovery and deployment pylon of claim 1, wherein the motorized winch is longitudinally oriented.

12. The recovery and deployment pylon of claim 1, further comprising:
   a forward bulkhead;
   an aft bulkhead;
   a connecting member; and
   a rack unit,
   wherein the forward bulkhead and the aft bulkhead are configured to be mechanically coupled to the host aircraft,
   wherein the connecting member is mechanically coupled to the forward bulkhead and the aft bulkhead, and
   wherein the rack unit is mechanically coupled to at least one of the forward bulkhead, the aft bulkhead, or the connecting member.

13. A system including the pylon of claim 1 and a capture mechanism configured to be coupled with a target aircraft, the capture mechanism configured to move between a first state in which the capture mechanism is configured to secure the fitting with the capture mechanism such that the target aircraft can be pulled toward the pylon when the towline is reeled in and a second state in which the capture mechanism is configured to release the fitting from the capture mechanism.

14. The system of claim 13, comprising a fitting release hatch configured to selectively open to release the fitting from the capture mechanism.

15. The system of claim 14, wherein the capture mechanism of the target aircraft comprises one or more flaps configured to deploy and stow, wherein the one or more flaps deploy to define an opening through which the towline is received, and wherein the flaps stow to guide the fitting into a recess of the target aircraft.

16. The system of claim 13, wherein a rack unit is shaped to provide a central cavity such that the towline can be released through a central portion of the pylon.

17. A recovery and deployment pylon for recovering and relaunching a target aircraft, the pylon comprising:
- a housing configured to be coupled with a host aircraft;
- a motorized winch within the housing;
- a towline coupled with the motorized winch and configured to be selectively paid out and reeled in using the motorized winch;
- a plurality of fleet pulleys supported within the housing, wherein the towline extends from the motorized winch through the plurality of fleet pulleys;
- a fitting coupled with the towline, the fitting having a width that is larger than a width of the towline; and
- a movable ejector configured to extend away from the housing, wherein the ejector is configured to exert a force on the target aircraft upon activation of the ejector to cause the target aircraft to move away from the pylon when the target aircraft is positioned within a predetermined distance of the recovery and deployment pylon;
- wherein the motorized winch further comprises a cartridge through which the towline extends, and
- wherein the cartridge is movable along an axle such that a portion of the towline between the motorized winch and the plurality of fleet pulleys may sweep a total angle of up to thirty degrees.

18. A method of servicing a target aircraft in flight using a recovery and deployment pylon coupled with a host aircraft, comprising:
- extending a towline from the recovery and deployment pylon, the towline extending from a winch through a plurality of fleet pulleys supported within the recovery and deployment pylon, the towline extending through a cartridge of the winch, wherein the cartridge is movable along an axle such that a portion of the towline between the winch and the plurality of fleet pulleys is configured to sweep a total angle of up to thirty degrees;
- coupling the towline with the target aircraft;
- reeling in the towline to move the target aircraft to a predetermined position relative to the recovery and deployment pylon;
- latching the target aircraft to the recovery and deployment pylon by engaging a first lug on the target aircraft with a first latching mechanism of the recovery and deployment pylon;
- servicing the target aircraft;
- decoupling the towline from the target aircraft; and
- releasing the target aircraft from the recovery and deployment pylon.

19. The method of claim 18, wherein servicing the target aircraft comprises rearming, refueling, and/or providing power to the target aircraft.

20. The method of claim 18, wherein releasing the target aircraft from the recovery and deployment pylon comprises actuating an ejector mechanism to exert a force on the target aircraft that causes the target aircraft to move away from the recovery and deployment pylon.

* * * * *